US012151230B2

(12) United States Patent
Sadow et al.

(10) Patent No.: US 12,151,230 B2
(45) Date of Patent: *Nov. 26, 2024

(54) PORE-ENCAPSULATED CATALYSTS FOR SELECTIVE HYDROGENOLYSIS OF PLASTIC WASTE

(71) Applicants: IOWA STATE UNIVERSITY RESEARCH FOUNDATION, INC., Ames, IA (US); CORNELL UNIVERSITY, Ithaca, NY (US)

(72) Inventors: Aaron D. Sadow, Ames, IA (US); Wenyu Huang, Ames, IA (US); Frédéric A. Perras, Ames, IA (US); Marek Pruski, Ames, IA (US); Akalanka Tennakoon, Ames, IA (US); Xun Wu, Ames, IA (US); Anne M. Lapointe, Ithaca, NY (US)

(73) Assignees: IOWA STATE UNIVERSITY RESEARCH FOUNDATION, INC., Ames, IA (US); CORNELL UNIVERSITY, Ithaca, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/508,055

(22) Filed: Nov. 13, 2023

(65) Prior Publication Data

US 2024/0157338 A1 May 16, 2024

Related U.S. Application Data

(63) Continuation of application No. 17/497,206, filed on Oct. 8, 2021, now Pat. No. 11,857,951.
(Continued)

(51) Int. Cl.
*B01J 21/08* (2006.01)
*B01J 23/24* (2006.01)
(Continued)

(52) U.S. Cl.
CPC ............... *B01J 23/42* (2013.01); *B01J 21/08* (2013.01); *B01J 35/40* (2024.01); *B01J 35/50* (2024.01); *C08J 11/16* (2013.01); *B01J 35/647* (2024.01)

(58) Field of Classification Search
CPC ... B01J 21/08; B01J 23/24; B01J 23/26; B01J 23/28; B01J 23/30; B01J 23/34;
(Continued)

(56) References Cited

U.S. PATENT DOCUMENTS 3,894,066 A    7/1975  Buschhoff et al.
5,446,188 A    8/1995  Gruber et al.
(Continued)

OTHER PUBLICATIONS

Hou et al., "Upcycling and Catalytic Degradation of Plastic Wastes," Cell Reports Physical Science 2:1-30 (2021).
(Continued)

*Primary Examiner* — Cam N. Nguyen
(74) *Attorney, Agent, or Firm* — Troutman Pepper Hamilton Sanders LLP (Rochester)

(57) ABSTRACT

Disclosed herein is a catalyst which comprises a silica core having an outer surface and a mesoporous silica shell having an outer surface and an inner surface with the inner surface being inside the outer surface of said mesoporous silica shell proximate to and surrounding the outer surface of said silica core. Wherein the outer surface of the mesoporous silica shell has openings leading to pores within the mesoporous silica shell which extend toward the outer surface of said silica core. The catalyst also includes catalytically active metal nanoparticles positioned within the pores proximate to said core, wherein the catalytic metal nanoparticles comprise about 0.0001 wt % to about 1.0 wt % of the catalyst. Also disclosed are methods of making the catalyst and using it to carry out a process for catalytically hydrogenolysizing a polyolefinic polymer.

21 Claims, 100 Drawing Sheets

Related U.S. Application Data

(60) Provisional application No. 63/089,972, filed on Oct. 9, 2020.

(51) Int. Cl.

| | | |
|---|---|---|
| *B01J 23/26* | (2006.01) | |
| *B01J 23/28* | (2006.01) | |
| *B01J 23/30* | (2006.01) | |
| *B01J 23/34* | (2006.01) | |
| *B01J 23/36* | (2006.01) | |
| *B01J 23/42* | (2006.01) | |
| *B01J 23/44* | (2006.01) | |
| *B01J 23/46* | (2006.01) | |
| *B01J 23/74* | (2006.01) | |
| *B01J 23/745* | (2006.01) | |
| *B01J 23/75* | (2006.01) | |
| *B01J 23/755* | (2006.01) | |
| *B01J 23/76* | (2006.01) | |
| *B01J 23/89* | (2006.01) | |
| *B01J 35/40* | (2024.01) | |
| *B01J 35/50* | (2024.01) | |
| *B01J 35/64* | (2024.01) | |
| *C08J 11/16* | (2006.01) | |

(58) Field of Classification Search
CPC ... B01J 23/36; B01J 23/42; B01J 23/44; B01J 23/46; B01J 23/462; B01J 23/74; B01J 23/745; B01J 23/75; B01J 23/755; B01J 23/76; B01J 23/89; B01J 23/892; B01J 35/40; B01J 35/50; B01J 35/647; C08J 11/16
See application file for complete search history.

(56) References Cited

U.S. PATENT DOCUMENTS

| | | | |
|---|---|---|---|
| 6,171,475 | B1 | 1/2001 | Dufaud et al. |
| 8,048,394 | B2 | 11/2011 | Yano et al. |
| 8,415,267 | B2 | 4/2013 | Lee |
| 8,449,856 | B2 | 5/2013 | Yano et al. |
| 8,883,308 | B2 | 11/2014 | Polshettiwar et al. |
| 9,283,545 | B2 | 3/2016 | Asefa et al. |
| 9,533,286 | B2 | 1/2017 | Stamm Masias et al. |
| 9,943,826 | B2 | 4/2018 | Haynes et al. |
| 9,956,545 | B2 | 5/2018 | Calderone et al. |
| 10,351,781 | B2 | 7/2019 | Sinha et al. |
| 11,053,598 | B2 | 7/2021 | Chou |
| 11,198,112 | B2 | 12/2021 | Lu et al. |
| 11,857,951 | B2 | 1/2024 | Sadow et al. |
| 12,030,843 | B2 | 7/2024 | Sadow et al. |
| 2010/0056360 | A1 | 3/2010 | Lee |
| 2011/0250122 | A1 | 10/2011 | Joo et al. |
| 2011/0311635 | A1 | 12/2011 | Stucky et al. |
| 2012/0264599 | A1 | 10/2012 | Komatsu et al. |
| 2013/0318863 | A1 | 12/2013 | Chang et al. |
| 2018/0056277 | A1 | 3/2018 | Lee et al. |
| 2019/0126247 | A1 | 5/2019 | Deeba |
| 2019/0291092 | A1 | 9/2019 | Cargnello et al. |
| 2020/0122122 | A1 | 4/2020 | Gong et al. |
| 2021/0031176 | A1 | 2/2021 | Suriye et al. |
| 2021/0061971 | A1 | 3/2021 | Delferro et al. |
| 2021/0322961 | A1 | 10/2021 | Wattanakit et al. |
| 2022/0111356 | A1 | 4/2022 | Sadow et al. |
| 2022/0213007 | A1 | 7/2022 | Sadow et al. |
| 2023/0219870 | A1 | 7/2023 | Sadow et al. |

OTHER PUBLICATIONS

Jehanno et al., "Organocatalysis for Depolymerisation," Polymer Chemistry 10:172-186 (2019).
Lee et al., "Chemical Recycling of Plastic Waste via Thermocatalytic Routes," Journal of Cleaner Production 321:128989 12 pages (2021).
Office Action for U.S. Appl. No. 17/554,666 (Aug. 9, 2023).
Cannavacciuolo et al., "A High-Throughput Approach to Repurposing Olefin Polymerization Catalysts for Polymer Upcycling," Angew. Chem. Int. Ed. 61:e202202258 (2022).
Zhang et al., "Polyethylene Upcycling to Long-Chain Alkylaromatics by Tandem Hydrogenolysis/Aromatization," Science 370:437-441 (2020).
Coates et al., "Chemical Recycling to Monomer for an Ideal, Circular Polymer Economy," Nature Reviews Materials 5:501-516 (2020).
Gu et al., "Cp2ZrHCI Induced Catalytic Chain Scission of Diene-Based Polymers Under Mild Conditions: Influence of Chemical Environment Around C=C Bonds," Polymer 161:181-189 (2019).
Gu et al., "The Catalytic Cleavage of Carbon-Carbon Double Bond in Polychloroprene Induced by Schwartz's Reagent Via Chlorine Self-Assisted β-Alkyl Elimination Mechanism," Polymer 170:24-30 (2019).
Office Action (Restriction) for U.S. Appl. No. 17/554,666 (Mar. 31, 2023).
Bae et al. "Catalytic Hydroxylation of Polypropylenes," J. Am. Chem. Soc. 127:767-776 (2005).
Bae et al., "Regiospecific Side-Chain Functionalization of Linear Low-Density Polyethylene with Polar Groups," Angew. Chem. Int. Ed. 44:6410-6413 (2005).
Boaen et al., "Selective and Mild Oxyfunctionalization of Model Polyolefins," Macromolecules 36:7027-7034 (2003).
Bunescu et al., "Catalytic Hydroxylation of Polyethylenes," ACS Cent. Sci. 3:895-903 (2017).
Diaz-Requejo et al., "Controlled, Copper-Catalyzed Functionalization of Polyolefins," Macromolecules 38:4966-4969 (2005).
Kondo et al., "Rhodium-Catalyzed, Regiospecific Functionalization of Polyolefins in the Melt," J. Am. Chem. Soc. 124:1164-1165 (2002).
Lewis et al., "Upcycling Aromatic Polymers through C-H Fluoroalkylation," Chem. Sci. 10:6270-6277 (2019).
Plummer et al., "Mild Halogenation of Polyolefins Using an ••Haloamide Reagent," Polym. Chem. 9:1309-1317 (2018).
Williamson et al., "Chemo- and Regioselective Functionalization of Isotactic Polypropylene: A Mechanistic and Structure-Property Study," J. Am. Chem. Soc. 141:12815-12823 (2019).
Williamson et al., "Regioselective C—H Xanthylation as a Platform for Polyolefin Functionalization," Angew. Chem. Int. Ed. 57:6261-6265 (2018).
Zhou et al., "Direct Amination of Polyethylene by Metal-Free Reaction," Macromolecules 50:3510-3515 (2017).
Chen et al., "Selective, Catalytic Oxidations of C—H Bonds in Polyethylenes Produce Functional Materials with Enhanced Adhesion," Chem. 7:137-145 (2021).
U.S. Appl. No. 17/983,165, filed Nov. 8, 2022, first named inventor Aaron D. Sadow, accessible to the USPTO.
DOE Grant proposal (Jul. 1, 2020).
Takei et al., "Anionic Surfactants: Lauric Products," JAOCS 62(2):341-347 (1985).
David B. Hatcher, "Fatty Alcohol Sulfates," The Journal of the American Oil Chemists' Society 34:175-178 (1957).
Backstrom et al., "Trash to Treasure: Microwave-Assisted Conversion of Polyethylene to Functional Chemicals," Industrial & Engineering Chemistry Research 56:14814-14821 (2017).
Zheng et al., "Controlled Chain-Scission of Polybutadiene by the Schwarts Hydrozirconation," Chem. Eur. J. 19:541-548 (2013).
Kanbur et al., "Catalytic Carbon-Carbon Bond Cleavage and Carbon-Element Bond Formation Give New Life for Polyolefins as Biodegradable Surfactants," Chem 7(5):1347-1362 (2021).
Tennakoon et al., "Catalytic Upcycling of High-Density Polyethylene via a Processive Mechanism," Nat. Catal. 3:893-901 (2020).
Xiao et al., "High-temperature-stable and Regenerable Catalysts: Platinum Nanoparticles in Aligned Mesoporous Silica Wells," ChemSusChem. 6(10):1915-22 (2013).
Flaherty et al., "Metal-catalyzed C—C Bond Cleavage in Alkanes: Effects of Methyl Substitution on Transition-state Structures and Stability," J Am Chem Soc 136(27):9664-76 (2014).

(56) References Cited

OTHER PUBLICATIONS

Dufaud et al., "Catalytic Hydrogenolysis at Low Temperature and Pressure of Polyethylene and Polypropylene to Diesels or Lower Alkanes by a Zirconium Hydride Supported on Silica-Alumina: A Step Toward Polyolefin Degradation by the Microscopic Reverse of Ziegler-Natta Polymerization," Angew Chem Int Ed Engl 37(6):806-810 (1998).

Dong et al., "In Situ Quantitative Single-Molecule Study of Dynamic Catalytic Processes in Nanoconfinement," Nature Catalysis 1:135-140 (2018).

Celik et al., "Upcycling Single-Use Polyethylene into High-Quality Liquid Products," ACS Cent. Sci. 5:1795-1803 (2019).

Schmidt-Rohr and Spiess, "Chain Diffusion Between Crystalline and Amorphous Regions in Polyethylene Detected by 2D Exchange 13C NMR," Macromolecules 24:5288-5293 (1991).

Inoue et al., "Structural and Dynamical Studies of 13c-Labeled Polyethylene Adsorbed on the Surface of Silica Gel by High-Resolution Solid-State 13c NMR Spectroscopy," Acta Polymer. 46:420-423 (1995).

Office Action for U.S. Appl. No. 17/497,206 (Mar. 2, 2023).

U.S. Appl. No. 18/662,461, filed May 13, 2024, first named inventor Aaron D. Sadow, accessible to the USPTO.

U.S. Appl. No. 18/539,495, filed Dec. 14, 2023, first named inventor Aaron D. Sadow, accessible to the USPTO.

Hoang and Lieske, "Effect of Hydrogen Treatments on $ZrO_2$ and $Pt/ZrO_2$ Catalysts," Catalysis Letters 27:33-42 (1994).

Utami et al., "Hydrothermal Preparation of a Platinum-Loaded Sulphated Nanozirconia Catalyst for the Effective Conversion of Waste Low Density Polyethylene into Gasoline-Range Hydrocarbons," RSC Advances 9:41392-41401 (2019).

Wang et al., "Graphene Oxide—Periodic Mesoporous Silica Sandwich Nanocomposites with Vertically Oriented Channels," ACS Nano 4:7437-7450 (2010).

Yang et al., "Graphene-Based Nanosheets with a Sandwich Structure," Angew. Chem. Int. Ed. 49:4795-4799 (2010).

Yappert et al., "Integrated Multiscale Models for Polymer Upcycling," Poster, Sep. 2021.

PORE-ENCAPSULATED CATALYSTS FOR SELECTIVE HYDROGENOLYSIS OF PLASTIC WASTE

CROSS-REFERENCE TO RELATED APPLICATIONS

This application is a continuation of U.S. patent application Ser. No. 17/497,206, filed Oct. 8, 2021, which claims the benefit of U.S. Provisional Application No. 63/089,972 filed Oct. 9, 2020, which are hereby incorporated by reference in their entirety.

GOVERNMENT INTERESTS

This invention was made with government support under DOE Contract No. DE-AC02-07CH11358 awarded by U.S. Department of Energy. The government has certain rights in the invention.

FIELD

The present application is directed to a catalyst and its use for the selective hydrogenolysis of polyolefins.

BACKGROUND

Polymers are irreplaceable in the global economy, with a myriad of uses in packaging, construction, transportation, electronics, and health-care industries. Many of these applications rely on plastics as inexpensive disposable materials, which are nonetheless often precisely constructed to confer desired properties essential for the targeted function. Their massive-scale manufacture, single-use function, long lifetimes, slow decomposition rates, and disruption of sensitive ecosystems, however, have created a crisis of plastics waste. Unfortunately, conventional mechanical recycling methods are limited by considerable technological and economic challenges. First, syntheses of many virgin plastics are currently less expensive than creating quality recycled materials, because plastics are made on large scale in centralized plants, from inexpensive monomers such as ethylene, in processes that are tightly integrated into commodity chemical production. In contrast, waste streams are widely decentralized and rarely connect with manufacturing consumer products (aside from recycling). Second, melt-processed waste plastics frequently have poorer properties than those of the original materials, and this issue is exacerbated with multicomponent mixtures. Thus, recycled plastics are typically limited to applications where lower-quality materials are acceptable, resulting in minimal economic incentives for waste recovery, sorting, and processing.

Long carbon chains are constructed during olefin polymerizations to achieve desired average lengths and dispersity, stereochemical control, and co-monomer incorporation through catalyst-programmed precision, providing inexpensive plastics with desirable physical and chemical properties. The structure/property relationship-guided requirements for high quality materials, along with chemical degradation under melt-reprocessing conditions, contribute to low recycling rates of high-density polyethylene (HDPE, 8.9% US), low-density polyethylene (LDPE) and linear LDPE (LLDPE, 4.3% US, combined) and isotactic polypropylene (iPP, 0.6% US). Limited recycling, combined with massive production of polyolefins representing more than 50% of the estimated 400 million tons of plastics produced worldwide each year, contributes to the disastrous accumulation of plastics everywhere on Earth.

Chemical upcycling, an emerging alternative to the classical recycling approach, would use plastic waste as a feedstock for the synthesis of value-added chemicals and materials. Catalytic methods can add functional groups to polymer chains through oxidation or C—H bond activation to create materials with new properties. For example, combination of HDPE and hexane afford alkane liquids via cross-alkane metathesis (3 d, 150° C.). Alternatively, catalytic hydrogenolysis of carbon-carbon bonds can be used to deconstruct the long chains of polyolefins into shorter molecules. In a seminal report, an air-sensitive zirconium hydride supported on silica-alumina catalyzes hydrogenolysis of polyethylene to light alkanes (2.5 d, 150° C., 14.5 psi $H_2$). Recently, platinum nanoparticles, supported on strontium titanate nanocuboids, were shown to catalyze hydrogenolysis of high density polyethylene (HDPE) selectively into uniform liquid alkanes that have valuable properties as lubricants (4 d, 300° C., 200 psi $H_2$). These approaches rely on random encounters between catalytic sites and positions along the macromolecular chains.

The deconstruction of longer polymer chains follows a decay in the number-averaged molecular weight ($M_n$) inversely related to the rate of carbon-carbon bond cleavage Assessing and comparing catalysts requires analysis of the distribution of the species in the reaction mixtures (i.e., the populations). Concurrent generation of all chain lengths by random C—C bond cleavage is undesirableAn ideal catalyst would cleaves long chains directly to the desired short chain fragments that are in the liquid range and can yield the desired products over a wide range of conversion (FIG. 119, top).

An example of a catalytic conversion of polymers into liquids is provided by the hydrogenolysis reaction, in which carbon-carbon bonds are broken at catalytic sites. Pt nanoparticles (NPs) grown on strontium titanate nanocuboids through five atomic layer deposition (ALD) cycles (5c-Pt/$SrTiO_3$), favors cleavage of long chains to lubricant-length high quality liquids and produces only small amounts of gases (<1%). This Pt-catalyzed hydrogenolysis is a structure-sensitive reaction. A catalyst with smaller Pt NPs (1.2 nm) made through fewer ALD cycles, produces more small volatile molecules. In less selective hydrogenolysis reactions, the amount of the smallest species ($C_1$-$C_6$) that result from chain end cleavage increase in proportion to the conversion of the longer chains, as a result of the increased mole fraction of chain ends.

In contrast to the above synthetic methods, nature routinely performs atom-precise deconstructions of flexible macromolecules, such as proteins, cellulose, or even synthetic polymers. The processive modus operandi of such enzymes involves threading and noncovalent binding of the molecular chain in a cleft-like channel containing an active site. This binding cleft engenders conformational and positional specificity onto multiple repeat units of the polymer chain in order to enable precise cleavage reactions by the active site. Once the cleavage occurs, the smaller molecular mass fragment is released, the polymer threads further into the catalytic pore and is positioned to undergo another cleavage reaction. These steps are repeated processively, without releasing the polymer, until that entire polymer chain is converted into the desired uniform species of low molecular mass. A processive polymer deconstruction may be considered as the reverse of a chain-growth polymerization, in that reaction mixtures contain only small molecules (monomers or deconstruction products) and high molecular mass polymer. Thus, the product stream from a polymer deconstruction reaction that obeys a processive mechanism is independent of the chain length of the starting polymer as well as the conversion.

The rate of PE hydrogenolysis catalyzed by the active sites in smaller Pt NPs is higher than that of sites in larger Pt NPs. In contrast, the similar rates for the small and large Pt NPs as well as Pt surfaces is a hallmark of structure insensitive reactions. Thus, this qualitative assessment reveals that PE hydrogenolysis rates are increased with greater proportions of edge and corner sites compared to facets in the Pt NPs. Hydrogenolysis of light linear, branched, and cyclic alkanes have been demonstrated to be structure sensitive on metal surfaces, whose activity (and selectivity, varies with the exposed single crystal facet.

Structure sensitivity is often also manifested in terms of selectivity. For example, larger Pt NPs catalyze hydrogenolysis of small hydrocarbons in solid-gas reactions to give more branched products than linear ones, favoring cleavage of carbon-carbon bonds of secondary carbons over those involving tertiary carbons. The selectivity of PE hydrogenolysis catalyzed by small, medium, and larger Pt NPs in $mSiO_2/Pt$—$X/SiO_2$ is independent of the particle size.

To partly address this waste crisis, the upcycling of used polyolefins into value-added chemicals would benefit from selective cleavage of the long chains into a narrow distribution of desired chain lengths, just as polymer properties and applications are advantaged by highly selective polymerizations.

The present application relates to overcoming deficiencies in the art.

SUMMARY

One aspect of the present application relates to a catalyst which comprises a silica core having an outer surface and a mesoporous silica shell having an outer surface and an inner surface with the inner surface being inside the outer surface of said mesoporous silica shell proximate to and surrounding the outer surface of said silica core. The outer surface of the mesoporous silica shell has openings leading to pores within the mesoporous silica shell which extend toward the outer surface of said silica core. The catalyst also includes catalytically active metal nanoparticles positioned within the pores proximate to said core, wherein the catalytic metal nanoparticles comprise about 0.0001 wt % to about 1.0 wt % of the catalyst.

Another aspect of the present application relates to a process for catalytically hydrogenolysizing a polyolefinic polymer, which comprises providing a polyolefinic polymer and subjecting said polyolefinic polymer to a hydrogenolysis reaction in the presence of a catalyst to cleave the polymer into hydrocarbon segments. The catalyst comprises a silica core having an outer surface and a mesoporous silica shell having an outer surface and an inner surface with the inner surface being inside the outer surface of said mesoporous silica shell proximate to and surrounding the outer surface of said silica core. The outer surface of the mesoporous silica shell has openings leading to pores within the mesoporous silica shell which extend toward the outer surface of said silica core. The catalyst also includes catalytic metal nanoparticles positioned within the pores proximate to said core to cleave said polyolefinic polymer entering said mesoporous silica shell through the openings into hydrocarbon segments.

A further aspect of the present application relates to a method of preparing a catalyst which comprises adding a functional group to a silica core having an outer surface to produce a functionalized silica core. The functionalized silica core is contacted with a plurality of catalytic metal nanoparticles wherein the catalytic metal nanoparticles adhere to the surface of the functionalized silica core to produce a functionalized silica core supported catalytic metal nanoparticles. The functionalized silica core supported catalytic metal nanoparticles is then contacted with a silicon compound to produce a mesoporous silica shell having an outer surface and an inner surface with the inner surface being inside the outer surface of said mesoporous silica shell proximate to and surrounding the outer surface of said functionalized silica core supported catalytic metal nanoparticles. The outer surface of the mesoporous silica shell has openings leading to pores within the mesoporous silica shell which extend toward the outer surface of said functionalized silica core supported catalytic metal nanoparticles.

This architecture and the catalytic process is further illustrated by FIG. 1A which shows the processive process through which many enzymes deconstruct large macromolecules. First, the polymer threads and binds into the catalytic pore or cleft. A catalytic cleavage reaction at the active site (represented by a pair of scissors) releases a low molecular mass fragment. The macromolecule then threads further into the pore to repeat the process. An analogous mechanism proposed for the $mSiO_2/Pt/SiO_2$ catalyst is shown in FIG. 1B, where $SiO_2$-supported Pt nanoparticles are located at the end of nanopores in the mesoporous $SiO_2$ ($mSiO_2$) shell.

The present application provides an artificial processive catalyst for polyethylene hydrogenolysis from chemically and thermally robust inorganic materials. The key design elements include (1) pores that are sufficiently narrow to support headfirst adsorption of a polymer chain in an induced straightened conformation, (2) a catalyst positioned near the end of the pore that selectively cleaves one type of bond at a regular interval from the chain end, and (3) pore size, structure, and chemistry that permits the desorption and release of the small-molecule products.

To design a processive catalytic process for upcycling of polyethylene, the adsorption and dynamics of HDPE and small hydrocarbons in porous silicas were first spectroscopically investigated. These studies identified the pore characteristics required by design element (1) and demonstrated that long polymer chains bind preferentially to the surface over small hydrocarbons; design element (3). A functioning catalyst was then constructed by positioning active sites for carbon-carbon bond hydrogenolysis, namely Pt nanoparticles, at the closed ends of these pores to achieve the design element (2). In this catalytic process, small molecules desorb and exit the pore as they are cut from the polymer end, allowing the catalyst to processively digest entire chains of HDPE.

In contrast with traditional synthetic catalytic systems, enzymes are able to reliably produce atom-precise fragments from large macromolecules by utilizing a processive mechanism. Using solid-state nuclear magnetic resonance (NMR) spectroscopy it was shown that mesoporous silica materials can grasp polyethylene chains that nonetheless remain mobile. These properties are central requirements for achieving processivity in a catalytic process. Inspired by this result, a hydrogenolysis catalyst housing Pt nanoparticles at the base of silica mesopores was designed and synthesized. The processive polymer deconstruction, realized by this catalyst, leads to a narrow Pt-catalyzed distribution of short chain products from PE and opens a new avenue to waste polymer upcycling. The oily product could be separated into fuels, solvents, and lubricating oil. In fact, the mSiO$_2$/Pt/SiO$_2$ catalyst is active for hydrogenolysis of post-consumer HDPE, including multilayer plastics films obtained from single-use grocery-style shopping bags. The hydrogenolysis of isotactic polypropylene (iPP) is catalyzed by mSiO$_2$/Pt/SiO$_2$ to a liquid product distribution (79% yield) from C$_9$-C$_{18}$.

The features of these conversions highlight the potential benefits of processive catalytic transformation for upcycling single-use plastics. It was speculated that the architectural motifs of the processive catalyst, such as pore diameter and length, could be designed to 'dial-in' the center-point of the catalyst-generated product distribution. Moreover, the standard deviation of product distributions will be affected by the balance between polymer and product binding thermodynamics and kinetic properties of carbon-carbon bond-cleaving sites. The modified architecture of a processive catalyst could also offer enhancement of catalytic rates by holding mobile macromolecules in a desired position with respect to catalytic sites. Finally, the placement of a catalytic site within a narrow pore may provide a strategy to exclude certain large, non-linear molecules, such as low density polyethylene or linear low density polyethylene. These features and the processive mechanism, however, will likely be affected by rates of adsorption and desorption of chains in the pores, migration of chains through the pores, and carbon-carbon bond cleavage steps, all of which will be affected by the properties of the polymer. Likely, accessing a high degree of processive behavior to selectively produce the desired products will involve a degree matching of catalyst and polymer architectures.

Selective hydrogenolysis of polyethylene and isotactic polypropylene to narrow distributions of hydrocarbon oligomers is catalyzed by spherical mesoporous silica shell/active platinum NP/silica core (mSiO$_2$/Pt/SiO$_2$) materials. This catalytic architecture creates linear, radial-oriented wells with Pt NPs located solely at the bottom, requiring the hydrocarbon chains to adopt a zig-zag, all-anti conformation as they diffuse through the mesopores to access the catalytic sites. The influence of the catalytic architecture upon the products' length and distribution could result from a number of factors, including chain adsorption phenomena in the pores, rates of chain diffusion and rates of carbon-carbon bond cleavage via exposed active sites, and/or the pore templating a specific conformation of the chains.

This possibility, that the dimensions of Pt NPs affect the product chain length, is investigated in the present disclosure, which also examines the influence of Pt NP size on rates and selectivity in hydrogenolysis of polyethylene catalyzed by the mSiO$_2$/Pt—X/SiO$_2$ architecture (where X is the mean Pt NP diameter). We infer that hydrogenolysis catalysis using mSiO$_2$/Pt—X/SiO$_2$ is a structure-sensitive catalytic reaction The synthesis of smaller (1.7 nm), intermediate (2.9 nm), and larger (5.0 nm) Pt NPs in the identical mSiO$_2$/Pt—X/SiO$_2$ architecture provides a family of efficient, highly active, and highly selective catalysts with characteristic features and excellent behavior, across the three Pt NP sizes, in polyethylene hydrogenolysis. The smallest Pt NP is smaller than the 2.4 nm diameter of the mesopore in mSiO$_2$/Pt—X/SiO$_2$, while the largest Pt NP is larger than the pore diameter. The conversions catalyzed by these catalysts proceed in stages. This distribution is templated by the mSiO$_2$/Pt—X/SiO$_2$ architecture, rather than by the size of the Pt NPs. Adsorption of PE chains into mesopores limits conformations to affect the average product chain length. This pore-templated cleavage phenomenon was also observed in mSiO$_2$/Pt-5.0/SiO$_2$-catalyzed hydrogenolysis of PE at 250° C., which showed features consistent with a processive mechanism. Thus, the pore-templated carbon-carbon bond cleavage, which is a component of the processive mechanism, also functions in related processes with a low degree of processivity. The present disclosure also indicates that the size of the exposed Pt surface, dictated either by Pt NP size or pore diameter of the mesoporous shell, is unlikely to be responsible for selecting the average chain-length of the product.

Thus, mSiO$_2$/Pt—X/SiO$_2$ is not only selective for hydrogenolysis of PE to waxes but also remarkably selective for hydrogenolysis of PE in the presence of a large amount of C$_{23}$-centered waxes. The PE hydrogenolysis occur faster with smaller Pt NPs than with larger ones, corresponding to an increase in catalytic rate without significantly diminishing selectivity. The selectivity of PE hydrogenolysis catalyzed by small, medium, and larger Pt NPs in mSiO$_2$/Pt—X/SiO$_2$ is independent of the particle size.

Finally, another beneficial aspect of the localization of platinum nanoparticles in the mesoporous silica/platinum/silica core architecture is that the production of low value gas products (methane, ethane, propane, butane) is limited. Those gases form at early stages of the hydrogenolysis conversion, but then polymer chains are transformed with nearly perfect selectivity into the desired wax and liquid products for the remainder of the catalytic experiment before the total consumption of polymer chains. The catalytic architecture appears to be responsible for this behavior, which is observed with small, medium, and large Pt nanoparticles in the architecture, but not without the presence of the mesoporous silica shell overcoating on platinum nanoparticles. Thus, the behavior leads to high selectivity for the desired liquid and wax products.

BRIEF DESCRIPTION OF THE DRAWINGS

(FIG. 3B); D$_{eff}$ as a function of t$_{mix}$ (FIG. 3C); Representative Arrhenius plot (t$_{mix}$=2 s) used to determine the activation energy for the intra-pore diffusion (FIG. 3D).

(FIG. 117A), 93° C. (FIG. 117B), and 114° C. (FIG. 117C). The 2 s mixing time spectra have examples of the fits used to extract the relative intensities of the peaks. All spectra are presented with identical vertical intensities and horizontal scaling.

FIGS. 120A-120F show the TEM images for Pt-1.7/SiO$_2$ (FIG. 120A), Pt-2.9/SiO$_2$ (FIG. 120C), Pt-5.0/SiO$_2$ (FIG. 120E), mSiO$_2$/Pt-1.7/SiO$_2$ (FIG. 120B), mSiO$_2$/Pt-2.9/SiO$_2$ (FIG. 120D), and mSiO$_2$/Pt-5.0/SiO$_2$ (FIG. 120F) with dark field images of the cores of mSiO$_2$/Pt-x/SiO$_2$ are shown as insets in (FIGS. 120B, 120D, 120F) at equivalent magnification.

Figure 121:
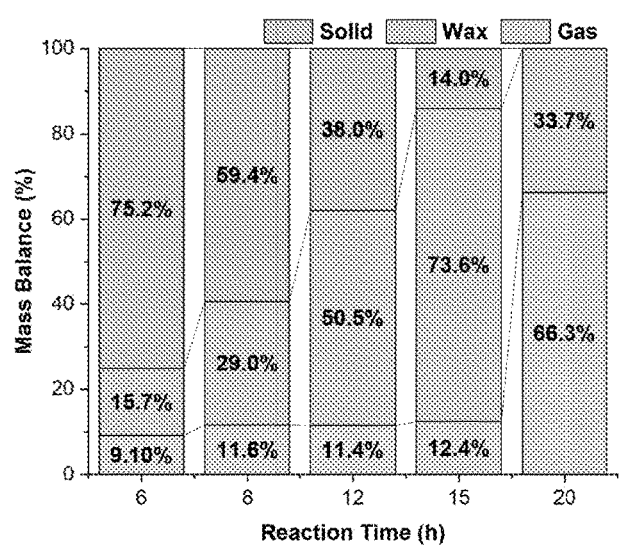

FIG. 121 shows the bar chart showing time-dependent mass-based fractions of gas phase and methylene chloride-extracted waxes, and residual solid products after mSiO$_2$/Pt-1.7/SiO$_2$-catalyzed hydrogenolysis of PE (M$_n$=20 kDa) at 300° C. under 0.89 MPa H$_2$. The mass fraction of extractable species increases from 6 to 15 h, while only a small increase in low molecular weight gas phase products is observed over that time. Quantitative conversion of solids (20 h) is accompanied by substantial increase in gas products (over-hydrogenolysis).

Figure 122:
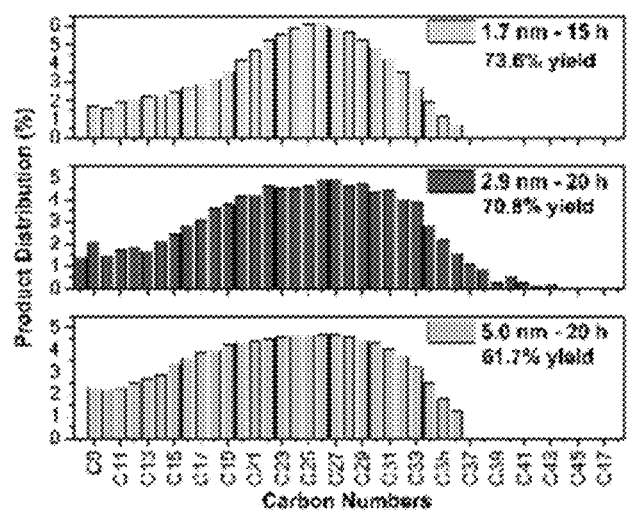

FIG. 122 shows the similar carbon number distributions of extracted waxes with similarly high conversions (~80%). Top: 86% conversion of solid polymer and 73.6% yield of extracted oils from mSiO$_2$/Pt-1.7/SiO$_2$, 15 h at 300° C.; Center: 85.8% conversion of solid polymer and 70.8% yield of extracted oils from mSiO$_2$/Pt-2.9/SiO$_2$, 20 h at 300° C.; Bottom: 73.8% conversion of solid polymer and 61.7% yield of extracted oils from mSiO$_2$/Pt-5.0/SiO$_2$, 20 h at 300° C.

Figure 123:
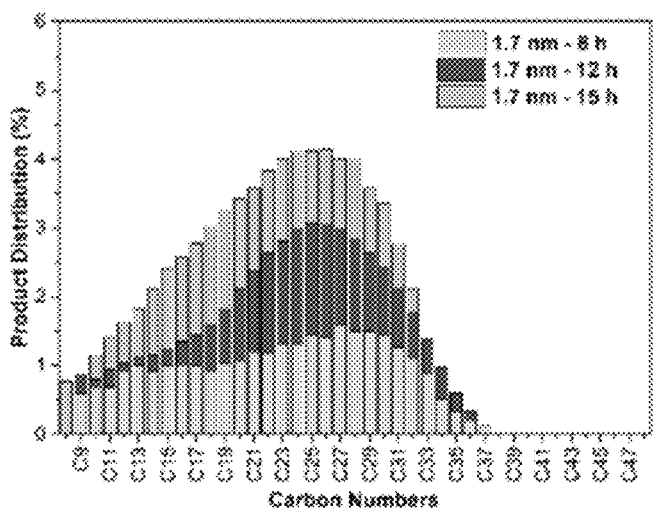

FIG. 123 shows the carbon number distribution of extracted waxes (weighted by % yield of extracted waxes) from hydrogenolysis of PE using mSiO$_2$/Pt-1.7/SiO$_2$ (0.085 wt/silica wt. %) as catalyst. Conditions: 0.0007 Pt wt/PE wt. % in the reactor for 8-15 h at 300° C. under H$_2$ (at 0.89 MPa), and the product was isolated by extraction of the solid reaction mixture with methylene chloride at 80° C. from the reactor that was vented at 25° C.

Figure 124:
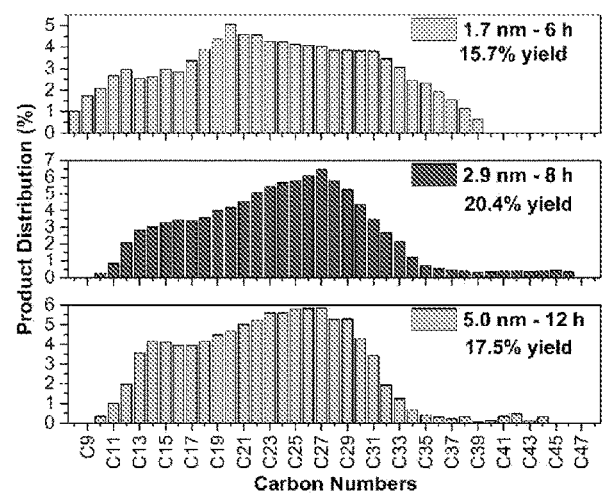

FIG. 124 shows the similar carbon number distributions of extracted waxes with similarly low conversions (~25%). Top: 24.8% conversion of solid polymer and 18.7% yield of extracted oils from mSiO$_2$/Pt-1.7/SiO$_2$, 6 h at 300° C.; Center: 28.7% conversion of solid polymer and 20.4% yield of extracted oils from mSiO$_2$/Pt-2.9/SiO$_2$, 8 h at 300° C.; Bottom: 26.2% conversion of solid polymer and 17.5% yield of extracted oils from mSiO$_2$/Pt-5.0/SiO$_2$, 12 h at 300° C.

Figures 125A, 125B, 125C:
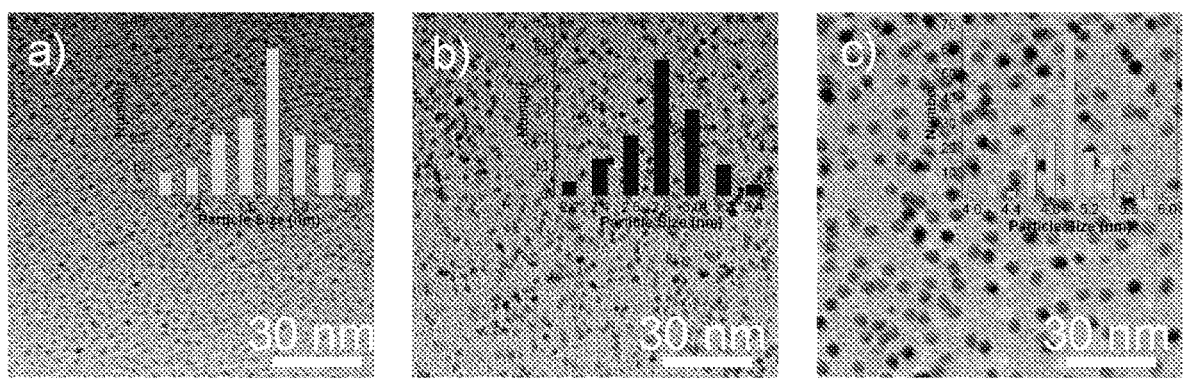

FIGS. 125A-125C show the TEM images and size distribution histogram (inset) for 1.7 (±0.3) nm Pt NPs (FIG. 125A), 2.9 (±0.5) nm Pt NPs (FIG. 125B), and 5.0 (±1.0) nm Pt NPs (FIG. 125C) with distributions having been based on 150 particle counts.

Figure 126:
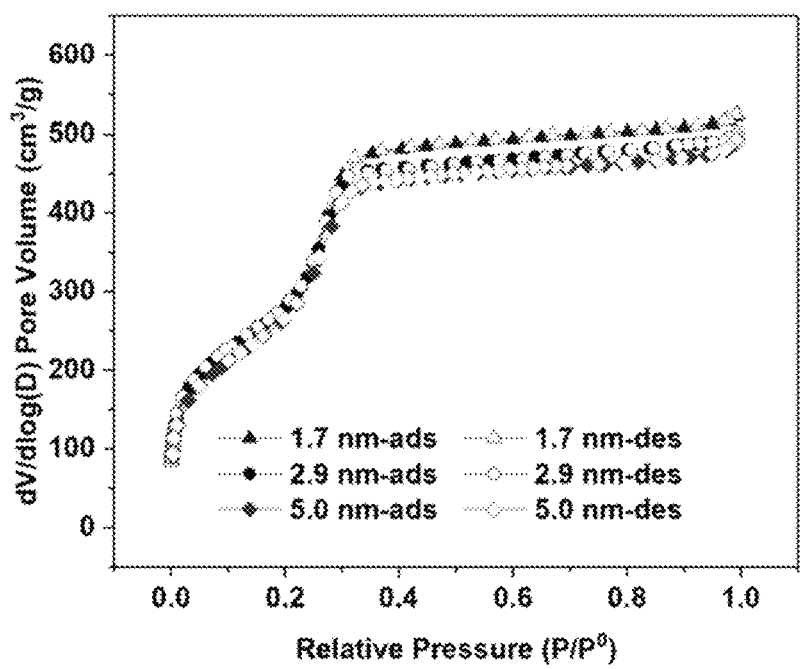

FIG. 126 shows the N$_2$ sorption isotherms of the mSiO$_2$/Pt—X/SiO$_2$ catalysts.

Figure 127:
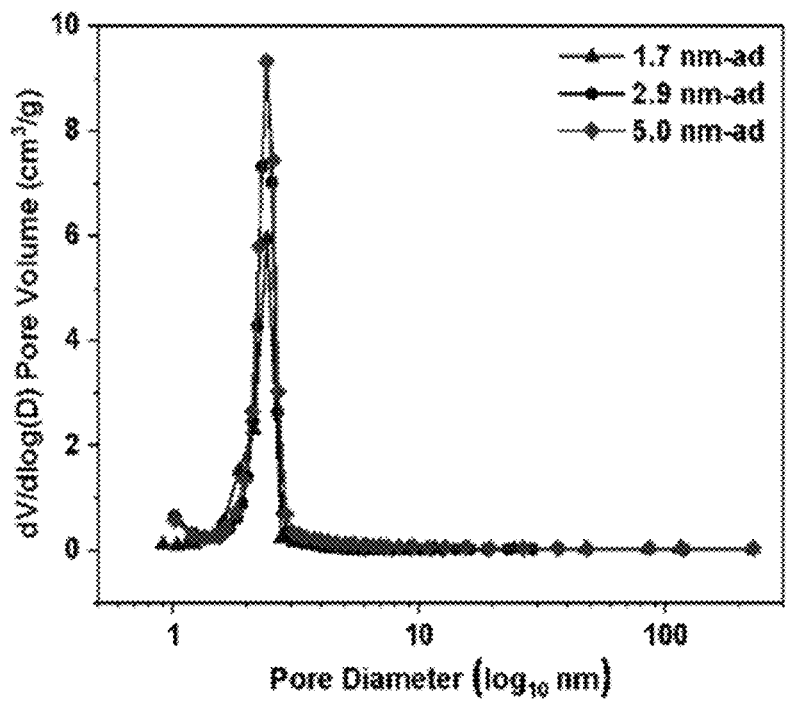

FIG. 127 shows the pore size distributions of the mSiO$_2$/Pt—X/SiO$_2$ catalysts from BJH model, with adsorption branch.

Figures 128A, 128B:
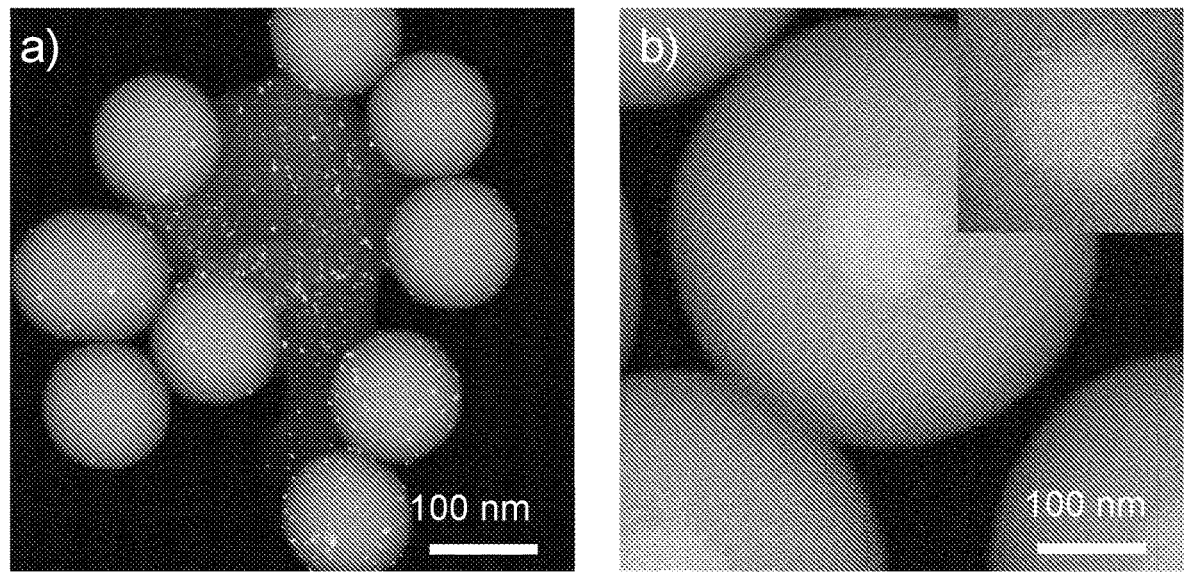

FIGS. 128A-128B show the dark-field TEM images of post-reaction and post-DCM extraction catalyst: Pt-1.7/SiO$_2$ (FIG. 128A), and mSiO$_2$/Pt-1.7-SiO$_2$ (FIG. 128B). Inset figure in FIG. 128B is a higher magnitude image with better contrast to show the Pt dispersion.

Figure 129:
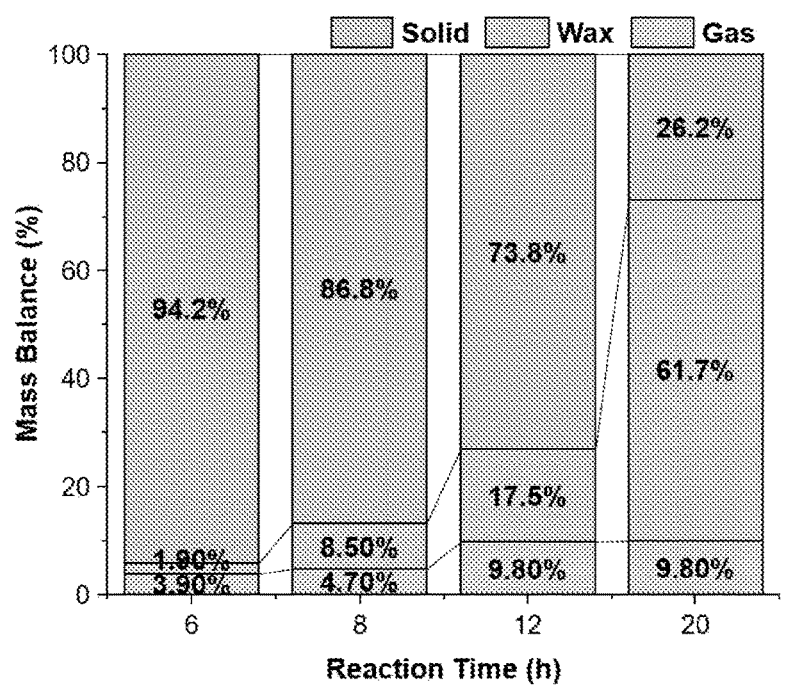

FIG. 129 shows the bar chart showing mass-based fractions of products (gases, methylene chloride-extracted waxes, and the residual solid) after mSiO$_2$/Pt—X/SiO$_2$-catalyzed hydrogenolysis of PE (M$_n$=20 kDa, M$_w$=90 kDa, ρ=0.92 g/mL) at 300° C. for 6 h under H$_2$ (0.89 MPa). The PE conversions into liquid and gaseous species were 25%, 15% and 6% in experiments employing 1.7 nm, 2.9 nm, and 5.0 nm Pt NPs as the catalyst, respectively.

Figure 130:
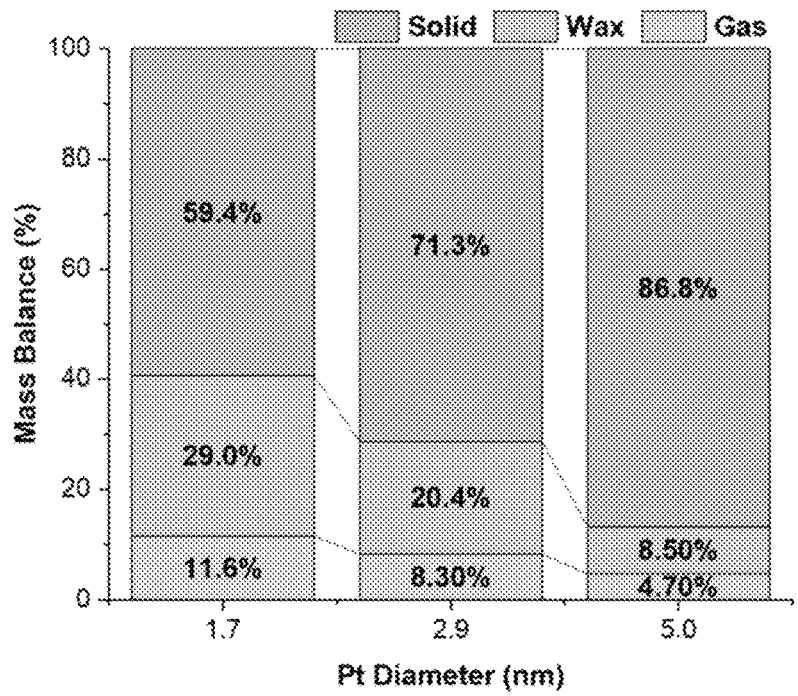

FIG. 130 shows the bar chart showing mass-based fractions of products (gases, methylene chloride-extracted waxes, and the residual solid) after mSiO$_2$/Pt—X/SiO$_2$-catalyzed hydrogenolysis of PE (M$_n$=20 kDa, M$_w$=90 kDa, ρ=0.92 g/mL) at 300° C. for 8 h under H$_2$ (0.89 MPa). The PE conversions into liquid and gaseous species were 40%, 28% and 15% in experiments employing 1.7 nm, 2.9 nm and 5.0 nm Pt NPs as the catalyst, respectively.

Figure 131:
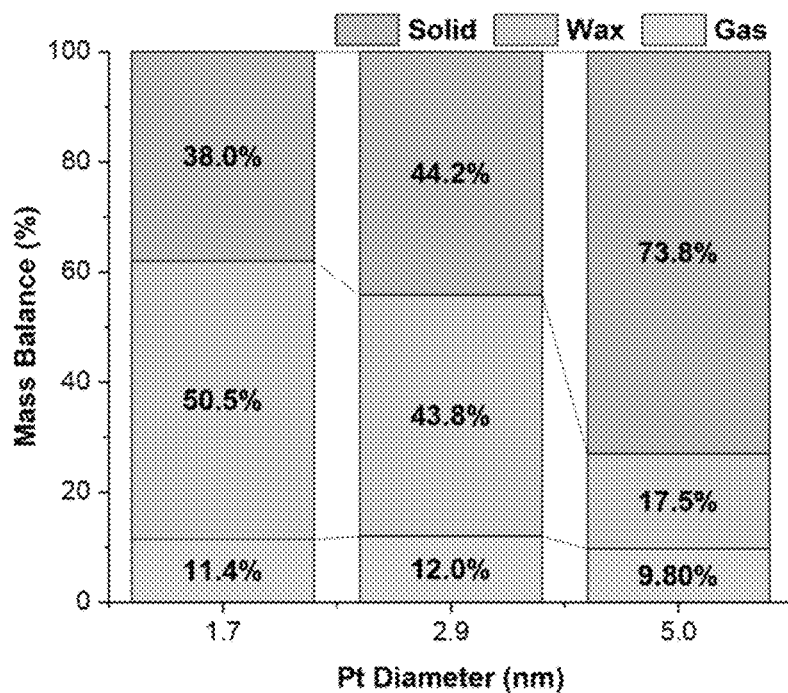

FIG. 131 shows the bar chart showing mass-based fractions of products (gases, methylene chloride-extracted waxes, and the residual solid) after mSiO$_2$/Pt—X/SiO$_2$-catalyzed hydrogenolysis of PE (M$_n$=20 kDa, M$_w$=90 kDa, ρ=0.92 g/mL) at 300° C. for 12 h under H$_2$ (0.89 MPa). The PE conversions into liquid and gaseous species were 62%, 56% and 26% in experiments employing 1.7 nm, 2.9 nm, and 5.0 nm Pt NPs as the catalyst, respectively.

Figure 132:
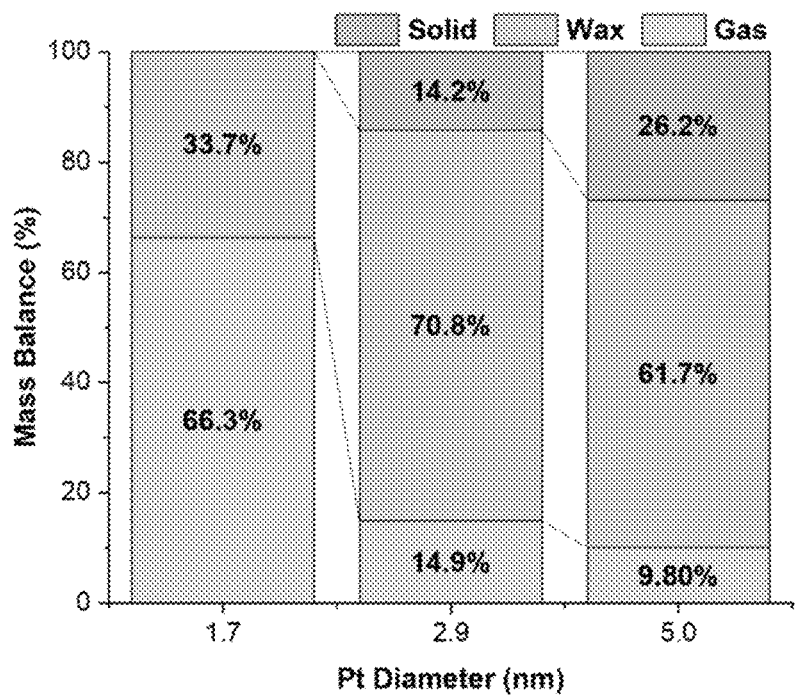

FIG. 132 shows the bar chart showing mass-based fractions of products (gases, methylene chloride-extracted waxes, and the residual solid) after mSiO$_2$/Pt—X/SiO$_2$-catalyzed hydrogenolysis of PE (M$_n$=20 kDa, M$_w$=90 kDa, ρ=0.92 g/mL) at 300° C. for 20 h under H$_2$ (0.89 MPa). The PE conversions into liquid and gaseous species were 100%, 86% and 74% in experiments employing 1.7 nm, 2.9 nm, and 5.0 nm Pt NPs as the catalyst, respectively.

Figure 133:
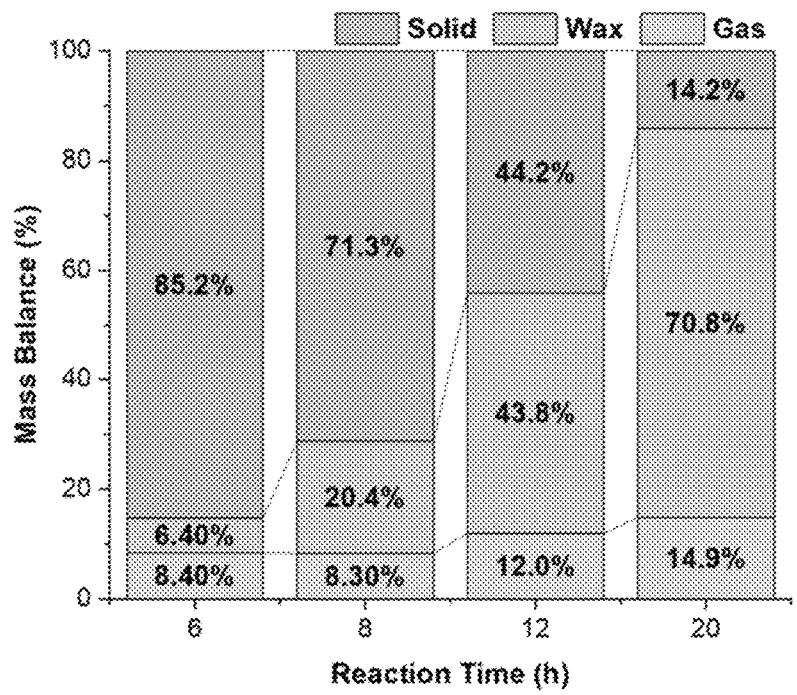

FIG. 133 shows the bar chart showing time-dependence of the mass-based fractions of products (gases, methylene chloride-extracted waxes, and the residual solid) after mSiO$_2$/Pt-2.9/SiO$_2$-catalyzed hydrogenolysis of PE (M$_n$=20 kDa, M$_w$=90 kDa, ρ=0.92 g/mL) at 300° C. under H$_2$ (0.89 MPa). The mass fraction of species that extract into methylene chloride at 80° C. increases from catalytic experiments performed for 6 h to those performed for 20 h, while only a small increase the mass fraction of low molecular weight gas phase products is observed over that time.

Figure 134:
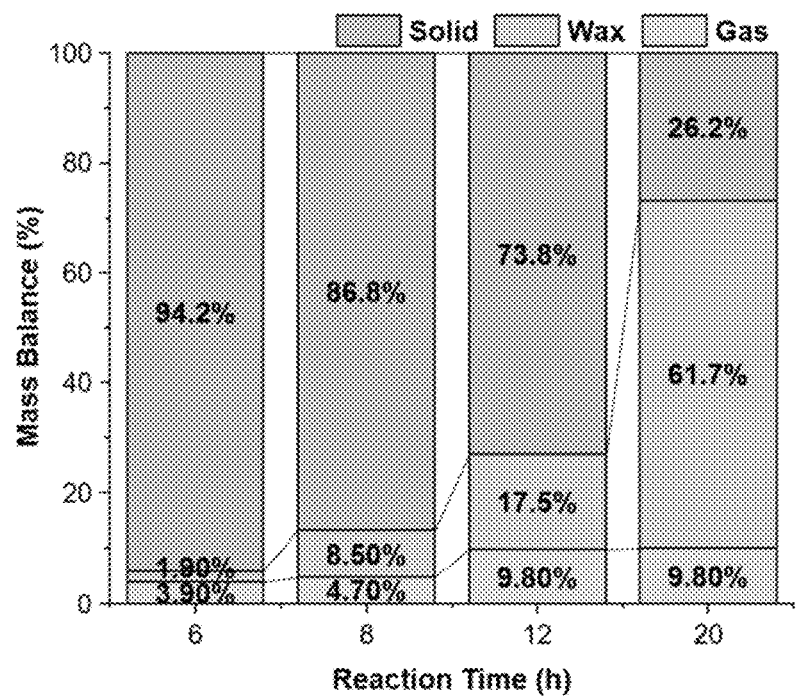

FIG. 134 shows the bar chart showing time-dependence of the mass-based fractions of products (gases, methylene chloride-extracted waxes, and the residual solid) after mSiO$_2$/Pt-5.0/SiO$_2$-catalyzed hydrogenolysis of PE (M$_n$=20 kDa, M$_w$=90 kDa, ρ=0.92 g/mL) at 300° C. under H$_2$ (0.89 MPa). The mass fraction of species that extract into methylene chloride at 80° C. increases from catalytic experiments performed for 6 h to those performed for 20 h, while only a small increase the mass fraction of low molecular weight gas phase products is observed over that time.

Figure 135:
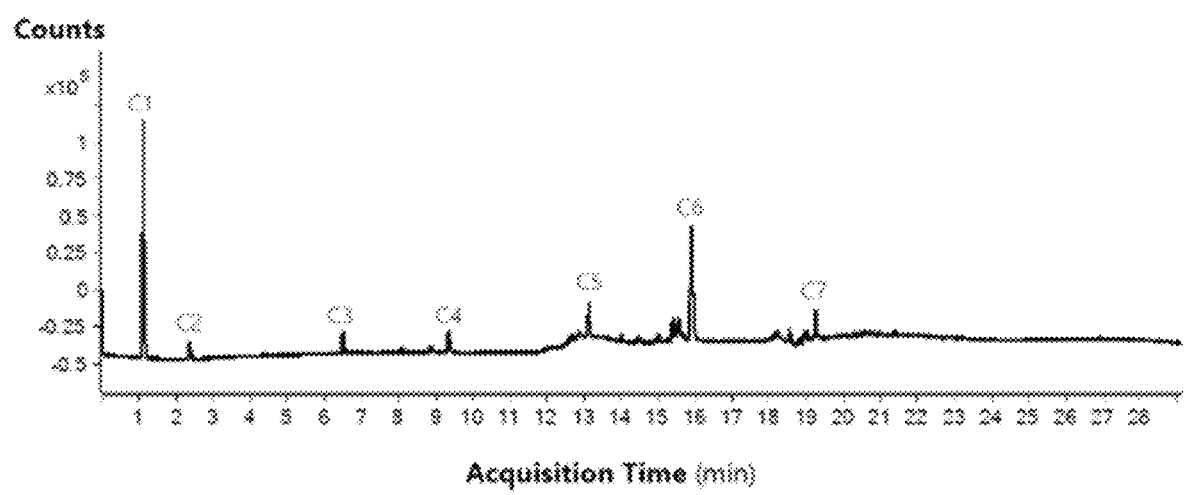

FIG. 135 shows the GC-FID trace of the sampled headspace (corresponding to 9.1% of the starting PE) for the hydrogenolysis reaction of PE (M$_n$=20 kDa, M$_w$=90 kDa, ρ=0.92 g/mL) using mSiO$_2$/Pt-1.7/SiO$_2$ (0.085 Pt wt/silica wt %) as catalyst. Conditions: 0.0007 wt/PE wt % was heated for 6 h at 300° C. under H$_2$ (at 0.89 MPa) in the reactor, which was then cooled, vented and sampled at 25° C.

Figure 136:
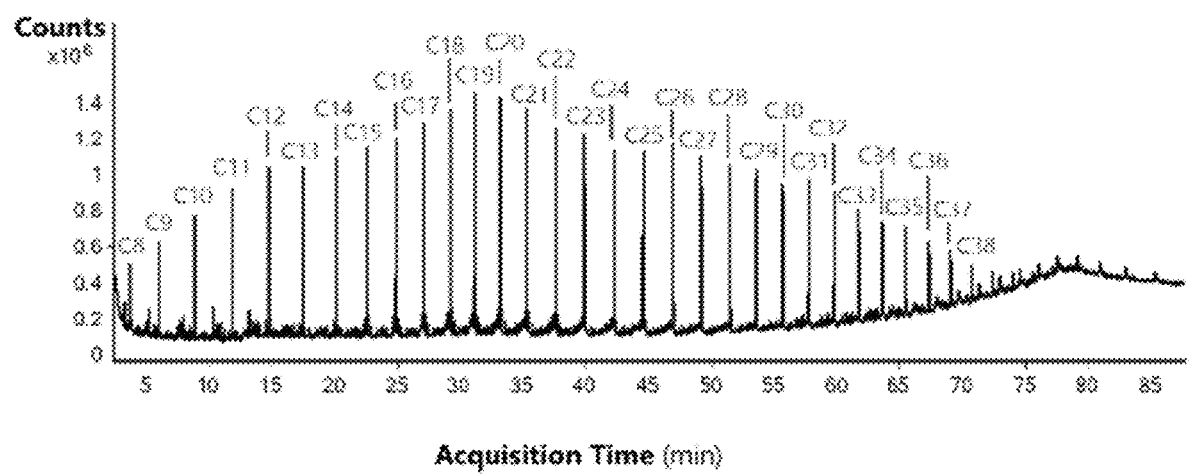

FIG. 136 shows the GC-MS of extracted waxes (18.7% yield) from hydrogenolysis of PE (M$_n$=20 kDa, M$_w$=90 kDa, ρ=0.92 g/mL) using mSiO$_2$/Pt-1.7/SiO$_2$ (0.085 Pt wt/silica wt %) as catalyst. Conditions: 0.0007 Pt wt/PE wt % was heated in the reactor for 6 h at 300° C. under H$_2$ (at 0.89 MPa), the reactor was cooled to 25° C., the pressure was released, and the product was isolated by extraction of the solid reaction mixture with methylene chloride at 80° C.

Figure 137:
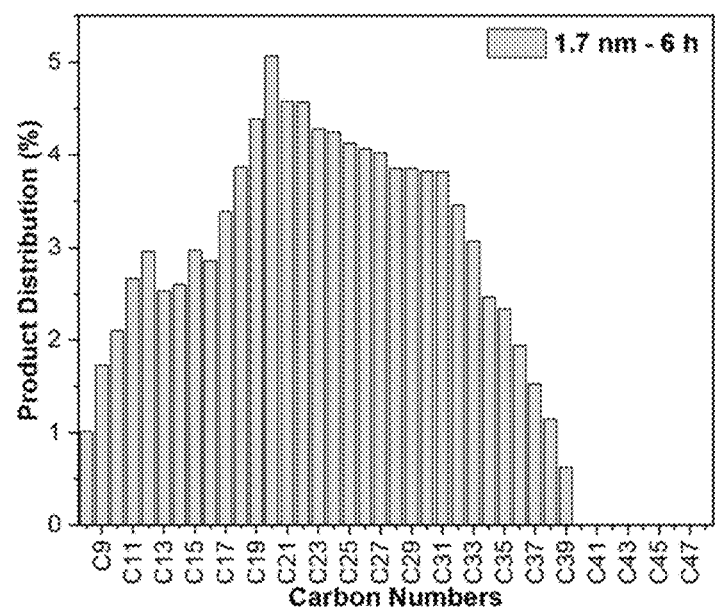

FIG. 137 shows the carbon number distribution of extracted waxes (18.7% yield) from hydrogenolysis of PE (M$_n$=20 kDa, M$_w$=90 kDa, ρ=0.92 g/mL) using mSiO$_2$/Pt-1.7/SiO$_2$ (0.085 Pt wt/silica wt %) as catalyst. Conditions: 0.0007 Pt wt/PE wt % was heated in the reactor for 6 h at 300° C. under H$_2$ (at 0.89 MPa), the reactor was cooled to 25° C., the pressure was released, and the product was isolated by extraction of the solid reaction mixture with methylene chloride at 80° C.

Figure 138:
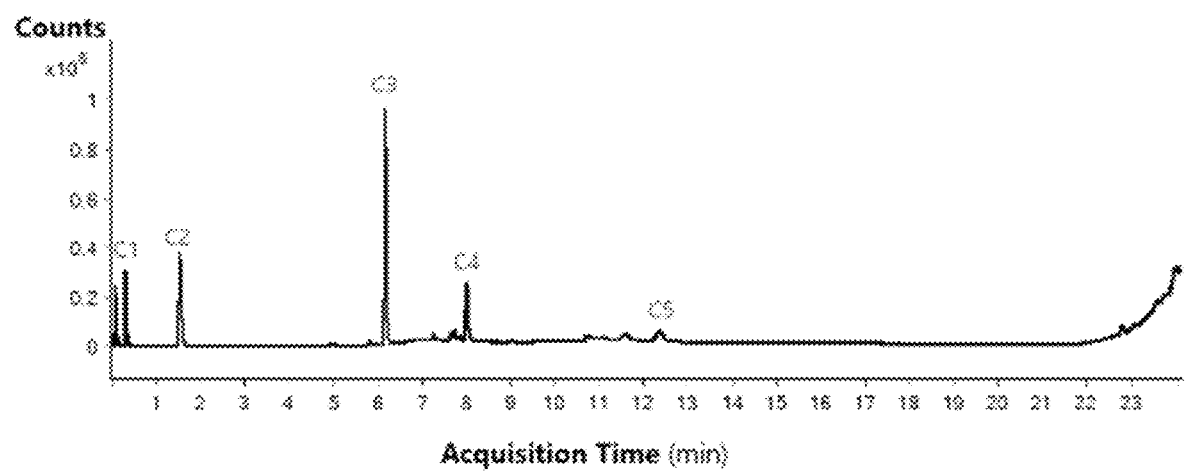

FIG. 138 shows the GC-FID trace of the sampled headspace (corresponding to 8.4% of the starting PE) for the hydrogenolysis reaction of PE (M$_n$=20 kDa, M$_w$=90 kDa, ρ=0.92 g/mL) using mSiO$_2$/Pt-2.9/SiO$_2$ (0.40 Pt wt/silica wt %) as catalyst. Conditions: 0.0019 wt/PE wt % was heated for 6 h at 300° C. under H$_2$ (at 0.89 MPa) in the reactor, which was then cooled, vented and sampled at 25° C.

Figure 139:
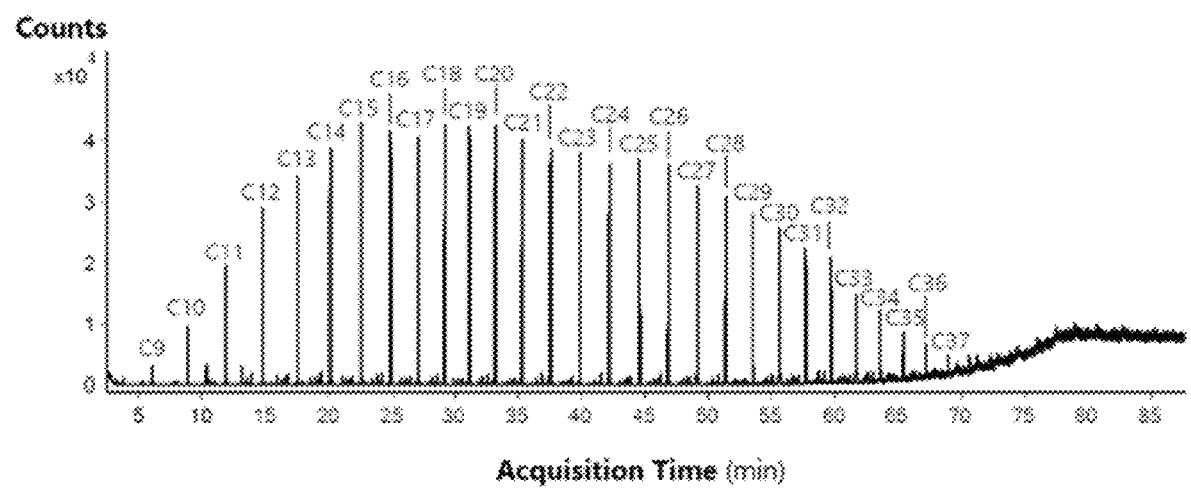

FIG. 139 shows the GC-MS of extracted waxes (6.4% yield) from hydrogenolysis of PE (M$_n$=20 kDa, M$_w$=90 kDa, ρ=0.92 g/mL) using mSiO$_2$/Pt-2.9/SiO$_2$ (0.40 wt/silica wt %) as catalyst. Conditions: 0.0019 Pt wt/PE wt % was heated in the reactor for 6 h at 300° C. under H$_2$ (at 0.89 MPa), the reactor was cooled to 25° C., the pressure was released, and the product was isolated by extraction of the solid reaction mixture with methylene chloride at 80° C.

Figure 140:
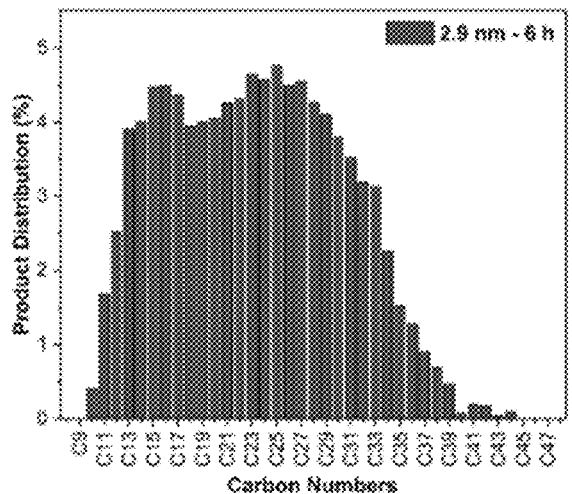

FIG. 140 shows the carbon number distribution for the oil products (6.4% yield) from hydrogenolysis of PE (M$_n$=20 kDa, M$_w$=90 kDa, ρ=0.92 g/mL) using mSiO$_2$/Pt-2.9/SiO$_2$ (0.40 wt/silica wt %) as catalyst. Conditions: 0.0019 Pt wt/PE wt % was heated in the reactor for 6 h at 300° C. under H$_2$ (at 0.89 MPa), the reactor was cooled to 25° C., the pressure was released, and the product was isolated by extraction of the solid reaction mixture with methylene chloride at 80° C.

Figure 141:
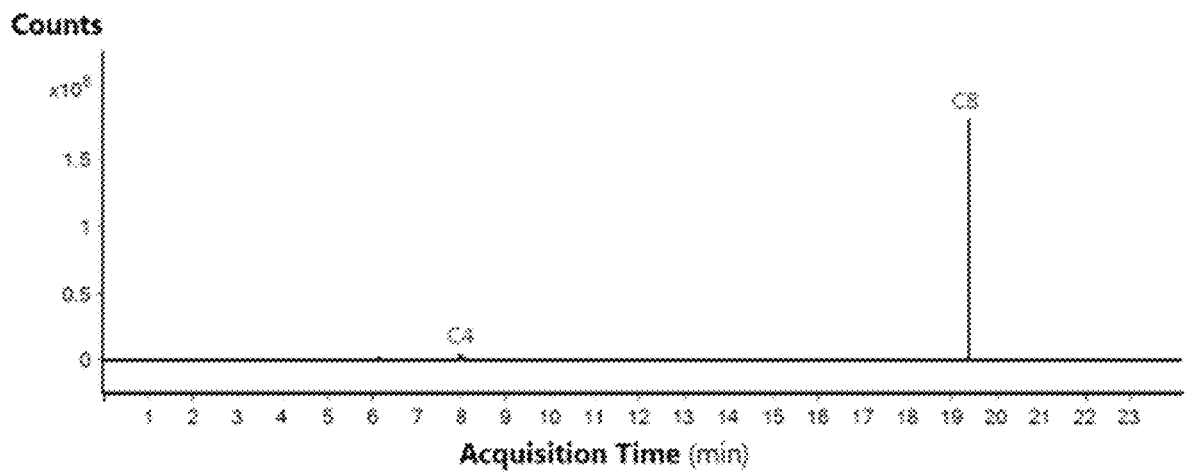

FIG. 141 shows the GC-FID trace of the sampled headspace (corresponding to 3.9% of the starting PE) for the hydrogenolysis reaction of PE ($M_n$=20 kDa, $M_w$=90 kDa, $\rho$=0.92 g/mL) using $mSiO_2$/Pt-5.0/$SiO_2$ (0.28 Pt wt/silica wt %) as catalyst. Conditions: 0.0034 wt/PE wt % was heated for 6 h at 300° C. under $H_2$ (at 0.89 MPa) in the reactor, which was then cooled, vented and sampled at 25° C.

Figure 142:
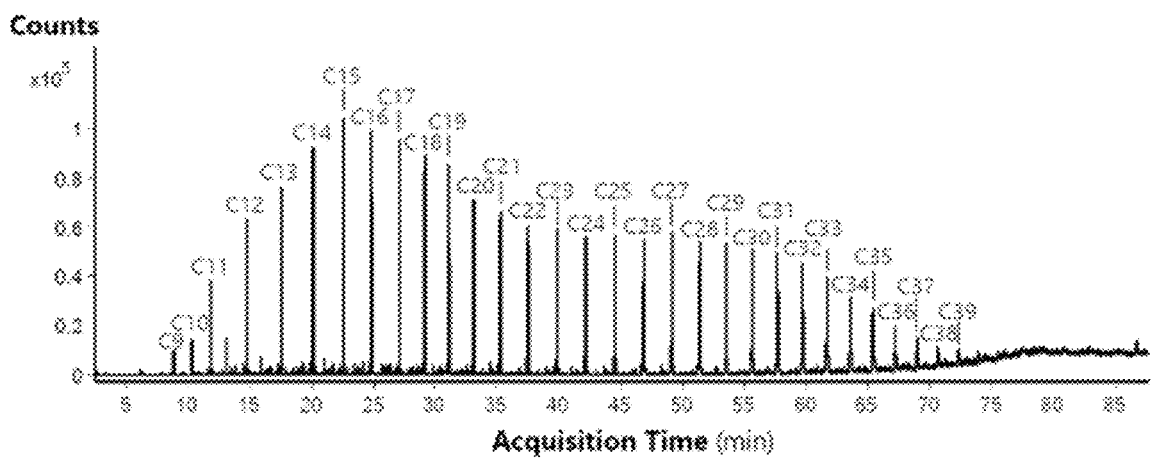

FIG. 142 shows the GC-MS of extracted waxes (1.9% yield) from hydrogenolysis of PE ($M_n$=20 kDa, $M_w$=90 kDa, $\rho$=0.92 g/mL) using $mSiO_2$/Pt-5.0/$SiO_2$ (0.28 Pt wt/silica wt %) as catalyst. Conditions: 0.0034 Pt wt/PE wt % was heated in the reactor for 6 h at 300° C. under $H_2$ (at 0.89 MPa), the reactor was cooled to 25° C., the pressure was released, and the product was isolated by extraction of the solid reaction mixture with methylene chloride at 80° C.

Figure 143:
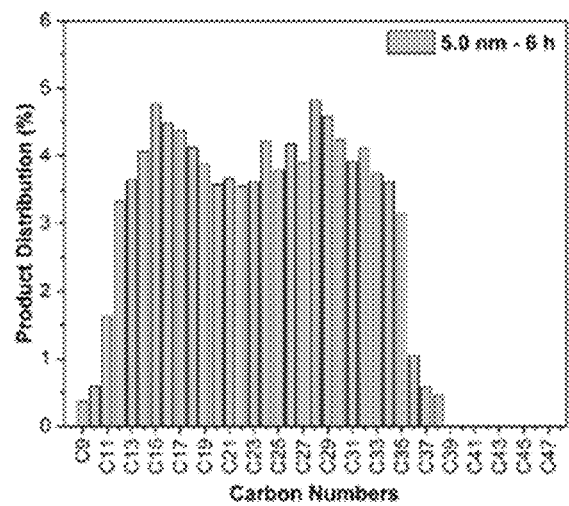

FIG. 143 shows the carbon number distribution of extracted waxes (1.9% yield) from hydrogenolysis of PE ($M_n$=20 kDa, $M_w$=90 kDa, $\rho$=0.92 g/mL) using $mSiO_2$/Pt-5.0/$SiO_2$ (0.28 wt/silica wt %) as catalyst. Conditions: 0.0034 Pt wt/PE wt % was heated in the reactor for 6 h at 300° C. under $H_2$ (at 0.89 MPa), the reactor was cooled to 25° C., the pressure was released, and the product was isolated by extraction of the solid reaction mixture with methylene chloride at 80° C.

Figure 144:
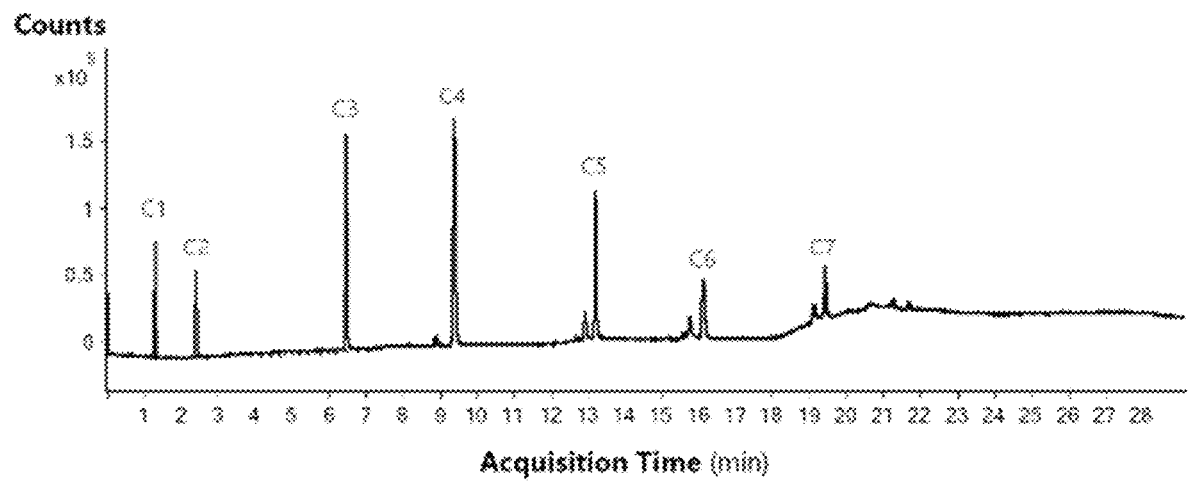

FIG. 144 shows the GC-FID trace of the sampled headspace (corresponding to 11.6% of the starting PE) for the hydrogenolysis reaction of PE ($M_n$=20 kDa, $M_w$=90 kDa, $\rho$=0.92 g/mL) using $mSiO_2$/Pt-1.7/$SiO_2$ (0.085 Pt wt/silica wt %) as catalyst. Conditions: 0.0007 wt/PE wt % was heated for 8 h at 300° C. under $H_2$ (at 0.89 MPa) in the reactor, which was then cooled, vented and sampled at 25° C.

Figure 145:
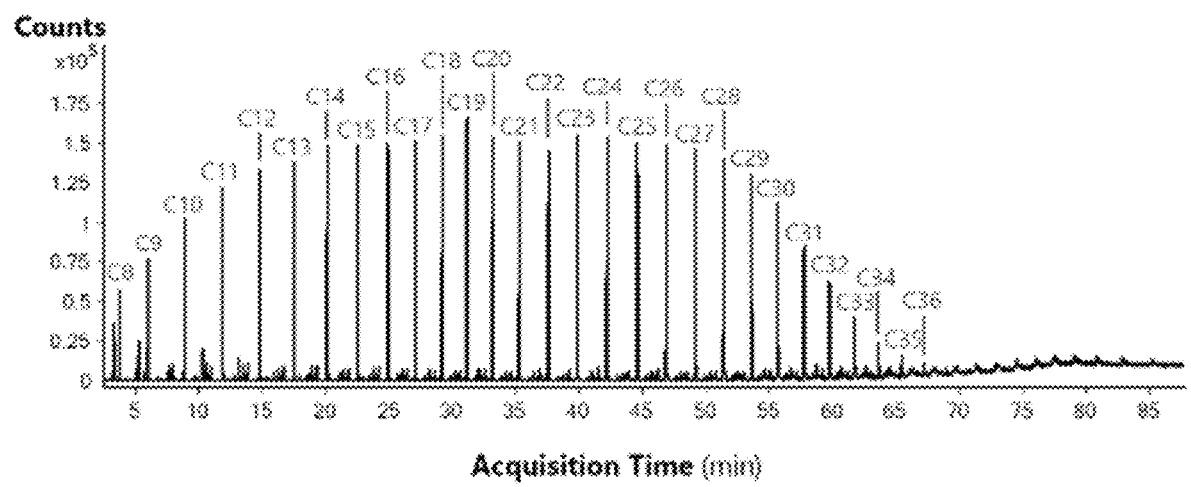

FIG. 145 shows the GC-MS of extracted waxes (29.0% yield) from hydrogenolysis of PE ($M_n$=20 kDa, $M_w$=90 kDa, $\rho$=0.92 g/mL) using $mSiO_2$/Pt-1.7/$SiO_2$ (0.085 Pt wt/silica wt %) as catalyst. Conditions: 0.0007 Pt wt/PE wt % was heated in the reactor for 8 h at 300° C. under $H_2$ (at 0.89 MPa), the reactor was cooled to 25° C., the pressure was released, and the product was isolated by extraction of the solid reaction mixture with methylene chloride at 80° C.

Figure 146:
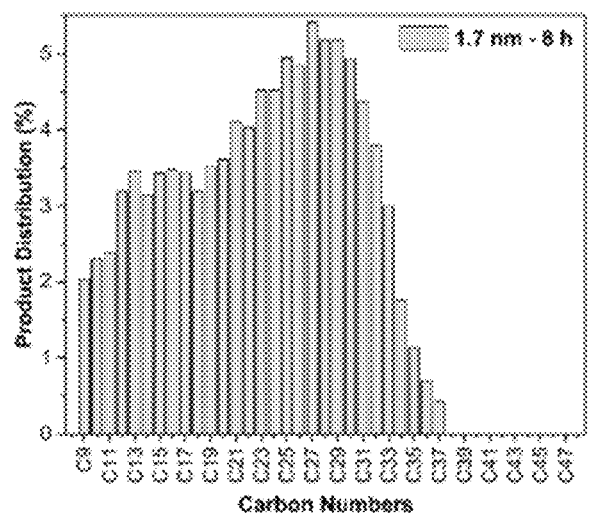

FIG. 146 shows the carbon number distribution of extracted waxes (29.0% yield) from hydrogenolysis of PE ($M_n$=20 kDa, $M_w$=90 kDa, $\rho$=0.92 g/mL) using $mSiO_2$/Pt-1.7/$SiO_2$ (0.085 Pt wt/silica wt %) as catalyst. Conditions: 0.0007 Pt wt/PE wt % was heated in the reactor for 8 h at 300° C. under $H_2$ (at 0.89 MPa), the reactor was cooled to 25° C., the pressure was released, and the product was isolated by extraction of the solid reaction mixture with methylene chloride at 80° C.

Figure 147:
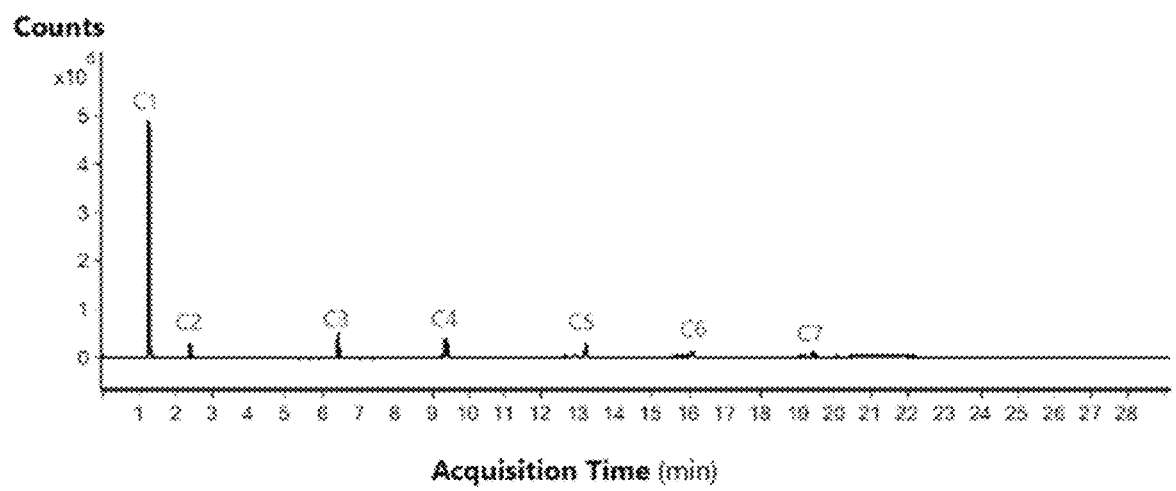

FIG. 147 shows the GC-FID trace of the sampled headspace (corresponding to 8.3% of the starting PE) for the hydrogenolysis reaction of PE ($M_n$=20 kDa, $M_w$=90 kDa, $\rho$=0.92 g/mL) using $mSiO_2$/Pt-2.9/$SiO_2$ (0.40 Pt wt/silica wt %) as catalyst. Conditions: 0.0019 wt/PE wt % was heated for 8 h at 300° C. under $H_2$ (at 0.89 MPa) in the reactor, which was then cooled, vented and sampled at 25° C.

Figure 148:
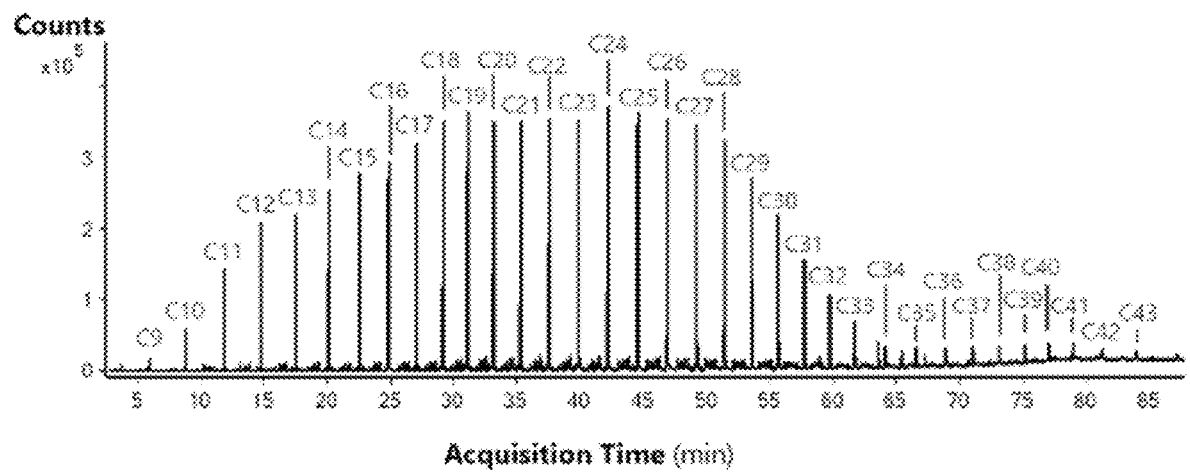

FIG. 148 shows the GC-MS of extracted waxes (20.4% yield) from hydrogenolysis of PE ($M_n$=20 kDa, $M_w$=90 kDa, $\rho$=0.92 g/mL) using $mSiO_2$/Pt-2.9/$SiO_2$ (0.40 Pt wt/silica wt %) as catalyst. Conditions: 0.0019 Pt wt/PE wt % was heated in the reactor for 8 h at 300° C. under $H_2$ (at 0.89 MPa), the reactor was cooled to 25° C., the pressure was released, and the product was isolated by extraction of the solid reaction mixture with methylene chloride at 80° C.

Figure 149:
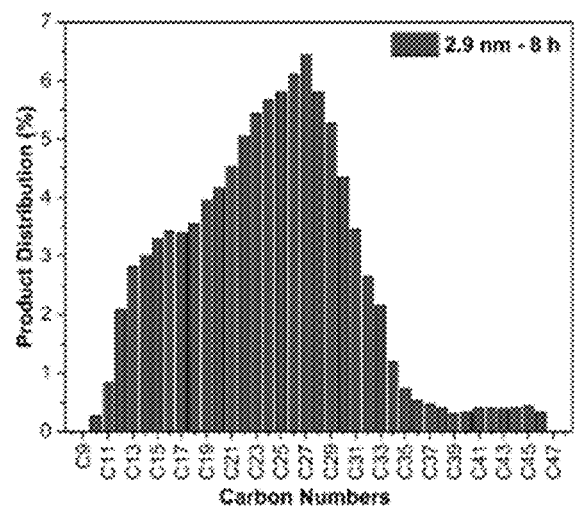

FIG. 149 shows the carbon number distribution of extracted waxes (20.4% yield) from hydrogenolysis of PE ($M_n$=20 kDa, $M_w$=90 kDa, $\rho$=0.92 g/mL) using $mSiO_2$/Pt-2.9/$SiO_2$ (0.40 Pt wt/silica wt %) as catalyst. Conditions: 0.0019 Pt wt/PE wt % was heated in the reactor for 8 h at 300° C. under $H_2$ (at 0.89 MPa), the reactor was cooled to 25° C., the pressure was released, and the product was isolated by extraction of the solid reaction mixture with methylene chloride at 80° C.

Figure 150:
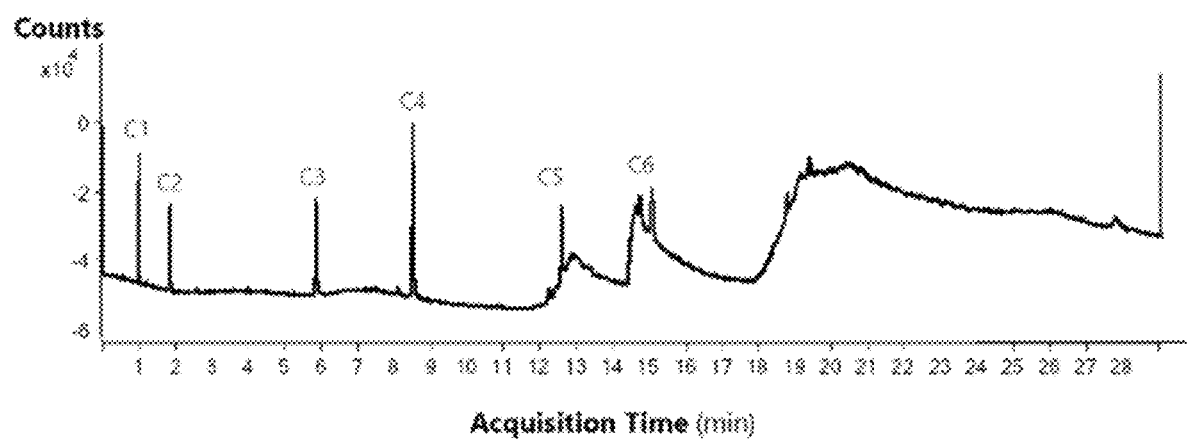

FIG. 150 shows the GC-FID trace of the sampled headspace (corresponding to 4.7% of the starting PE) for the hydrogenolysis reaction of PE ($M_n$=20 kDa, $M_w$=90 kDa, $\rho$=0.92 g/mL) using $mSiO_2$/Pt-5.0/$SiO_2$ (0.28 Pt wt/silica wt %) as catalyst. Conditions: 0.0034 wt/PE wt % was heated for 8 h at 300° C. under $H_2$ (at 0.89 MPa) in the reactor, which was then cooled, vented and sampled at 25° C.

Figure 151:
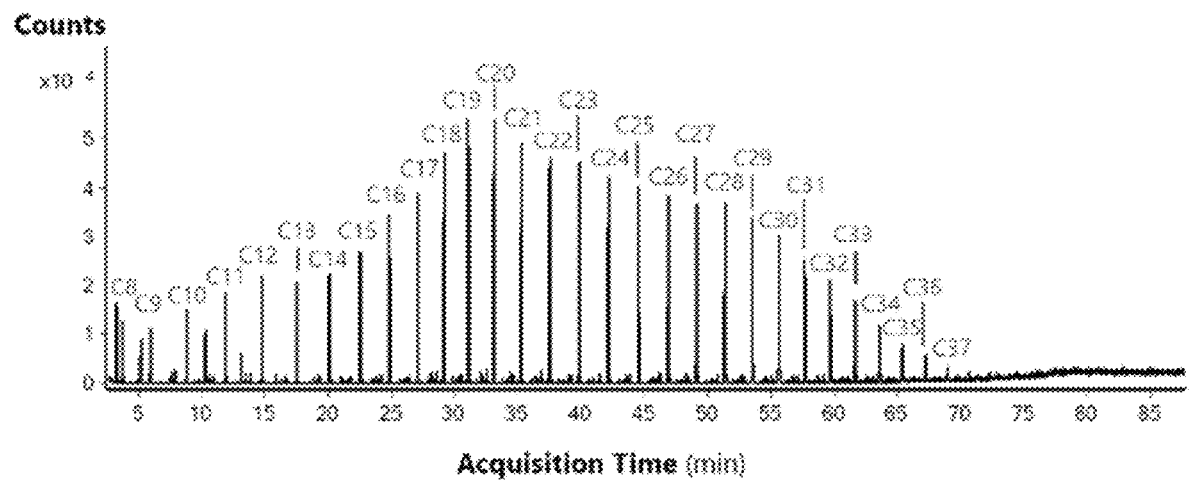

FIG. 151 shows the GC-MS of extracted waxes (8.5% yield) from hydrogenolysis of PE ($M_n$=20 kDa, $M_w$=90 kDa, $\rho$=0.92 g/mL) using $mSiO_2$/Pt-5.0/$SiO_2$ (0.28 Pt wt/silica wt %) as catalyst. Conditions: 0.0034 Pt wt/PE wt % was heated in the reactor for 8 h at 300° C. under $H_2$ (at 0.89 MPa), the reactor was cooled to 25° C., the pressure was released, and the product was isolated by extraction of the solid reaction mixture with methylene chloride at 80° C.

Figure 152:
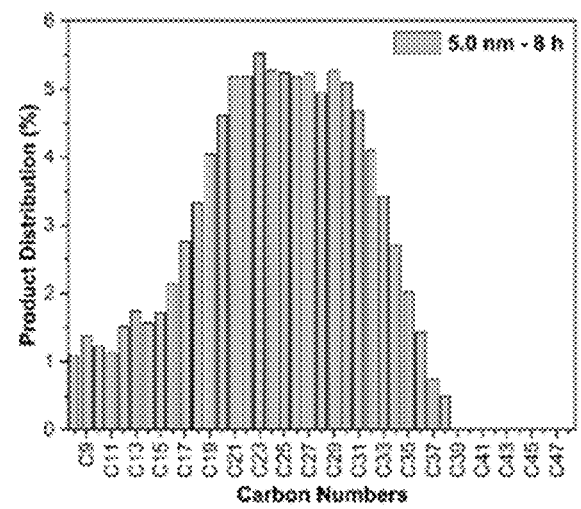

FIG. 152 shows the Carbon number distribution of extracted waxes (8.5% yield) from hydrogenolysis of PE ($M_n$=20 kDa, $M_w$=90 kDa, $\rho$=0.92 g/mL) using $mSiO_2$/Pt-5.0/$SiO_2$ (0.28 Pt wt/silica wt %) as catalyst. Conditions: 0.0034 Pt wt/PE wt % was heated in the reactor for 8 h at 300° C. under $H_2$ (at 0.89 MPa), the reactor was cooled to 25° C., the pressure was released, and the product was isolated by extraction of the solid reaction mixture with methylene chloride at 80° C.

Figure 153:
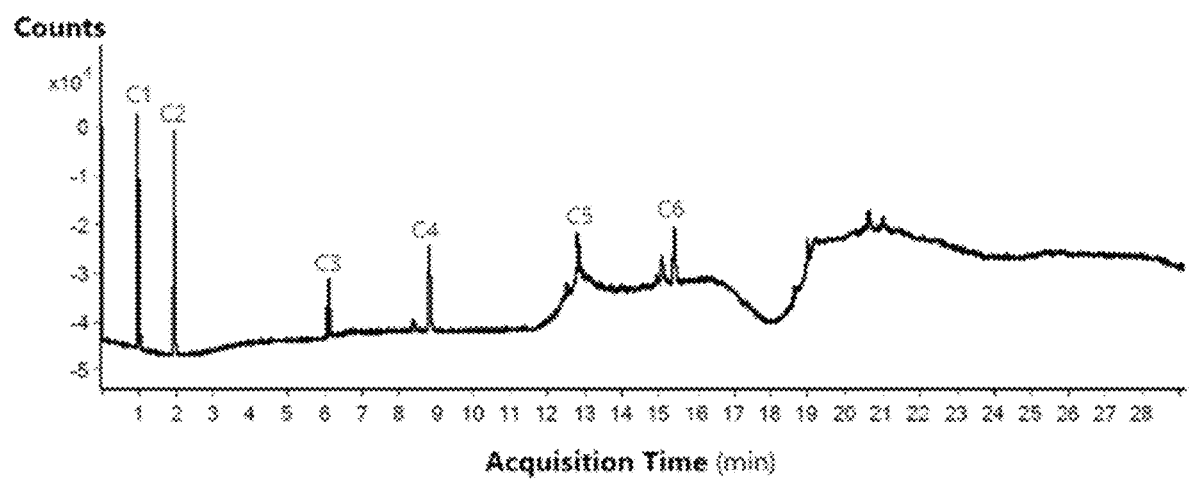

FIG. 153 shows the GC-FID trace of the sampled headspace (corresponding to 2.4% of the starting PE) for the hydrogenolysis reaction of PE ($M_n$=20 kDa, $M_w$=90 kDa, $\rho$=0.92 g/mL) using $mSiO_2$/$SiO_2$ as catalyst. Conditions: 35 mg of $mSiO_2$/$SiO_2$ (0 Pt wt/PE wt %) was heated for 12 h at 300° C. under $H_2$ (at 0.89 MPa) in the reactor, which was then cooled, vented and sampled at 25° C.

Figure 154:
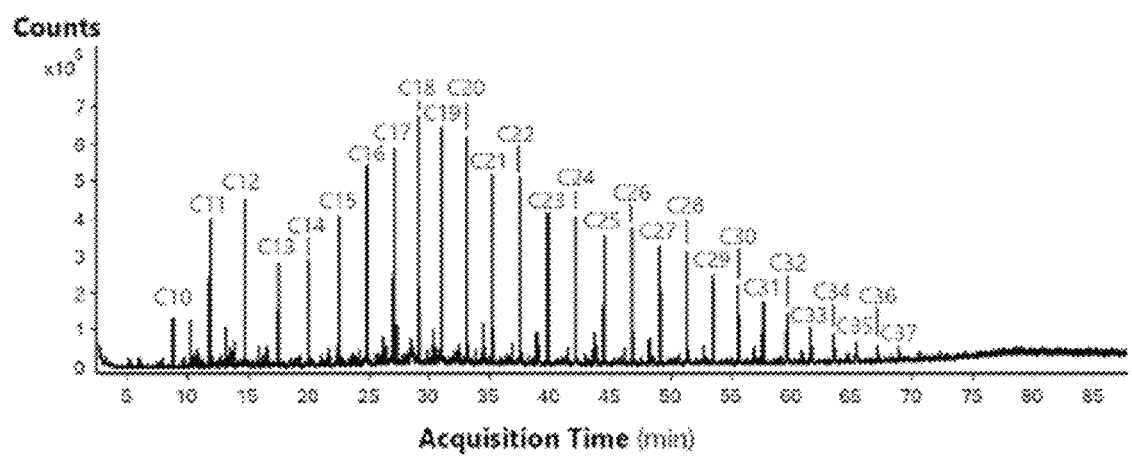

FIG. 154 shows the GC-MS of extracted waxes (1.2% yield) from hydrogenolysis of PE ($M_n$=20 kDa, $M_w$=90 kDa, $\rho$=0.92 g/mL) using $mSiO_2$/$SiO_2$ as catalyst. Conditions: 35 mg of $mSiO_2$/$SiO_2$ (0 Pt wt/PE wt %) was heated in the reactor for 12 h at 300° C. under $H_2$ (at 0.89 MPa), the reactor was cooled to 25° C., the pressure was released, and the product was isolated by extraction of the solid reaction mixture with methylene chloride at 80° C.

Figure 155:
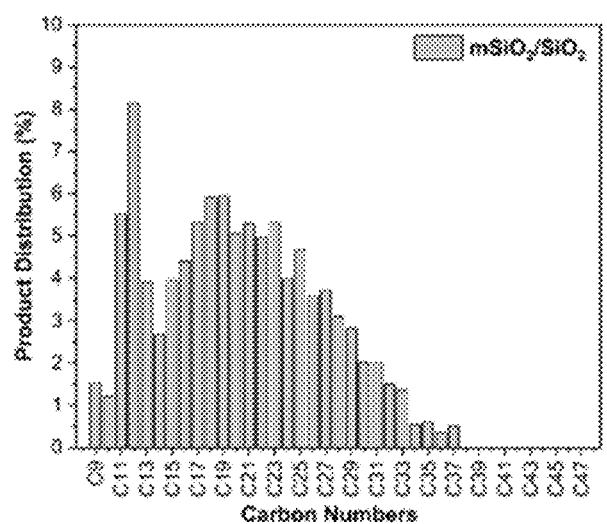

FIG. 155 shows the carbon number distribution (1.2% yield) from hydrogenolysis of PE ($M_n$=20 kDa, $M_w$=90 kDa, $\rho$=0.92 g/mL) using $mSiO_2$/$SiO_2$ as catalyst. Conditions: 35 mg of $mSiO_2$/$SiO_2$ (0 Pt wt/PE wt %) was heated in the reactor for 12 h at 300° C. under $H_2$ (at 0.89 MPa), the reactor was cooled to 25° C., the pressure was released, and the product was isolated by extraction of the solid reaction mixture with methylene chloride at 80°.

Figure 156:
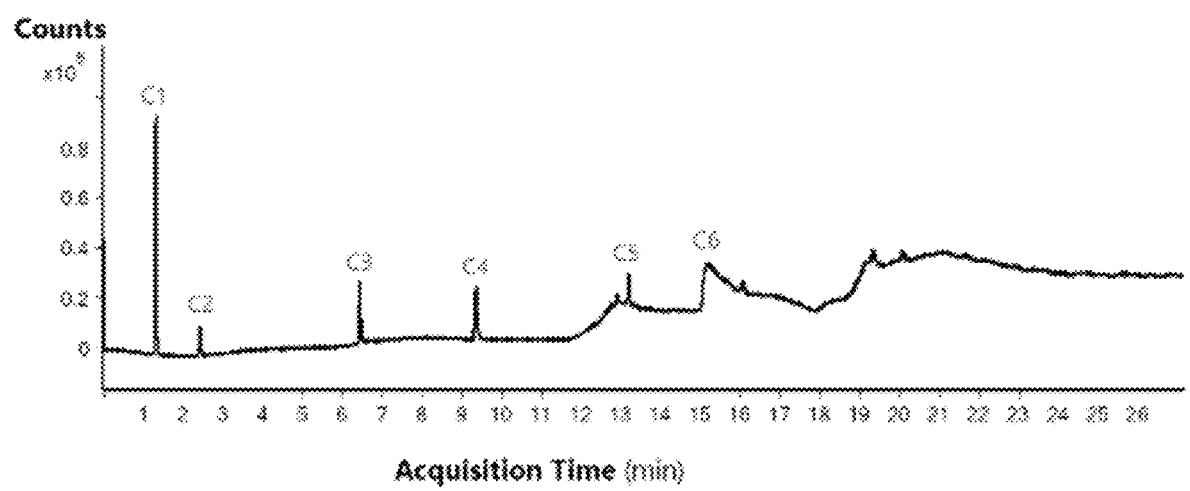

FIG. 156 shows the GC-FID trace of the sampled headspace (corresponding to 11.4% of the starting PE) for the hydrogenolysis reaction of PE ($M_n$=20 kDa, $M_w$=90 kDa, $\rho$=0.92 g/mL) using $mSiO_2$/Pt-1.7/$SiO_2$ (0.085 Pt wt/silica wt %) as catalyst. Conditions: 0.0007 wt/PE wt % was heated for 12 h at 300° C. under $H_2$ (at 0.89 MPa) in the reactor, which was then cooled, vented and sampled at 25° C.

Figure 157:
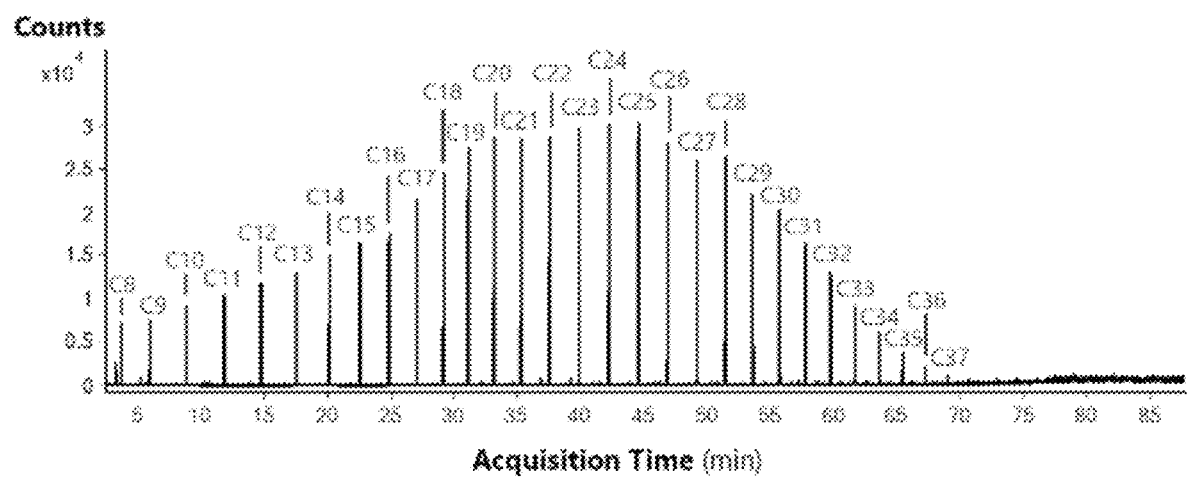

FIG. 157 shows the GC-MS of extracted waxes (50.5% yield) from hydrogenolysis of PE ($M_n$=20 kDa, $M_w$=90 kDa, $\rho$=0.92 g/mL) using $mSiO_2$/Pt-1.7/$SiO_2$ (0.085 Pt wt/silica wt %) as catalyst. Conditions: 0.0007 Pt wt/PE wt % was heated in the reactor for 12 h at 300° C. under $H_2$ (at 0.89 MPa), the reactor was cooled to 25° C., the pressure was released, and the product was isolated by extraction of the solid reaction mixture with methylene chloride at 80° C.

Figure 158:
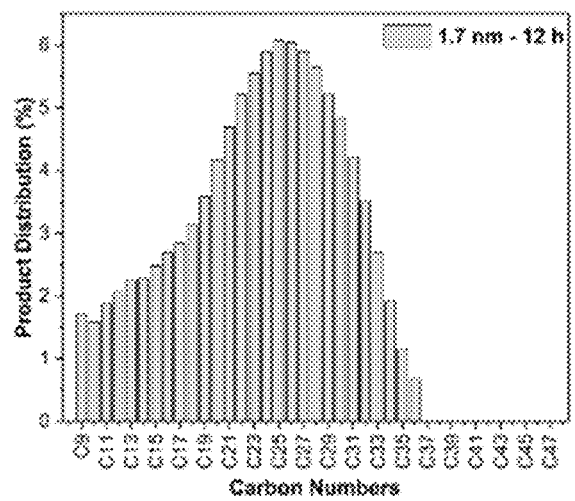

FIG. 158 shows the carbon number distribution of extracted waxes (50.5% yield) from hydrogenolysis of PE ($M_n$=20 kDa, $M_w$=90 kDa, $\rho$=0.92 g/mL) using $mSiO_2$/Pt-1.7/$SiO_2$ (0.085 Pt wt/silica wt %) as catalyst. Conditions: 0.0007 Pt wt/PE wt % was heated in the reactor for 12 h at 300° C. under $H_2$ (at 0.89 MPa), the reactor was cooled to 25° C., the pressure was released, and the product was isolated by extraction of the solid reaction mixture with methylene chloride at 80° C.

Figure 159:
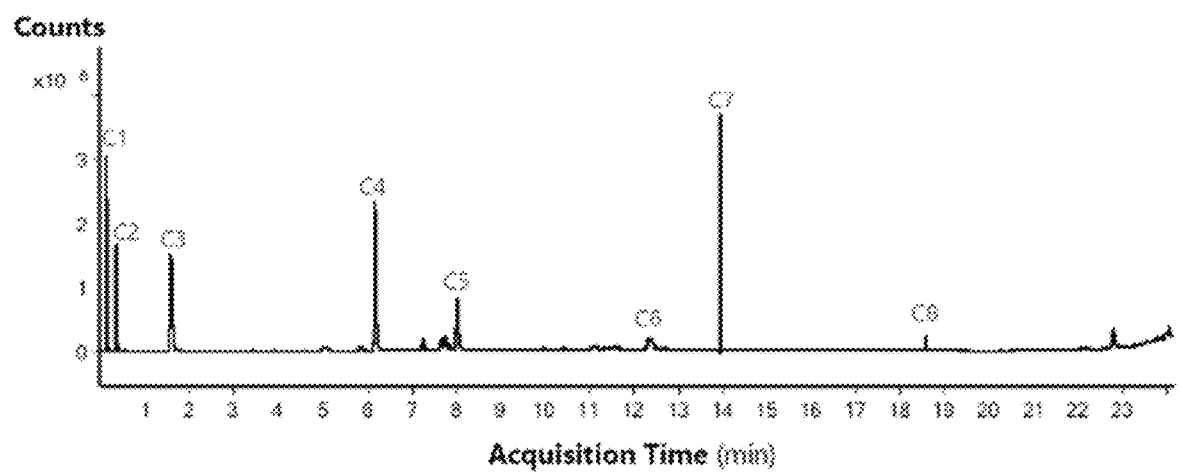

FIG. 159 shows the GC-FID trace of the sampled headspace (corresponding to 12.0% of the starting PE) for the hydrogenolysis reaction of PE ($M_n$=20 kDa, $M_w$=90 kDa, $\rho$=0.92 g/mL) using $mSiO_2$/Pt-2.9/$SiO_2$ (0.40 Pt wt/silica wt %) as catalyst. Conditions: 0.0019 wt/PE wt % was heated for 12 h at 300° C. under $H_2$ (at 0.89 MPa) in the reactor, which was then cooled, vented and sampled at 25° C.

Figure 160:
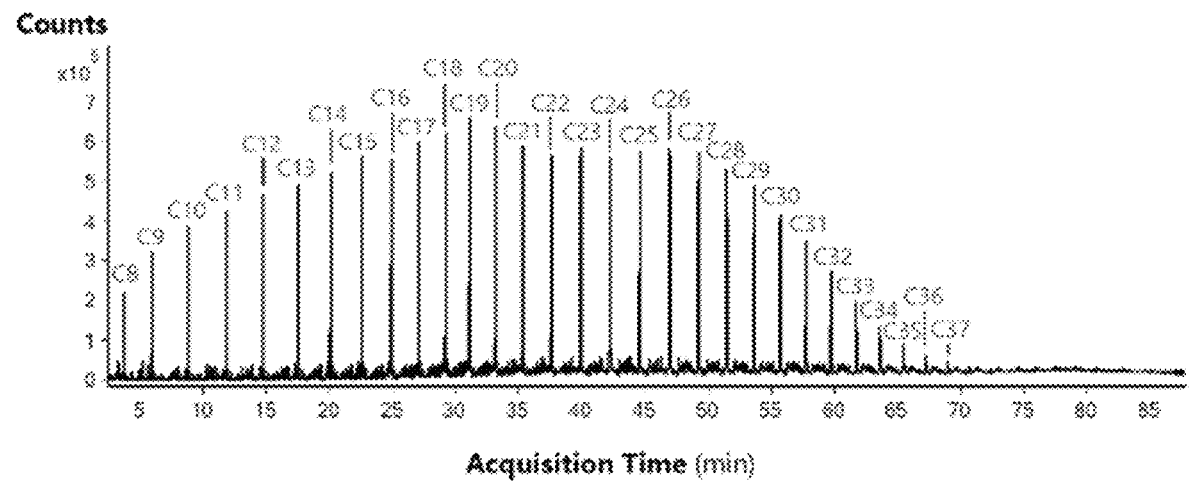

FIG. 160 shows the GC-MS of extracted waxes (43.8% yield) from hydrogenolysis of PE ($M_n$=20 kDa, $M_w$=90 kDa, $\rho$=0.92 g/mL) using $mSiO_2$/Pt-2.9/$SiO_2$ (0.40 Pt wt/silica wt %) as catalyst. Conditions: 0.0019 Pt wt/PE wt % was heated in the reactor for 12 h at 300° C. under $H_2$ (at 0.89 MPa), the reactor was cooled to 25° C., the pressure was released, and the product was isolated by extraction of the solid reaction mixture with methylene chloride at 80° C.

Figure 161:
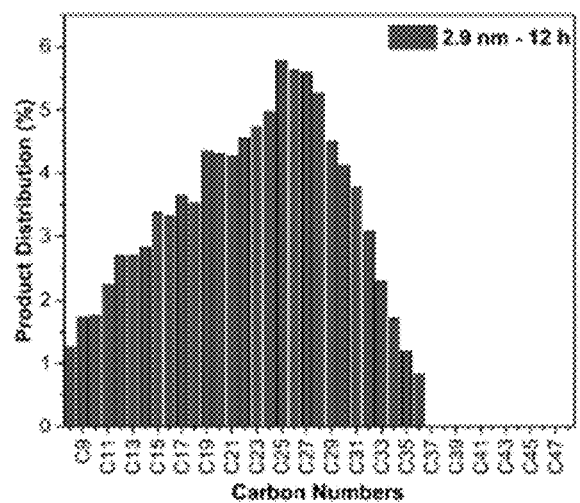

FIG. 161 shows the carbon number distribution of extracted waxes (43.8% yield) from hydrogenolysis of PE ($M_n$=20 kDa, $M_w$=90 kDa, $\rho$=0.92 g/mL) using $mSiO_2$/Pt-2.9/$SiO_2$ (0.40 Pt wt/silica wt %) as catalyst. Conditions: 0.0019 Pt wt/PE wt % was heated in the reactor for 12 h at 300° C. under $H_2$ (at 0.89 MPa), the reactor was cooled to 25° C., the pressure was released, and the product was isolated by extraction of the solid reaction mixture with methylene chloride at 80° C.

Figure 162:
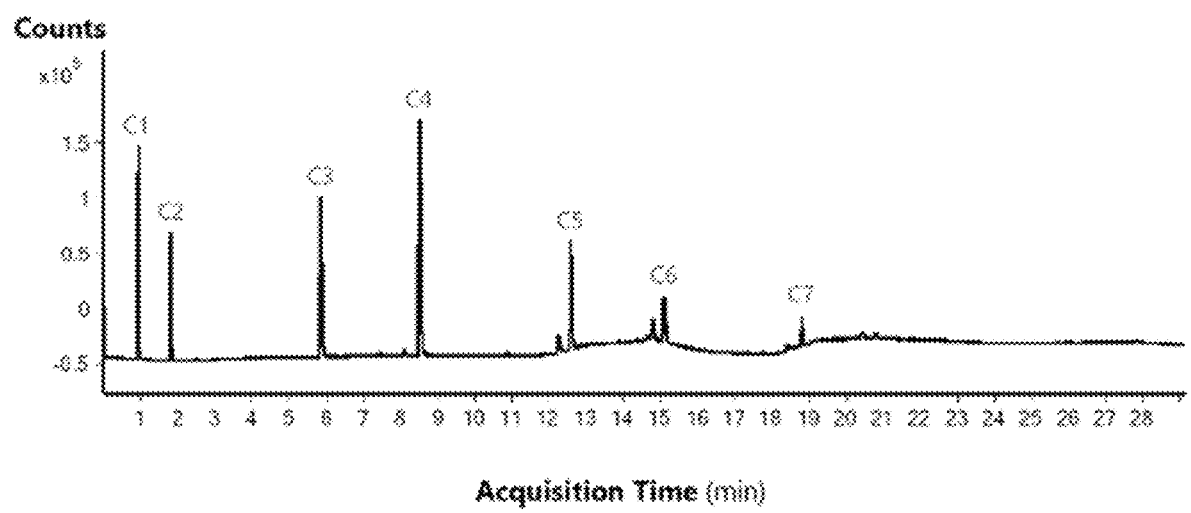

FIG. 162 shows the GC-FID trace of the sampled headspace (corresponding to 9.8% of the starting PE) for the hydrogenolysis reaction of PE ($M_n$=20 kDa, $M_w$=90 kDa, $\rho$=0.92 g/mL) using $mSiO_2$/Pt-5.0/$SiO_2$ (0.28 Pt wt/silica wt %) as catalyst. Conditions: 0.0034 wt/PE wt % was heated for 12 h at 300° C. under $H_2$ (at 0.89 MPa) in the reactor, which was then cooled, vented and sampled at 25° C.

Figure 163:
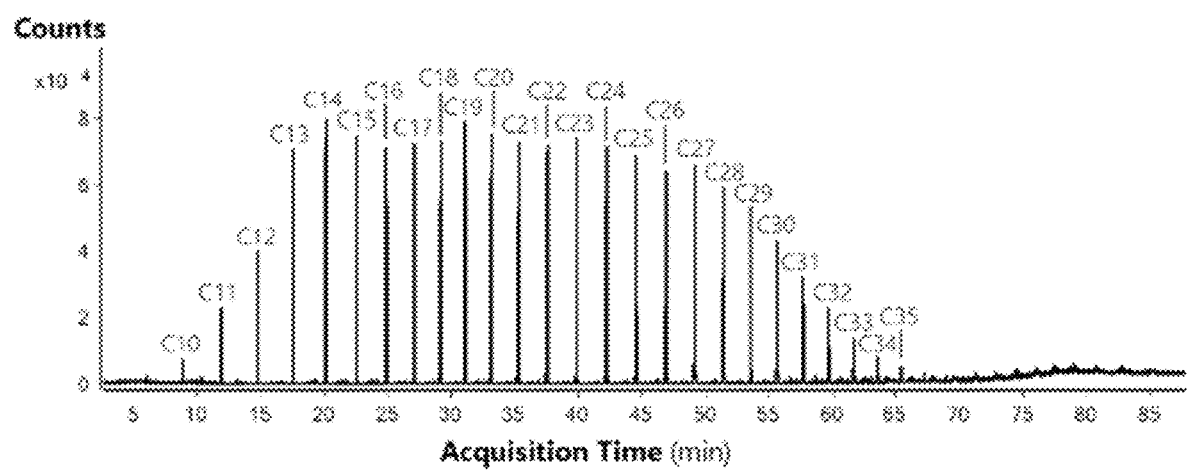

FIG. 163 shows the GC-MS of extracted waxes (17.5% yield) from hydrogenolysis of PE ($M_n$=20 kDa, $M_w$=90 kDa, $\rho$=0.92 g/mL) using $mSiO_2$/Pt-5.0/$SiO_2$ (0.28 Pt wt/silica wt %) as catalyst. Conditions: 0.0034 Pt wt/PE wt % was heated in the reactor for 12 h at 300° C. under $H_2$ (at 0.89 MPa), the reactor was cooled to 25° C., the pressure was released, and the product was isolated by extraction of the solid reaction mixture with methylene chloride at 80° C.

Figure 164:
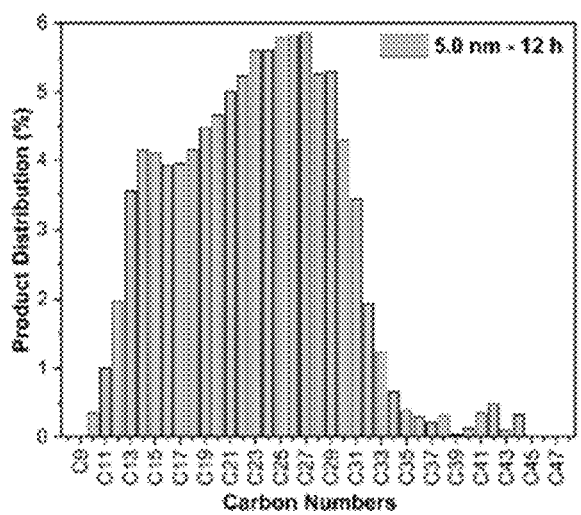

FIG. 164 shows the carbon number distribution of extracted waxes (17.5% yield) from hydrogenolysis of PE ($M_n$=20 kDa, $M_w$=90 kDa, $\rho$=0.92 g/mL) using $mSiO_2$/Pt-5.0/$SiO_2$ (0.28 Pt wt/silica wt %) as catalyst. Conditions: 0.0034 Pt wt/PE wt % was heated in the reactor for 12 h at 300° C. under $H_2$ (at 0.89 MPa), the reactor was cooled to 25° C., the pressure was released, and the product was isolated by extraction of the solid reaction mixture with methylene chloride at 80° C.

Figure 165:
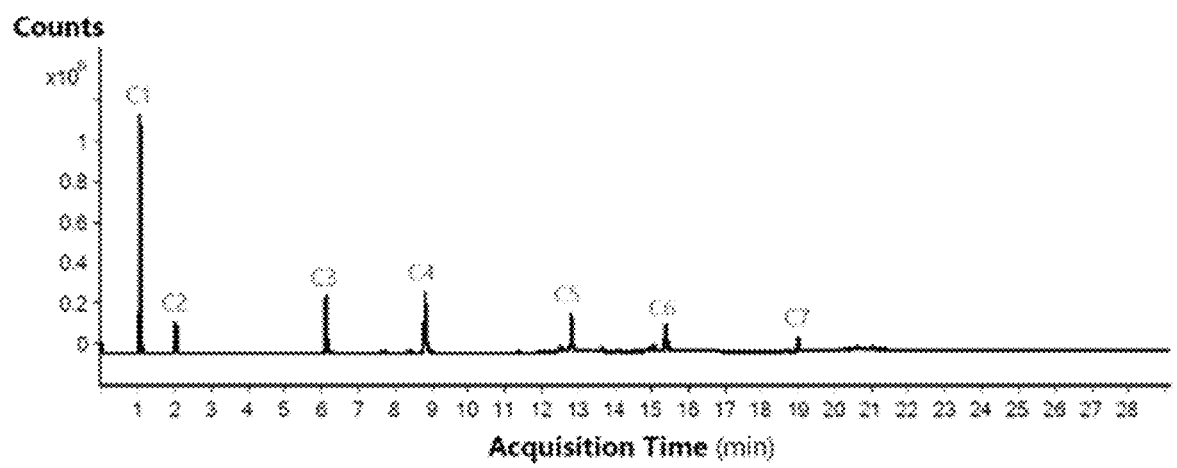

FIG. 165 shows the GC-FID trace of the sampled headspace (corresponding to 12.4% of the starting PE) for the hydrogenolysis reaction of PE ($M_n$=20 kDa, $M_w$=90 kDa, $\rho$=0.92 g/mL) using $mSiO_2$/Pt-1.7/$SiO_2$ (0.085 Pt wt/silica wt %) as catalyst. Conditions: 0.0007 wt/PE wt % was heated for 15 h at 300° C. under $H_2$ (at 0.89 MPa) in the reactor, which was then cooled, vented and sampled at 25° C.

Figure 166:
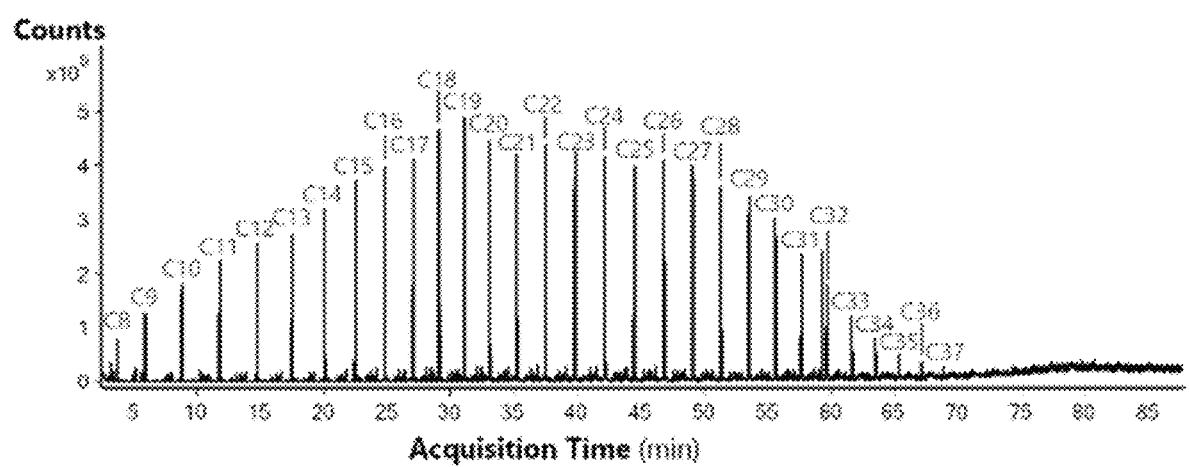

FIG. 166 shows the GC-MS of extracted waxes (73.6% yield) from hydrogenolysis of PE ($M_n$=20 kDa, $M_w$=90 kDa, $\rho$=0.92 g/mL) using $mSiO_2$/Pt-1.7/$SiO_2$ (0.085 Pt wt/silica wt %) as catalyst. Conditions: 0.0007 Pt wt/PE wt % was heated in the reactor for 15 h at 300° C. under $H_2$ (at 0.89 MPa), the reactor was cooled to 25° C., the pressure was released, and the product was isolated by extraction of the solid reaction mixture with methylene chloride at 80° C.

Figure 167:
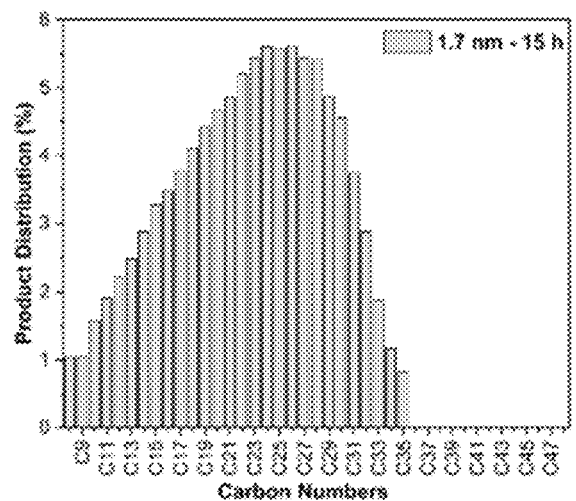

FIG. 167 shows the carbon number distribution of extracted waxes (73.6% yield) from hydrogenolysis of PE ($M_n$=20 kDa, $M_w$=90 kDa, $\rho$=0.92 g/mL) using $mSiO_2$/Pt-1.7/$SiO_2$ (0.085 Pt wt/silica wt %) as catalyst. Conditions: 0.0007 Pt wt/PE wt % was heated in the reactor for 15 h at 300° C. under $H_2$ (at 0.89 MPa), the reactor was cooled to 25° C., the pressure was released, and the product was isolated by extraction of the solid reaction mixture with methylene chloride at 80° C.

Figure 168:
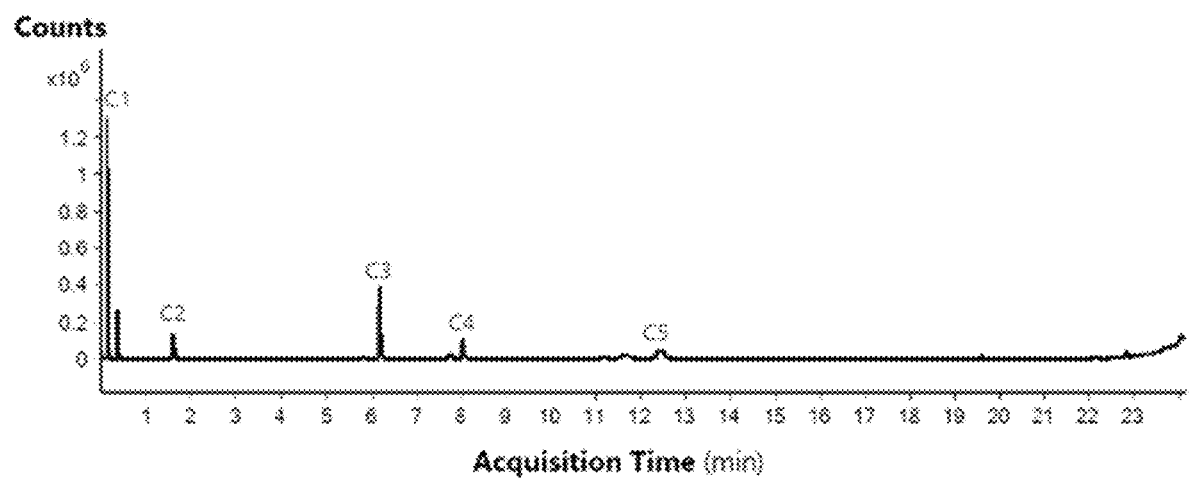

FIG. 168 shows the GC-FID trace of the sampled headspace (corresponding to 66.3% of the starting PE) for the hydrogenolysis reaction of PE ($M_n$=20 kDa, $M_w$=90 kDa, $\rho$=0.92 g/mL) using $mSiO_2$/Pt-1.7/$SiO_2$ (0.085 Pt wt/silica wt %) as catalyst. Conditions: 0.0007 wt/PE wt % was heated for 20 h at 300° C. under $H_2$ (at 0.89 MPa) in the reactor, which was then cooled, vented and sampled at 25° C.

Figure 169:
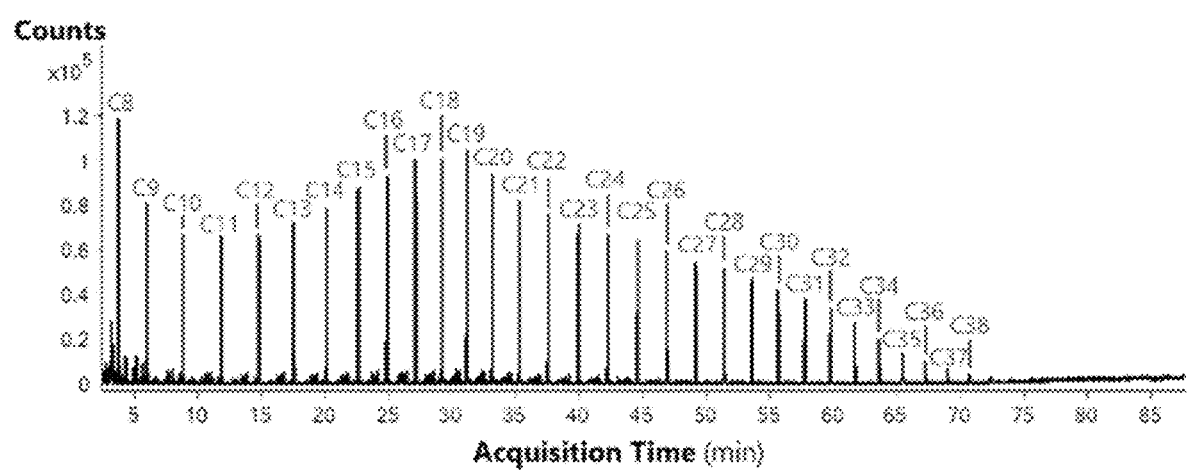

FIG. 169 shows the GC-MS of extracted waxes (33.7% yield) from hydrogenolysis of PE ($M_n$=20 kDa, $M_w$=90 kDa, $\rho$=0.92 g/mL) using $mSiO_2$/Pt-1.7/$SiO_2$ (0.085 Pt wt/silica wt %) as catalyst. Conditions: 0.0007 Pt wt/PE wt % heated in the reactor for 20 h at 300° C. under $H_2$ (at 0.89 MPa), the reactor was cooled to 25° C., the pressure was released, and the product was isolated by extraction of the solid reaction mixture with methylene chloride at 80° C.

Figure 170:
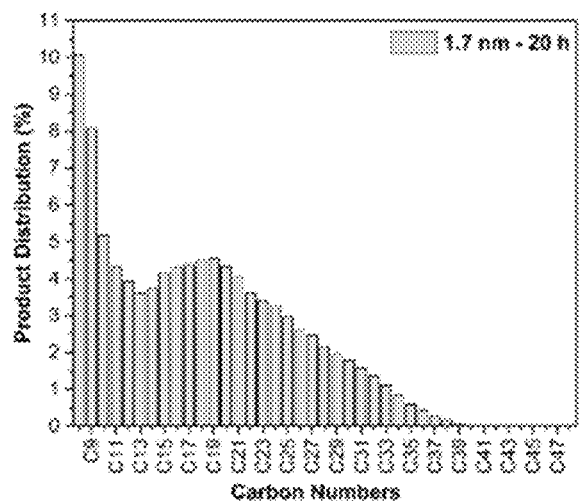

FIG. 170 shows the carbon number distribution of extracted waxes (corresponding to 33.7% of the starting PE) for the hydrogenolysis reaction of PE ($M_n$=20 kDa, $M_w$=90 kDa, $\rho$=0.92 g/mL) using $mSiO_2$/Pt-1.7/$SiO_2$ (0.085 Pt wt/silica wt %) as catalyst. Conditions: 0.0007 Pt wt/PE wt % was heated in the reactor for 15 h at 300° C. under $H_2$ (at 0.89 MPa), the reactor was cooled to 25° C., the pressure was released, and the product was isolated by extraction of the solid reaction mixture with methylene chloride at 80° C.

Figure 171:
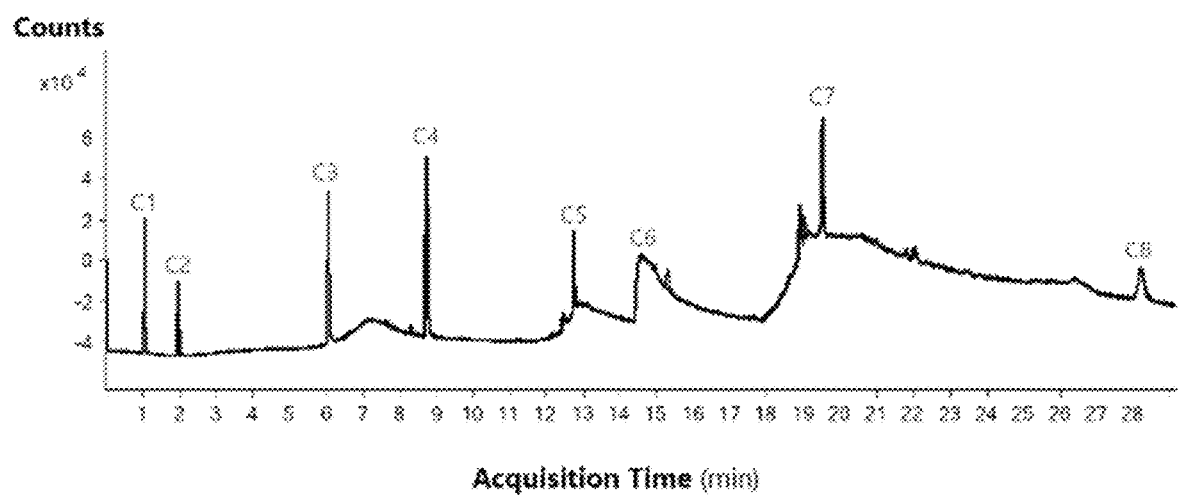

FIG. 171 shows the GC-FID trace of the sampled headspace (corresponding to 14.9% of the starting PE) for the hydrogenolysis reaction of PE ($M_n$=20 kDa, $M_w$=90 kDa, $\rho$=0.92 g/mL) using $mSiO_2$/Pt-2.9/$SiO_2$ (0.40 Pt wt/silica wt %) as catalyst. Conditions: 0.0019 wt/PE wt % heated for 20 h at 300° C. under $H_2$ (at 0.89 MPa) in the reactor, which was then cooled, vented and sampled at 25° C.

Figure 172:
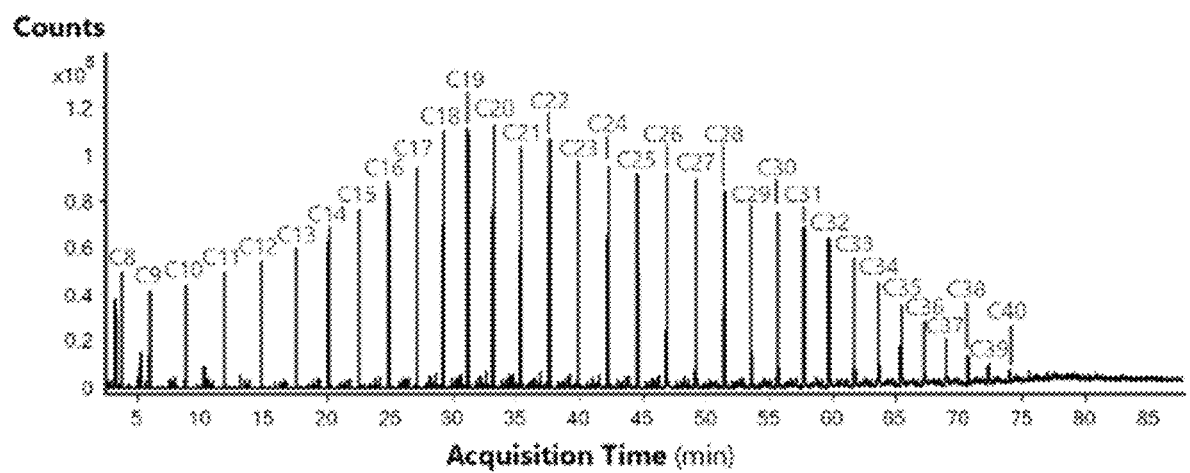

FIG. 172 shows the GC-MS of extracted waxes (70.8% yield) from hydrogenolysis of PE ($M_n$=20 kDa, $M_w$=90 kDa, $\rho$=0.92 g/mL) using $mSiO_2$/Pt-2.9/$SiO_2$ (0.40 Pt wt/silica wt %) as catalyst. Conditions: 0.0019 Pt wt/PE wt % was heated in the reactor for 20 h at 300° C. under $H_2$ (at 0.89 MPa), the reactor was cooled to 25° C., the pressure was released, and the product was isolated by extraction of the solid reaction mixture with methylene chloride at 80° C.

Figure 173:
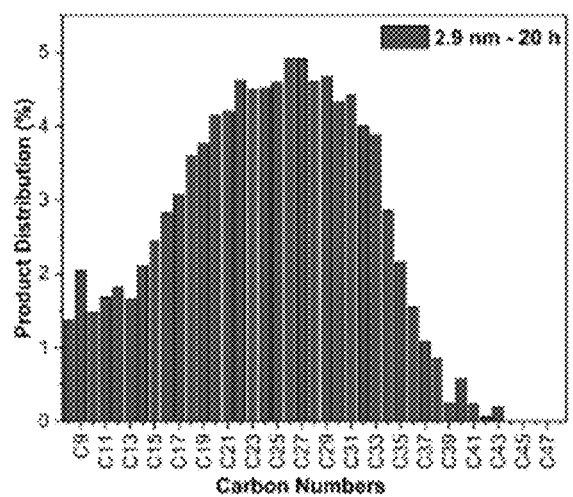

FIG. 173 shows the carbon number distribution of extracted waxes (70.8% yield) from hydrogenolysis of PE ($M_n$=20 kDa, $M_w$=90 kDa, $\rho$=0.92 g/mL) using $mSiO_2$/Pt-2.9/$SiO_2$ (0.40 Pt wt/silica wt %) as catalyst. Conditions: 0.0019 Pt wt/PE wt % was heated in the reactor for 20 h at 300° C. under $H_2$ (at 0.89 MPa), the reactor was cooled to 25° C., the pressure was released, and the product was isolated by extraction of the solid reaction mixture with methylene chloride at 80° C.

Figure 174:
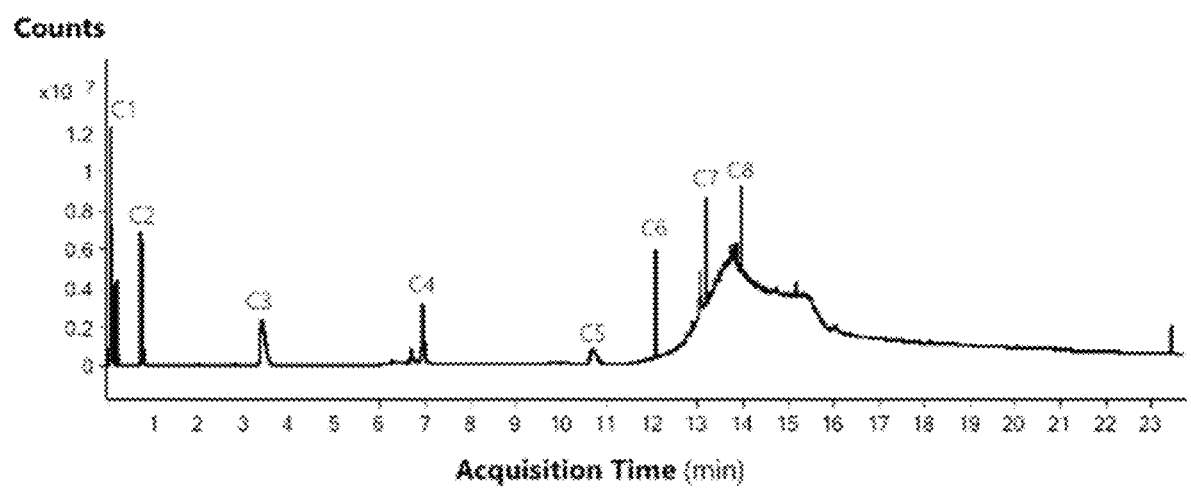

FIG. 174 shows the GC-FID trace of the sampled headspace (corresponding to 9.8% of the starting PE) for the hydrogenolysis reaction of PE ($M_n$=20 kDa, $M_w$=90 kDa, ρ=0.92 g/mL) using mSiO$_2$/Pt-5.0/SiO$_2$ (0.28 Pt wt/silica wt %) as catalyst. Conditions: 0.0034 wt/PE wt % was heated for 20 h at 300° C. under H$_2$ (at 0.89 MPa) in the reactor, which was then cooled, vented and sampled at 25° C.

Figure 175:
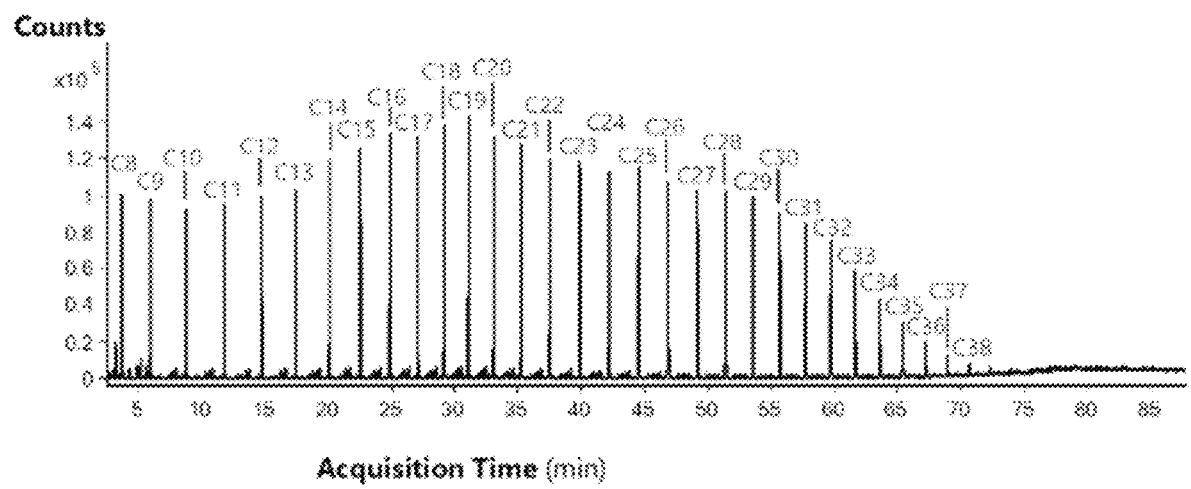

FIG. 175 shows the GC-MS of extracted waxes (61.7% yield) from hydrogenolysis of PE ($M_n$=20 kDa, $M_w$=90 kDa, ρ=0.92 g/mL) using mSiO$_2$/Pt-5.0/SiO$_2$ (0.28 Pt wt/silica wt %) as catalyst. Conditions: 0.0034 Pt wt/PE wt % in the reactor for 20 h at 300° C. under H$_2$ (at 0.89 MPa), the reactor was cooled to 25° C., the pressure was released, and the product was isolated by extraction of the solid reaction mixture with methylene chloride at 80° C.

Figure 176:
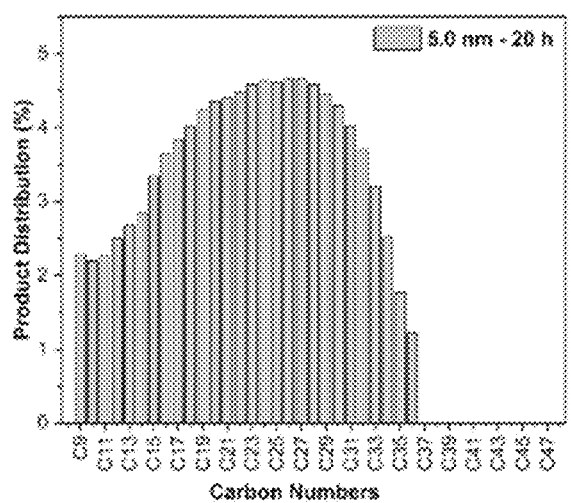

FIG. 176 shows the carbon number distribution of extracted waxes (61.7% yield) from hydrogenolysis of PE ($M_n$=20 kDa, $M_w$=90 kDa, ρ=0.92 g/mL) using mSiO$_2$/Pt-5.0/SiO$_2$ (0.28 Pt wt/silica wt %) as catalyst. Conditions: 0.0034 Pt wt/PE wt % was heated in the reactor for 20 h at 300° C. under H$_2$ (at 0.89 MPa), the reactor was cooled to 25° C., the pressure was released, and the product was isolated by extraction of the solid reaction mixture with methylene chloride at 80° C.

Figure 177:
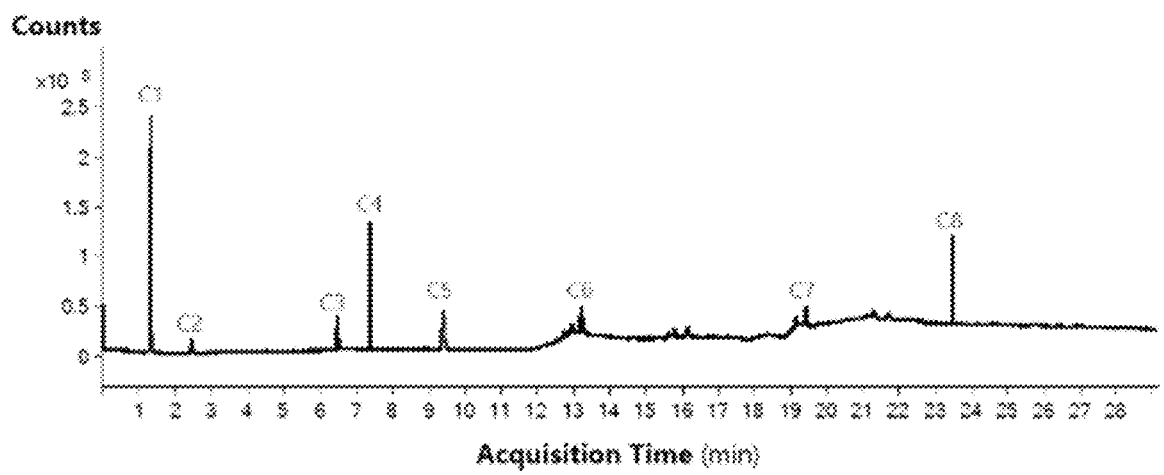

FIG. 177 shows the GC-FID trace of the sampled headspace (corresponding to 1.8% of the starting PE) for the hydrogenolysis reaction of PE ($M_n$=20 kDa, $M_w$=90 kDa, ρ=0.92 g/mL) using Pt-1.7/SiO$_2$ (0.72 Pt wt/silica wt %) as catalyst. Conditions: 0.0007 wt/PE wt % was heated for 12 h at 300° C. under H$_2$ (at 0.89 MPa) in the reactor, then cooled, vented and sampled at 25° C.

Figure 178:
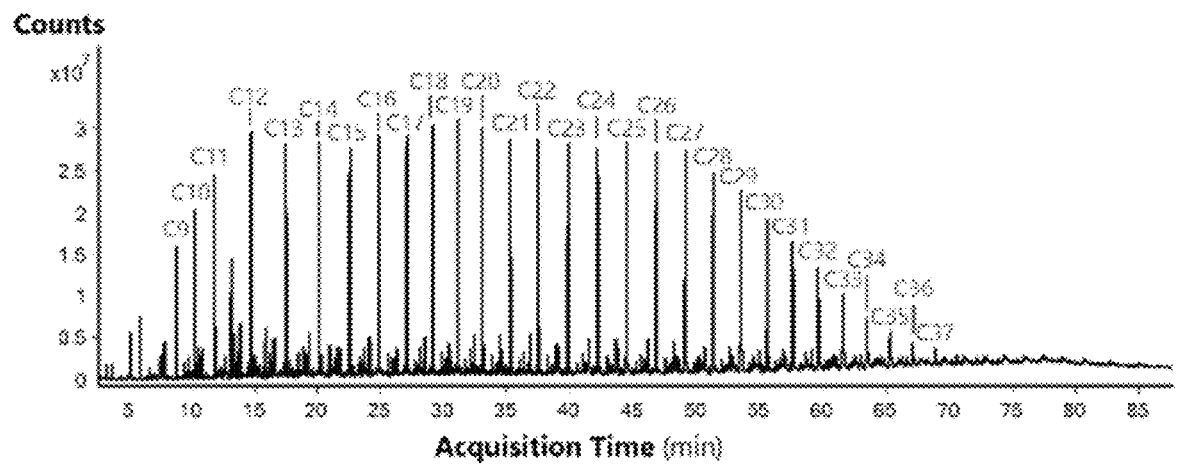

FIG. 178 shows the GC-MS of extracted waxes (2.7% yield) from hydrogenolysis of PE ($M_n$=20 kDa, $M_w$=90 kDa, ρ=0.92 g/mL) using Pt-1.7/SiO$_2$ (0.72 Pt wt/silica wt %) as catalyst. Conditions: 0007 Pt wt/PE wt % was heated in the reactor for 12 h at 300° C. under H$_2$ (at 0.89 MPa), the reactor was cooled to 25° C., the pressure was released, and the product was isolated by extraction of the solid reaction mixture with methylene chloride at 80° C.

Figure 179:
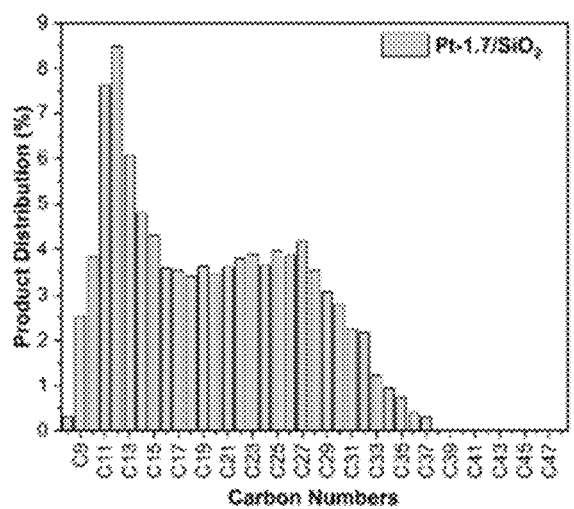

FIG. 179 shows the carbon number distribution of extracted waxes (2.7% yield) from hydrogenolysis of PE ($M_n$=20 kDa, $M_w$=90 kDa, ρ=0.92 g/mL) using Pt-1.7/SiO$_2$ (0.72 Pt wt/silica wt %) as catalyst. Conditions: 0.0007 Pt wt/PE wt % was heated in the reactor for 12 h at 300° C. under H$_2$ (at 0.89 MPa), the reactor was cooled to 25° C., the pressure was released, and the product was isolated by extraction of the solid reaction mixture with methylene chloride at 80° C.

Figure 180:
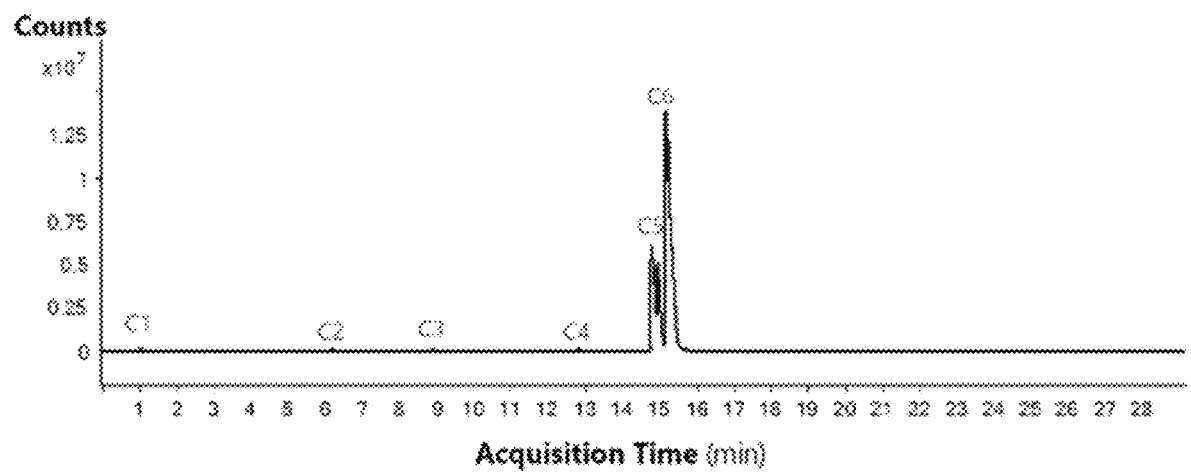

FIG. 180 shows the GC-FID trace of the sampled headspace (corresponding to 1.2% of the starting PE) for the hydrogenolysis reaction of PE ($M_n$=20 kDa, $M_w$=90 kDa, ρ=0.92 g/mL) using Pt-2.9/SiO$_2$ (3.98 Pt wt/silica wt %) as catalyst. Conditions: 0.0019 wt/PE wt % was heated for 12 h at 300° C. under H$_2$ (at 0.89 MPa) in the reactor, which was then cooled, vented and sampled at 25° C.

Figure 181:
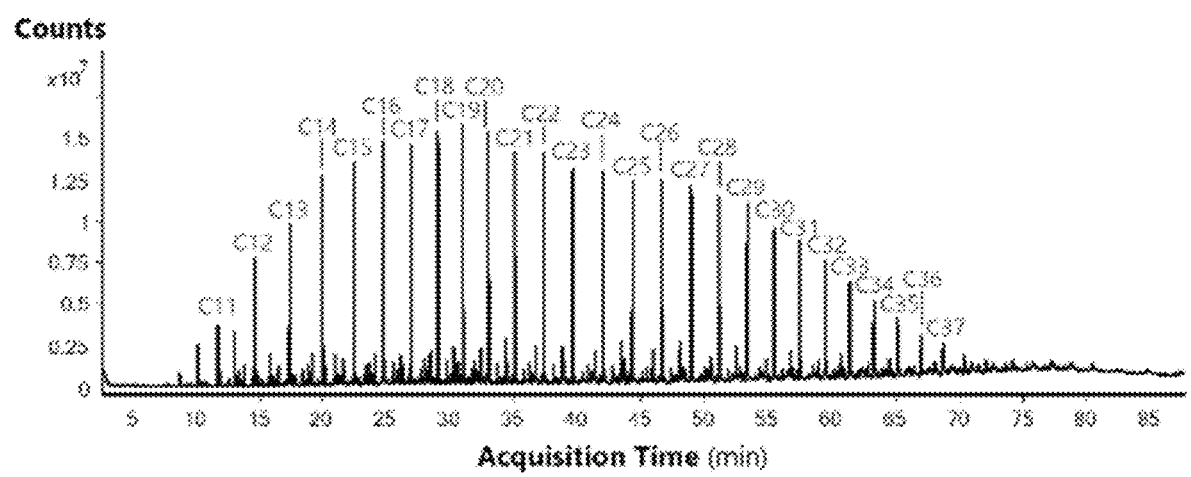

FIG. 181 shows the GC-MS of extracted waxes (3.1% yield) from hydrogenolysis of PE ($M_n$=20 kDa, $M_w$=90 kDa, ρ=0.92 g/mL) using Pt-2.9/SiO$_2$ (3.98 Pt wt/silica wt %) as catalyst. Conditions: 0.0019 Pt wt/PE wt % was heated in the reactor for 12 h at 300° C. under H$_2$ (at 0.89 MPa), the reactor was cooled to 25° C., the pressure was released, and the product was isolated by extraction of the solid reaction mixture with methylene chloride at 80° C.

Figure 182:
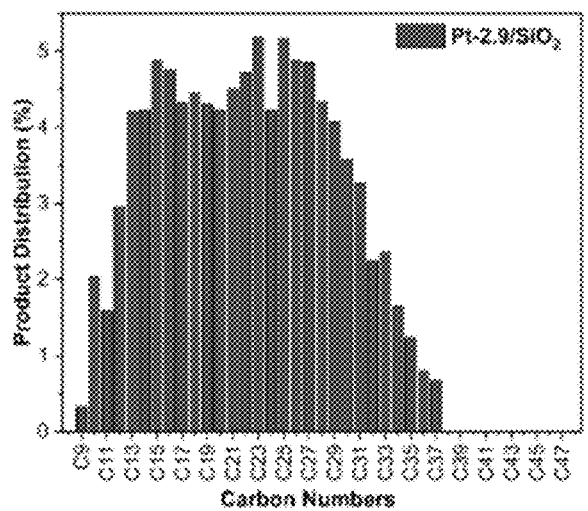

FIG. 182 shows the carbon number distribution of extracted waxes (3.1% yield) from hydrogenolysis of PE ($M_n$=20 kDa, $M_w$=90 kDa, ρ=0.92 g/mL) using Pt-2.9/SiO$_2$ (3.98 Pt wt/silica wt %) as catalyst. Conditions: 0.0019 Pt wt/PE wt % was heated in the reactor for 12 h at 300° C. under H$_2$ (at 0.89 MPa), the reactor was cooled to 25° C., the pressure was released, and the product was isolated by extraction of the solid reaction mixture with methylene chloride at 80° C.

Figure 183:
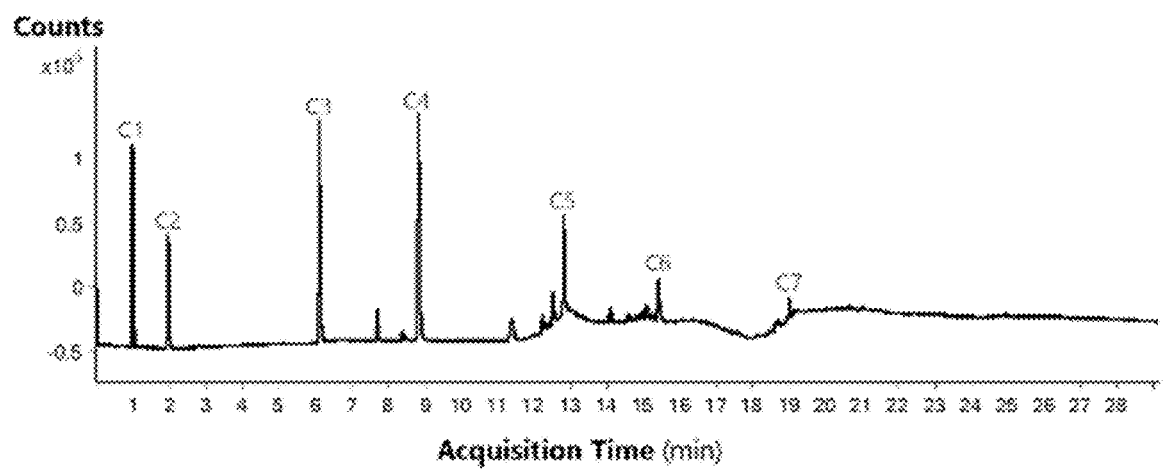

FIG. 183 shows the GC-FID trace of the sampled headspace (corresponding to 6.4% of the starting PE) for the hydrogenolysis reaction of PE ($M_n$=20 kDa, $M_w$=90 kDa, ρ=0.92 g/mL) using Pt-5.0/SiO$_2$ (3.78 Pt wt/silica wt %) as catalyst. Conditions: 0.0034 wt/PE wt % was heated for 12 h at 300° C. under H$_2$ (at 0.89 MPa) in the reactor, which was then vented and sampled at 25° C.

Figure 184:
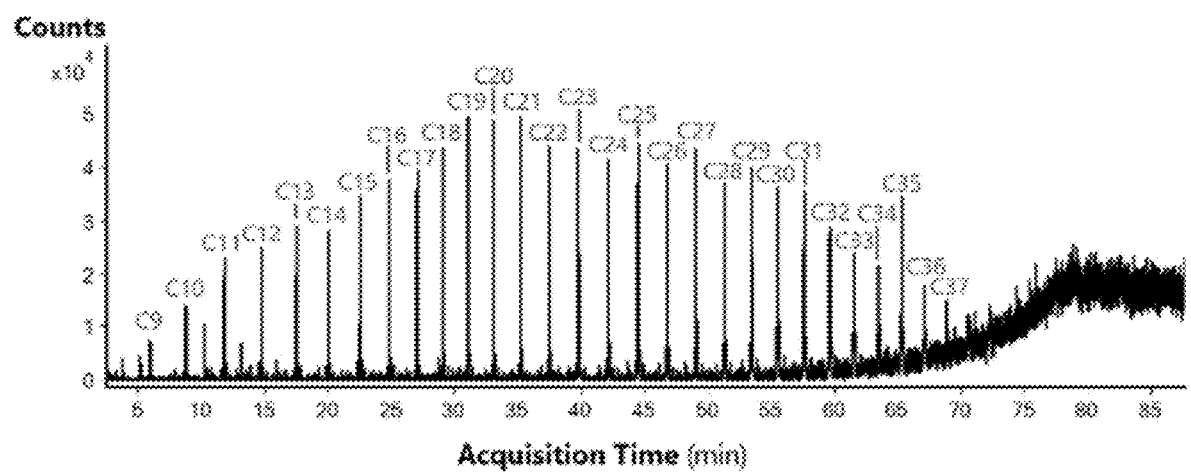

FIG. 184 shows the GC-MS of extracted waxes (7.1% yield) from hydrogenolysis of PE ($M_n$=20 kDa, $M_w$=90 kDa, ρ=0.92 g/mL) using Pt-5.0/SiO$_2$ (3.78 Pt wt/silica wt %) as catalyst. Conditions: 0.0034 Pt wt/PE wt % was heated in the reactor for 12 h at 300° C. under H$_2$ (at 0.89 MPa), the reactor was cooled to 25° C., the pressure was released, and the product was isolated by extraction of the solid reaction mixture with methylene chloride at 80° C.

Figure 185:
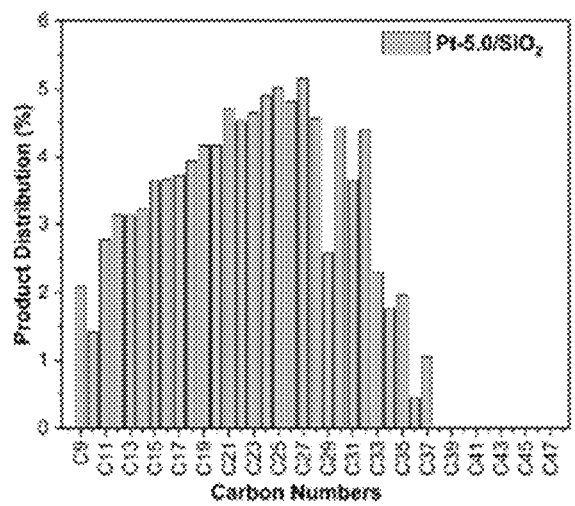

FIG. 185 shows the carbon number distribution of extracted waxes (7.1% yield) from hydrogenolysis of PE ($M_n$=20 kDa, $M_w$=90 kDa, ρ=0.92 g/mL) using Pt-5.0/SiO$_2$ (3.78 Pt wt/silica wt %) as catalyst. Conditions: 0.0034 Pt wt/PE wt % was heated in the reactor for 12 h at 300° C. under H$_2$ (at 0.89 MPa), the reactor was cooled to 25° C., the pressure was released, and the product was isolated by extraction of the solid reaction mixture with methylene chloride at 80° C.

Figure 186:
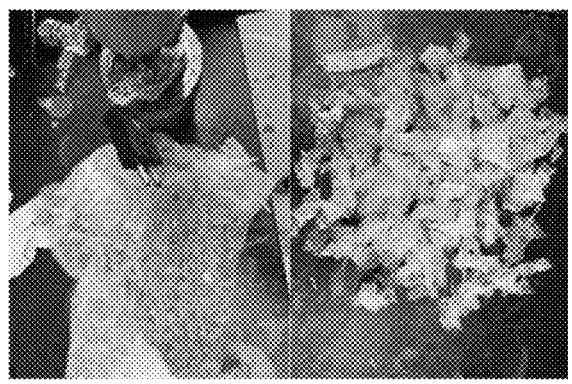

FIG. 186 shows the bubble wrap plastic waste obtained from backyard as litter, no pre-cleaning was performed prior to reactions.

Figure 187:
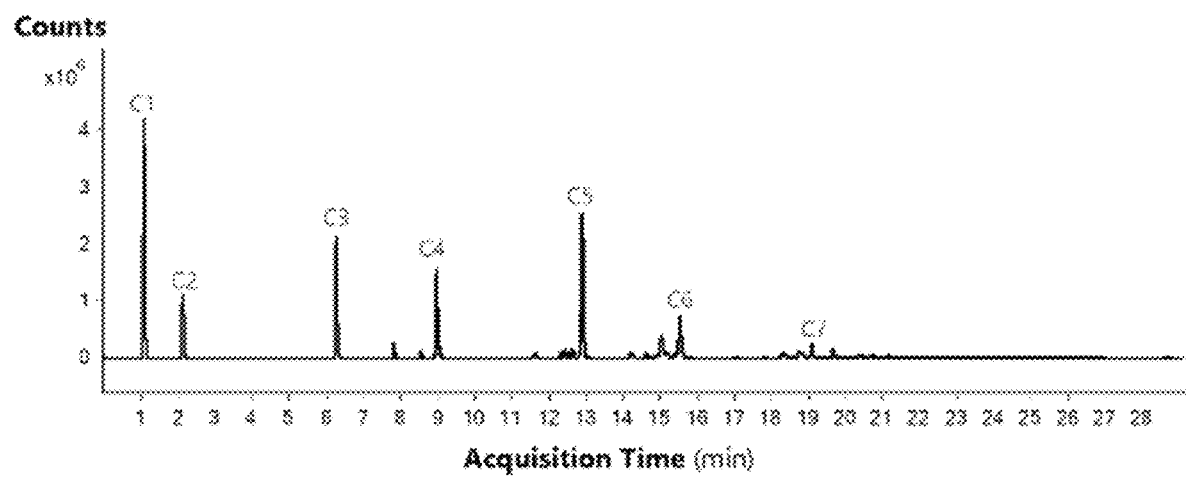

FIG. 187 shows the GC-FID trace of the sampled headspace (corresponding to 10.3% of the starting PE) for the hydrogenolysis reaction of bubble wrap using mSiO$_2$/Pt-1.7/SiO$_2$ (0.085 Pt wt/silica wt %) as catalyst. Conditions: 0.0007 wt/PE wt % was heated for 12 h at 300° C. under H$_2$ (at 0.89 MPa) in the reactor, which was then vented and sampled at 25° C.

Figure 188:
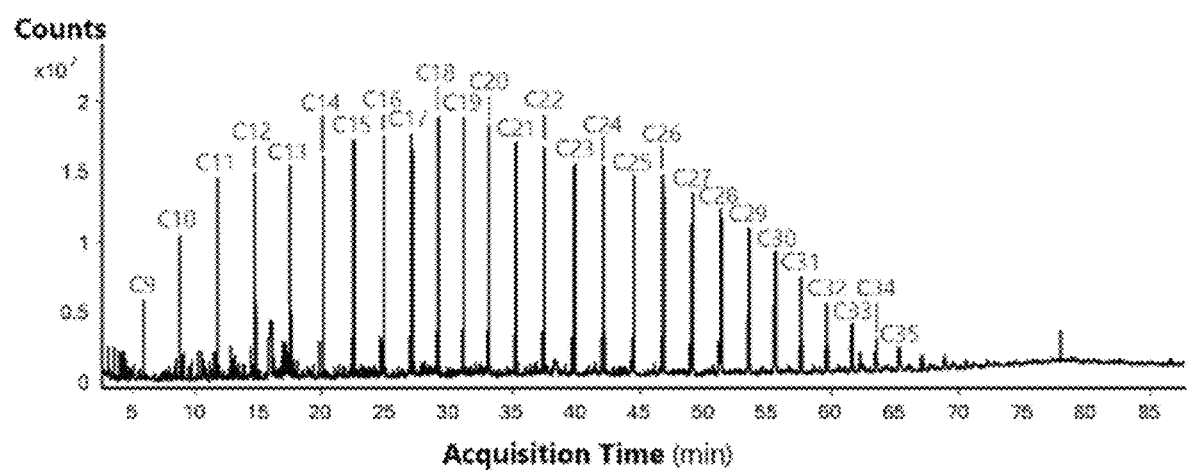

FIG. 188 shows the GC-MS of extracted waxes (28.8% yield) from hydrogenolysis of bubble wrap litter using mSiO$_2$/Pt-1.7/SiO$_2$ (0.085 Pt wt/silica wt %) as catalyst. Conditions: 0.0007 wt/PE wt % in the reactor for 12 h at 300° C. under H$_2$ (at 0.89 MPa), the reactor was cooled to 25° C., the pressure was released, and the product was isolated by extraction of the solid reaction mixture with methylene chloride at 80° C.

Figure 189:
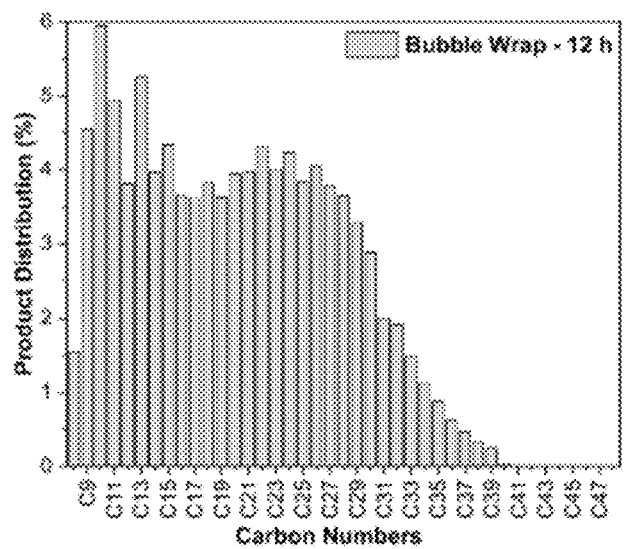

FIG. 189 shows the Carbon number distribution of extracted waxes (28.8% yield) from hydrogenolysis of backyard bubble wrap litter using mSiO$_2$/Pt-1.7/SiO$_2$ (0.085 Pt wt/silica wt %) as catalyst. Conditions: 0.0007 Pt wt/PE wt % was heated in the reactor for 12 h at 300° C. under H$_2$ (at 0.89 MPa), the reactor was cooled to 25° C., the pressure was released, and the product was isolated by extraction of the solid reaction mixture with methylene chloride at 80° C.

Figure 190:
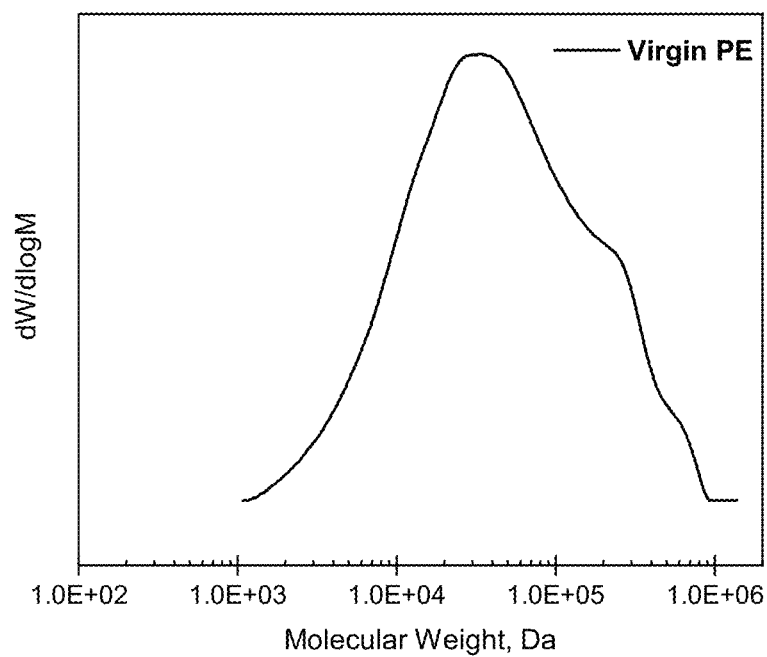

FIG. 190 shows the HT-GPC analysis of molecular mass and distributions of PE (Alfa Aesar 041321).

DETAILED DESCRIPTION

As used above, and throughout the description herein, the following terms, unless otherwise indicated, shall be understood to have the following meanings. If not defined otherwise herein, all technical and scientific terms used herein have the same meaning as is commonly understood by one of ordinary skill in the art to which this technology belongs. In the event that there is a plurality of definitions for a term herein, those in this section prevail unless stated otherwise.

The term "block copolymer" or "block polymer" refers to a macromolecule consisting of long sequences of different repeat units. Exemplary block polymers include, but are not limited to $A_nB_m$, $A_nB_mA_m$, $A_nB_mC_k$, or $A_nB_mC_kA_n$.

The term "copolymer" refers to a polymer derived from more than one species of monomer.

The term "graft copolymer" refers to a type of copolymer which one or more blocks of homopolymer are grafted as branches onto a main chain i.e. it is a branched copolymer with one or more side chains of a homopolymer attached to the backbone of the main chain.

The term "metal nanoparticle" refers to a submicron scale entities made of pure metals (e.g., nickel, palladium, platinum, cobalt, rhodium, iridium, iron, ruthenium, osmium, manganese, rhenium, chromium, molybdenum, and tungsten), combination of metals (e.g. PtSn), or their compounds.

The term "number average molecular weight ($M_n$)" refers to the total weight of the polymer divided by the number of molecules in the polymer.

The term "polymeric blend" refers to a mixture in which at least two polymers are blended together to create a new material with different physical properties.

The term "polyolefinic polymer" refers to a polymer produced from an olefin with the general formula $C_nH_{2n}$ as a monomer.

Catalyst

One aspect of the present application relates to a catalyst which comprises a silica core having an outer surface and a mesoporous silica shell having an outer surface and an inner surface with the inner surface being inside the outer surface of said mesoporous silica shell proximate to and surrounding the outer surface of said silica core. The outer surface of the mesoporous silica shell has openings leading to pores within the mesoporous silica shell which extend toward the outer surface of said silica core. The catalyst also includes catalytically active metal nanoparticles positioned within the pores proximate to said core, wherein the catalytic metal nanoparticles comprise about 0.0001 wt % to about 1.0 wt % of the catalyst.

In another embodiment of the catalyst, the catalytic metal nanoparticle comprises about 0.085 wt % of the catalyst.

In another embodiment of the catalyst, the catalytic metal nanoparticle comprises about 0.28 wt % of the catalyst.

In another embodiment of the catalyst, the catalytic metal nanoparticle comprises about 0.35 wt % of the catalyst.

In another embodiment of the catalyst, the catalytic metal nanoparticle comprises about 0.40 wt % of the catalyst.

In another embodiment of the catalyst, the silica core further comprises a functional group selected from the group consisting of: amines, carboxylic acids, alcohols, thiols, phosphorus, and combinations thereof.

In another embodiment of the catalyst, the catalytic metal nanoparticles are positioned on the outer surface of the silica core.

In another embodiment of the catalyst, the catalyst has a mean particle diameter of about 100 nm to about 1000 nm.

In another embodiment of the catalyst, the catalyst has a mean particle diameter of about 240 nm.

In another embodiment of the catalyst, the silica core has a mean particle diameter of about 50 nm to about 500 nm.

In another embodiment of the catalyst, the silica core has a mean particle diameter of about 127 nm.

In another embodiment of the catalyst, the metal for the catalytic metal nanoparticle is selected from the group consisting of nickel, palladium, platinum, cobalt, rhodium, iridium, iron, ruthenium, osmium, manganese, rhenium, chromium, molybdenum, tungsten, and combinations thereof.

In another embodiment of the catalyst, the catalytic metal nanoparticle has a mean particle diameter of about 1 nm to about 10 nm.

In another embodiment of the catalyst, the catalytic metal nanoparticle has a mean particle diameter of about 1.7 nm.

In another embodiment of the catalyst, the catalytic metal nanoparticle has a mean particle diameter of about 2.9 nm.

In another embodiment of the catalyst, the catalytic metal nanoparticle has a mean particle diameter of about 3.2 nm.

In another embodiment of the catalyst, the catalytic metal nanoparticle has a mean particle diameter of about 5.0 nm.

In another embodiment of the catalyst, the mesoporous silica shell has a thickness of about 50 nm to about 500 nm.

In another embodiment of the catalyst, the mesoporous silica shell has a thickness of about 65 nm.

In another embodiment of the catalyst, the mesoporous silica shell has a thickness of about 110 nm.

In another embodiment of the catalyst, the mesoporous silica shell has a thickness of about 120 nm.

In another embodiment of the catalyst, the mesoporous silica shell has a thickness of about 220 nm.

In another embodiment of the catalyst, the mesoporous silica shell has a thickness of about 300 nm.

In another embodiment of the catalyst, the mesoporous silica shell has a pore diameter of about 1 nm to about 10 nm.

In another embodiment of the catalyst, the mesoporous silica shell has a pore diameter of about 2.4 nm.

In another embodiment of the catalyst, the pores have a length of about the thickness of the mesoporous silica shell measured between its inner and outer surfaces.

Methods of Use

Another aspect of the present application relates to a process for catalytically hydrogenolysizing a polyolefinic polymer, which comprises providing a polyolefinic polymer and subjecting said polyolefinic polymer to a hydrogenolysis reaction in the presence of a catalyst to cleave the polymer into hydrocarbon segments. The catalyst comprises a silica core having an outer surface and a mesoporous silica shell having an outer surface and an inner surface with the inner surface being inside the outer surface of said mesoporous silica shell proximate to and surrounding the outer surface of said silica core, wherein the outer surface of the mesoporous silica shell has openings leading to pores within the mesoporous silica shell which extend toward the outer surface of said silica core. The catalyst also includes catalytic metal nanoparticles positioned within the pores proximate to said core to cleave said polyolefinic polymer entering said mesoporous silica shell through the openings into hydrocarbon segments.

In carrying out the process, the catalyst used has the characteristics described herein.

In another embodiment of the process for catalytically hydrogenolysizing a polyolefinic polymer, the catalytic metal nanoparticle comprises about 0.0001 wt % to about 1.0 wt % of the catalyst.

In another embodiment of the process for catalytically hydrogenolysizing a polyolefinic polymer, the catalytic metal nanoparticle comprises about 0.085 wt % of the catalyst.

In another embodiment of the process for catalytically hydrogenolysizing a polyolefinic polymer, the catalytic metal nanoparticle comprises about 0.28 wt % of the catalyst.

In another embodiment of the process for catalytically hydrogenolysizing a polyolefinic polymer, the catalytic metal nanoparticle comprises about 0.35 wt % of the catalyst.

In another embodiment of the process for catalytically hydrogenolysizing a polyolefinic polymer, the catalytic metal nanoparticle comprises about 0.40 wt % of the catalyst.

In another embodiment of the process for catalytically hydrogenolysizing a polyolefinic polymer, the catalytic metal nanoparticle has a mean particle diameter of about 1 nm to about 10 nm.

In another embodiment of the process for catalytically hydrogenolysizing a polyolefinic polymer, the catalytic metal nanoparticle has a mean particle diameter of about 1.7 nm.

In another embodiment of the process for catalytically hydrogenolysizing a polyolefinic polymer, the catalytic metal nanoparticle has a mean particle diameter of about 2.9 nm.

In another embodiment of the process for catalytically hydrogenolysizing a polyolefinic polymer, the catalytic metal nanoparticle has a mean particle diameter of about 3.2 nm.

In another embodiment of the process for catalytically hydrogenolysizing a polyolefinic polymer, the catalytic metal nanoparticle has a mean particle diameter of about 5.0 nm.

In another embodiment of the process for catalytically hydrogenolysizing a polyolefinic polymer, said polyolefinic polymer is selected from the group consisting of physical mixtures of polymers, polymeric blends, copolymers, block copolymers, graft copolymers, and combinations thereof.

In another embodiment of the process for catalytically hydrogenolysizing a polyolefinic polymer, said polyolefinic polymer is selected from the group consisting of high density polyethylene, isostatic polypropylene, medium density polyethylene, low density polyethylene, linear low density polyethylene, ultra high molecular weight polyethylene, and combinations thereof.

In another embodiment of the process for catalytically hydrogenolysizing a polyolefinic polymer, said polyolefinic polymer is high density polyethylene having a number average molecular weight ($M_n$) of 5000-100000 Da. In some embodiments of the number average molecular weight ($M_n$) is 5000-75000 Da, 10000-100000 Da, 10000-75000 Da, 10000-50000 Da, or 5000-50000 Da.

In another embodiment of the process for catalytically hydrogenolysizing a polyolefinic polymer, said polyolefinic polymer has a longitudinal extent between opposed ends. The step of subjecting said polyolefinic polymer to a hydrogenolysis reaction comprises extending an end of said polyolefinic polymer through the openings and into the pores of said mesoporous silica shell and cleaving said polyolefinic polymer into hydrocarbon segments in the pores using the catalytic metal nanoparticle.

In another embodiment of the process for catalytically hydrogenolysizing a polyolefinic polymer, the pores have dimensions selected to produce a size distribution of the hydrocarbon segments as a result of hydrogenolysis.

In another embodiment of the process for catalytically hydrogenolysizing a polyolefinic polymer, the pores have a diameter selected to permit a length of said polyolefinic polymer to enter the pores which yield a particular segment length as a result of hydrogenolysis.

In another embodiment of the process for catalytically hydrogenolysizing a polyolefinic polymer, said subjecting is carried out at a pressure of about 1 psi to about 1000 psi.

In another embodiment of the process for catalytically hydrogenolysizing a polyolefinic polymer, said subjecting is carried out at a pressure of about 10 psi to about 1000 psi, about 50 psi to about 1000 psi, about 100 psi to about 1000 psi, about 150 psi to about 1000 psi, about 200 psi to about 1000 psi, about 250 psi to about 1000 psi, about 300 psi to about 1000 psi, about 400 psi to about 1000 psi, about 500 psi to about 1000 psi, about 600 psi to about 1000 psi, about 700 psi to about 1000 psi, about 800 psi to about 1000 psi, about 900 psi to about 1000 psi, about 1 psi to about 900 psi, about 1 psi to about 800 psi, about 1 psi to about 700 psi, about 1 psi to about 600 psi, about 1 psi to about 500 psi, about 1 psi to about 400 psi, about 1 psi to about 300 psi, about 1 psi to about 250 psi, about 1 psi to about 200 psi, about 1 psi to about 150 psi, about 1 psi to about 100 psi, about 1 psi to about 50 psi, or about 1 psi to about 10 psi.

In another embodiment of the process for catalytically hydrogenolysizing a polyolefinic polymer, said subjecting is carried out at a pressure of about 200 psi.

In another embodiment of the process for catalytically hydrogenolysizing a polyolefinic polymer, said subjecting is carried out at a temperature of about 150° C. to about 400° C.

In another embodiment of the process for catalytically hydrogenolysizing a polyolefinic polymer, said subjecting is carried out at a temperature of about 200° C. to about 400° C., about 250° C. to about 400° C., about 300° C. to about 400° C., about 350° C. to about 400° C., about 150° C. to about 350° C., about 150° C. to about 300° C., about 150° C. to about 250° C., or about 150° C. to about 200° C.

In another embodiment of the process for catalytically hydrogenolysizing a polyolefinic polymer, said subjecting is carried out at a temperature of about 250° C.

Methods of Preparing the Catalyst

The catalyst of the present application can be prepared by dispersing $SiO_2$ spheres in an alcoholic solvent and functionalizing them with a group such as an amine. The functionalized $SiO_2$ spheres are then dried before being resuspended in an alcoholic solvent and then treated with Pt nanoparticles suspended in an alcoholic solvent. The $Pt/SiO_2$ spheres were dried before being resuspended in an alcoholic solvent and then a shell of mesoporous silica ($mSiO_2$) was grown on top of the $Pt/SiO_2$ spheres, the shell having pores organized radially from the silica sphere and the pore length being equal to the thickness of the $mSiO_2$ shell. This three-layered spherical shell-type construction ($mSiO_2/Pt/SiO_2$) places the Pt nanoparticles at the terminal end of linear channels (i.e., at the bottom of wells).

A further aspect of the present application relates to a method of preparing a catalyst which comprises adding a functional group to a silica core having an outer surface to produce a functionalized silica core. The functionalized silica core is contacted with a plurality of catalytic metal nanoparticles wherein the catalytic metal nanoparticles adhere to the surface of the functionalized silica core to produce a functionalized silica core supported catalytic metal nanoparticles. The functionalized silica core supported catalytic metal nanoparticles is then contacted with a silicon compound to produce a mesoporous silica shell having an outer surface and an inner surface with the inner surface being inside the outer surface of said mesoporous silica shell proximate to and surrounding the outer surface of said functionalized silica core supported catalytic metal nanoparticles. The outer surface of the mesoporous silica shell has openings leading to pores within the mesoporous silica shell which extend toward the outer surface of said functionalized silica core supported catalytic metal nanoparticles.

In another embodiment of the method of preparing a catalyst, the functional group is selected from the group consisting of: amines, carboxylic acids, alcohols, thiols, phosphorus, and combinations thereof.

In carrying out the method of preparing a catalyst, the catalyst has the characteristics described above.

In another embodiment of the method of preparing a catalyst, the metal for the plurality of catalytic metal nanoparticles is selected from the group consisting of nickel, palladium, platinum, cobalt, rhodium, iridium, iron, ruthenium, osmium, manganese, rhenium, chromium, molybdenum, tungsten, and combinations thereof.

In another embodiment of the method of preparing a catalyst, the plurality of catalytic metal nanoparticles comprises about 0.0001 wt % to about 1.0 wt % of the catalyst.

In another embodiment of the method of preparing a catalyst, the plurality of catalytic metal nanoparticles comprises about 0.00025 wt % to about 1.0 wt % of the catalyst, about 0.0005 wt % to about 1.0 wt % of the catalyst, about 0.00075 wt % to about 1.0 wt % of the catalyst, about 0.001 wt % to about 1.0 wt % of the catalyst, about 0.0025 wt % to about 1.0 wt % of the catalyst, about 0.005 wt % to about 1.0 wt % of the catalyst, about 0.0075 wt % to about 1.0 wt % of the catalyst, about 0.01 wt % to about 1.0 wt % of the catalyst, about 0.025 wt % to about 1.0 wt % of the catalyst, about 0.05 wt % to about 1.0 wt % of the catalyst, about 0.075 wt % to about 1.0 wt % of the catalyst, about 0.1 wt % to about 1.0 wt % of the catalyst, about 0.2 wt % to about 1.0 wt % of the catalyst, about 0.3 wt % to about 1.0 wt % of the catalyst, about 0.4 wt % to about 1.0 wt % of the catalyst, about 0.5 wt % to about 1.0 wt % of the catalyst, about 0.6 wt % to about 1.0 wt % of the catalyst, about 0.7 wt % to about 1.0 wt % of the catalyst, about 0.8 wt % to about 1.0 wt % of the catalyst, or about 0.9 wt % to about 1.0 wt % of the catalyst.

In another embodiment of the method of preparing a catalyst, the plurality of catalytic metal nanoparticles comprises about 0.085 wt % of the catalyst.

In another embodiment of the method of preparing a catalyst, the plurality of catalytic metal nanoparticles comprises about 0.28 wt % of the catalyst.

In another embodiment of the method of preparing a catalyst, the plurality of catalytic metal nanoparticles comprises about 0.35 wt % of the catalyst.

In another embodiment of the method of preparing a catalyst, the plurality of catalytic metal nanoparticles comprises about 0.40 wt % of the catalyst.

In another embodiment of the method of preparing a catalyst, the plurality of catalytic metal nanoparticles has a mean particle diameter of about 1 nm to about 10 nm.

In another embodiment of the method of preparing a catalyst, the plurality of catalytic metal nanoparticles has a mean particle diameter of about 2 nm to about 10 nm, about 3 nm to about 10 nm, about 4 nm to about 10 nm, about 5 nm to about 10 nm, about 6 nm to about 10 nm, about 7 nm to about 10 nm, about 8 nm to about 10 nm, about 9 nm to about 10 nm, about 1 nm to about 9 nm, about 1 nm to about 8 nm, about 1 nm to about 7 nm, about 1 nm to about 6 nm, about 1 nm to about 5 nm, about 1 nm to about 4 nm, about 1 nm to about 3 nm, or about 1 nm to about 2 nm.

In another embodiment of the method of preparing a catalyst, the catalytic metal nanoparticle has a mean particle diameter of about 1.7 nm.

In another embodiment of the method of preparing a catalyst, the catalytic metal nanoparticle has a mean particle diameter of about 2.9 nm.

In another embodiment of the method of preparing a catalyst, the catalytic metal nanoparticle has a mean particle diameter of about 3.2 nm.

In another embodiment of the method of preparing a catalyst, the catalytic metal nanoparticle has a mean particle diameter of about 5.0 nm.

In another embodiment of the method of preparing a catalyst, the silicon compound is selected from the group consisting of: orthosilicates, metasilicates, pyrosilicates, and combinations thereof.

According to any embodiment of the present application, the catalytic metal nanoparticle comprises about 0.00025 wt % to about 1.0 wt % of the catalyst, about 0.0005 wt % to about 1.0 wt % of the catalyst, about 0.00075 wt % to about 1.0 wt % of the catalyst, about 0.001 wt % to about 1.0 wt % of the catalyst, about 0.0025 wt % to about 1.0 wt % of the catalyst, about 0.005 wt % to about 1.0 wt % of the catalyst, about 0.0075 wt % to about 1.0 wt % of the catalyst, about 0.01 wt % to about 1.0 wt % of the catalyst, about 0.025 wt % to about 1.0 wt % of the catalyst, about 0.05 wt % to about 1.0 wt % of the catalyst, about 0.075 wt % to about 1.0 wt % of the catalyst, about 0.1 wt % to about 1.0 wt % of the catalyst, about 0.2 wt % to about 1.0 wt % of the catalyst, about 0.3 wt % to about 1.0 wt % of the catalyst, about 0.4 wt % to about 1.0 wt % of the catalyst, about 0.5 wt % to about 1.0 wt % of the catalyst, about 0.6 wt % to about 1.0 wt % of the catalyst, about 0.7 wt % to about 1.0 wt % of the catalyst, about 0.8 wt % to about 1.0 wt % of the catalyst, or about 0.9 wt % to about 1.0 wt % of the catalyst.

According to any embodiment of the present application, the catalyst has a mean particle diameter of about 110 nm to about 1000 nm, about 120 nm to about 1000 nm, about 130 nm to about 1000 nm, about 140 nm to about 1000 nm, about 150 nm to about 1000 nm, about 160 nm to about 1000 nm, about 170 nm to about 1000 nm, about 180 nm to about 1000 nm, about 190 nm to about 1000 nm, about 200 nm to about 1000 nm, about 210 nm to about 1000 nm, about 220 nm to about 1000 nm, about 230 nm to about 1000 nm, about 240 nm to about 1000 nm, about 250 nm to about 1000 nm, about 260 nm to about 1000 nm, about 270 nm to about 1000 nm, about 280 nm to about 1000 nm, about 290 nm to about 1000 nm, about 300 nm to about 1000 nm, about 310 nm to about 1000 nm, about 320 nm to about 1000 nm, about 330 nm to about 1000 nm, about 340 nm to about 1000 nm, about 350 nm to about 1000 nm, about 360 nm to about 1000 nm, about 370 nm to about 1000 nm, about 380 nm to about 1000 nm, about 390 nm to about 1000 nm, about 400 nm to about 1000 nm, about 410 nm to about 1000 nm, about 420 nm to about 1000 nm, about 430 nm to about 1000 nm, about 440 nm to about 1000 nm, about 450 nm to about 1000 nm, about 460 nm to about 1000 nm, about 470 nm to about 1000 nm, about 480 nm to about 1000 nm, about 490 nm to about 1000 nm, about 500 nm to about 1000 nm, about 510 nm to about 1000 nm, about 520 nm to about 1000 nm, about 530 nm to about 1000 nm, about 540 nm to about 1000 nm, about 550 nm to about 1000 nm, about 560 nm to about 1000 nm, about 570 nm to about 1000 nm, about 580 nm to about 1000 nm, about 590 nm to about 1000 nm, about 600 nm to about 1000 nm, about 610 nm to about 1000 nm, about 620 nm to about 1000 nm, about 630 nm to about 1000 nm, about 640 nm to about 1000 nm, about 650 nm to about 1000 nm, about 660 nm to about 1000 nm, about 670 nm to about 1000 nm, about 680 nm to about 1000 nm, about 690 nm to about 1000 nm, about 700 nm to about 1000 nm, about 710 nm to about 1000 nm, about 720 nm to about 1000 nm, about 730 nm to about 1000 nm, about 740 nm to about 1000 nm, about 750 nm to about 1000 nm, about 760 nm to about 1000 nm, about 770 nm to about 1000 nm, about 780 nm to about 1000 nm, about 790 nm to about 1000 nm, about 800 nm to about 1000 nm, about 810 nm to about 1000 nm, about 820 nm to about 1000 nm, about 830 nm to about 1000 nm, about 840 nm to about 1000 nm, about 850 nm to about 1000 nm, about 860 nm to about 1000 nm, about 870 nm to about 1000 nm, about 880 nm to about 1000 nm, about 890 nm to about 1000 nm, about 900 nm to about 1000 nm, about 910 nm to about 1000 nm, about 920 nm to about 1000 nm, about 930 nm to about 1000 nm, about 940 nm to about 1000 nm, about 950 nm to about 1000 nm, about 960 nm to about 1000 nm, about 970 nm to about 1000 nm, about 980 nm to about 1000 nm, about 990 nm to about 1000 nm, about 100 nm to about 990 nm, about 100 nm to about 980 nm, about 100 nm to about 970 nm, about 100 nm to about 960 nm, about 100 nm to about 950 nm, about 100 nm to about 940 nm, about 100 nm to about 930 nm, about 100 nm to about 920 nm, about 100 nm to about 910 nm, about 100 nm to about 900 nm, about 100 nm to about 890 nm, about 100 nm to about 880 nm, about 100 nm to about 870 nm, about 100 nm to about 860 nm, about 100 nm to about 850 nm, about 100 nm to about 840 nm, about 100 nm to about 830 nm, about 100 nm to about 820 nm, about 100 nm to about 810 nm, about 100 nm to about 800 nm, about 100 nm to about 790 nm, about 100 nm to about 780 nm, about 100 nm to about 770 nm, about 100 nm to about 760 nm, about 100 nm to about 750 nm, about 100 nm to about 740 nm, about 100 nm to about 730 nm, about 100 nm to about 720 nm, about 100 nm to about 710 nm, about 100 nm to about 700 nm, about 100 nm to about 690 nm, about 100 nm to about 680 nm, about 100 nm to about 670 nm, about 100 nm to about 660 nm, about 100 nm to about 650 nm, about 100 nm to about 640 nm, about 100 nm to about 630 nm, about 100 nm to about 620 nm, about 100 nm to about 610 nm, about 100 nm to about 600 nm, about 100 nm to about 590 nm, about 100 nm to about 580 nm, about 100 nm to about 570 nm, about 100 nm to about 560 nm, about 100 nm to about 550 nm, about 100 nm to about 540 nm, about 100 nm to about 530 nm, about 100 nm to about 520 nm, about 100 nm to about 510 nm, about 100 nm to about 500 nm, about 100 nm to about 490 nm, about 100 nm to about 480 nm, about 100 nm to about 470 nm, about 100 nm to about 460 nm, about 100 nm to about 450 nm, about 100 nm to about 440 nm, about 100 nm to about 430 nm, about 100 nm to about 420 nm, about 100 nm to about 410 nm, about 100 nm to about 400 nm, about 100 nm to about 390 nm, about 100 nm to about 380 nm, about 100 nm to about 370 nm, about 100 nm to about 360 nm, about 100 nm to about 350 nm, about 100 nm to about 340 nm, about 100 nm to about 330 nm, about 100 nm to about 320 nm, about 100 nm to about 310 nm, about 100 nm to about 300 nm, about 100 nm to about 290 nm, about 100 nm to about 280 nm, about 100 nm to about 270 nm, about 100 nm to about 260 nm, about 100 nm to about 250 nm, about 100 nm to about 240 nm, about 100 nm to about 230 nm, about 100 nm to about 220 nm, about 100 nm to about 210 nm, about 100 nm to about 200 nm, about 100 nm to about 190 nm, about 100 nm to about 180 nm, about 100 nm to about 170 nm, about 100 nm to about 160 nm, about 100 nm to about 150 nm, about 100 nm to about 140 nm, about 100 nm to about 130 nm, about 100 nm to about 120 nm, or about 100 nm to about 110 nm.

According to any embodiment of the present application, the silica core has a mean particle diameter of about 55 nm to about 500 nm, about 60 nm to about 500 nm, about 65 nm to about 500 nm, about 70 nm to about 500 nm, about 75 nm to about 500 nm, about 80 nm to about 500 nm, about 85 nm to about 500 nm, about 90 nm to about 500 nm, about 95 nm to about 500 nm, about 100 nm to about 500 nm, about 110 nm to about 500 nm, about 120 nm to about 500 nm, about 130 nm to about 500 nm, about 140 nm to about 500 nm, about 150 nm to about 500 nm, about 160 nm to about 500 nm, about 170 nm to about 500 nm, about 180 nm to about 500 nm, about 190 nm to about 500 nm, about 200 nm to about 500 nm, about 210 nm to about 500 nm, about 220 nm to about 500 nm, about 230 nm to about 500 nm, about 240 nm to about 500 nm, about 250 nm to about 500 nm, about 260 nm to about 500 nm, about 270 nm to about 500 nm, about 280 nm to about 500 nm, about 290 nm to about 500 nm, about 300 nm to about 500 nm, about 310 nm to about 500 nm, about 320 nm to about 500 nm, about 330 nm to about 500 nm, about 340 nm to about 500 nm, about 350 nm to about 500 nm, about 360 nm to about 500 nm, about 370 nm to about 500 nm, about 380 nm to about 500 nm, about 390 nm to about 500 nm, about 400 nm to about 500 nm, about 410 nm to about 500 nm, about 420 nm to about 500 nm, about 430 nm to about 500 nm, about 440 nm to about 500 nm, about 450 nm to about 500 nm, about 460 nm to about 500 nm, about 470 nm to about 500 nm, about 480 nm to about 500 nm, about 490 nm to about 500 nm, about 50 nm to about 490 nm, about 50 nm to about 480 nm, about 50 nm to about 470 nm, about 50 nm to about 460 nm, about 50 nm to about 450 nm, about 50 nm to about 440 nm, about 50 nm to about 430 nm, about 50 nm to about 420 nm, about 50 nm to about 410 nm, about 50 nm to about 400 nm, about 50 nm to about 390 nm, about 50 nm to about 380 nm, about 50 nm to about 370 nm, about 50 nm to about 360 nm, about 50 nm to about 350 nm, about 50 nm to about 340 nm, about 50 nm to about 330 nm, about 50 nm to about 320 nm, about 50 nm to about 310 nm, about 50 nm to about 300 nm, about 50 nm to about 290 nm, about 50 nm to about 280 nm, about 50 nm to about 270 nm, about 50 nm to about 260 nm, about 50 nm to about 250 nm, about 50 nm to about 240 nm, about 50 nm to about 230 nm, about 50 nm to about 220 nm, about 50 nm to about 210 nm, about 50 nm to about 200 nm, about 50 nm to about 190 nm, about 50 nm to about 180 nm, about 50 nm to about 170 nm, about 50 nm to about 160 nm, about 50 nm to about 150 nm, about 50 nm to about 140 nm, about 50 nm to about 130 nm, about 50 nm to about 120 nm, about 50 nm to about 110 nm, about 50 nm to about 100 nm, about 50 nm to about 95 nm, about 50 nm to about 90 nm, about 50 nm to about 85 nm, about 50 nm to about 80 nm, about 50 nm to about 75 nm, about 50 nm to about 70 nm, about 50 nm to about 65 nm, about 50 nm to about 60 nm, or about 50 nm to about 55 nm.

According to any embodiment of the present application, the catalytic metal nanoparticle has a mean particle diameter of about 2 nm to about 10 nm, about 3 nm to about 10 nm, about 4 nm to about 10 nm, about 5 nm to about 10 nm, about 6 nm to about 10 nm, about 7 nm to about 10 nm, about 8 nm to about 10 nm, about 9 nm to about 10 nm, about 1 nm to about 9 nm, about 1 nm to about 8 nm, about 1 nm to about 7 nm, about 1 nm to about 6 nm, about 1 nm to about 5 nm, about 1 nm to about 4 nm, about 1 nm to about 3 nm, or about 1 nm to about 2 nm.

According to any embodiment of the present application, the mesoporous silica shell has a thickness of about 55 nm to about 500 nm, about 60 nm to about 500 nm, about 65 nm to about 500 nm, about 70 nm to about 500 nm, about 75 nm to about 500 nm, about 80 nm to about 500 nm, about 85 nm to about 500 nm, about 90 nm to about 500 nm, about 95 nm to about 500 nm, about 100 nm to about 500 nm, about 110 nm to about 500 nm, about 120 nm to about 500 nm, about 130 nm to about 500 nm, about 140 nm to about 500 nm, about 150 nm to about 500 nm, about 160 nm to about 500 nm, about 170 nm to about 500 nm, about 180 nm to about 500 nm, about 190 nm to about 500 nm, about 200 nm to about 500 nm, about 210 nm to about 500 nm, about 220 nm to about 500 nm, about 230 nm to about 500 nm, about 240 nm to about 500 nm, about 250 nm to about 500 nm, about 260 nm to about 500 nm, about 270 nm to about 500 nm, about 280 nm to about 500 nm, about 290 nm to about 500 nm, about 300 nm to about 500 nm, about 310 nm to about 500 nm, about 320 nm to about 500 nm, about 330 nm to about 500 nm, about 340 nm to about 500 nm, about 350 nm to about 500 nm, about 360 nm to about 500 nm, about 370 nm to about 500 nm, about 380 nm to about 500 nm, about 390 nm to about 500 nm, about 400 nm to about 500 nm, about 410 nm to about 500 nm, about 420 nm to about 500 nm, about 430 nm to about 500 nm, about 440 nm to about 500 nm, about 450 nm to about 500 nm, about 460 nm to about 500 nm, about 470 nm to about 500 nm, about 480 nm to about 500 nm, about 490 nm to about 500 nm, about 50 nm to about 490 nm, about 50 nm to about 480 nm, about 50 nm to about 470 nm, about 50 nm to about 460 nm, about 50 nm to about 450 nm, about 50 nm to about 440 nm, about 50 nm to about 430 nm, about 50 nm to about 420 nm, about 50 nm to about 410 nm, about 50 nm to about 400 nm, about 50 nm to about 390 nm, about 50 nm to about 380 nm, about 50 nm to about 370 nm, about 50 nm to about 360 nm, about 50 nm to about 350 nm, about 50 nm to about 340 nm, about 50 nm to about 330 nm, about 50 nm to about 320 nm, about 50 nm to about 310 nm, about 50 nm to about 300 nm, about 50 nm to about 290 nm, about 50 nm to about 280 nm, about 50 nm to about 270 nm, about 50 nm to about 260 nm, about 50 nm to about 250 nm, about 50 nm to about 240 nm, about 50 nm to about 230 nm, about 50 nm to about 220 nm, about 50 nm to about 210 nm, about 50 nm to about 200 nm, about 50 nm to about 190 nm, about 50 nm to about 180 nm, about 50 nm to about 170 nm, about 50 nm to about 160 nm, about 50 nm to about 150 nm, about 50 nm to about 140 nm, about 50 nm to about 130 nm, about 50 nm to about 120 nm, about 50 nm to about 110 nm, about 50 nm to about 100 nm, about 50 nm to about 95 nm, about 50 nm to about 90 nm, about 50 nm to about 85 nm, about 50 nm to about 80 nm, about 50 nm to about 75 nm, about 50 nm to about 70 nm, about 50 nm to about 65 nm, about 50 nm to about 60 nm, or about 50 nm to about 55 nm.

According to any embodiment of the present application, the mesoporous silica shell has a pore diameter of about 2 nm to about 10 nm, about 3 nm to about 10 nm, about 4 nm to about 10 nm, about 5 nm to about 10 nm, about 6 nm to about 10 nm, about 7 nm to about 10 nm, about 8 nm to about 10 nm, about 9 nm to about 10 nm, about 1 nm to about 9 nm, about 1 nm to about 8 nm, about 1 nm to about 7 nm, about 1 nm to about 6 nm, about 1 nm to about 5 nm, about 1 nm to about 4 nm, about 1 nm to about 3 nm, or about 1 nm to about 2 nm.

The above disclosure is general. A more specific description is provided below in the following examples. The examples are described solely for the purpose of illustration and are not intended to limit the scope of the present application. Changes in form and substitution of equivalents are contemplated as circumstances suggest or render expedient. Although specific terms have been employed herein, such terms are intended in a descriptive sense and not for purposes of limitation.

EXAMPLES

General Methods and Techniques
Solid State NMR $^{13}$C cross-polarization (CP) and directly-excited (Bloch decay) magic-angle-spinning (MAS) NMR spectra were acquired using a 600 MHz Varian NMR system equipped with a 3.2-mm double-resonance probe. The samples were tightly-packed into 3.2-mm pencil-type rotors and spun to 16 kHz. The Bloch decay spectra were acquired using a 5 s $^{13}$C excitation pulse and a 10 s recycle delay while the CPMAS experiments used a 3.2 s $^{1}$H excitation pulse, a 1 ms contact time, and a 5 s recycle delay. High powered (80 kHz) SPINAL-64 decoupling was applied in all experiments and the resolution was found to be limited by the $^{13}$C-$^{13}$C homonuclear dipolar coupling interactions, with faster spinning yielding an improved resolution. The number of scans totaled 128(92) for the mSiO$_2$, 47126(47126) for the silica gel, 128(288) for the 200 nm Stöber silica, and 4096(1306) for the 50 nm Stöber silica, with the first number being that for the CPMAS experiment and second being associated with the Bloch decay. 8320 scans were accumulated for the Bloch decay spectrum of the non-enriched 7 kg/mol PE on the mSiO$_2$. 8192 scans were accumulated in the case of the mSiO$_2$ that was dried at 300° C. under vacuum. Chemical shifts were referenced to DSS (4,4-dimethyl-4-silapentane-1-sulfonic acid) using the universal shielding scale.

The two-dimensional $^{13}$C exchanged spectroscopy (EXSY) spectra were acquired using a 400 MHz Agilent DD2 solid-state NMR spectrometer equipped with a 3.2-mm MAS probe. Samples were spun to a MAS rate of 15 kHz. 2.5 s $^{13}$C π/2 pulses were used. A presaturation loop consisting of 50 pairs of alternating 0° and 900 phased pulses was applied prior to a recovery period, which was set to 3 s. $^{1}$H SPINAL-64 decoupling (100 kHz) was applied during the ti evolution period and the acquisition. Mixing times varied between 0 and 4 s. Experiments were conducted at 72, 93, and 114° C. The exact temperatures were determined via ex situ measurement of the change in the chemical shift of Pb(NO$_3$)$_2$ with respect to the static spectrum collected at 25° C. The observed temperatures take into account sample heating due to MAS. The number of scans and ti increments varied between 64 to 192 and 64 to 88, respectively. Greater numbers of scans and ti increments were used for the higher temperature experiments.

Electron Microscopy

Transmission electron microscopy (TEM) images were obtained on a Tecnai G2 F20 electron microscope operated at 200 kV. High-angle annular dark-field scanning transmission electron microscopy (HAADF-STEM) image was acquired using a FEI Titan Themis 300 probe-corrected scanning transmission electron microscope under 200 kV accelerating voltage.

Dynamic Light Scattering

Dynamic light scattering for particle size determination was recorded using a Malvern Zetasizer Nano ZS100 with MPT-2 autotitrator with ethanol as the solvent.

X-ray Diffraction

Powder X-ray diffraction (PXRD) patterns were measured by a Bruker D8 Advance Twin diffractometer with Cu $K_\alpha$ radiation (40 kV, 40 mA, $\lambda$=0.1541 nm).

Nitrogen Adsorption $N_2$ physisorption experiments, Brunauer-Emmett-Teller (BET) surface area analysis, and Barrett-Joyner-Halenda (BJH) mesopore size analysis were conducted using a Micromeritics 3Flex surface characterization analyzer at 77 K.

Elemental Analysis

The Pt NP loadings for the catalysts were determined by inductively coupled plasma mass spectrometry (ICP-MS; Thermo Scientific X Series II). The samples are first treated with hydrofluoric acid (50 µL, 48-51%, Acros Organics) to etch away silica and then digested with aqua regia (4 mL). The final solution is diluted with 2 v/v % nitric acid to target concentrations.

Gel Permeation Chromatography

High temperature gel permeation chromatography (fiT-GPC) was performed on an Agilent PL-GPC 220 equipped with a refractive index (RI) detector and three PL-Gel Mixed B columns. GPC columns were eluted at 1.0 mL/min with 1,2,4-trichlorobenzene (TCB) containing 0.01 wt. % di-tert-butylhydroxytoluene (BHT) at 150° C. The samples were prepared in TCB (with BHT) at a concentration of 1.0 mg/mL unless otherwise stated and heated at 150° C. for at least 1 h prior to injection. 1-1T-GPC data calibration was done with mononodal polyethylene standards from Varian and Polymer Standards Service.

Gas Chromatography Flame Ionization Detection (GC-FID). Gas chromatography (GC) analyses were performed on an Agilent 6890 gas chromatograph equipped with a split/splitless injector and a flame ionization detector (FID). The column was a 30 m×0.32 mm HP-5 (Agilent) with a film thickness of 0.25 µm. These experiments were performed to establish the reproducibility of the GC methods on separate instruments and to compare with GC data detected using MS. Separations were performed under temperature-programmed conditions from 60 to 325° C. at 4.0° C./min with initial and final hold times of 2 and 10 minutes, respectively. Helium carrier gas was employed with a constant flow of 4.5 mL/min. Injector and detector temperatures were maintained at 320 and 345° C., respectively. In initial studies, oil samples extracted with dichloromethane after 24 h of hydrogenolysis were taken up in dichloromethane and 1 µL of solution was injected (splitless mode). The solvent vent time was 2 minutes. In subsequent analyses, the residue was taken up in a mixture consisting of 2 parts dichloromethane and 1 part toluene, and 4 µL was injected (split mode) with a split ratio of 10:1. Blank injections (dichloromethane only) were included between each experiment to ensure residual hydrocarbons are were not present on the column. Retention times of known species, including pure $C_{28}H_{58}$ (octacosane, Sigma-Aldrich, 0504) and an American Society for Testing and Material's 20 component (Restek ASTM D2287-12 STANDARD) test mixture of saturated alkanes dissolved in dichloromethane, were used to identify the species in catalytic reaction mixtures.

Example 1—Synthesis of Polymer and Inorganic Catalytic Materials $mSiO_2$

Decyltrimethylammonium bromide (C10TAB, 0.74 mmol) was dissolved in ultrapure water (480 mL). 2 M NaOH (3.5 mL) was added, and the solution was stirred at 80° C. for 1 h. Tetraethyl orthosilicate (TEOS, 5.0 mL) was added in dropwise fashion over 5 min. The mixture was stirred at 80° C. for 2 h to provide a white suspension. The solution was filtered using a filter frit, and the solid was washed with water (1×200 mL) and then methanol (3×200 mL). The solid was allowed to dry on the filter at room temperature, and then the solid was dried under vacuum. The dried sample (1.0 g) was suspended in acidic methanol (100 mL) with 12 N HCl (0.8 mL), and the suspension was then heated at reflux (80° C.) for 6 h. The solid was isolated by filtration, washed with water (3×200 mL) and methanol (3×200 mL), and then dried under vacuum. The data characterizing the $mSiO_2$ material is given below.

50 nm Stöber Silica

Ethanol (200 proof, 190 mL) was mixed with water (10 mL) and $NH_3 \cdot H_2O$ (~28 wt %, 5 mL). This solution was equilibrated at 40° C. for 1 h. TEOS (2.75 mL) was then added to the solution at 40° C., and the reaction mixture was maintained at 40° C. for 2 h. The silica spheres were separated by centrifugation and washed with ethanol (3×100 mL). The data characterizing the 50 nm particles of Stöber silica is given below.

127 nm Stöber Silica 127 nm $SiO_2$ spheres were prepared using the Stöber method. The above solution of 45 nm seed particles (1 mL) was mixed with deionized water (2.6 mL), ethanol (18 mL), and $NH_3$—$H_2O$ (~28 wt %, 1.7 mL). The mixture was stirred at 500 rpm for 1 h at room temperature. Three portions of TEOS (1.5 mL total volume) were added in a dropwise fashion to the solution, with 30 min intervals between the addition of each portion. The reaction was stirred at room temperature for 6 h. The $SiO_2$ spheres were then washed with an ethanol/water solution (50/50 v/v; 5×20 mL) and then dried under vacuum at room temperature. The data characterizing the 127 nm particles of Stöber silica is given below.

200 nm Stöber Silica 200 nm $SiO_2$ spheres were synthesized by a four-step seeded growth approach. First, 24 nm $SiO_2$ seeds were prepared. For this, L-arginine (18.2 mg) and ultrapure water (13.9 mL) were thoroughly mixed. Then, cyclohexane (0.9 mL) was added gently to the water-arginine mixture to layer the cyclohexane on top of the aqueous solution. The solution was heated to 60.0±0.2° C. for 30 min with stirring at 300 rpm. TEOS (1.10 mL) was added to the mixture. The reaction was allowed to proceed for 20 h at 60° C. After this time, the aqueous layer (bottom) was separated from the organic layer and stored in a refrigerator.

These 24 nm $SiO_2$ seed particles were then used for the synthesis of 45 nm $SiO_2$ seed particles. The 24 nm seed suspension (4 mL) was diluted with ultrapure water (14.4 mL). Cyclohexane (2 mL) was then added to this solution. The mixture was heated at 60° C. for 30 min with stirring at 300 rpm. TEOS (1.408 mL) was then immediately added to the top layer, and the mixture was allowed to stand at 60° C. for 30 h. After this time, the bottom layer was separated and stored in a refrigerator.

82 nm $SiO_2$ seed particles were then grown using the Stöber method, initiated from the 45 nm seed particles (1 mL). The above solution was diluted with deionized water (2.6 mL) and ethanol (18 mL). Subsequently, $NH_3 \cdot H_2O$ (~28 wt %, 1.7 mL) was added to the solution. The solution was stirred at 500 rpm for 1 h at room temperature. Three portions of TEOS (0.8 mL total) were added in a dropwise fashion to the solution, with 30 min intervals between the addition of each portion. The solution was then stirred for 6 h and stored in the refrigerator.

Finally, 200 nm $SiO_2$ spheres were prepared as follows: the solution of 82 nm seed particles (1 mL) was diluted with deionized water (2.6 mL) and ethanol (18 mL). $NH_3 \cdot H_2O$ (~28 wt %, 1.7 mL) was then added to the solution, which was mixed at 500 rpm for 1 h. Two portions of TEOS (0.44 mL total) were added dropwise to the solution, with 30 min intervals between the addition of each portion. The reaction mixture was stirred for 6 h. After 6 h, 200 nm $SiO_2$ spheres were obtained and stored in the refrigerator for further use. The $SiO_2$ spheres were then washed with an ethanol/water solution (50/50 v/v; 5×20 mL) and then dried under vacuum at room temperature. The data characterizing the 200 nm particles of Stöber silica is given below.

Pt Nanoparticles $K_2PtCl_4$ (41.5 mg), tetradecyltrimethylammonium bromide (C14TAB, 505 mg), and polyvinylpyrrolidone (PVP-K30, $M_w$=40,000, 222 mg) were added to ethylene glycol (20 mL). The atmosphere of the vessel was inertized with Ar, and the solution was heated at 140° C. for 2 h. Acetone (180 mL) was added to precipitate "as prepared" Pt NPs. The precipitate was further washed with an ethanol/hexane mixture (¼ v/v; 5×20 mL), and ethanol (20 mL) was added to the material for storage.

$Pt/SiO_2$

In a typical synthesis, $SiO_2$ (1 g) spheres were dispersed in isopropanol (175 mL). A solution of 3-aminopropyl triethoxysilane (APTS, 200 μL) in isopropanol (25 mL) was added to this dispersion to functionalize the silica spheres with $NH_2$ groups. The reaction mixture was allowed to age at 80° C., and then the $SiO_2$ spheres were washed with ethanol (3×20 mL) by centrifugation at 8000 rpm. The $NH_2$-functionalized $SiO_2$ spheres were then dried under vacuum at room temperature and annealed at 100° C. in air for 5 h.

$NH_2$-functionalized $SiO_2$ spheres (400 mg) were dispersed in ethanol (120 mL). 3.2±0.5 nm Pt nanoparticles suspended in ethanol (220 mL) were added in a dropwise fashion to a vigorously stirred dispersion of $NH_2$-functionalized $SiO_2$ spheres. The resulting mixture of $SiO_2$-supported Pt nanoparticles ($Pt/SiO_2$) was sonicated for 30 min. The $Pt/SiO_2$ spheres were separated from the solution by centrifugation at 8000 rpm and washed with ethanol (5×30 mL).

$mSiO_2/Pt/SiO_2$ with 1.7 nm Pores $Pt/SiO_2$ spheres (25 mg) were dispersed in ethanol (10 mL) by sonication for 0.5 h at room temperature. A premixed solution of dodecyltrimethylammonium bromide ($C_{12}$TAB, 132 mg) in $H_2O$ (50 mL) and ethanol (16.3 mL) was added to the above $Pt/SiO_2$ dispersion, and the mixture was sonicated for another 0.5 h. $NH_3 \cdot H_2O$ (~28 wt %, 550 μL) was then added to the solution. After 0.5 h of gentle stirring, a solution of TEOS (600 μL) in ethanol (5 mL) was added to the above solution in a dropwise manner in 4 portions (150 μL each) every 0.5 h. The solution was stirred for 6 h at room temperature. The $mSiO_2/Pt/SiO_2$ particles were separated by centrifugation, washed with ethanol (3×20 mL), and finally dispersed into a mixture of methanol (15 mL) and concentrated hydrochloric acid (1 mL). This mixture was heated at reflux (80° C.) for 24 h to remove the $C_{12}$TAB surfactant. After refluxing, $mSiO_2/Pt/SiO_2$ catalysts were washed thoroughly with ethanol (6×15 mL) by centrifugation at 8000 rpm.

$mSiO_2/Pt/SiO_2$ with 2.4 nm Pores $Pt/SiO_2$ spheres (25 mg) were dispersed in ethanol (10 mL) by sonication for 30 min at room temperature. A premixed solution of hexadecyltrimethylammonium bromide ($C_{16}$TAB, 165 mg) in $H_2O$ (50 mL) and ethanol (16.3 mL) was added to the above $Pt/SiO_2$ dispersion, and the mixture was sonicated for another 30 min. Then 550 μL of concentrated $NH_3$—$H_2O$ (~28 wt %) was added to the solution. After 30 min of gentle stirring, a solution of TEOS (720 μL) in ethanol (5 mL) was added to the above solution in a dropwise manner (4×180 μL) every 30 min. The solution was stirred for 6 h at room temperature. The $mSiO_2/Pt/SiO_2$ particles were separated on a centrifuge, washed with ethanol (3×20 mL), and finally dispersed into a mixture of methanol (15 mL) and concentrated hydrochloric acid (1 mL). This mixture was heated at reflux (80° C.) for 24 h to remove the $C_{16}$TAB surfactant. After refluxing, $mSiO_2/Pt/SiO_2$ catalysts were washed thoroughly with ethanol (6×15 mL) by centrifugation at 8000 rpm.

$mSiO_2/Pt/SiO_2$ with 3.5 nm Pores

This catalyst was prepared in the same way as the 2.4 nm-pore $mSiO_2/Pt/SiO_2$ catalyst given in the main text, except n-hexane (20 mL) was added to the mixture priory to the TEOS addition, and the shell growth time was increased from 6 h to 12 h.

Pt/MCM-41

200 mg MCM-41 was dispersed in Milli-Q water (10 mL) by sonicating for 0.5 h, then $H_2PtCl_6$ (4.1 mg) was added to the solution. The reaction mixture was heated at 60° C. in an oil bath and stirred at 300 rpm for 12 h until the water completely evaporated. The resulting powder was reduced at 220° C. for 2 h under 10% $H_2$/Ar (⁵⁄45 mL/min) in a tube furnace.

Pt/SBA-15

$K_2PtCl_4$ (4.1 mg) was dissolved into Milli-Q water (420 μL). Half of the solution (210 L) was added dropwise onto the SBA-15 powder (200 mg) with stirring. The mixture was allowed to stand for 12 h and then was dried under reduced pressure. After drying, this procedure was repeated with the other portion of the $K_2PtCl_4$ solution (210 μL). The dried powder was reduced at 220° C. for 2 h under 10% $H_2$/Ar (⁵⁄45 mL/min) in a tube furnace.

NiMo/γ-$Al_2O_3$ $Ni(NO_3)_2$ (139.4 mg) and $(NH_4)_6Mo_7O_{24} \cdot 4H_2O$ (59.8 mg) were dissolved in Milli-Q water (380 μL). Half of the solution (190 μL) was added dropwise onto the γ-$Al_2O_3$ powder (200 mg, Alfa Aesar) with stirring. The mixture was allowed to stand for 12 h and then was dried under reduced pressure. After drying, this procedure was repeated with the second portion of solution (190 μL). The dried powder was calcined at 973 K for 6 h in a muffle furnace.

Catalyst Data

Figures 7A, 7B, 7C:
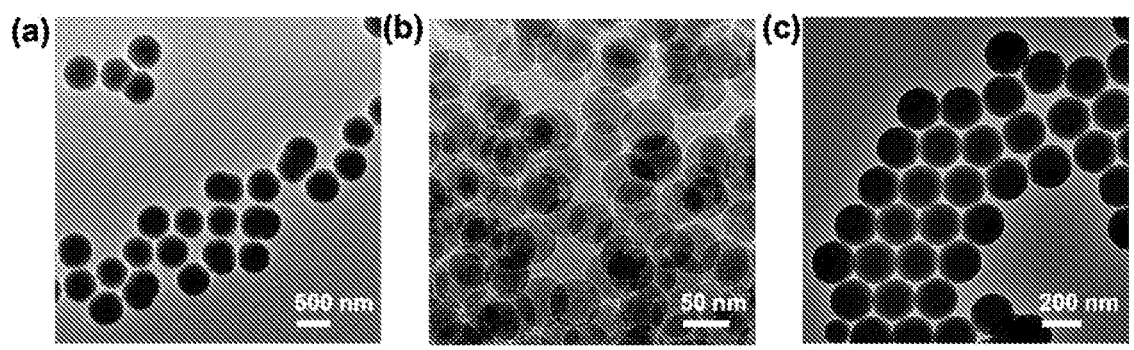
FIGS. 7A-7C show the TEM images of the mSiO$_2$ (FIG. 7A) and Stöber silicas of 50 (FIG. 7B) and 200 (FIG. 7C) nm in diameter.
Figures 8A, 8B:
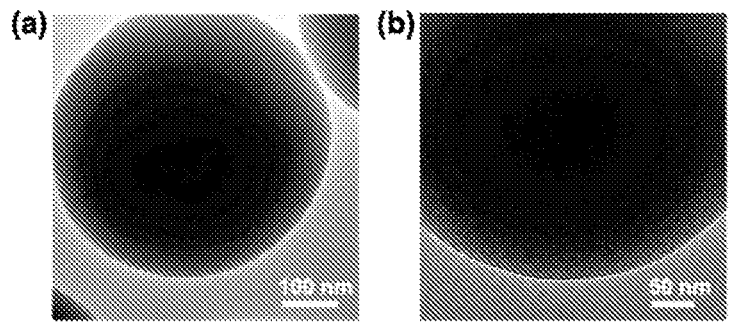
FIGS. 8A-8B show the enlarged view of the TEM images of the mSiO$_2$.

FIGS. 7A-7C show the TEM images of the three samples, $mSiO_2$ (FIG. 7A), 50 nm Stöber silica (FIG. 7B), and 200 nm Stöber silica (FIG. 7C) prior to polyethylene adsorption. All samples show uniform spherical shapes and are relatively monodisperse. The respective diameters for the $mSiO_2$ and the 50 and 200 nm Stöber silica particles were measured to be 488+24 (5.0%), 50.1±5.7 (11.3%), and 221.1±5.7 (2.6%) nm. An enlarged view of the $mSiO_2$ is shown in FIGS. 8A-8B.

Figures 9A, 9B, 9C:
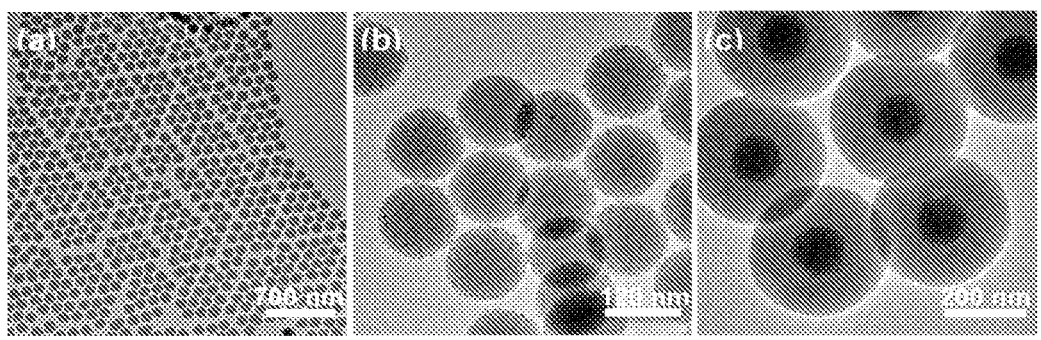
FIGS. 9A-9C show the TEM images of 127 nm Stöber silica spheres (FIG. 9A), the Pt/SiO$_2$ particles (FIG. 9B), and the mSiO$_2$/Pt/SiO$_2$ catalyst with 2.4 nm pore diameter in the mesoporous shell (FIG. 9C).

FIGS. 9A-9C show the TEM images of the 127 nm Stöber $SiO_2$ spheres and the corresponding $Pt/SiO_2$ and $mSiO_2/Pt/SiO_2$. All samples are relatively monodispersed and uniform.

Figures 10A, 10B:
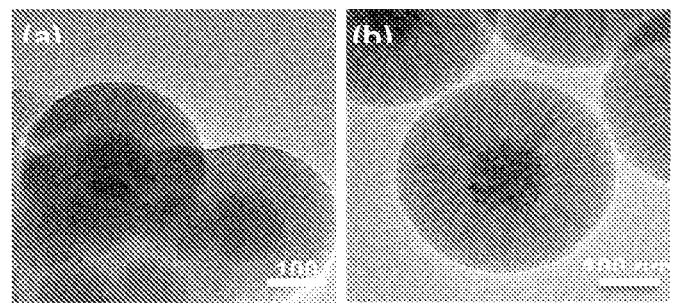
FIGS. 10A-10B show the TEM images of the mSiO$_2$/Pt/SiO$_2$ catalyst with 1.7 (FIG. 10A) and 3.5 nm (FIG. 10B) pore diameter in the mesoporous shell.
Figures 11A, 11B, 11C:
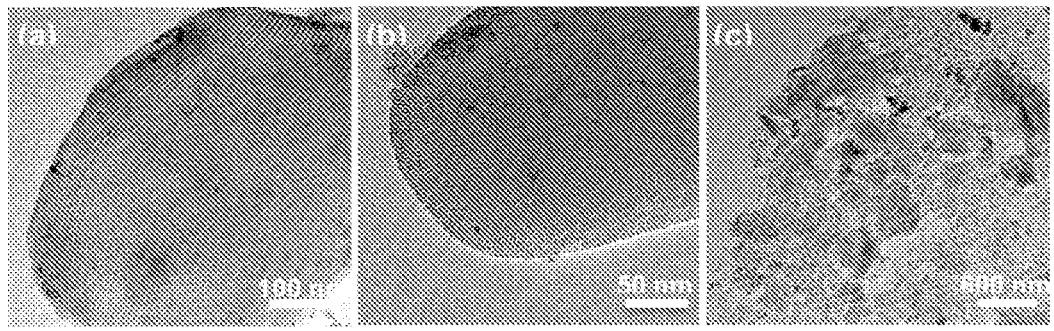
FIGS. 11A-11C show the TEM images of Pt/SBA-15 (FIG. 11A), Pt/MCM-41 (FIG. 11B), and NiMo/γ-Al$_2$O$_3$ (FIG. 11C). The diameters of Pt nanoparticles are 6.5±1.2 and 2.8±1.1 nm for Pt/SBA-15 and Pt/MCM-41, respectively.

The diameter of the 127 nm Stöber silica particles is 127±7 (5.5%) nm and the thickness of the mesoporous shell for core-shell material structure is 110±8 (7.2%) nm. The average pore diameter for the mesoporous shell is 2.4 nm. FIGS. 10A-10B show TEM images of the $mSiO_2/Pt/SiO_2$ with average 1.7 and 3.5 nm-diameter pores in the mesoporous shell. The mesoporous shells are 97±8 and 115±5 nm thick for the 1.7 and 3.5 nm-diameter pore $mSiO_2/Pt/SiO_2$, respectively. FIGS. 11A-11C show the TEM images of Pt/SBA-15, Pt/MCM-41, and NiMo/$\gamma$-$Al_2O_3$.

The DLS sizes of the $mSiO_2$, the 50 Stöber silica, and 200 nm Stöber silica were 190, 96, and 241 nm, respectively. These sizes are in agreement with those determined by TEM with the minor difference being attributed to the ethanol solvation environment. The DLS size of $C_{10}$TAB-produced $mSiO_2$ is nevertheless significantly smaller than their geometric sizes determined by TEM, likely due to their mesoporous surface.

Figure 12:
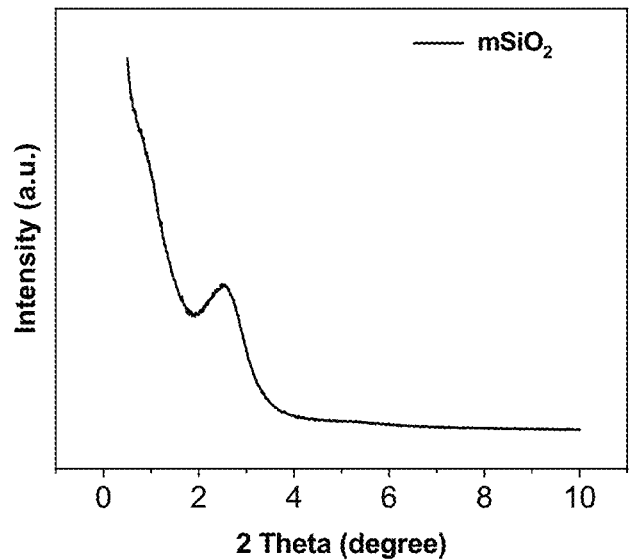
FIG. 12 shows the typical low angle diffraction peak of MCM-type mSiO$_2$.
Figure 13:
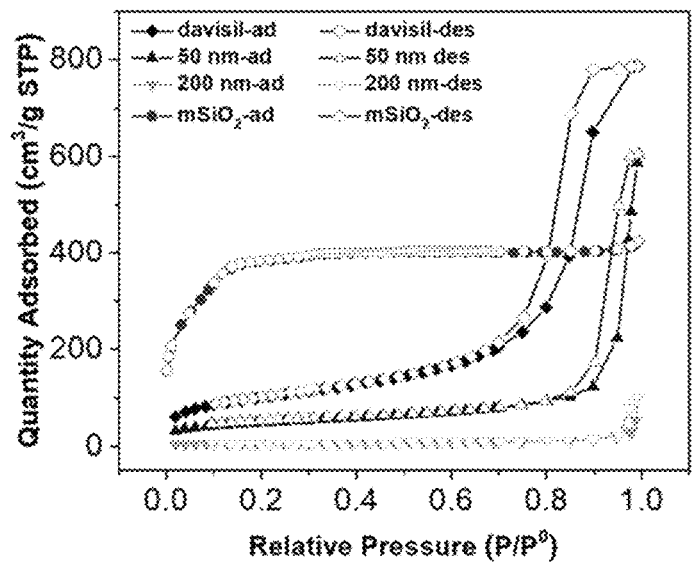
FIG. 13 shows the N$_2$ sorption isotherms of the mSiO$_2$, Davisil silica gel, and the 50 and 200 nm Stöber silica spheres.
Figure 14:
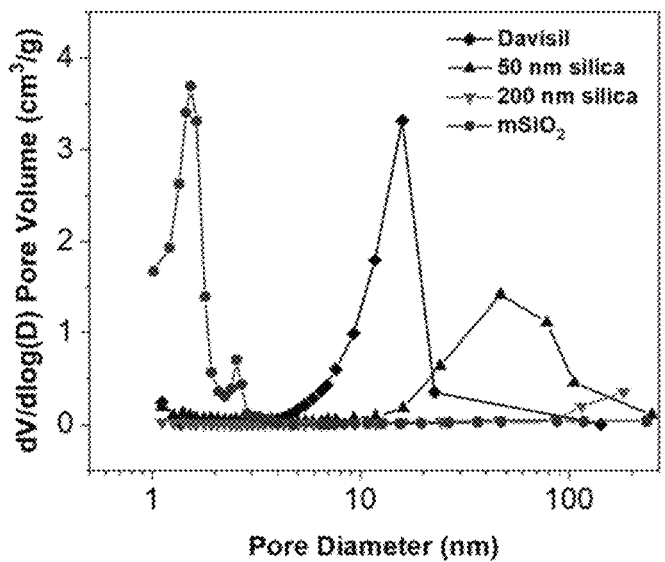
FIG. 14 shows the pore size distributions of the mSiO$_2$, Davisil silica, and 50 and 200 nm Stöber silica spheres, with adsorption branch.
Figure 15:
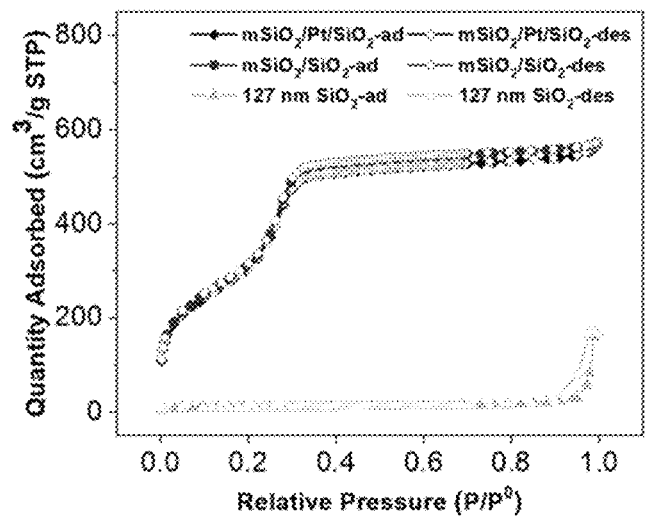
FIG. 15 shows the N$_2$ sorption isotherms of the mSiO$_2$/Pt/SiO$_2$, mSiO$_2$/SiO$_2$, and the 127 nm Stöber silica spheres.
Figure 16:
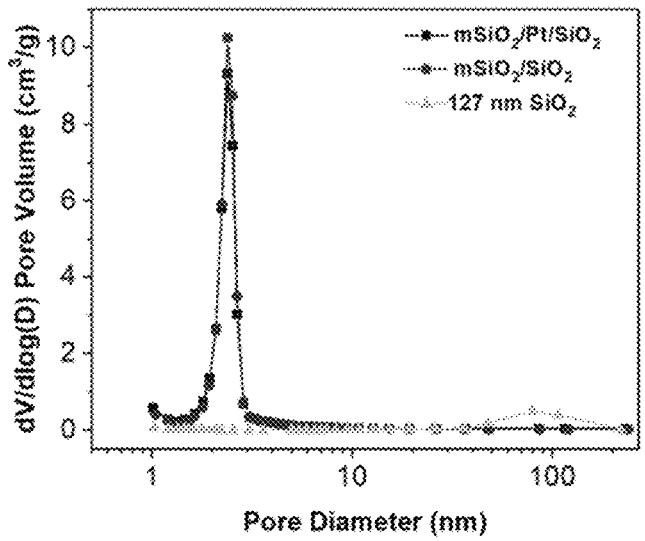
FIG. 16 shows the pore size distributions of the mSiO$_2$/Pt/SiO$_2$, mSiO$_2$/SiO$_2$, and the 127 nm Stöber silica spheres, with adsorption branch.
Figure 17:
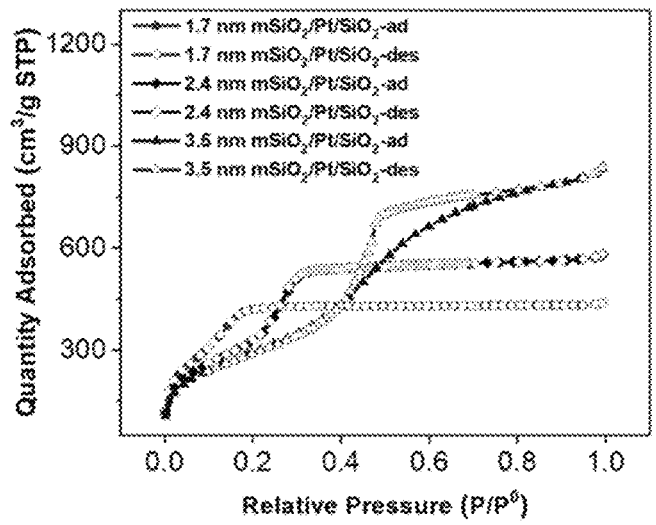
FIG. 17 shows the N$_2$ sorption isotherms of the mSiO$_2$/Pt/SiO$_2$ catalysts with pore diameters of 1.7, 2.4, and 3.5 nm.
Figure 18:
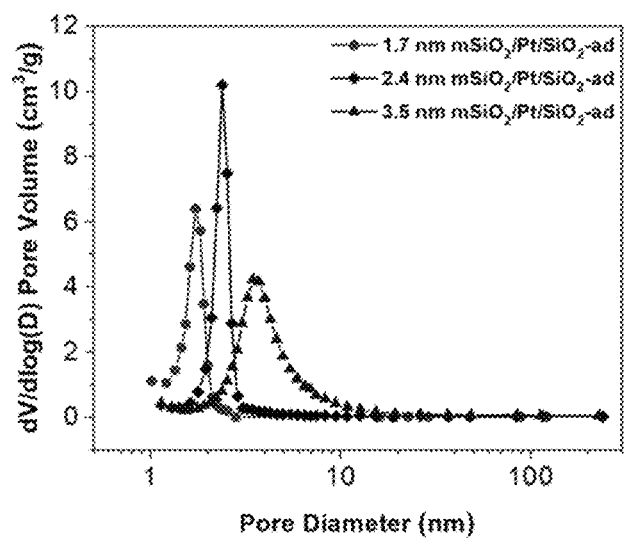
FIG. 18 shows the pore size distribution of the mSiO$_2$/Pt/SiO$_2$ catalysts with pore diameters of 1.7, 2.4, and 3.5 nm, with adsorption branch.
Figure 19:
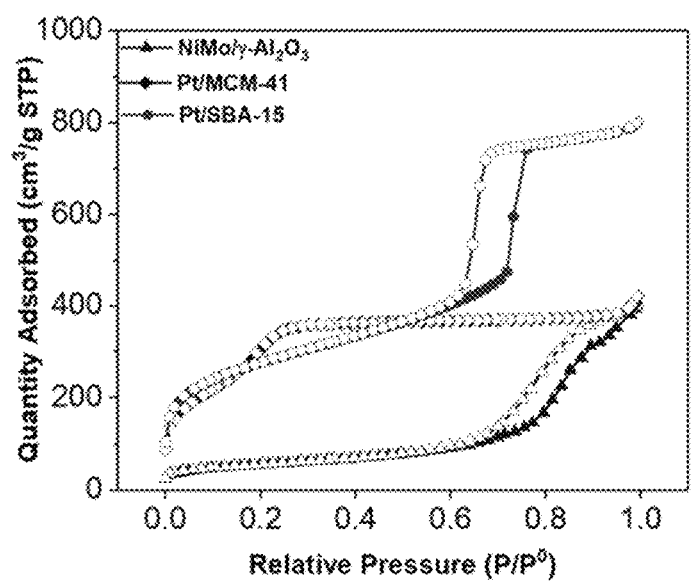
FIG. 19 shows the N$_2$ sorption isotherms of the Pt/SBA-15, Pt/MCM-41, and NiMo/γ-Al$_2$O$_3$.
Figure 20:
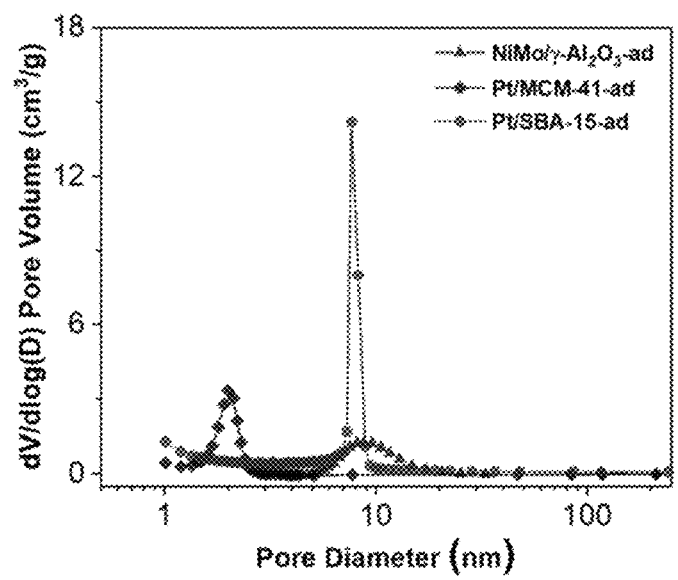
FIG. 20 shows the pore size distribution of the Pt/SBA-15, Pt/MCM-41, and NiMo/γ-Al$_2$O$_3$, with adsorption branch.

FIG. 12 shows the typical low angle diffraction peak of MCM-type $mSiO_2$.

Nitrogen physisorption results are listed in Tables 1 and 2 below, and the isotherms are shown in FIGS. 13, 15, 17, and 19 with the pore size distributions shown in FIGS. 14, 16, 18, and 20. The $mSiO_2$ (used in $^{13}C$ SSNMR experiments) have a large surface area and a high mesoporosity with a uniform pore size of 1.5 nm. The Stöber silicas have a low surface area with almost no pores (the broad peak at 50 nm is likely due to the interparticle assembly), in agreement with their solid morphology. The Davisil silica gel has a moderate surface area that is in between those measured for the Stöber silicas and the $mSiO_2$. The $mSiO_2/Pt/SiO_2$ (1.7, 2.4, and 3.5 nm pore) catalysts have large surface area as well. For $mSiO_2/Pt/SiO_2$ with 2.4 nm pores, loading the Pt onto the core-shell structure only slightly changes the surface area in comparison to $mSiO_2/SiO_2$ (2.4 nm pore). Pt/SBA-15, Pt/MCM-41, and NiMo/$\gamma$-$Al_2O_3$ have BET surface areas of 980, 1030, and 190 $m^2/g$, respectively. The averaged pore diameters for Pt/SBA-15, Pt/MCM-41, and NiMo/$\gamma$-$Al_2O_3$ are 7.7, 2.0, and 8.2 nm, respectively.

TABLE 1

$N_2$ physisorption data silica materials used in PE adsorption $^{13}C$ NMR studies.

| sample | BET surface area ($m^2/g$) | pore volume ($cm^3/g$) | BJH pore size (nm) | TEM sizes (nm) | DLS sizes (nm) |
|---|---|---|---|---|---|
| $mSiO_2$ | 1420 | 0.83 | 1.5 | 448 (24) | 190 |
| silica gel-Davisil | 480 | 0.75 | 12.0 | 2500-5000[a] | ND |
| 50 nm Stöber $SiO_2$ | 55 | NA | NA | 50.1(5.7) | 96 |
| 200 nm Stöber $SiO_2$ | 14 | NA | NA | 221.1(5.7) | 241 |

[a]Size as reported by vendor (Aldrich).

TABLE 2

$N_2$ Physisorption data for hydrogenolysis catalysts.

| sample | BET surface area($m^2/g$) | pore volume ($cm^3/g$) | BJH pore size (nm) | TEM sizes (nm) |
|---|---|---|---|---|
| 127 nm $SiO_2$ | 30 | 0.03 | NA | 127(7) |
| $mSiO_2/SiO_2$ (2.4 nm pore) | 1110 | 0.86 | 2.4 | 337(10) |
| $mSiO_2/Pt/SiO_2$ (2.4 nm pore) | 1070 | 0.84 | 2.4 | 342(11) |
| $mSiO_2/Pt/SiO_2$ (1.7 nm pore) | 1300 | 0.66 | 1.7 | 313(12) |
| $mSiO_2/Pt/SiO_2$ (3.5 nm pore) | 1060 | 1.22 | 3.5 | 350(10) |

$^{13}$C-Enriched Polyethylene $C_2H_4$ (99% enriched 1,2-$^{13}C_2$) was obtained from Cambridge Isotope Lab in a 250 mL glass vessel and used without purification. Methylaluminoxane (MAO) was obtained from Sigma-Aldrich as a 10 wt % solution in toluene; the volatile materials were evaporated, and the white solid MAO residue was washed with pentane (5×10 mL) to give a shiny white solid after exhaustive drying. The $\{\kappa^2$—$N(C_6F_5)$=$CHC_6H_2tBu_2O\}_2TiCl_2$ polymerization catalyst was synthesized following the literature procedure.

$^{13}$C-labeled polyethylene was prepared by the following procedure: A Schlenk round bottom flask was charged with a toluene solution (50 mL) of MAO (0.044 g, 0.74 mmol). 1,2-$^{13}C_2H_4$ (250 mL at 1 atm) was condensed into the reaction vessel cooled in a liquid nitrogen bath. The vessel was sealed and allowed to warm to room temperature, and then the mixture was cooled to 0° C. The Ti-phenoxyimine catalyst (0.002 g, 0.002 mmol), dissolved in a minimal amount of toluene, was added to the reaction mixture through a septum. The resulting solution was stirred at 0° C. for 10 min and then allowed to warm to room temperature. Stirring was continued for 30 min at room temperature. The solution was then poured into a 5% HCl in MeOH solution to precipitate the polymer. The precipitate was isolated by filtration and dried under reduced pressure to yield $^{13}$C-labeled polyethylene as a white solid (0.43 g). The polymer was characterized by HT-GPC ($M_n$=132,000 kg/mol; $M_w$=429,800; Đ=3.2).

Example 2—General Description of Hydrogenolysis Examples

PE hydrogenolysis experiments were performed in Parr autoclaves with an overhead mechanical stirrer adapted with an impeller for mixing viscous suspensions. HDPE (3 g, $M_n$=5,900) and catalyst (0.0013 Pt wt % with respect to PE) were loaded into a glass-lined autoclave, which was sealed and refilled using alternating vacuum and argon cycles (3×). The reactor was then pressurized with $H_2$ (120 psi), mixed, and heated at 250° C. The pressure at 250° C. is 200 psi. After a designated time, the reactor was allowed to cool, and the pressure was released. The gaseous portion was analyzed by GC-MS. The mass of the products was measured to determine conversion to gaseous products, and the solid residue was extracted with methylene chloride (3×20 mL) at 100° C. with mixing. Methylene chloride extracts were combined and concentrated to provide a waxy oil product, which was analyzed by GC-MS and GC-FID, and the remaining insoluble residue was analyzed by HT-GPC.

HDPE and the catalytic materials (either $mSiO_2/Pt/SiO_2$, $Pt/SiO_2$, or $mSiO_2/SiO_2$) were physically mixed and then placed in a glass-lined Parr autoclave reactor equipped with a mechanical impeller-style stirrer. The reactor atmosphere was cycled between Ar and vacuum three times, and then the reactor was filled with $H_2$ (120 psi) and sealed. The reactor was placed in a heating mantle and heated to 250° C. for the predetermined time (6, 24 or 48 h); under these conditions the pressure reading is 200 psi. After a designated time, the reactor was vented, the gaseous portion was analyzed by GC-MS, and the reactor was allowed to cool. (In complementary experiments, the reactor was allowed to cool, then the reactor was vented, and the gaseous products were analyzed by GC-MS; this was done to ensure that the overall yields and distributions of low molecular weight products were not affected by workup and analysis protocols). The mass of the gaseous products was determined by taking the difference of the combined masses of the solid residue, impeller and glass reaction liner before and after the reaction. A sample of the solid residue was removed for analysis by HT-GPC. The solid residue was extracted with methylene chloride (3×20 mL) at 80° C. with mixing. Methylene chloride extracts were combined and concentrated to provide a waxy oil product, which was analyzed by GC-MS.

Molecular Weight Data

The polymeric residues produced from the catalytic hydrogenolysis reactions were analyzed by HT-GPC. A sample of the crude reaction mixture was dissolved in TCB and analyzed by HT-GPC directly. The remaining material was extracted with methylene chloride (as described above) to remove the small, soluble products, and the residual solid was then dissolved in TCB and analyzed by HT-GPC. These samples were compared to virgin polyethylene (HDPE) used for the catalytic experiments, and to 'virgin HDPE' that had been extracted with methylene chloride (to match the post-catalysis workup).

Catalytic hydrogenolysis and thermal, catalyst-free reactions of the HDPE result in lower $M_n$, which is statistically weighted to emphasize contributions of lower molecular weight species to the distribution. Once the soluble, small molecule species are extracted into methylene chloride, a comparison of $M_n$, $Đ(M_w/M_n)$, and $M_p$ would indicate the presence of new, shorter polymeric chains. Equivalent $M_n$, $Đ$, and $M_p$ values for treated and untreated polymer, after methylene chloride extraction of soluble species, would indicate that the remaining insoluble chains have not undergone significant hydrogenolysis steps. The HT-GPC data are summarized in Table 3.

TABLE 3

HT-GPC analysis of polymeric solids obtained after hydrogenolysis (pre-extraction) and residual polymeric materials after extraction (post-extraction) with methylene chloride at 80° C.

| Catalyst | Time (h) | Conversion (%) | | $M_n$ (kDa) | $M_w$ (kDa) | Đ |
|---|---|---|---|---|---|---|
| HDPE starting material | — | — | Pre-extraction | 5.9 | 26.3 | 4.45 |
| | | | Post-extraction | 6.6 | 30.0 | 4.6 |

TABLE 3-continued

HT-GPC analysis of polymeric solids obtained after hydrogenolysis (pre-extraction) and residual polymeric materials after extraction (post-extraction) with methylene chloride at 80° C.

| Catalyst | Time (h) | Conversion (%) | | $M_n$ (kDa) | $M_w$ (kDa) | Đ |
|---|---|---|---|---|---|---|
| $mSiO_2/Pt/SiO_2$[a] | 6 | 6.7 | Pre-extraction | 3.0 | 32.2 | 10.7 |
| | | | Post-extraction | 6.1 | 37.3 | 6.1 |
| $Pt@SiO_2$[b] | 6 | 8.0 | Pre-extraction | 5.6 | 25.4 | 4.5 |
| | | | Post-extraction | 6.7 | 30.5 | 4.5 |
| $mSiO_2/Pt/SiO_2$[c] | 24 | 10.3 | Pre-extraction | 4.5 | 29.9 | 6.7 |
| | | | Post-extraction | 6.8 | 31.9 | 4.7 |
| $Pt@SiO_2$[d] | 24 | 20.3 | Pre-extraction | 4.0 | 56.3 | 14.0 |
| | | | Post-extraction | 3.7 | 42.9 | 11.7 |
| $mSiO_2/Pt/SiO_2$[c] | 48 | 24.1 | Pre-extraction | 4.4 | 35.2 | 7.9 |
| | | | Post-extraction | 6.3 | 31.0 | 4.9 |
| $Pt@SiO_2$[d] | 48 | 27.5 | Pre-extraction | 3.6 | 15.5 | 4.3 |
| | | | Post-extraction | 3.9 | 17.4 | 4.5 |
| $mSiO_2/SiO_2$ (Pt-free) | 6 | 3.0 | Pre-extraction | 4.1 | 22.5 | 5.5 |
| | | | Post-extraction | 4.8 | 21.4 | 4.5 |

[a]$mSiO_2/Pt/SiO_2$ catalyst (0.042 Pt wt/silica wt %; 0.00087 Pt wt/HDPE wt %).
[b]$Pt/SiO_2$ catalyst (0.478 Pt wt/silica wt %; 0.00099 Pt wt/HDPE wt %).
[c]$mSiO_2/Pt/SiO_2$ catalyst (0.06 Pt wt/silica wt %; 0.0013 Pt wt/HDPE wt %).
[d]$Pt/SiO_2$ catalyst (1.7 Pt wt/silica wt %; 0.0013 Pt wt/HDPE wt %).

Gas Chromatography-Mass Spectrometry (GC-MS)

Headspace analysis. Gas samples taken from the headspace of the Parr reactor were analyzed by the gas chromatography using an Agilent Technologies 7890A GC system equipped with an Agilent Technologies 5975C inert MSD mass spectrometer. A capillary column, Agilent J&W DB-5ht [(5%-phenyl)-methylpolysiloxane, 0.25 mm, 30 m, 0.1 µm] was used for compound separation. Samples were injected manually using a gas-tight syringe.

Figure 21:
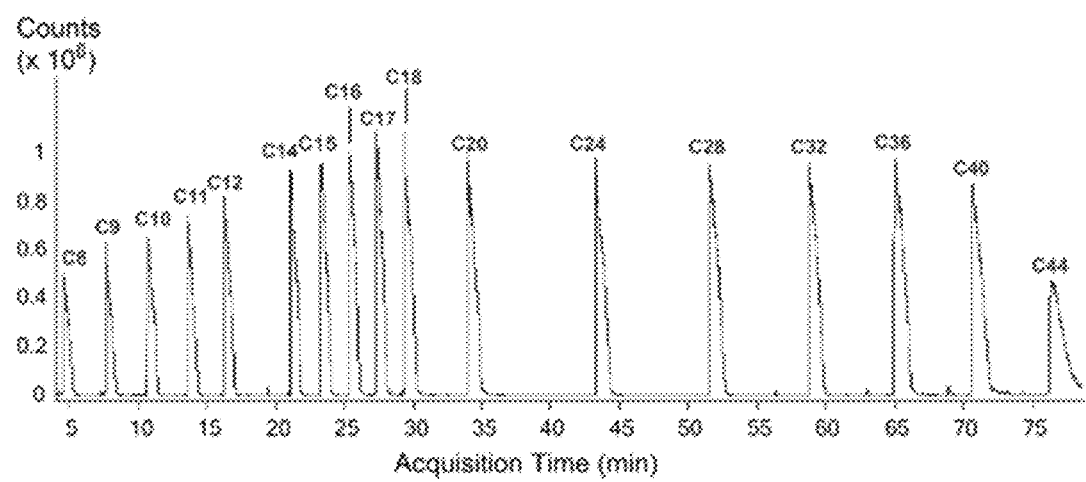
FIG. 21 shows the GC-MS trace of RESTEK ASTM D2887-12 STANDARD used to identify and quantify carbon numbers of species in samples from catalytic hydrogenolysis experiments.

Oil analysis. The full description of GC-MS analysis methods is described above. The GC-MS of this calibration mixture is shown in FIG. 21.

The carbon numbers in samples are estimated as follows: A GC-MS of ASTM standard was integrated. A plot of integrated area vs carbon number (shown in FIG. 22) allows the determination of the response of all $C_1$ (since ASTM standard does not include $C_{13}$, $C_{19}$, $C_{21}$, etc.) by interpolation. The regions of $C_6$-$C_{20}$ and $C_{20}$-$C_{40}$ are linear, but with inequivalent slopes. Therefore, these two regions were fit separately.

Figure 22:
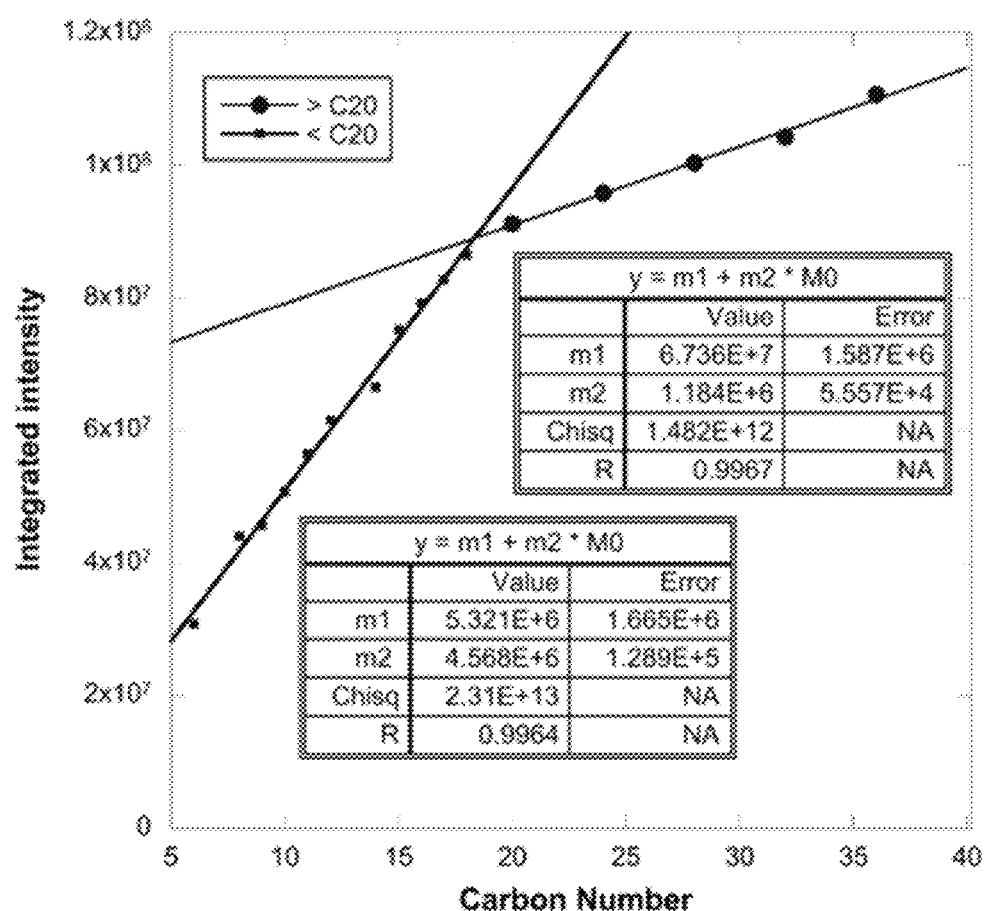
FIG. 22 shows the response factor in GC-MS chromatogram plotted against carbon number. The linear least squares regression analyses are used to estimate the response integrated intensity for carbon species not present in ASTM standard by interpolating within the ranges C$_5$-C$_{20}$ and C$_{20}$-C$_{40}$, which show linearity.

The relative mass ratio as a function of carbon number $F(C_n)$ was calculated by dividing the area of each peak (or calculated peaks for the appropriate range using the linear fits from FIG. 22) by that of the $C_{12}$ (which was arbitrarily chosen-note that this protocol was also tested with $C_{24}$ and, expectedly, gives an equivalent scaling factors for each peak).

$$\text{relative mass ratio} = F(C_n) = \frac{\text{integrated peak area of } C_n}{\text{integrated peak area of } C_{12}} \quad (1)$$

The relative mass ratio for each $C_n$ allows estimation of the GC-MS response for hydrocarbon species as a function of $C_n$. In GC-MS of catalytic mixtures below, the observed integrated intensities for each carbon number are appropriately scaled based on the relative mass ratio $(C_n)$.

$$\text{relative intensity for a carbon number} = \quad (2)$$
$$G(C_n) = \frac{\text{observed integrated intensity of catalytic sample}}{F(C_n)}$$

The percentage of each carbon number is determined by dividing that carbon number's relative intensity by the sum of the relative intensities for all carbon species observed.

$$\% C_n = \frac{G(C_n)}{\sum_{n=6}^{36} G(C_n)} \times 100\% \qquad (3)$$

Simulated Distillation Gas Chromatography Flame Ionization Detection (SimDist GC-FID)

Figure 23:
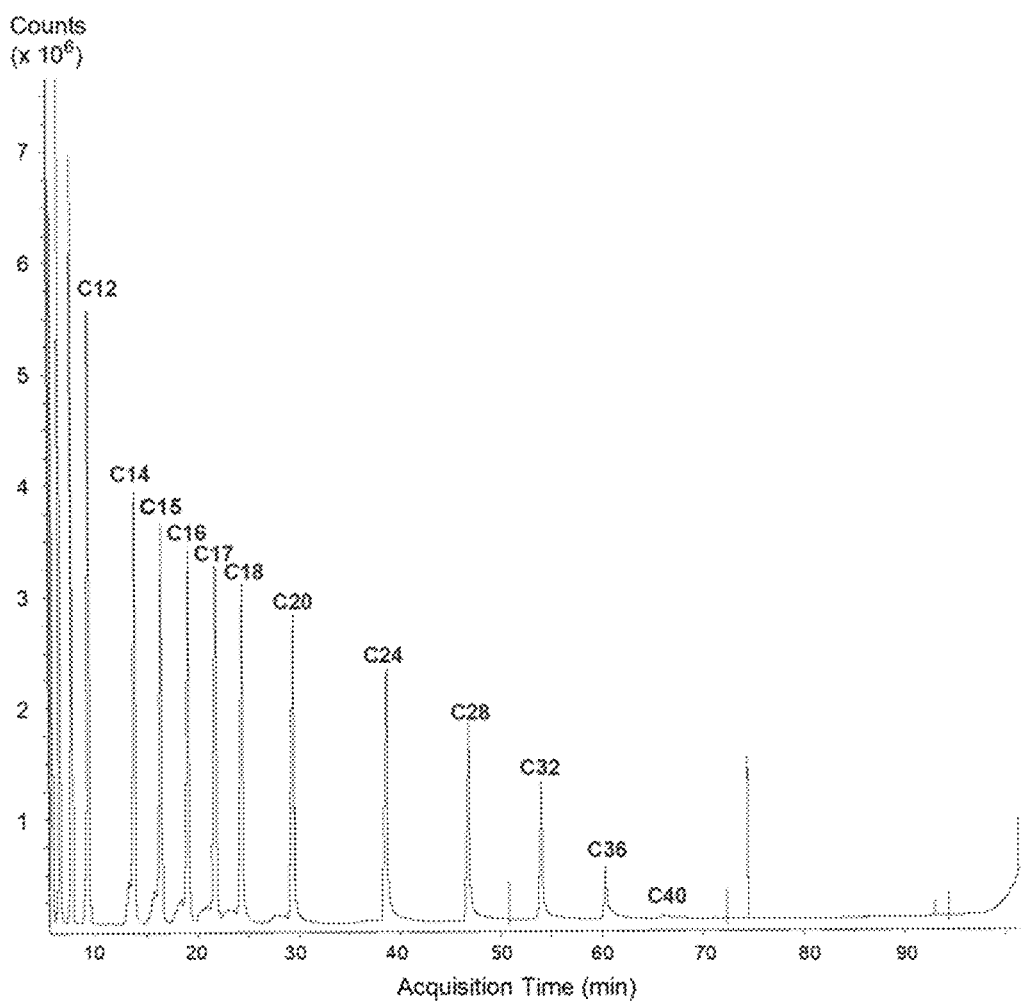
FIG. 23 shows the SimDist GC-FID of a standard mixture of saturated linear alkanes (D2287-Restek) dissolved in dichloromethane. The baseline is flat, showing that column or acquisition conditions inherently lead to flat baselines with this column and method (e.g., no column bleeding), and chromatograms below with non-flat baselines are attributed to samples containing poorly resolved branched isomers.
Figure 24:
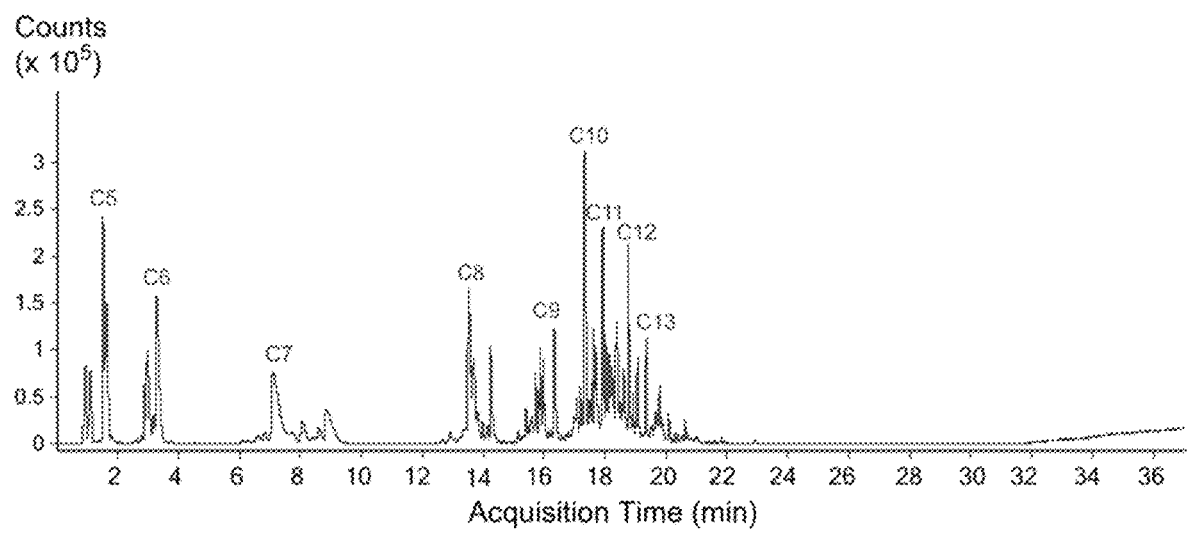
FIG. 24 shows the GC-MS trace of the sampled headspace for the hydrogenolysis reaction of HDPE and H$_2$ (200 psi) using mSiO$_2$/Pt/SiO$_2$ (0.042 Pt wt/silica wt %) as catalyst, conditions: 0.00087 Pt wt/HDPE wt % in the reactor for 6 h at 250° C., vented and sampled at 250° C., give a yield of volatile species corresponding to 3.35% of the starting HDPE.
Figure 25:
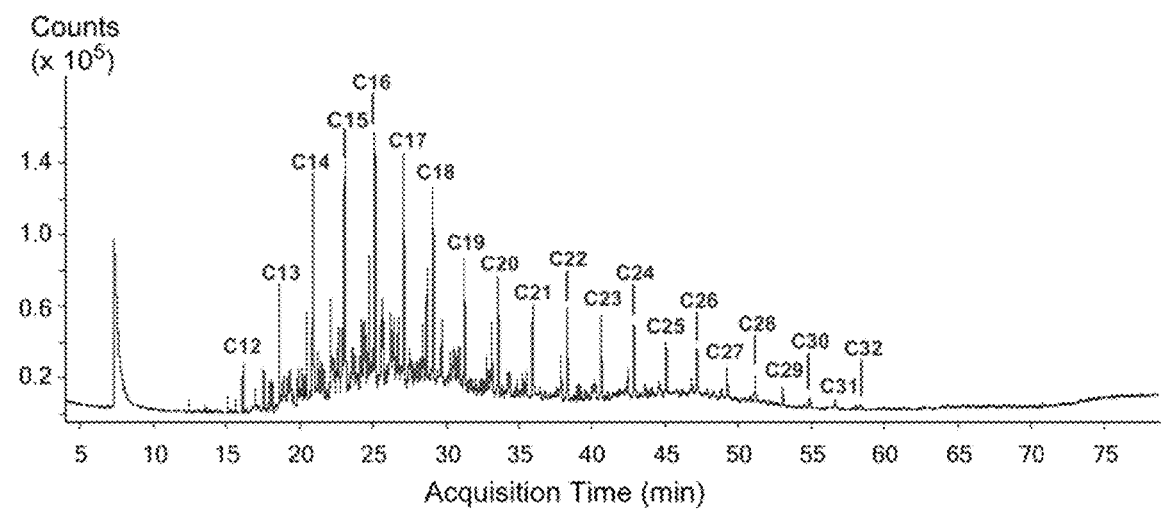
FIG. 25 shows the GC-MS of hydrogenolysis oil products (3.42% yield) from reaction of HDPE using mSiO$_2$/Pt/SiO$_2$ (0.042 Pt wt/silica wt %) as catalyst, conditions: 0.00087 Pt wt/HDPE wt % in the reactor for 6 h at 250° C. under H$_2$ (200 psi), isolated by extraction of the solid reaction mixture with methylene chloride at 80° C. from the reaction that was vented at 250° C.
Figure 26:
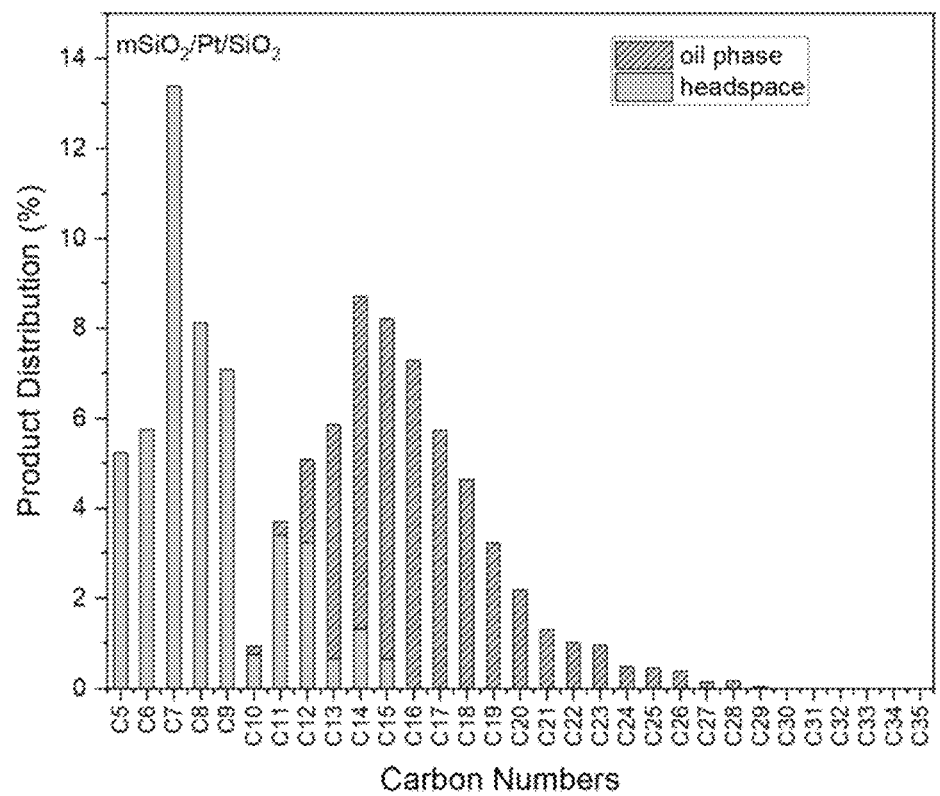
FIG. 26 shows the carbon number distribution for the hydrogenolysis reaction of HDPE using mSiO$_2$/Pt/SiO$_2$ (0.042 Pt wt/silica wt %) as catalyst, conditions: 0.00087 Pt wt/HDPE wt % in the reactor for 6 h at 250° C. under H$_2$ (200 psi).
Figure 27:
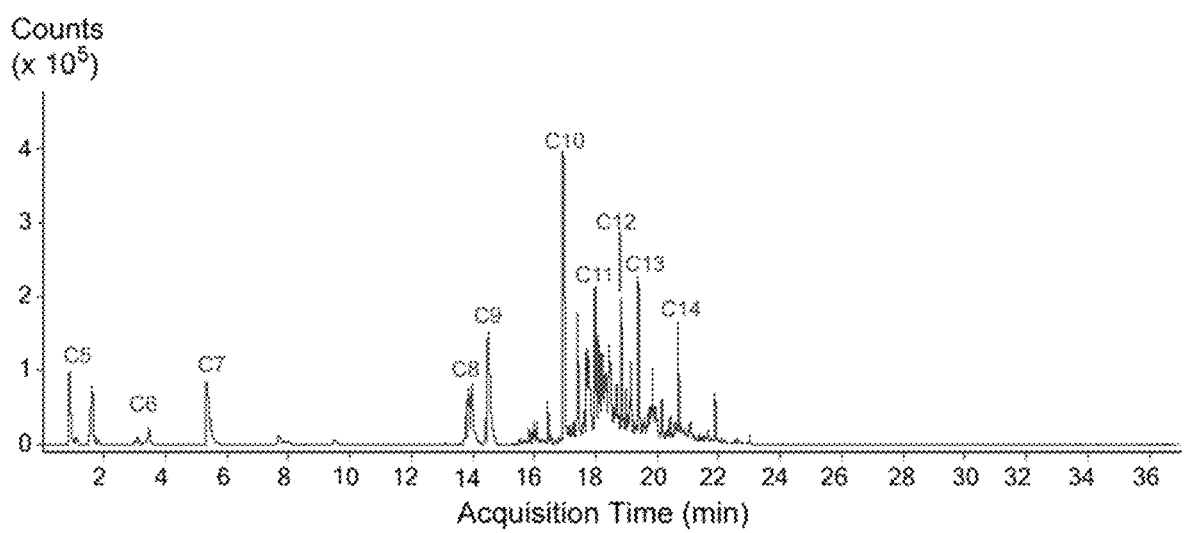
FIG. 27 shows the GC-MS chromatogram of the sampled headspace for the hydrogenolysis reaction of HDPE and H$_2$ (200 psi) using Pt/SiO$_2$ (0.478 Pt wt/silica wt %) as catalyst, conditions: 0.00099 Pt wt/HDPE wt % in the reactor for 6 h at 250° C. under H$_2$ (200 psi), yielding volatile species corresponding to 3.99% of the starting HDPE.
Figure 28:
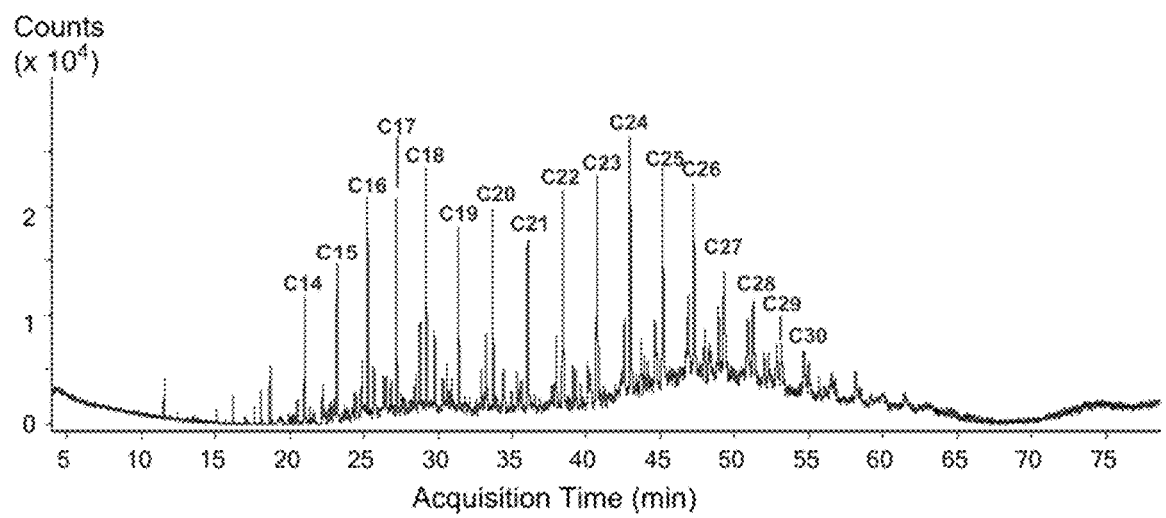
FIG. 28 shows the GC-MS of hydrogenolysis oil products (3.99% yield) from reaction of HDPE and H$_2$ (200 psi) using Pt/SiO$_2$ (0.478 Pt wt/silica wt %) as catalyst, conditions: 0.00099 Pt wt/HDPE wt % in the reactor for 6 h at 250° C. under H$_2$ (200 psi), and the product was isolated by extraction of the solid reaction mixture with methylene chloride at 80° C.
Figure 29:
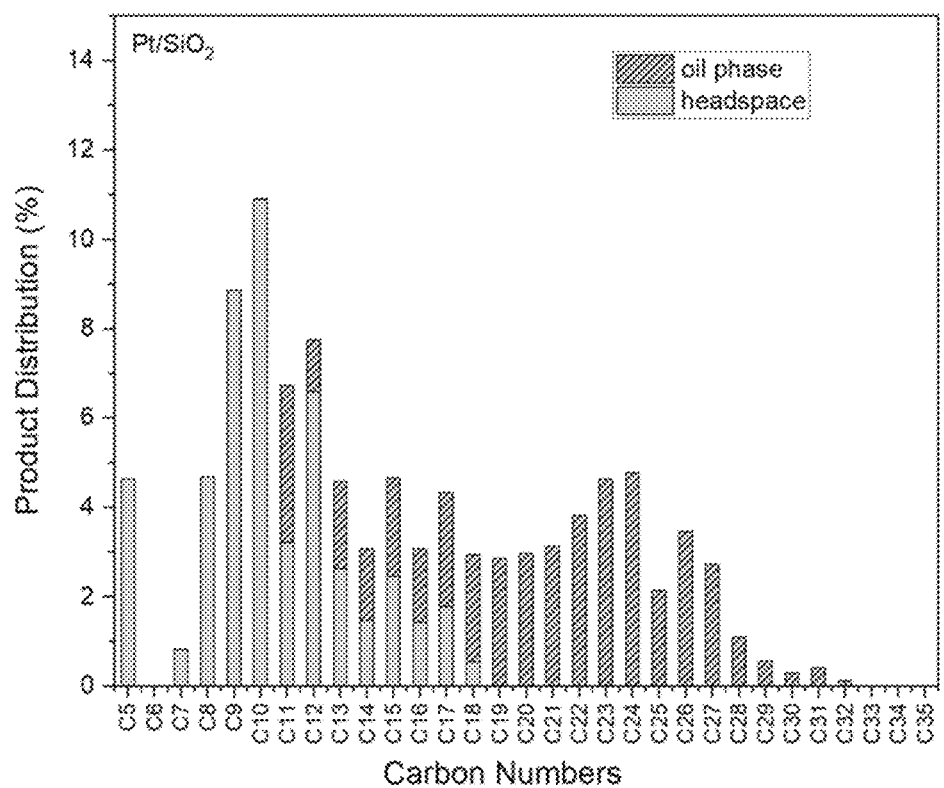
FIG. 29 shows the carbon number distribution for the hydrogenolysis reactions of HDPE using Pt/SiO$_2$ (0.478 Pt wt/silica wt %) as catalyst, conditions: 0.00099 Pt wt/HDPE wt % in the reactor for 6 h at 250° C. under H$_2$ (200 psi).

Simulated distillation gas chromatography (GC) was used to analyze the higher molecular weight components of oily products, as this method can separate carbon numbers up to at least $C_{40}$ and provides complementary data to GC using a capillary column. SimDist GC-FID analyses were performed on an Agilent 7890A gas chromatograph equipped with a split/splitless injector and a flame ionization detector (FID). The column was a 5 m×0.53 mm MXT-1HT SimDist (Restek) with a film thickness of 0.10 μm. Separations were performed under temperature-programmed conditions with the column oven programmed from 35 to 70° C. at 10.0° C./min, 70 to 280° C. at 3° C./min, and then 280 to 430° C. at 15° C./min with initial and final hold times of 0.5 and 10 minutes, respectively. Helium carrier gas was employed with a constant flow of 3 mL/min. Injector and detector temperatures were maintained at 350 and 430° C., respectively. 1.5 μL of solution was injected in the splitless mode. The solvent vent time was 2 minutes. A mixture of saturated alkanes (Restek ASTMD2287-12 STANDARD described above) dissolved in dichloromethane was used to identify the species formed in catalytic reactions. A SimDist GC-FID of Restek ASTMD2287-12 STANDARD is shown below in FIG. 23.

Example 3—Polymer Upcycling Catalysis

On the basis of the aforementioned NMR characterization of HDPE chain adsorption and translocation in $mSiO_2$ pores and motivated by the potential advantages of processive polymer deconstruction, a catalyst was designed with Pt nanoparticles located solely at the pore end (detailed below). In this inorganic architecture, PE chains must enter and diffuse to fill the pore length to access the Pt active sites. Platinum nanoparticles were chosen as catalytic entities because of their established performance in catalytic hydrogenolysis of carbon-carbon bonds in small hydrocarbons and recently in HDPE.

Figures 4A, 4B:
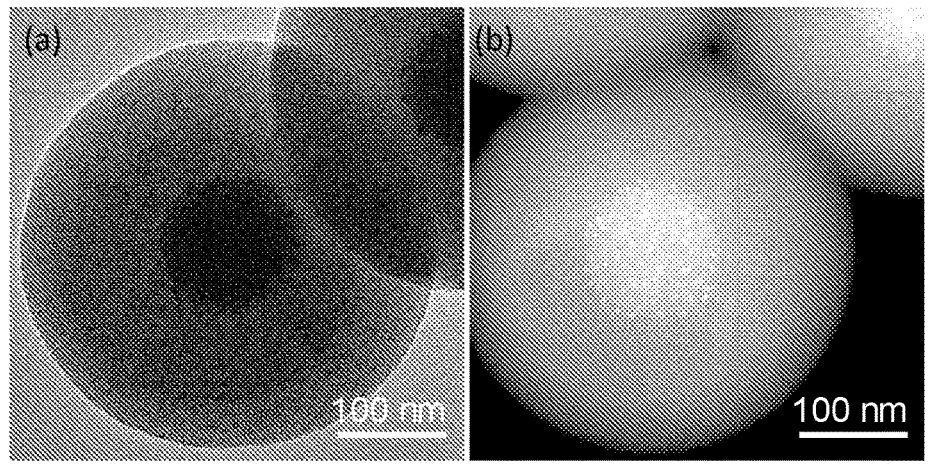
FIGS. 4A-4B show the bright-field TEM (FIG. 4A) and HAADF-STEM (FIG. 4B) images of the mSiO$_2$/Pt/SiO$_2$ catalyst, the small dark dots in FIG. 4A and bright dots in FIG. 4B are Pt nanoparticles that are supported on the surface of spherical SiO$_2$ core and located at the terminal end of the linear channel of mSiO$_2$ shell.

The porous catalyst was synthesized by loading 3.2±0.5 nm-diameter Pt nanoparticles onto amine-functionalized silica spheres (diameter~127±7 nm) and then growing a 110±8 nm thick shell of mesoporous silica ($mSiO_2$) with 2.4±0.2 nm-diameter pores organized radially from the silica sphere. The pore length is equal to the thickness of the $mSiO_2$ shell, as displayed by the transmission electron microscopy (TEM) image (see FIG. 4A). This three-layered spherical shell-type construction ($mSiO_2/Pt/SiO_2$) places the Pt nanoparticles at the terminal end of linear channels (i.e., at the bottom of wells); this architecture and Pt nanoparticle localization is supported by the high-angle annular darkfield scanning transmission electron microscopy (HAADF-STEM) image (FIG. 4B). Pt nanoparticles supported on silica spheres ($Pt/SiO_2$, FIG. 9B) without a $mSiO_2$ shell serve as a control catalyst, on which HDPE chains could be randomly adsorbed and cleaved.

Figures 5A, 5B, 5C:
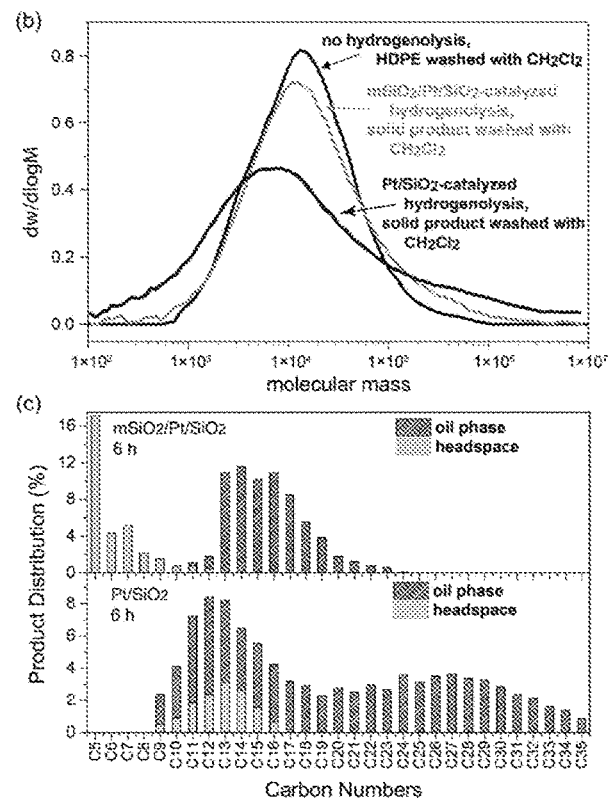
FIGS. 5A-5C show the Combined table of HT-GPC and GC data showing conversion-independent product distributions from mSiO$_2$/Pt/SiO$_2$ and conversion-dependent product distributions obtained with Pt/SiO$_2$ (FIG. 5A), HT-GPC analysis of molecular mass and distributions of HDPE before and after hydrogenolysis using mSiO$_2$/Pt/SiO$_2$ or Pt/SiO$_2$ (FIG. 5B), and combined distributions of the gas and liquid products obtained from the hydrogenolysis of HDPE using mSiO$_2$/Pt/SiO$_2$ (top) or Pt/SiO$_2$ (bottom) (FIG. 5C).

Hydrogenolysis reactions using these two catalysts at ca. 0.001 Pt wt % loading (corresponding to a very small amount of reactive species, 1 mg Pt in 100 g HDPE) were then performed solvent-free with ca. 3 g HDPE and 200 psi $H_2$ at 250° C. as standard conditions. The products and their distribution were analyzed by gas chromatography (GC) and HT-GPC, which, taken together, give an accurate representation of the hydrocarbon distribution from low molecular mass to high molecular mass. HT-GPC analysis of the residual polymeric materials, before and after extraction of species with carbon numbers $C_1$<40, distinguishes the performance of the porous and nonporous catalytic architectures (FIGS. 5A, 5B). Next, the yield and composition of species in the headspace of the pressurized reactor and of the isolated oils were analyzed individually, and then the data from the two phases were combined to give the representative mass-weighted distribution, normalized to account for yields of the two phases, of low molecular mass carbon numbers (to $C_{35}$, FIG. 5C). Comparing the populations of hydrocarbon species obtained from hydrogenolysis of HDPE using the $mSiO_2/Pt/SiO_2$ catalyst to those obtained from nonporous $Pt/SiO_2$ catalyst reveals several characteristic features of processive behavior in the former catalyst. Specifically, products afforded by the processive, porous catalyst show (1) identical molecular mass properties of bulk HDPE before and after catalytic hydrogenolysis, (2) a narrower distribution of small molecule carbon numbers that is independent of Pt-catalyzed conversion, and (3) few detectable species with intermediate molecular masses in between those of the produced fragments and the residual polymer.

FIG. 5A shows Combined table of HT-GPC and GC data showing narrow conversion-independent product distributions from $mSiO_2/Pt/SiO_2$ and broader, conversion-dependent product distributions obtained with $Pt/SiO_2$. The data is presented as pairs of analyses for each experiment, before and after extraction with methylene chloride. The HT-GPC data of all condensed-phase organic materials, prior to extraction with methylene chloride, reveals a substantial decrease in $M_n$ and increase in D for both catalytic architectures. (b) HT-GPC analysis of molecular mass and distributions of HDPE (black), HDPE after hydrogenolysis using $mSiO_2/Pt/SiO_2$, and HDPE after hydrogenolysis using $Pt/SiO_2$ for 24 h, showing equivalent bulk polymer properties after catalysis using the porous catalyst and change in the bulk HDPE after hydrogenolysis by the nonporous catalyst. (c) Combined distributions of the gas and liquid products (weighted by % yield of the products in the two phases) obtained from the hydrogenolysis of HDPE using $mSiO_2/Pt/SiO_2$ (top) and $Pt/SiO_2$ (bottom) after 6 h at 250° C. under 200 psi of $H_2$.

First, hydrogenolysis of HDPE using $Pt/SiO_2$ results in a significant transformation of $M_n$ and dispersity $Đ(M_w/M_n)$ of the polyethylene fraction, whereas the comparable $mSiO_2/Pt/SiO_2$-catalyzed hydrogenolysis provides equivalent molecular mass properties to those of the starting HDPE (see FIGS. 5A, 5B) as expected for a processive process. Using the 24 h experiment under standard conditions as a representative example, hydrogenolysis of HDPE employing $mSiO_2/Pt/SiO_2$ as the catalyst (0.0013 Pt wt %) provides condensed-phase organic materials; analysis of this crude mixture by HT-GPC reveals a substantial decrease in $M_n$ and increase in D compared to untreated HDPE. Extraction of all soluble low molecular mass species (7.2%) from the crude reaction mixture with refluxing dichloromethane gives residual insoluble HDPE ($M_n$=6.8 kDa and D=4.7) with equivalent properties to those of the unreacted, dichloromethane-washed HDPE starting material ($M_n$=6.6 kDa and Đ=4.6). Likewise, hydrogenolysis using the mSiO$_2$/Pt/SiO$_2$ catalyst for 6 h (6.7% conversion) and 48 h (25% conversion) afford residual HDPE with similar M$_n$ and Đ values. That is, the bulk properties of the HDPE are largely unchanged during hydrogenolysis with mSiO$_2$/Pt/SiO$_2$, even as the HDPE is consumed and small molecular mass species are produced.

Reactions of HDPE and H$_2$ with the nonporous Pt/SiO$_2$ catalyst under equivalent standard conditions (0.0013 Pt wt %) also result in hydrogenolysis (20.3% conversion after 24 h). The HT-GPC data reveals that residual HPDE is significantly transformed even after extraction with CH$_2$Cl$_2$, highlighting the contrasting behavior of Pt/SiO$_2$ and mSiO$_2$/Pt/SiO$_2$. In particular, the molecular mass of the insoluble polymeric material is reduced (M$_n$=3.7 kDa) and the dispersity (Đ=11.7) is considerably broadened from the values of both the virgin and unreacted/dichloromethane-washed polyethylene starting materials. Moreover, characteristics of the polymer are altered as a function of the extent of conversion. For example, the dispersity decreases with higher conversion as a result of a larger fraction of highest molecular mass species undergoing cleavage, whereas at lower conversion, the HDPE properties are not distinguished outside of error from starting materials. Catalyst-free thermal treatment of HDPE under H$_2$ also results in polymer with lower M$_n$, before and after washing with methylene chloride.

Second, the carbon number distribution of molecular species produced by mSiO$_2$/Pt/SiO$_2$ gives the appearance of a bell-like distribution, centered at C12-C$_{16}$ numbered chains that comprise ca. 40% of the hydrocarbons present after 10% conversion (see FIG. 5C). The higher molecular mass species from C$_{26}$-C$_{36}$ (above which each C$_1$ species is less than 0.01%) are only 2% of the observed products. This C$_{14}$-centered bell-like distribution, measured at low conversion, represents the intrinsic selectivity of the catalyst. Remarkably, this Pt-hydrogenolysis produced distribution is also largely independent of the conversion level from ~5% up to 25%, although the relative quantity of the lowest and highest molecular mass species varies somewhat. These species are attributed, which appear outside of the normal distribution in the samples, to background reactions because they are the predominant products in control reactions using Pt-free mSiO$_2$/SiO$_2$ material (i.e., acid catalyzed) or in the absence of any inorganic additive. A 17 kDa (Đ=1.1) polyethylene was also tested in this mSiO$_2$/Pt/SiO$_2$-catalyzed hydrogenolysis, which also produced a bell-like distribution of chain lengths. Finally, quantitative conversion of the HDPE to gaseous and dichloromethane-soluble species was observed after 5.5 d at 250° C., and for that experiment ca. 4-fold higher catalyst loading (albeit still low at 0.0039 Pt wt %) gave 57% isolated oils. The carbon number distribution again centers around low molecular mass species (C$_9$-C$_{15}$ is ca. 55%). At this long reaction time, it is likely that smaller molecular mass hydrocarbons also undergo hydrogenolysis steps.

In contrast, the hydrocarbon chains obtained from Pt/SiO$_2$ appeared as a flattened distribution of species with carbon numbers from C$_{18}$ to C$_{26}$ (5.8±0.2% for each species after ca. 20% conversion). In addition, the higher range, C$_{26}$-C$_{36}$ is significant at ca. ~17% of the distribution. Note that HT-GPC results indicate that the higher molecular mass species produced by Pt/SiO$_2$ are more abundant than indicated by GC data in FIG. 5C due to their lower solubility. As such, the GC analysis only describes the lower end of a much broader distribution. Nonetheless, it is clear that the C$_1$ distribution is sensitive to the extent of reaction with the nonporous Pt/SiO$_2$ as hydrogenolysis catalyst. After 48 h (27% conversion), for example, each individual C$_1$ species is less than 4.5% of the sample, and the majority species range all the way from C$_{13}$ to C$_{30}$. Additional control experiments employing porous supports for Pt, namely Pt/mSiO$_2$ (mSiO$_2$=MCM-41 or SBA-15) which lack the shell/site/core architecture, are active for HDPE hydrogenolysis at 250° C., but Pt/MCM-41 gives a broad distribution of hydrocarbon products rather than processive-like selectivity, while Pt/SBA-15 affords a wide, distribution flattened from C$_{18}$-C$_{23}$. A conventional hydrocracking catalyst NiMo/γ-Al$_2$O$_3$ also gives a broad distribution of hydrogenolysis products.

Finally, the entire distribution of hydrocarbon products from mSiO$_2$/Pt/SiO$_2$-catalyzed hydrogenolysis contains only low molecular mass hydrocarbons (mainly from C$_{12}$ to ca. C$_{18}$) and the original HDPE chains, while hydrocarbon fragments resulting from partial deconstruction of HDPE chains are not present in significant quantities. This result is inferred from a composite analysis of the GC-MS and HT-GPC data, comparing results for the two catalyst architectures before and after extraction with methylene chloride. In particular, the polymeric materials produced by hydrogenolysis with the random Pt/SiO$_2$ catalyst contain significant quantities of insoluble, lower molecular mass species not present in the starting polymer, as revealed by the change in M$_n$ values which are sensitive to low molecular mass species in the population. In contrast, new species in this intermediate molecular mass range are not present in reactions using the mSiO$_2$/Pt/SiO$_2$ catalyst because they are not found in the low molecular mass fraction (from GC analysis) or in the insoluble residual polymer fraction, since molecular mass properties of CH$_2$Cl$_2$-washed polymer are equivalent before and after reaction. This point is further supported by the distinct distributions of lower molecular mass species obtained by GC-MS (and simulated distillation column GC-FID), which show that the porous catalyst favors lower molecular mass products.

The contrasting results for the two catalytic architectures indicate that, when using mSiO$_2$/Pt/SiO$_2$ as the catalyst, (1) a fraction of the HDPE chains are not affected during catalysis, (2) all conversion into smaller hydrocarbons occurs from a subset of polyethylene chains, and (3) any transformed chain is entirely deconstructed into small, dichloromethane-soluble molecules. These results are consistent with a processive catalytic process, in which the polymer chains are not released from the catalytic pores, while small molecular mass products are allowed to escape.

Figure 6:
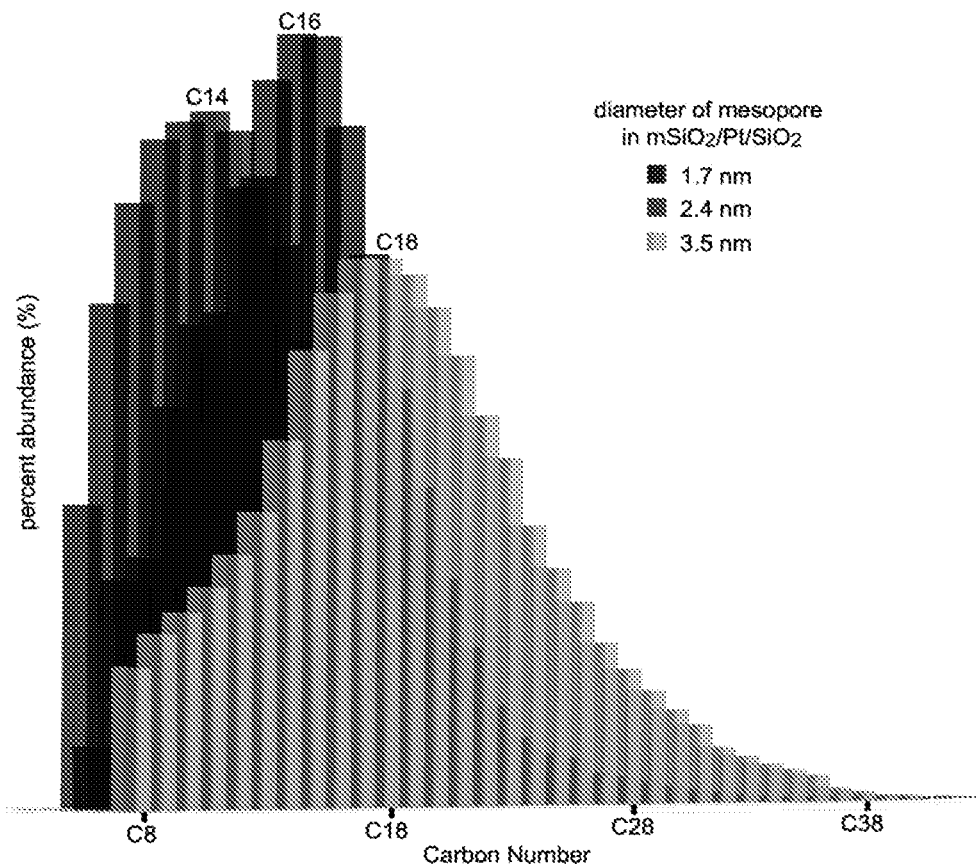
FIG. 6 shows the product distributions of liquid products obtained from the hydrogenolysis of HDPE at full conversion at 300° C. under 200 psi H$_2$ for 24 h using mSiO$_2$/Pt/SiO$_2$ (0.004 wt % Pt) with 1.7, 2.4, and 3.5 nm diameter pore sizes.

Remarkably, catalytic hydrogenolysis of HDPE at 300° C. for 24 h gives quantitative conversion to a narrow C$_{16}$-centered distribution of hydrocarbon chains, with the same median as produced at 250° C. with partial conversion. This narrow distribution indicates that the catalyst also operates through a processive mechanism at high conversion and higher temperature, in reactions in which rates of polymer adsorption and desorption, polymer transport within the pores, carbon-carbon bond hydrogenolysis, and product desorption have increased. Pore diameter may also affect rates of adsorption/desorption and diffusion processes without affecting hydrogenolysis rates. Impressively, mSiO$_2$/Pt/SiO$_2$ catalysts with smaller (1.7 nm) diameter pores give a distribution centered at shorter chains, and larger (3.5 nm) diameter pores afford longer chain products (FIG. 6). Thus, the physical dimensions of the pores may be used to tune the median of the product distribution.

Example 4—Hydrogenolysis at 6 h Reactions at 250° C.

Conversion of HDPE ($M_n$=5.9 kDa, Ð=4.5) into soluble small molecules with mSiO$_2$/Pt/SiO$_2$ (0.042 Pt wt/silica wt %; 0.00087 Pt wt/HDPE wt %) was 6.7% after 6 h, determined by the sum of mass of extracted, isolated oils and the mass of gaseous species produced (the latter was assessed by difference in mass of reaction mixture before and after catalytic reactions). Conversion is defined as:

$$\text{Conversion of } HDPE = \left\{1 - \frac{\text{mass of residual } HDPE}{\text{initial mass of } HDPE}\right\} \times 100\% \quad (4)$$

Conversion was slightly higher (8.0%) with the nonporous Pt/SiO$_2$ catalyst (0.478 Pt wt/silica wt %; 0.00099 Pt wt/HDPE wt %). These low conversion conditions are used to evaluate the intrinsic behavior of the catalytic materials. The products were analyzed in two parts, namely volatile species contained in the headspace and non-volatile, extractable oils. In these experiments, the volatile species were obtained by venting the reactor at reaction temperature (250° C.). Oils were obtained by repeated extraction of the residual solids with methylene chloride at 80° C. Yields of gas phase, oil phase, and residual solid, tabulated in Table 4, are defined as:

$$\text{yield} = \left\{\frac{\text{mass of products}}{\text{initial mass of } HDPE}\right\} \times 100\% \quad (5)$$

The residual solids were analyzed by HT-GPC, and the results of that analysis are described above.

As a control, thermal treatment of the same HDPE under H$_2$ in the presence of a silica-only material (composed of mesoporous silica-coated solid silica spheres, mSiO$_2$/SiO$_2$) results in only ca. 3 wt % conversion to small molecule products. In contrast to the catalytic experiments in the presence of platinum, most observed low molecular weight species from this 'thermal' treatment were unsaturated (olefinic) in nature, which suggests homolytic cleavage of PE chains rather than catalyst-mediated hydrogenolysis. These results indicate that catalysts located at the internal terminus of a pore are active for hydrogenolysis of PE, even though a background thermal degradation of HDPE contributes to the molecular species present in the experiments.

Figure 30:
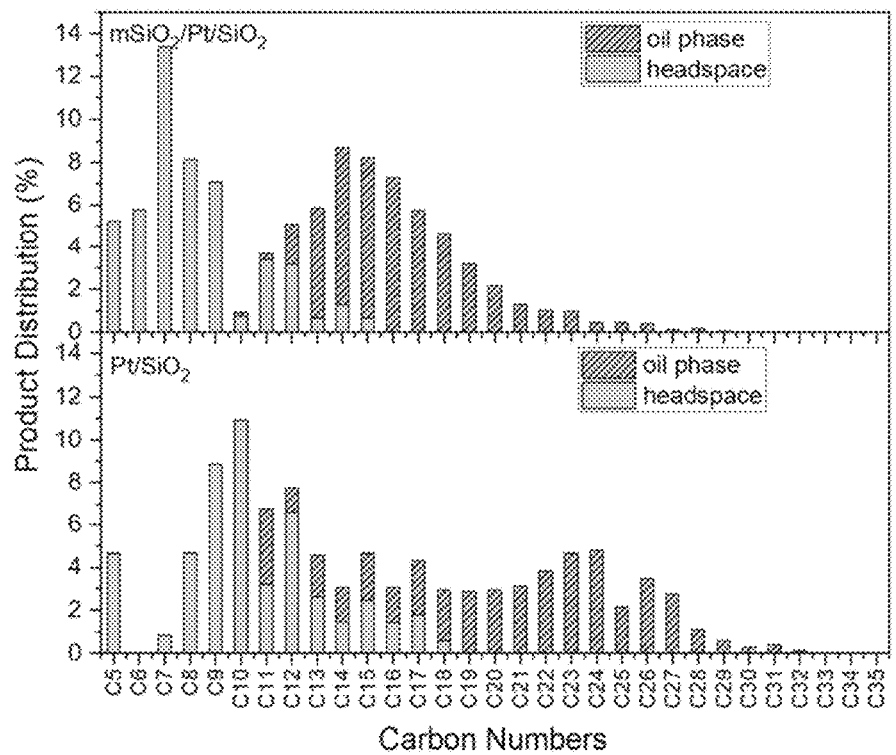
FIG. 30 shows the comparison of distributions of carbon numbers for hydrogenolysis reactions using the two catalysts, mSiO$_2$/Pt/SiO$_2$ and Pt/SiO$_2$, at 250° C. under H$_2$ (200 psi) after 6 h, obtained from yield-weighted contributions of headspace and isolated oil, with the two components' distributions analyzed by GC-MS.
Figure 31:
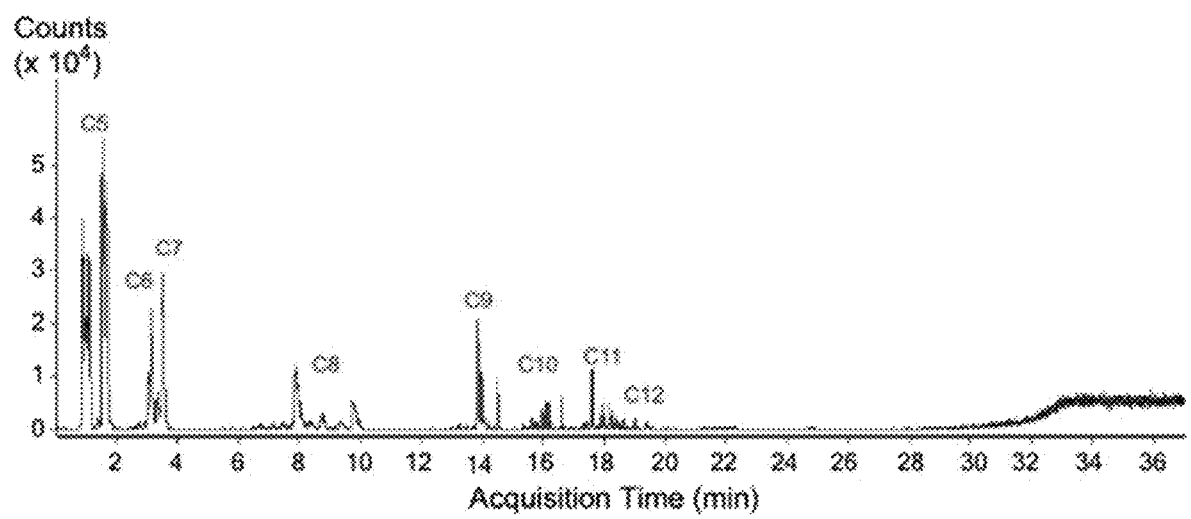
FIG. 31 shows the GC-MS trace of the sampled headspace (corresponding to 0.24% of the starting HDPE) for the hydrogenolysis reaction of HDPE using mSiO$_2$/Pt/SiO$_2$ (0.040 Pt wt/silica wt %) as catalyst, conditions: 0.00087 Pt wt/HDPE wt % in the reactor for 6 h at 250° C. under H$_2$ (at 200 psi), vented and sampled at 25° C.
Figure 32:
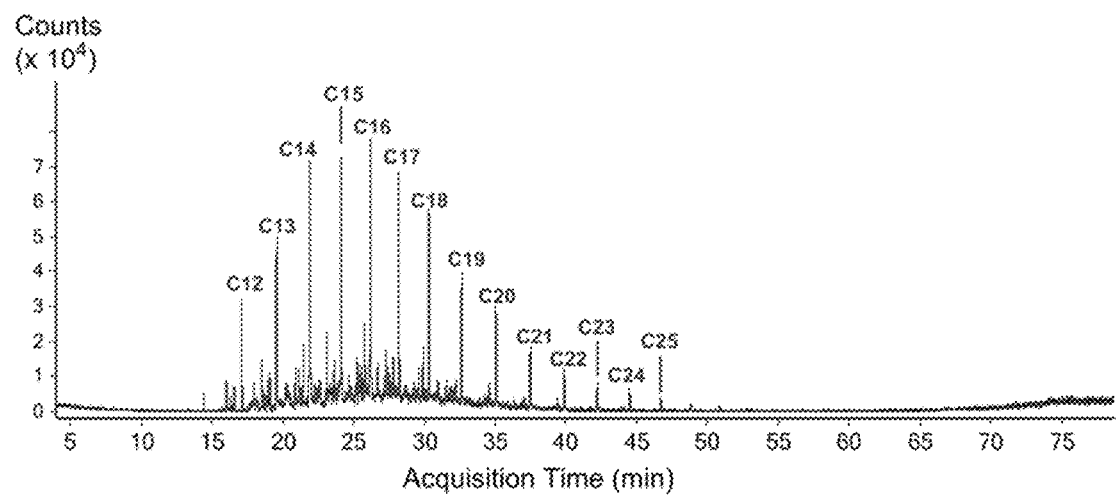
FIG. 32 shows the GC-MS of oil products (5.09% yield) from hydrogenolysis of HDPE using mSiO$_2$/Pt/SiO$_2$ (0.040 Pt wt/silica wt %) as catalyst, conditions: 0.00087 Pt wt/HDPE wt % in the reactor for 6 h at 250° C. under H$_2$ (200 psi), and the product was isolated by extraction of the solid reaction mixture with methylene chloride at 80° C. from the reactor that was vented at 25° C.
Figure 33:
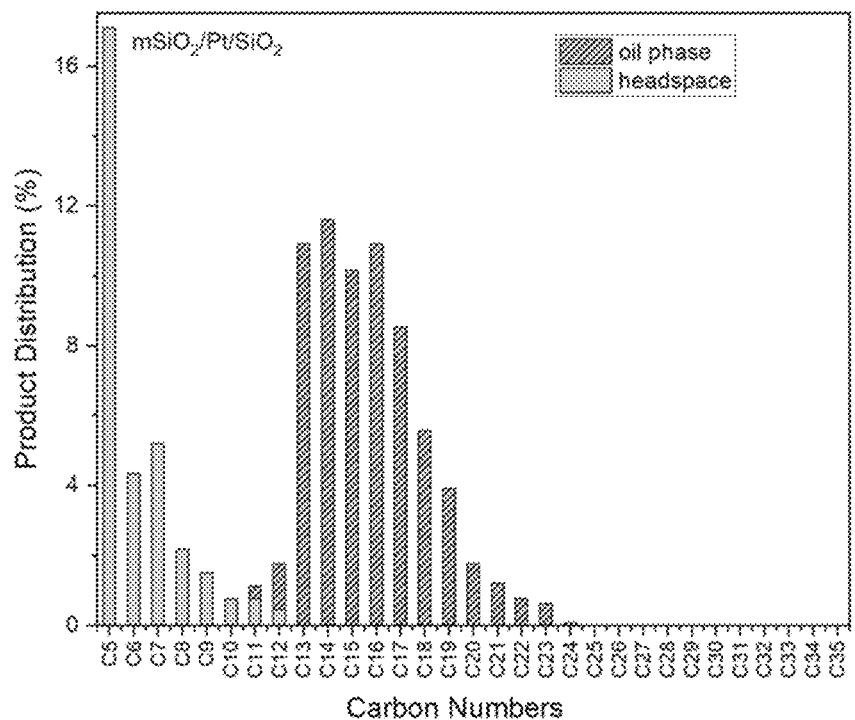
FIG. 33 shows the carbon number distribution for the hydrogenolysis reaction of HDPE, using mSiO$_2$/Pt/SiO$_2$ (0.040 Pt wt/silica wt %) as catalyst, from yield-weighted contributions of headspace and isolated oil, with the two components' distributions analyzed by GC-MS shown in FIGS. 31 and 32. Conditions: 0.00087 Pt wt/HDPE wt % in the reactor for 6 h at 250° C. under H$_2$ (200 psi).
Figure 34:
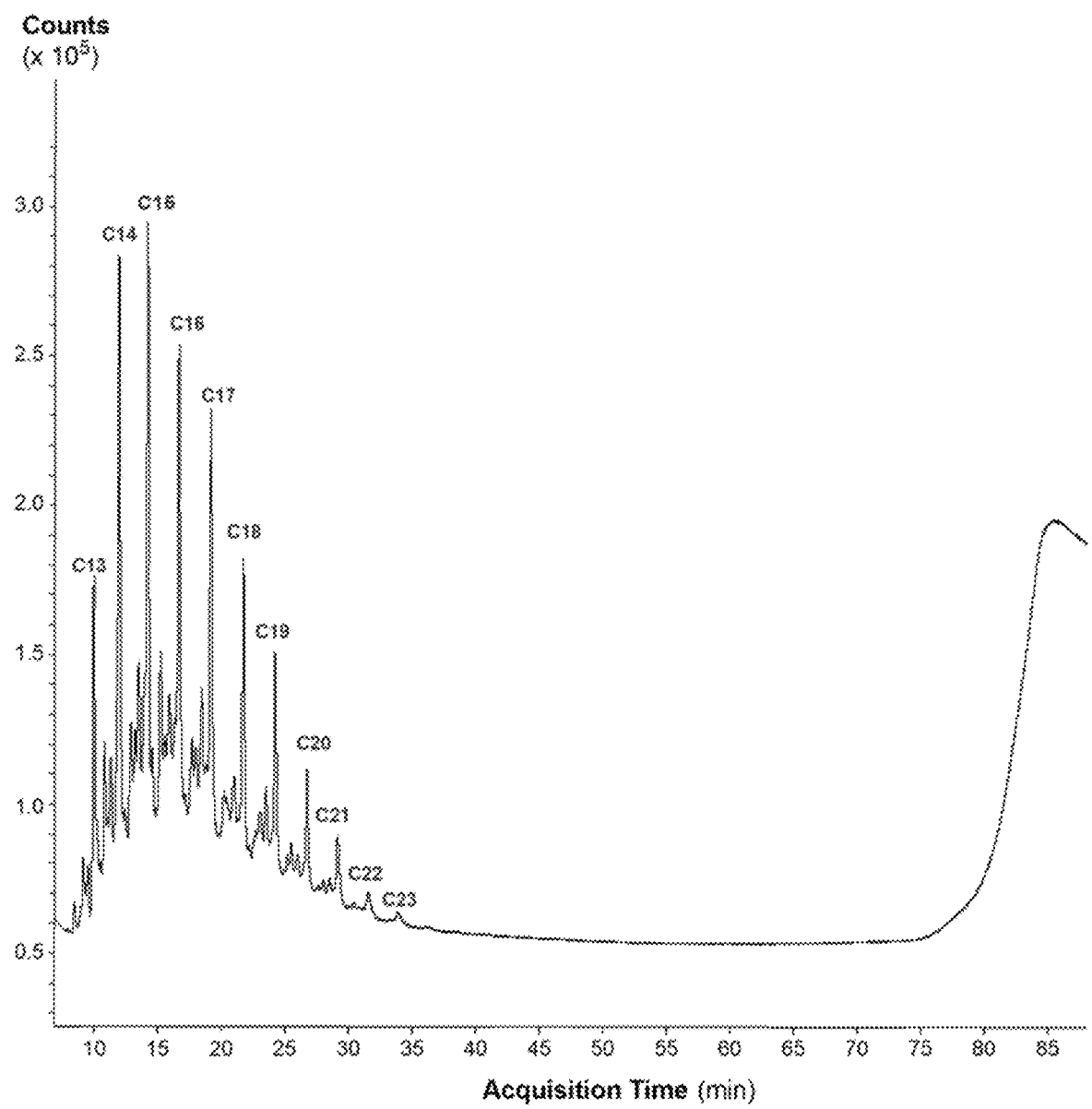
FIG. 34 shows the SimDist GC-FID of hydrogenolysis oil products (5.09% yield) from reaction of HDPE using mSiO$_2$/Pt/SiO$_2$ (0.040 Pt wt/silica wt %) as catalyst, conditions: 0.00087 Pt wt/HDPE wt % in the reactor for 6 h at 250° C. and H$_2$ (200 psi). Product was isolated by extraction of the solid reaction mixture with methylene chloride at 80° C. The reactor was vented at 25° C. at the end of the reaction.
Figure 35:
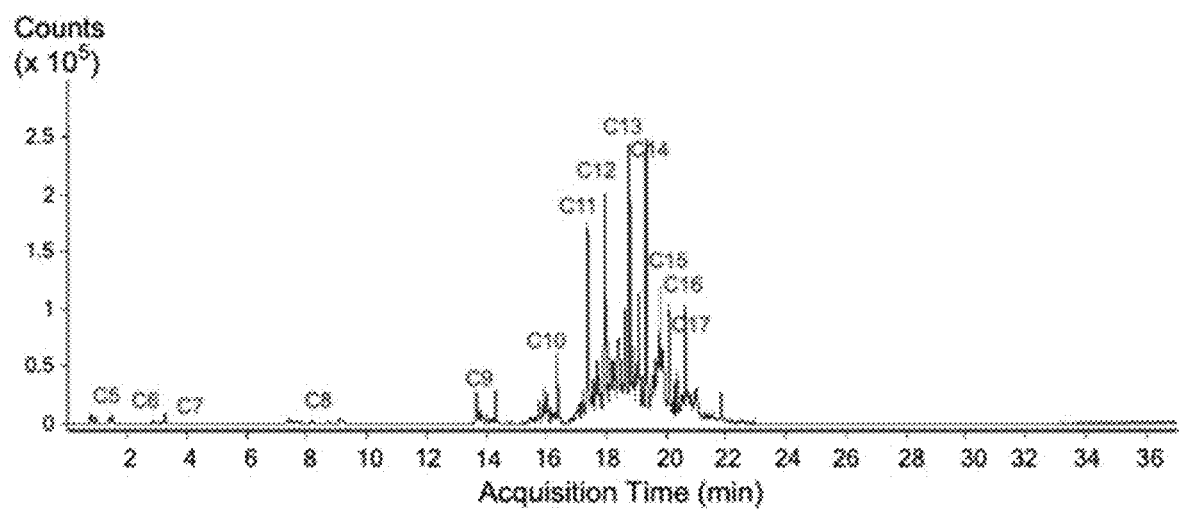
FIG. 35 shows the GC-MS trace of the sampled headspace (corresponding to 1.9% of the starting HDPE) for the hydrogenolysis reaction of HDPE using Pt/SiO$_2$ (0.59 Pt wt/silica wt %) as catalyst, conditions: 0.0018 Pt wt/HDPE wt % in the reactor for 6 h at 250° C. under H$_2$ (200 psi), vented and sampled at 25° C.
Figure 36:
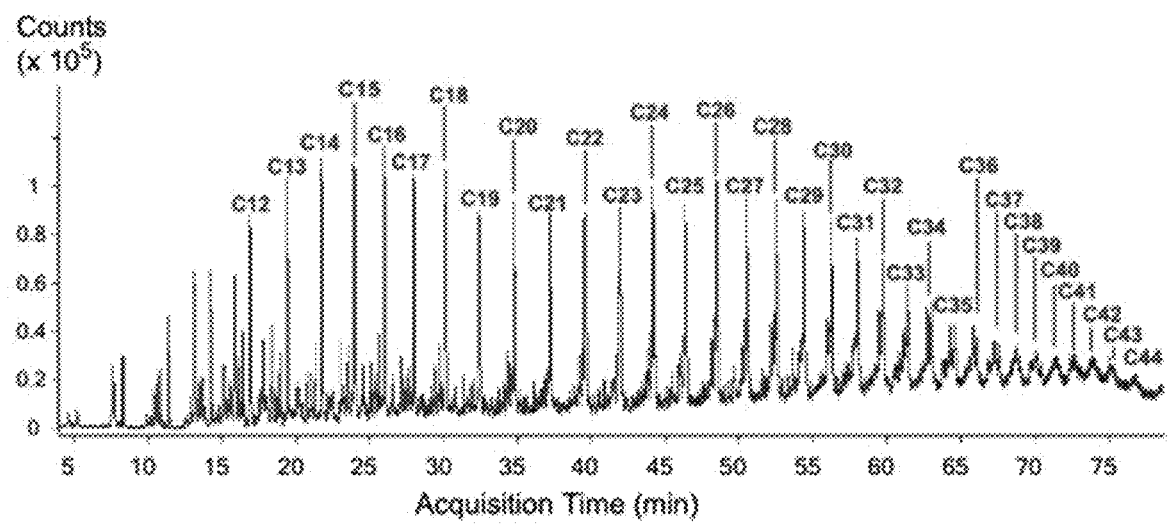
FIG. 36 shows the GC-MS of hydrogenolysis oil products (11.6% yield) from reaction of HDPE using Pt/SiO$_2$ (0.59 Pt wt/silica wt %) as catalyst, conditions: 0.0018 Pt wt/HDPE wt % in the reactor for 6 h at 250° C. under H$_2$ (200 psi), with the product isolated by extraction of the solid reaction mixture with methylene chloride at 80° C. from the reactor vented at 25° C.
Figure 37:
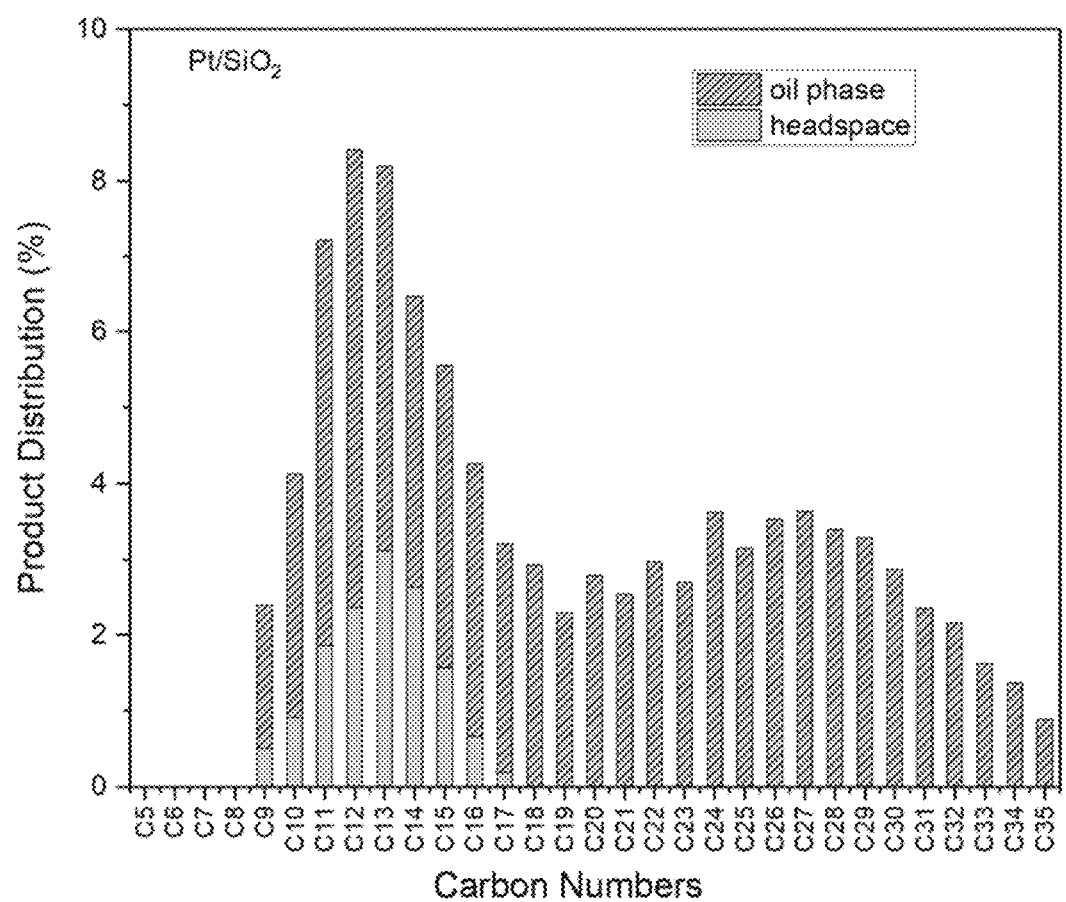
FIG. 37 shows the carbon number distribution from the hydrogenolysis reaction of HDPE, using Pt/SiO$_2$ as catalyst (0.59 Pt wt/silica wt %), from yield-weighted contributions of headspace and isolated oil, with the two components' distributions analyzed by GC-MS shown in FIGS. 35 and 36. Conditions: with 0.0018 Pt wt/HDPE wt % in the reactor for 6 h at 250° C. under H$_2$ (200 psi).
Figure 38:
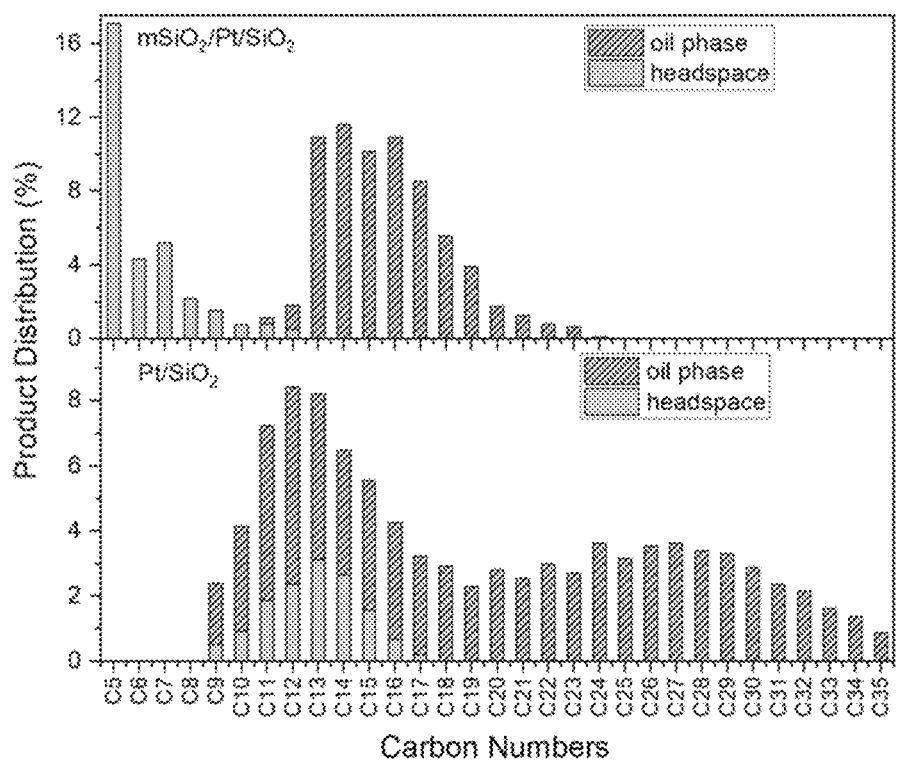
FIG. 38 shows the comparison of distributions of carbon numbers for hydrogenolysis reactions using the two catalysts, mSiO$_2$/Pt/SiO$_2$ and Pt/SiO$_2$ for 6 h at 250° C. under H$_2$ (200 psi), obtained from yield-weighted contributions of headspace and isolated oil, with the two components' distributions analyzed by GC-MS.
Figure 39:
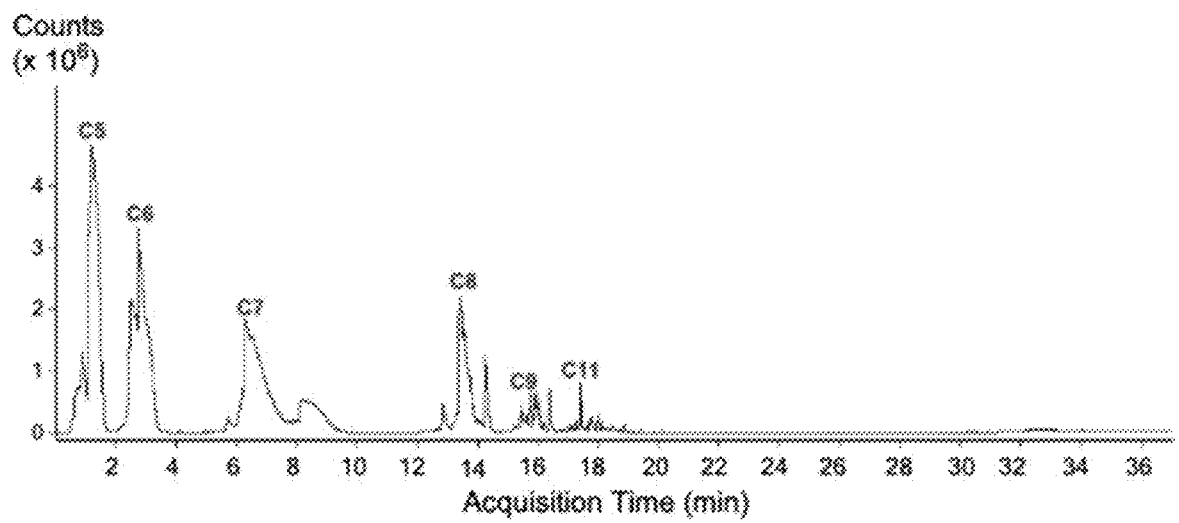
FIG. 39 shows the GC-MS trace of the volatile products (1.9% yield) from a control experiment. The sample was obtained by heating HDPE for 6 h under H$_2$ (200 psi) in the presence of mSiO$_2$/SiO$_2$ (Pt-free), and then the headspace of the reactor was vented and sampled at 250° C.
Figure 40:
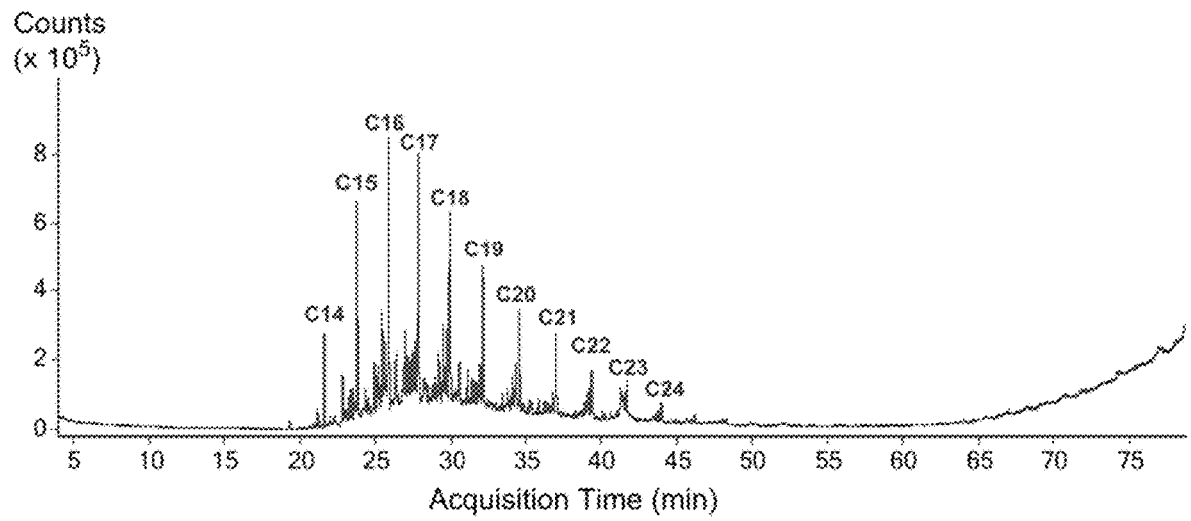
FIG. 40 shows the GC-MS trace of the oils (1.03% yield) obtained from a control experiment by heating HDPE in the presence of mSiO$_2$/SiO$_2$ for 6 h at 250° C. under H$_2$ (200 psi), venting the reactor at 250° C. Extraction of the oils was accomplished using methylene chloride heated at 80° C.
Figure 41:
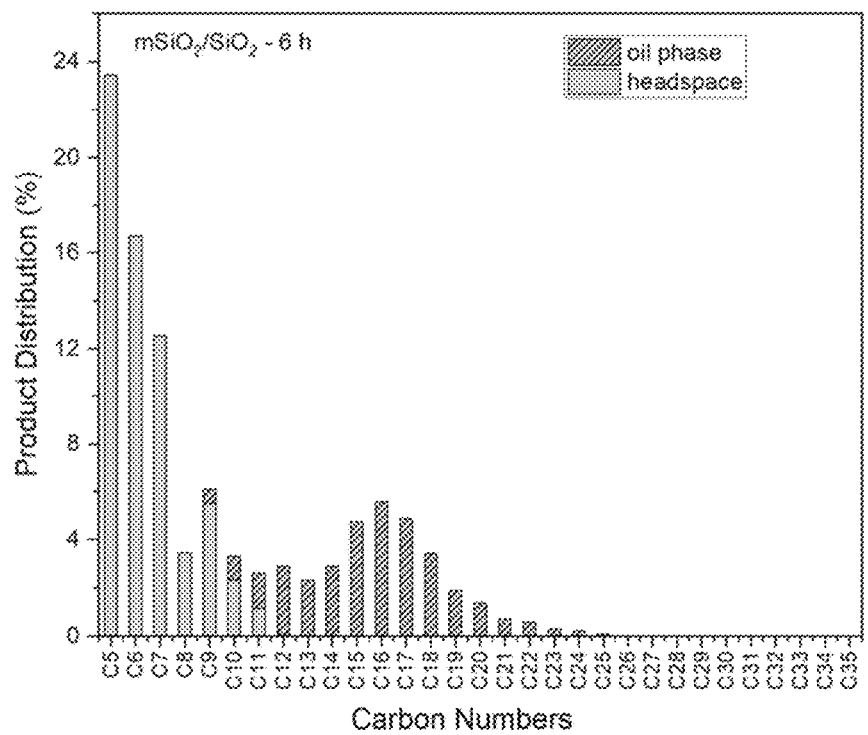
FIG. 41 shows the Carbon number distribution for products from the control experiment, in which HDPE and mSiO$_2$/SiO$_2$ were heated for 6 h at 250° C. under H$_2$ (200 psi), obtained from yield-weighted contributions of headspace and isolated oil.
Figure 42:
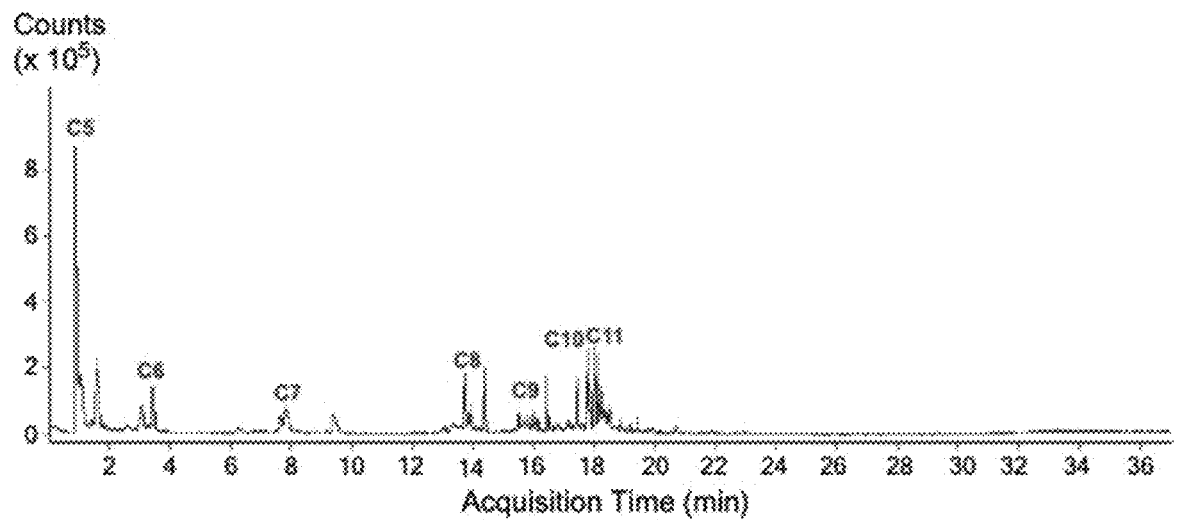
FIG. 42 shows the GC-MS trace of the volatile products (0.61% yield) from a control experiment performed in the absence of platinum or silica materials. The sample was obtained by heating HDPE for 6 h at 250° C. under H$_2$ (200 psi) without any additional catalyst, and then the headspace of the reactor was vented and sampled at 250° C.
Figure 43:
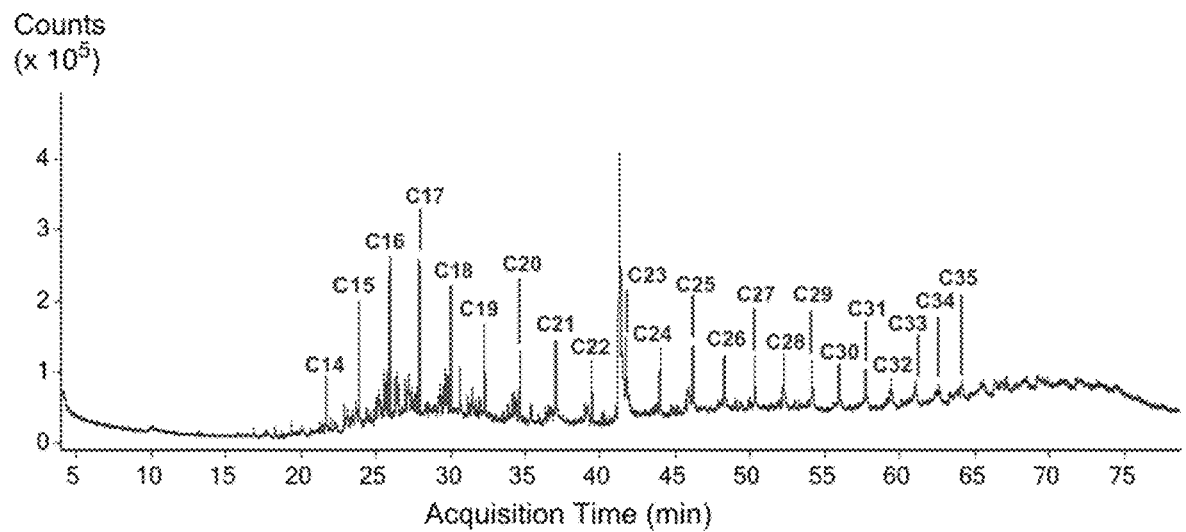
FIG. 43 shows the GC-MS trace of the oil products (0.68% yield) obtained from a control experiment performed in the absence of platinum or silica materials. The sample was obtained by heating HDPE for 6 h at 250° C. under H$_2$ (200 psi) without any additional catalyst, and then the headspace of the reactor was vented, and the residue was extracted with methylene chloride at 80° C.
Figure 44:
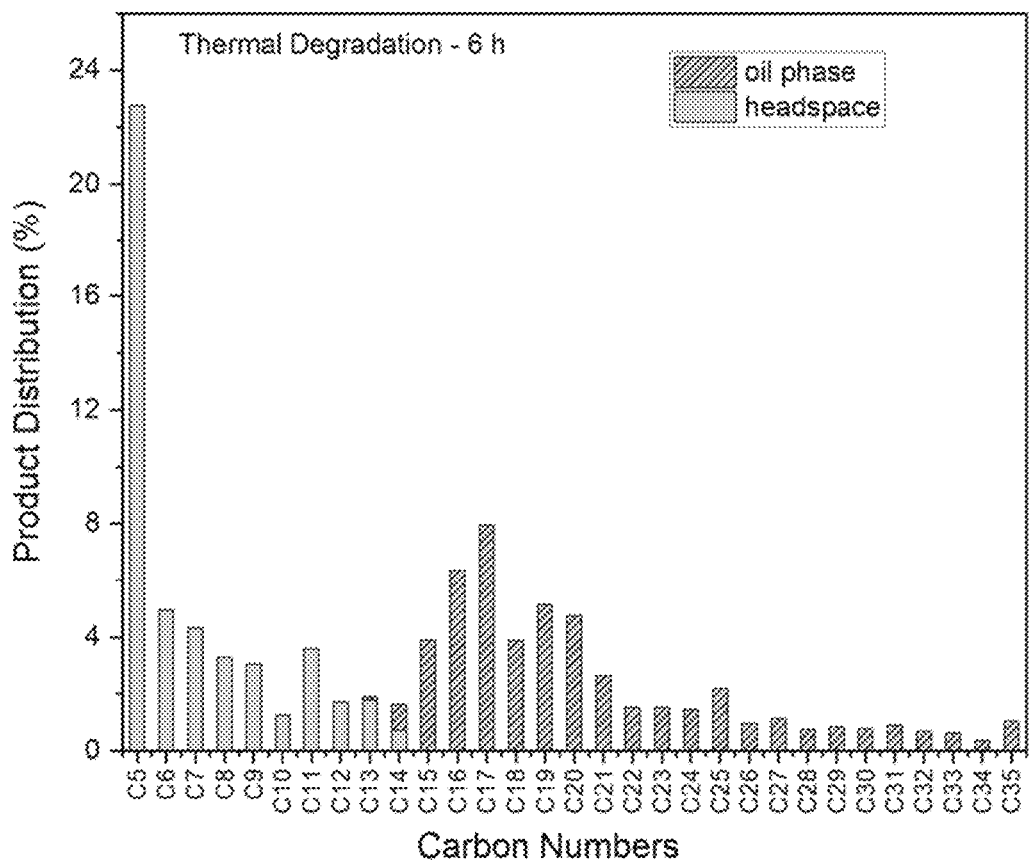
FIG. 44 shows the carbon number distribution for products from the control experiment, in which HDPE was heated for 6 h at 250° C. under H$_2$ (200 psi), obtained from yield-weighted contributions of headspace and isolated oil.
Figure 45:
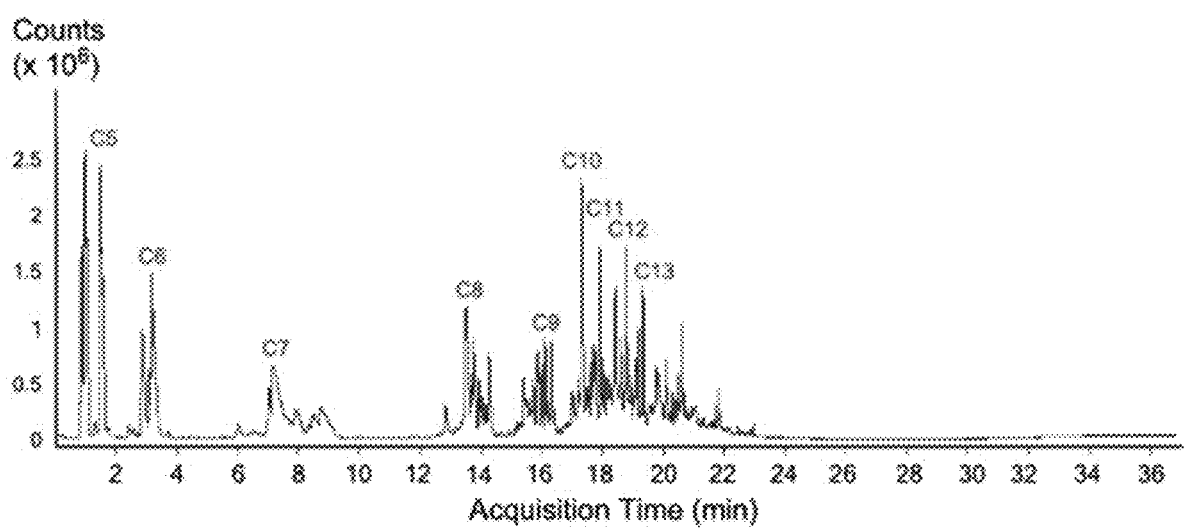
FIG. 45 shows the GC-MS trace of the sampled headspace for the hydrogenolysis reaction of HDPE (M$_n$=5.9 kDa, Đ=4.5) using mSiO$_2$/Pt/SiO$_2$ (0.06 Pt wt/silica wt %) as catalyst, conditions: 0.0013 Pt wt/HDPE wt % in the reactor for 24 h at 250° C. under H$_2$ (200 psi), cooled to room temperature and vented, give a yield of volatile species corresponding to 3.17% of the starting mass of HDPE.
Figure 46:
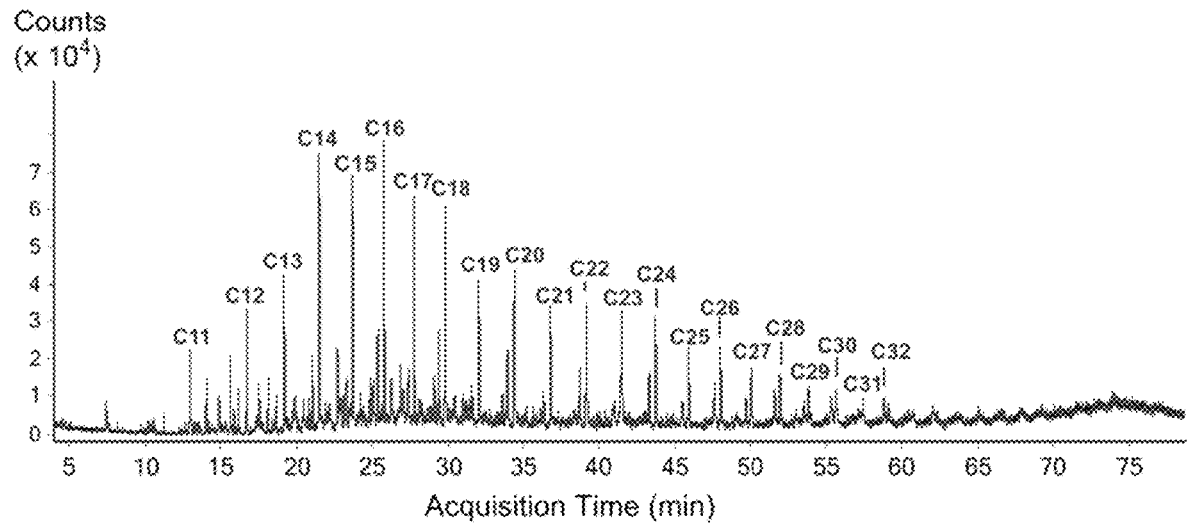
FIG. 46 shows the GC-MS of hydrogenolysis oil products (7.18% yield) from reaction of HDPE (M$_n$=5.9 kDa, Đ=4.5) using mSiO$_2$/Pt/SiO$_2$ (0.06 Pt wt/silica wt %) as catalyst, conditions: 0.0013 Pt wt/HDPE wt % in the reactor for 24 h at 250° C. under H$_2$ (200 psi), cooled and vented at room temperature, product was isolated by extraction of the solid reaction mixture with methylene chloride at 80° C.
Figure 47:
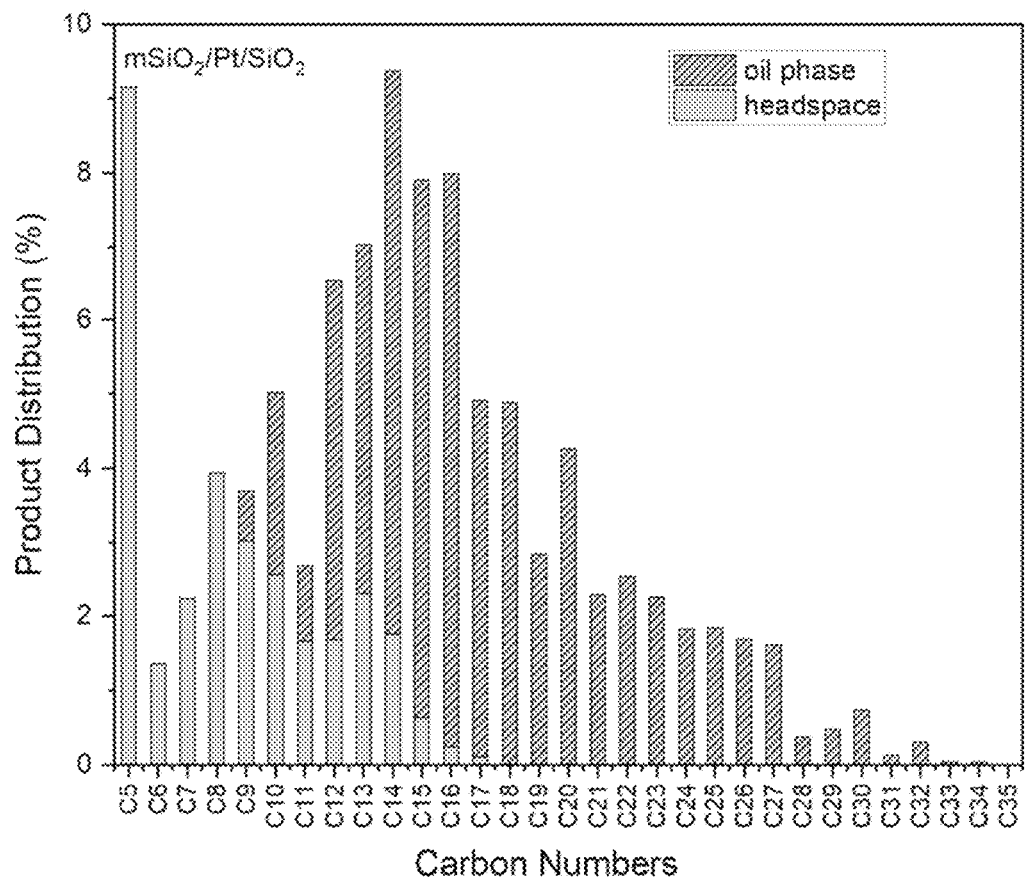
FIG. 47 shows the carbon number distribution (mass weighted) for the hydrogenolysis reaction of HDPE (M$_n$=5.9 kDa, Đ=4.5) using mSiO$_2$/Pt/SiO$_2$ (0.06 Pt wt/silica wt %) as catalyst, conditions: 0.0013 Pt wt/HDPE wt % in the reactor 24 h at 250° C. under H$_2$ (200 psi).
Figure 48:
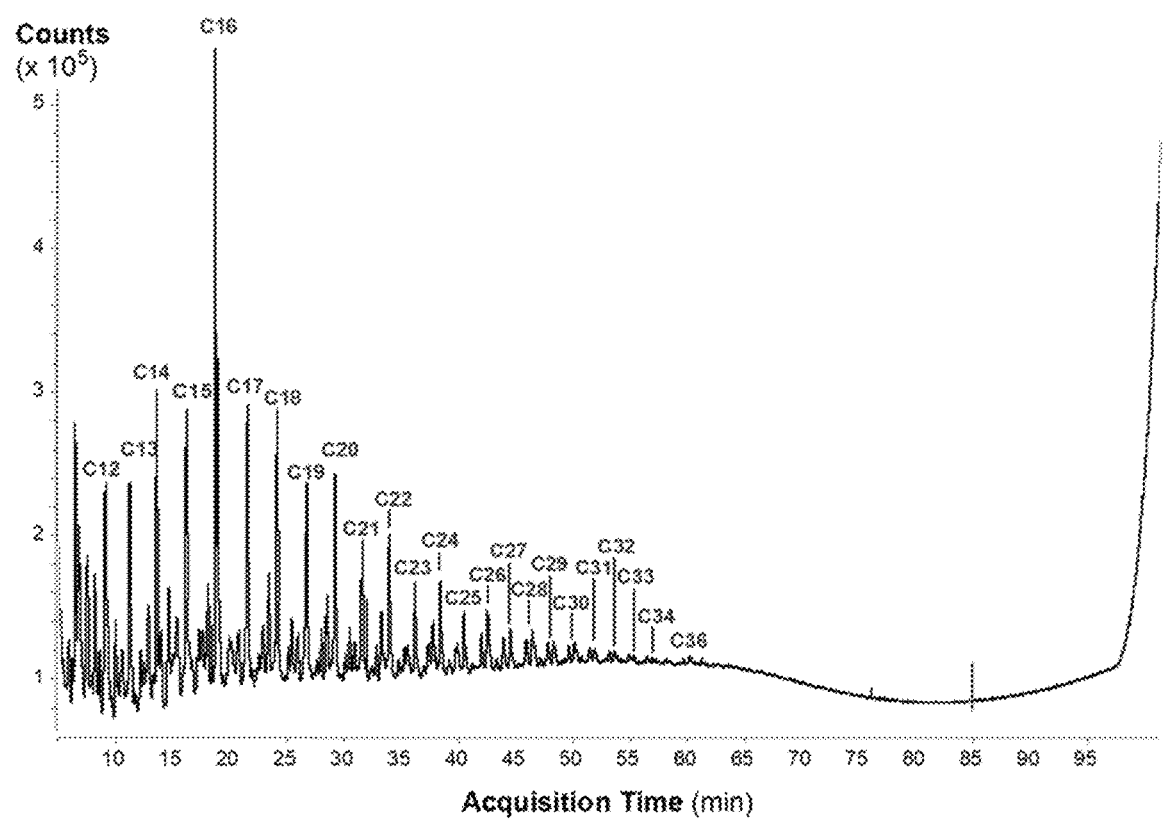
FIG. 48 shows the SimDist GC-FID, as a second method for analytical separation of hydrogenolysis oil products that highlights C$_{16}$-centered selectivity, from reaction of HDPE (M$_n$=5.9 kDa, Đ=4.5) using mSiO$_2$/Pt/SiO$_2$ (0.06 Pt wt/silica wt %) as catalyst, conditions: 0.0013 Pt wt/HDPE wt % in the reactor for 24 h at 250° C. and H$_2$ (200 psi), with the product isolated by extraction of the solid reaction mixture with methylene chloride at 80° C.
Figure 49:
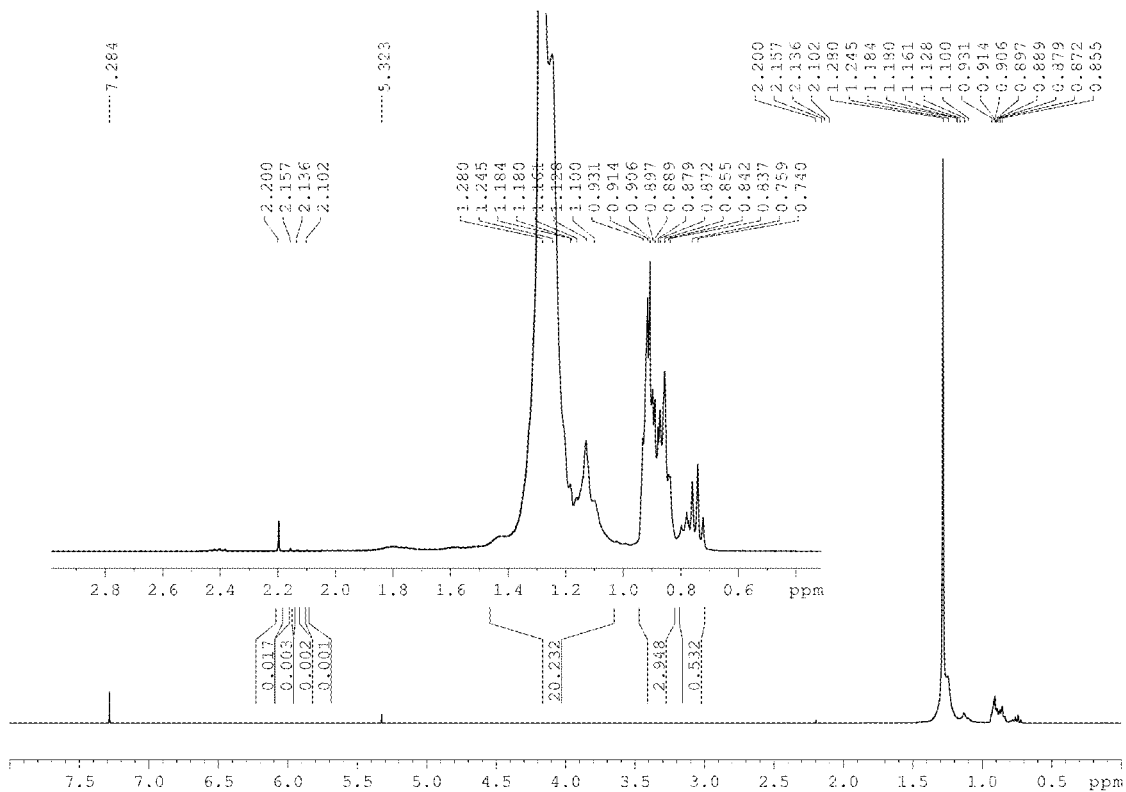
FIG. 49 shows the $^1$H NMR spectrum of oils obtained by hydrogenolysis using mSiO$_2$/Pt/SiO$_2$. (0.06 Pt wt/silica wt %) as catalyst, conditions: 0.0013 Pt wt/HDPE wt % in the reactor for 24 h at 250° C. under H$_2$ (200 psi), the product was isolated by extraction of the solid reaction mixture with methylene chloride at 80° C. Branching is 9.7 branches per 100 C, calculated by the formula (integral of CH$_3$/3)/{(Integral of CH+Integral of CH$_2$+Integral of CH$_3$)/2}×100.
Figure 50:
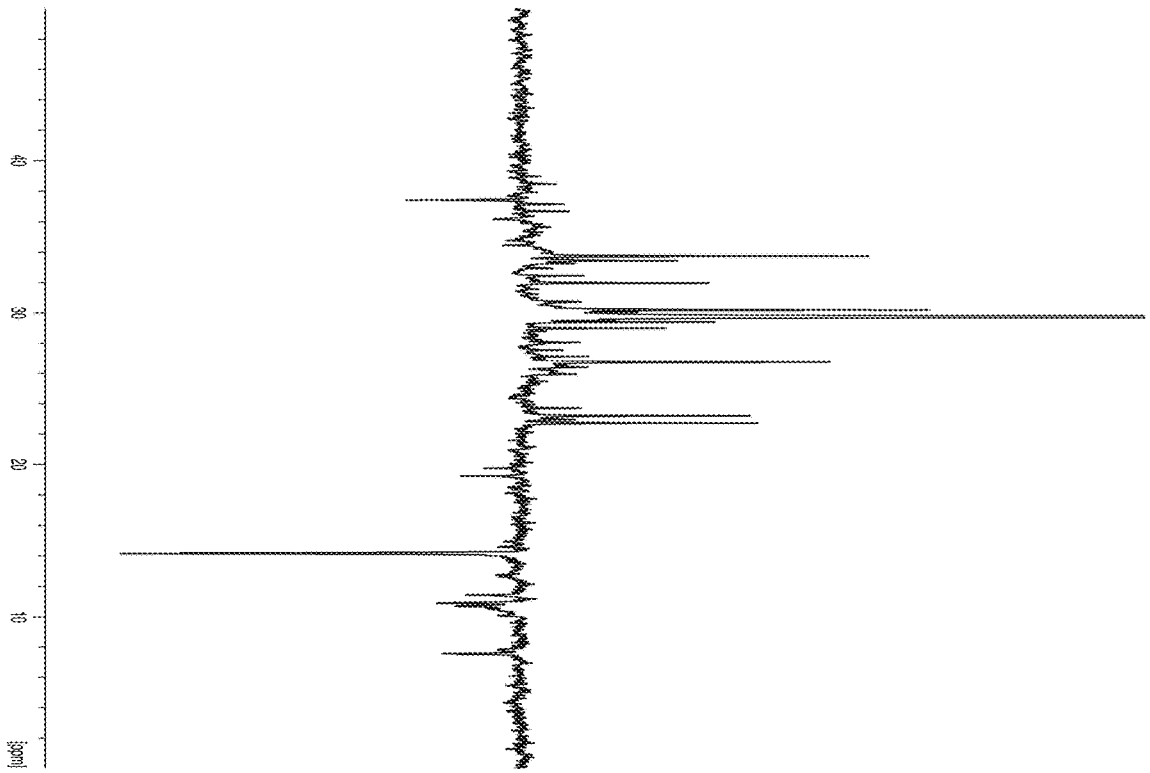
FIG. 50 shows the DEPT-135 NMR spectrum of oils obtained by hydrogenolysis using mSiO$_2$/Pt/SiO$_2$. (0.06 Pt wt/silica wt %) as catalyst, conditions: 0.0013 Pt wt/HDPE wt % in the reactor for 24 h at 250° C. under H$_2$ (200 psi), the product was isolated by extraction of the solid reaction mixture with methylene chloride at 80° C.

Gas chromatograms of the products and corresponding carbon number distribution from mSiO$_2$/Pt/SiO$_2$ catalyzed hydrogenolysis reactions are shown in FIGS. 24 to 26 and 31 to 34, while those of the Pt/SiO$_2$-catalyzed reactions are shown in FIGS. 27 to 29 and 35 to 37; comparisons of carbon number distribution are given in FIGS. 30 and 38. GC and carbon number distributions for control experiments without Pt and without inorganic oxide are given in FIGS. 39 to 44.

Example 5—Hydrogenolysis at 24 h Reactions at 250° C.

Conversion of HDPE ($M_n$=5.9 kDa, Ð=4.5) into soluble small molecules by hydrogenolysis with mSiO$_2$/Pt/SiO$_2$ (0.06 Pt wt/silica wt %; 0.0013 Pt wt/HDPE wt %; 2.4 nm diameter mesopores) was 10.3% after 24 h, determined by the sum of masses of extracted, isolated oils and the mass of gaseous species produced (assessed by difference in mass of reaction mixture before and after catalytic reactions). Conversion is defined as above in 6 h reactions. Conversion was higher (20.3%) after 24 h in hydrogenolysis reactions using the nonporous Pt/SiO$_2$ catalyst (1.7 Pt wt/silica wt %; 0.0013 Pt wt/HDPE wt %) under identical conditions. Similar conversions are obtained with Pt/MCM-41 compared to mSiO$_2$/Pt/SiO$_2$, while the larger pore-sized Pt/SBA-15 catalytic material gave lower conversions. A hydrocracking catalyst NiMo/γ-Al$_2$O$_3$ also shows similar conversion of HDPE.

Yields of gas phase, oil phase, and residual solid are tabulated in Table 5. Of the low molecular weight products obtained from hydrogenolysis catalyzed by mSiO$_2$/Pt/SiO$_2$, 30.1% were released from the headspace while 69.3% were oils. A smaller percentage of the products from Pt/SiO$_2$-catalyzed hydrogenolysis were released from the headspace (21.5%) than from the mesoporous silica-based catalyst, and a larger percentage of oils (78.5%) were produced by Pt/SiO$_2$. Despite the similar pores sizes of mSiO$_2$/Pt/SiO$_2$ and Pt/MCM-41, the latter gives a broad unselective distribution. NiMo/γ-Al$_2$O$_3$ also gives a broad distribution of hydrocarbon products. That is, the mSiO$_2$/Pt/SiO$_2$ catalyst favors a distribution with lower molecular weight hydrocarbon chains. The residual polymeric materials that were not extracted into methylene chloride were analyzed by HT-GPC (described above).

TABLE 4

Catalytic data and mass balance of reactions performed at 250° C. for 6 h

| Catalyst | Pt loading (wt %)[a] | HDPE (g)[b] | Conversion to volatiles in g (%) | Conversion to liquids in g (%) | Solid residue in g (%) |
|---|---|---|---|---|---|
| mSiO$_2$/Pt/SiO$_2$[c] | 0.00087 | 3.130 | 0.105 (3.35%) | 0.107 (3.42%) | 2.918 (93.2%) |
| Pt/SiO$_2$[d] | 0.00099 | 3.032 | 0.121 (3.99%) | 0.121 (3.99%) | 2.790 (92.0%) |
| mSiO$_2$/Pt/SiO$_2$[e] | 0.00087 | 3.008 | 0.073 (2.4%) | 0.153 (5.09%) | 2.782 (92.5%) |
| Pt/SiO$_2$[f] | 0.0018 | 3.009 | 0.056 (1.9%) | 0.349 (11.6%) | 2.604 (86.5%) |
| mSiO$_2$/SiO$_2$ | — | 3.003 | 0.058 (1.93%) | 0.031 (1.03%) | 2.914 (97.0%) |
| Thermal[g] | — | 2.947 | 0.018 (0.61%) | 0.020 (0.68%) | 2.909 (98.7%) |

[a]wt % Pt with respect to HDPE.
[b]HDPE properties: $M_n$ = 5.9 kDa, Ð = 4.5.
[c]Pt loading on mSiO$_2$/Pt/SiO$_2$ catalyst (0.042 Pt wt/silica wt %); the pressurized reaction vessel was vented and headspace was sampled at 250° C. to examine volatile species under reaction conditions.
[d]Pt loading on Pt/SiO$_2$ catalyst (0.478 Pt wt/silica wt %); the pressurized reaction vessel was vented and headspace was sampled at 250° C. to examine volatile species under reaction conditions.
[e]Pt loading on mSiO$_2$/Pt/SiO$_2$ catalyst (0.040 Pt wt/silica wt %); the pressurized reaction vessel was vented and sampled at room temperature to examine volatile species.
[f]Pt loading on Pt/SiO$_2$ catalyst (0.59 Pt wt/silica wt %); reaction vessel was vented and sampled at room temperature to examine volatile species.
[g]The pressurized reaction vessel was vented and the headspace was sampled at 250° C. to examine volatile species.

TABLE 5

Catalytic data and mass balance of reactions performed for 24 h at 250° C.

| Catalyst | Pt loading (wt %)[a] | HDPE (g)[b] | Yield of volatiles (g) | Yield of liquids (g) | Solid residue (g) |
|---|---|---|---|---|---|
| mSiO$_2$/Pt/SiO$_2$[c] | 0.0013 | 3.024 | 0.096 (3.17%) | 0.217 (7.18%) | 2.711 (89.7%) |
| Pt/SiO$_2$[d] | 0.0013 | 3.001 | 0.131 (4.37%) | 0.478 (15.9%) | 2.392 (79.7%) |
| mSiO$_2$/Pt/SiO$_2$[e] | 0.0021 | 0.503[f] | 0.012 (2.4%) | 0.081 (16.1%) | 0.410 (81.5%) |
| mSiO$_2$/Pt/SiO$_2$[g] | 0.00087 | 2.999 | 0.157 (5.2%) | 0.385 (12.8%) | 2.457 (81.9%) |
| Pt/SiO$_2$[h] | 0.00087 | 3.008 | 0.271 (9.0%) | 0.487 (16.2%) | 2.250 (74.8%) |
| Pt/MCM-41[i] | 0.0008 | 3.023 | 0.081 (2.7%) | 0.420 (13.9%) | 2.522 (83.4%) |
| Pt/SBA-15[j] | 0.0008 | 3.037 | 0.038 (1.2%) | 0.195 (6.4%) | 2.804 (92.4%) |
| NiMo/Al$_2$O$_3$ | 98.8 mg | 3.059 | 0.057 (1.9%) | 0.360 (11.8%) | 2.642 (86.3%) |
| mSiO$_2$/SiO$_2$[k] | n.a. | 2.964 | 0.098 (3.3%) | 0.072 (2.5%) | 2.794 (94.3%) |

[a]Pt wt/HDPE %. The reaction vessels were vented and sampled at room temperature to examine volatile species.
[b]HDPE properties: $M_n$ = 5.9 kDa, Đ = 4.5 unless otherwise specified.
[c]mSiO$_2$/Pt/SiO$_2$ catalyst (0.06 Pt wt/silica wt %), 2.4 nm diameter mesopores.
[d]Pt/SiO$_2$ catalyst (1.7 Pt wt/silica wt %).
[e]mSiO$_2$/Pt/SiO$_2$ catalyst (0.04 Pt wt/silica wt %; 2.4 nm pores).
[f]Low polydispersity polyethylene sample from Scientific Polymer Products ($M_n$ = 15.4 kDa, Đ = 1.1).
[g]mSiO$_2$/Pt/SiO$_2$ catalyst (0.040 Pt wt/silica wt %).
[h]Pt/SiO$_2$ catalyst (0.59 Pt wt/silica wt %).
[i]0.9 Pt wt/silica wt %.
[j]0.8 Pt wt/silica wt %.
[k]0.065 g of mSiO$_2$/SiO$_2$.

Gas chromatograms of the products and corresponding carbon number distribution from mSiO$_2$/Pt/SiO$_2$ catalyzed hydrogenolysis reactions are shown in FIGS. 45 to 48 and 61 to 63. $^1$H NMR and DEPT-135 $^{13}$C NMR spectra are shown in FIGS. 49, 50, 56, and 57 from samples produced by the mSiO$_2$/Pt/SiO$_2$ catalyst.

Figure 51:
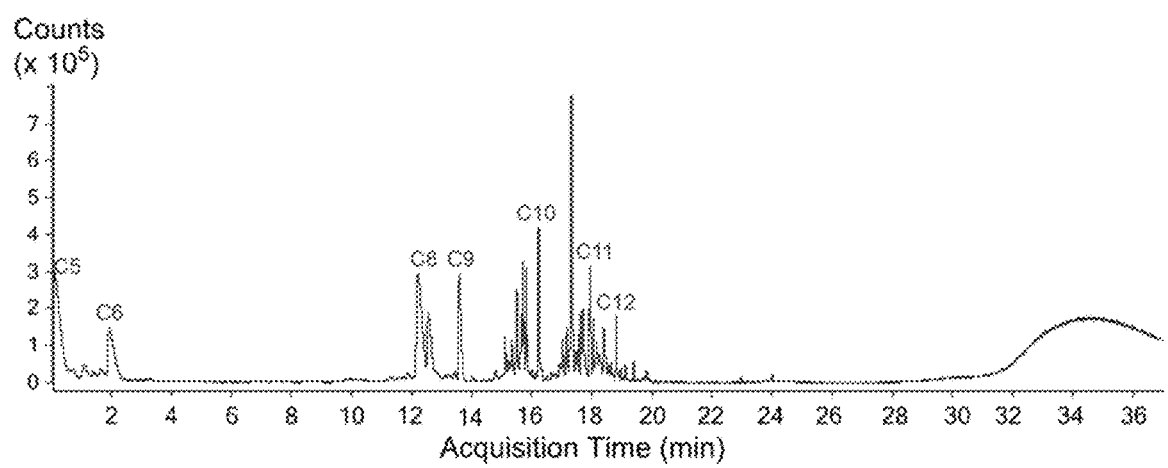
FIG. 51 shows the GC-MS chromatogram of the sampled headspace for the hydrogenolysis reaction of HDPE (M$_n$=5.9 kDa, Đ=4.5) using Pt/SiO$_2$ (1.7 Pt wt/silica wt %) as catalyst, conditions: 0.0013 Pt wt/HDPE wt % in the reactor for 24 h at 250° C. under H$_2$ (200 psi), yielding volatile species corresponding to 4.37% of the starting HDPE.
Figure 52:
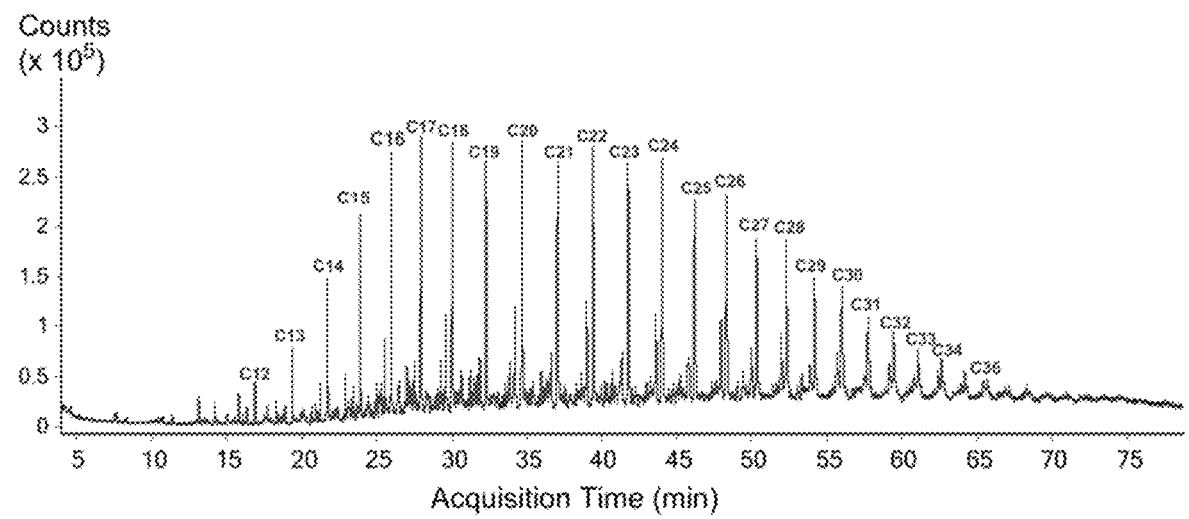
FIG. 52 shows the GC-MS of hydrogenolysis oil products (15.9% yield) from reaction of HDPE (M$_n$=5.9 kDa, Đ=4.5) using Pt/SiO$_2$ (1.7 Pt wt/silica wt %) as catalyst, conditions: 0.0013 Pt wt/HDPE wt % in the reactor for 24 h at 250° C. under H$_2$ (200 psi), isolated by extraction of the solid reaction mixture with methylene chloride at 80° C.
Figure 53:
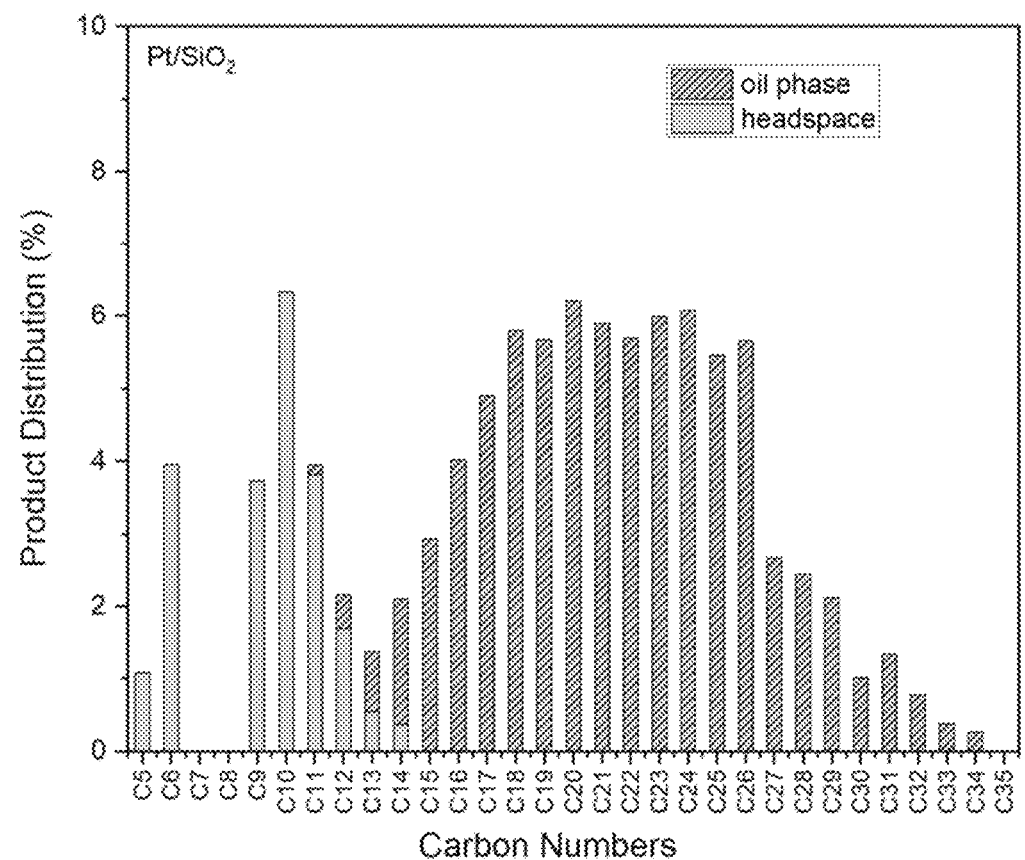
FIG. 53 shows the Carbon number distribution for the hydrogenolysis reaction of HDPE using Pt/SiO$_2$ (1.7 Pt wt/silica wt %) as catalyst, conditions: 0.0013 Pt wt/HDPE wt % in the reactor for 24 h at 250° C. under H$_2$ (200 psi).
Figure 54:
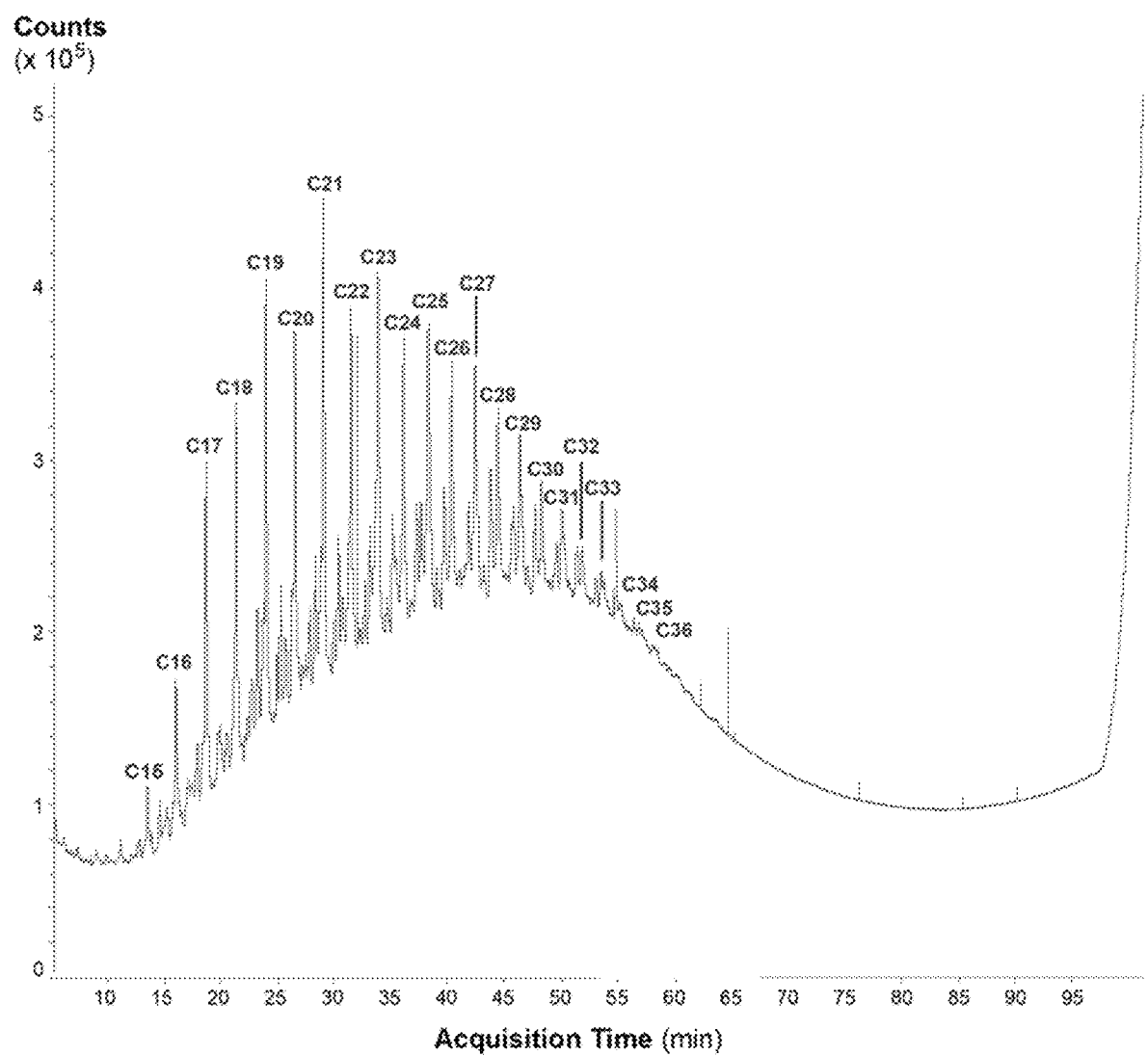
FIG. 54 shows the SimDist GC-FID, as a second method for analytical separation of hydrogenolysis oil products that highlights the broad distribution of hydrogenolysis oil products (15.9% yield) from reaction of HDPE using Pt/SiO$_2$ (1.7 Pt wt/silica wt %) as catalyst, conditions: 0.0013 Pt wt/HDPE wt % in the reactor for 24 h at 250° C. under H$_2$ (200 psi), the product was isolated by extraction of the solid reaction mixture with methylene chloride at 80° C.
Figure 56:
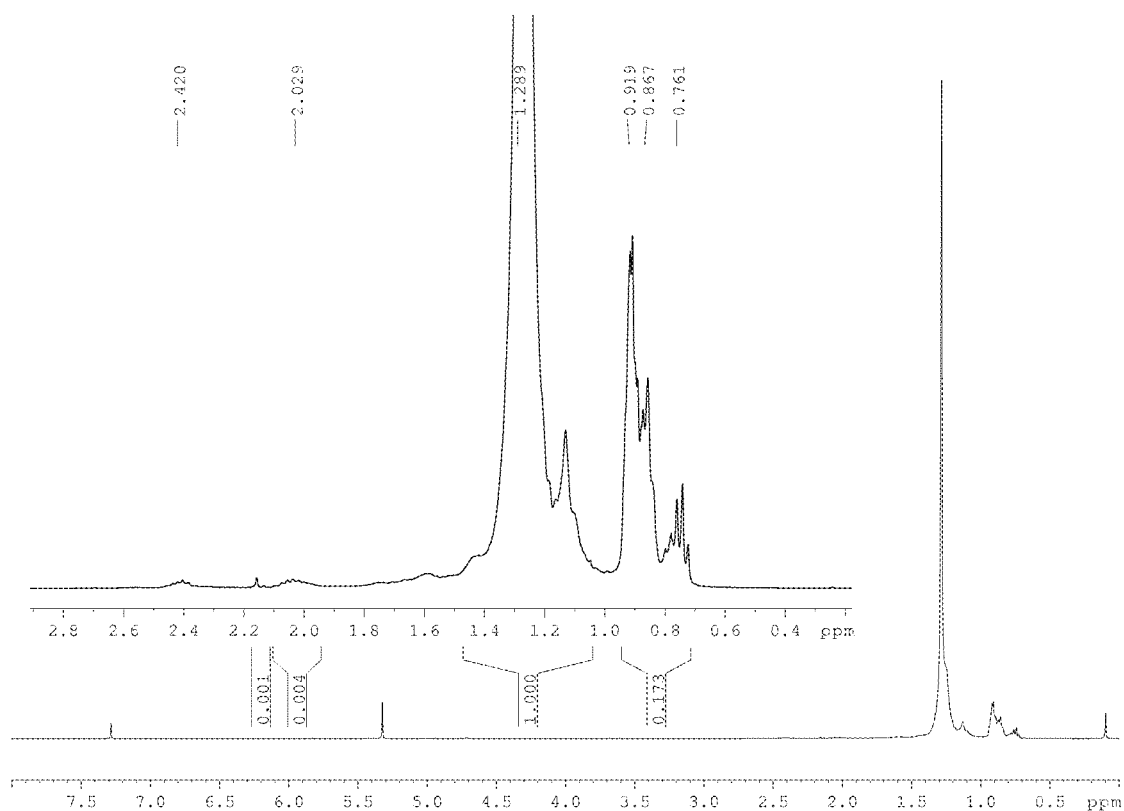
FIG. 56 shows the $^1$H NMR spectrum of oils obtained by hydrogenolysis using Pt/SiO$_2$ (1.7 Pt wt/silica wt %) as catalyst, conditions: 0.0013 Pt wt/HDPE wt % in the reactor for 24 h at 250° C. under H$_2$ (200 psi), the product was isolated by extraction of the solid reaction mixture with methylene chloride at 80° C.
Figure 57:
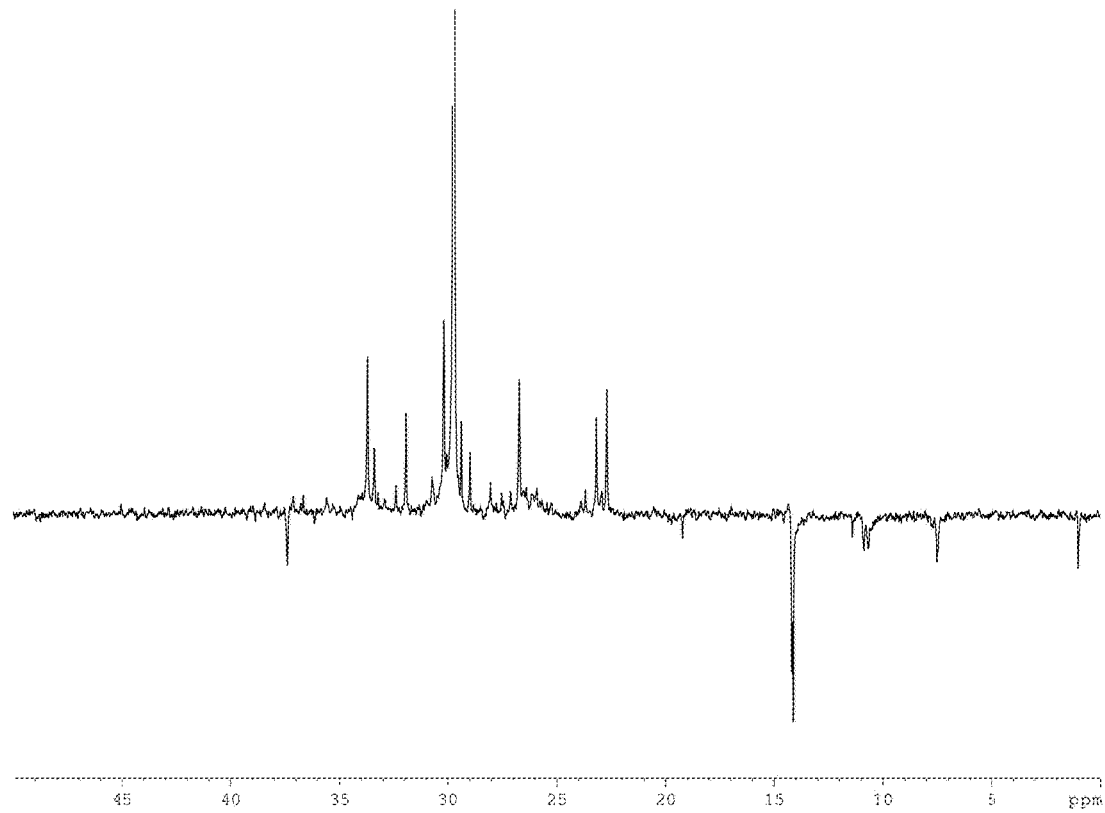
FIG. 57 shows the DEPT-135 NMR spectrum of oils obtained by hydrogenolysis using Pt/SiO$_2$ (1.7 Pt wt/silica wt %) as catalyst, conditions: 0.0013 Pt wt/HDPE wt % in the reactor for 24 h at 250° C. under H$_2$ (200 psi), the product was isolated by extraction of the solid reaction mixture with methylene chloride at 80° C.

Gas chromatograms of the products and corresponding carbon number distribution from Pt/SiO$_2$ catalyzed hydrogenolysis reactions are shown in FIGS. 51 to 53. SimDist GC-FID, as a second method for analytical separation of hydrogenolysis oil products that highlights the broad distribution of hydrogenolysis oil products (15.9% yield) from reaction of HDPE using Pt/SiO$_2$ is shown in FIG. 54. The $^1$H NMR spectrum of oils obtained by hydrogenolysis using Pt/SiO$_2$ (1.7 Pt wt/silica wt %) as catalyst are shown in FIG. 56 and the DEPT-135 NMR are shown in FIG. 57.

Figure 55:
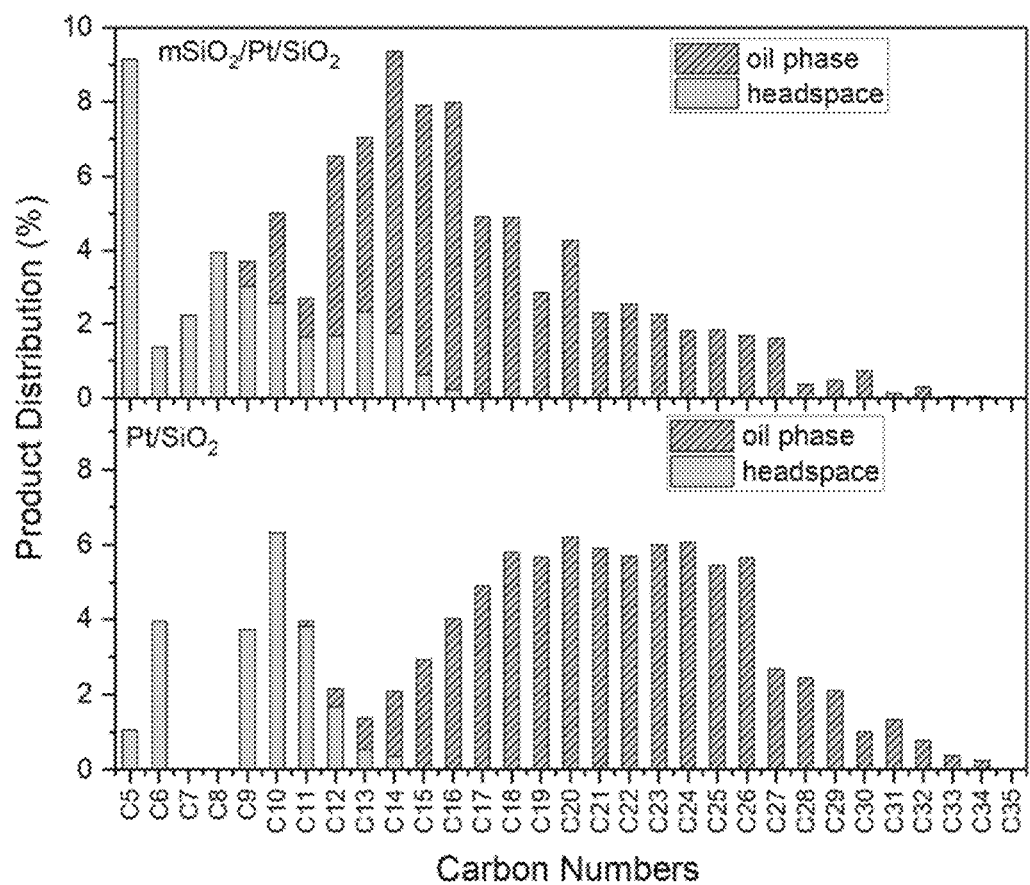
FIG. 55 shows the comparison of distributions of carbon numbers for hydrogenolysis reactions using the two catalysts, mSiO$_2$/Pt/SiO$_2$ and Pt/SiO$_2$ at 0.00013 Pt wt/HDPE wt % for 24 h at 250° C. under H$_2$ (200 psi).
Figure 67:
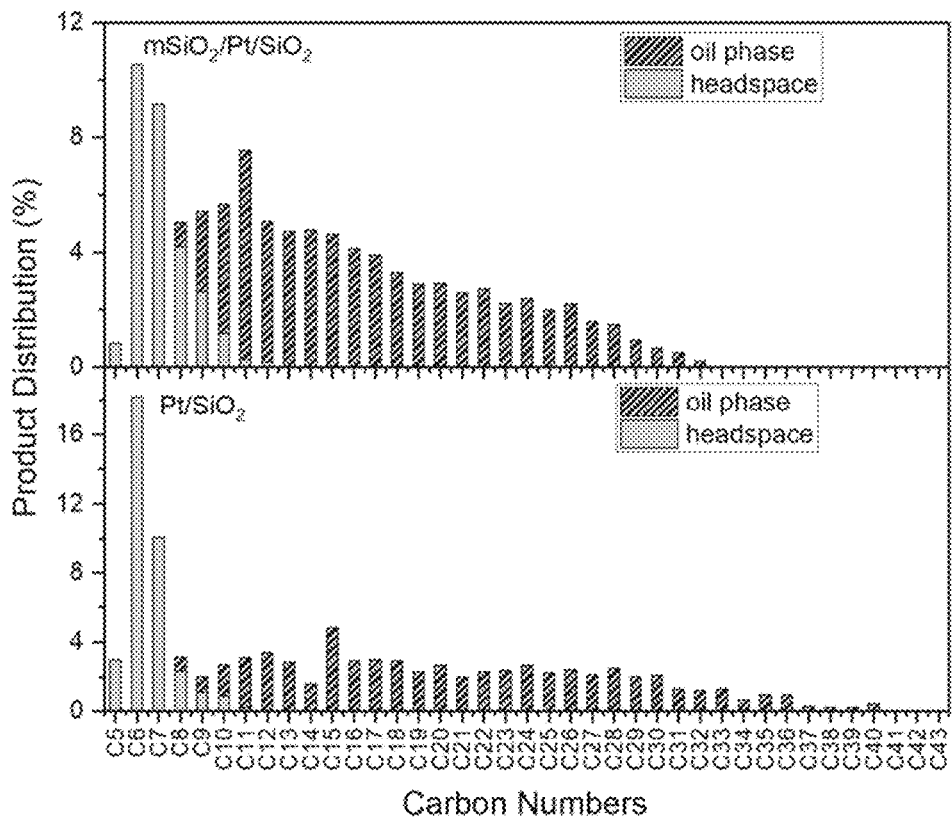
FIG. 67 shows a comparison of distributions of carbon numbers for hydrogenolysis reactions using the two catalysts, mSiO$_2$/Pt/SiO$_2$ and Pt/SiO$_2$ at 0.00087 Pt wt/HDPE wt % for 24 h at 250° C. under H$_2$ (200 psi), obtained from yield-weighted contributions of headspace and isolated oil.
Figure 68:
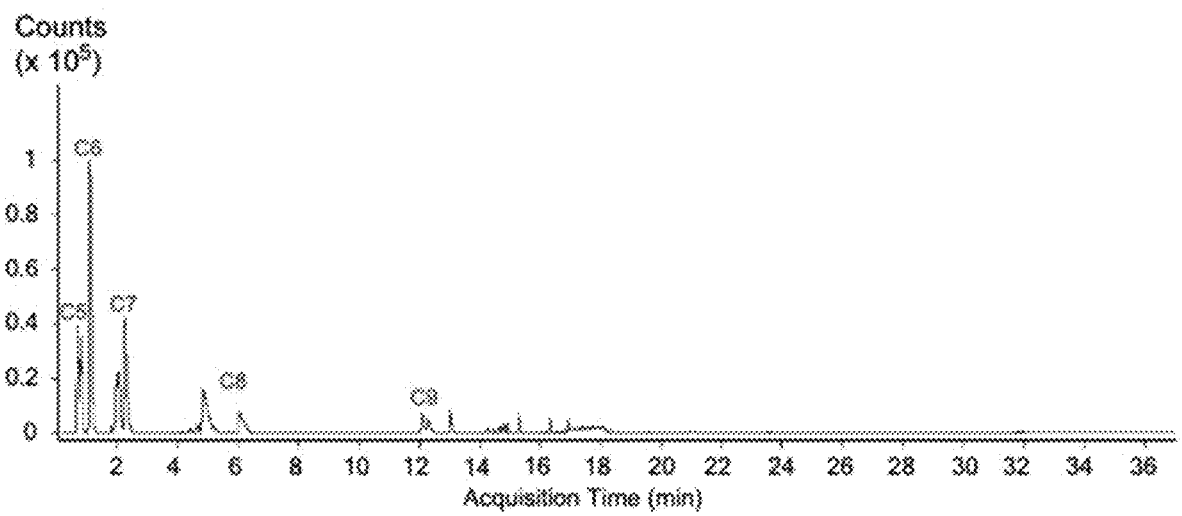
FIG. 68 shows the GC-MS chromatogram of the sampled headspace for the hydrogenolysis reaction of HDPE (M$_n$=5.9 kDa, Đ=4.5) using Pt/MCM-41 (0.9 Pt wt/silica wt %) as catalyst, conditions: 0.0008 Pt wt/HDPE wt % in the reactor for 24 h at 250° C. under H$_2$ (200 psi), yielding volatile species corresponding to 2.7% of the starting HDPE.
Figure 69:
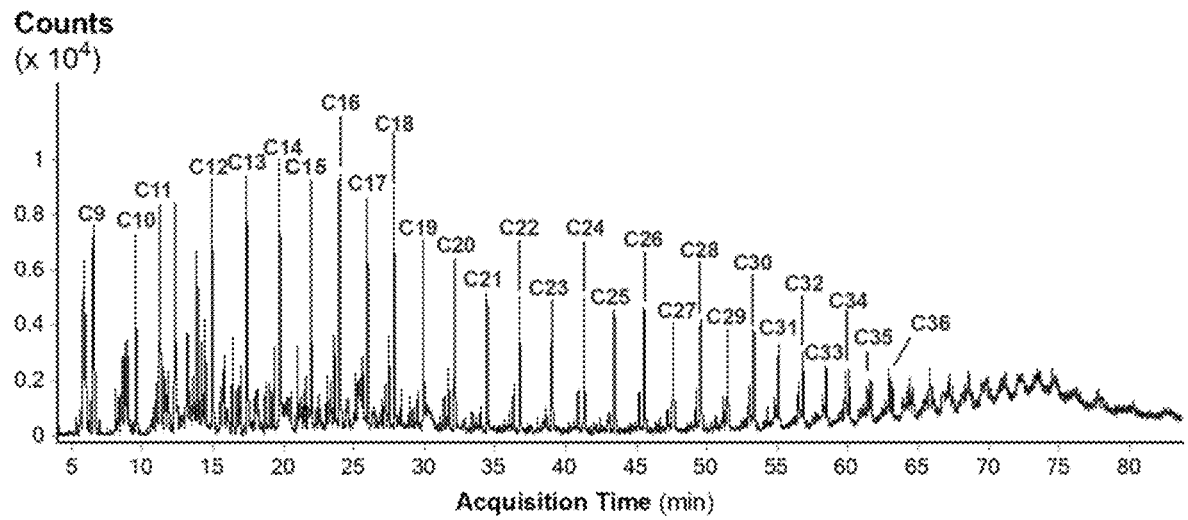
FIG. 69 shows the GC-MS of hydrogenolysis oil products (13.9% yield) from reaction of HDPE (M$_n$=5.9 kDa, Đ=4.5) using Pt/MCM-41 (0.9 Pt wt/silica wt %) as catalyst, conditions: 0.0008 Pt wt/HDPE wt % in the reactor for 24 h at 250° C. under H$_2$ (200 psi), isolated by extraction of the solid reaction mixture with methylene chloride at 80° C.
Figure 70:
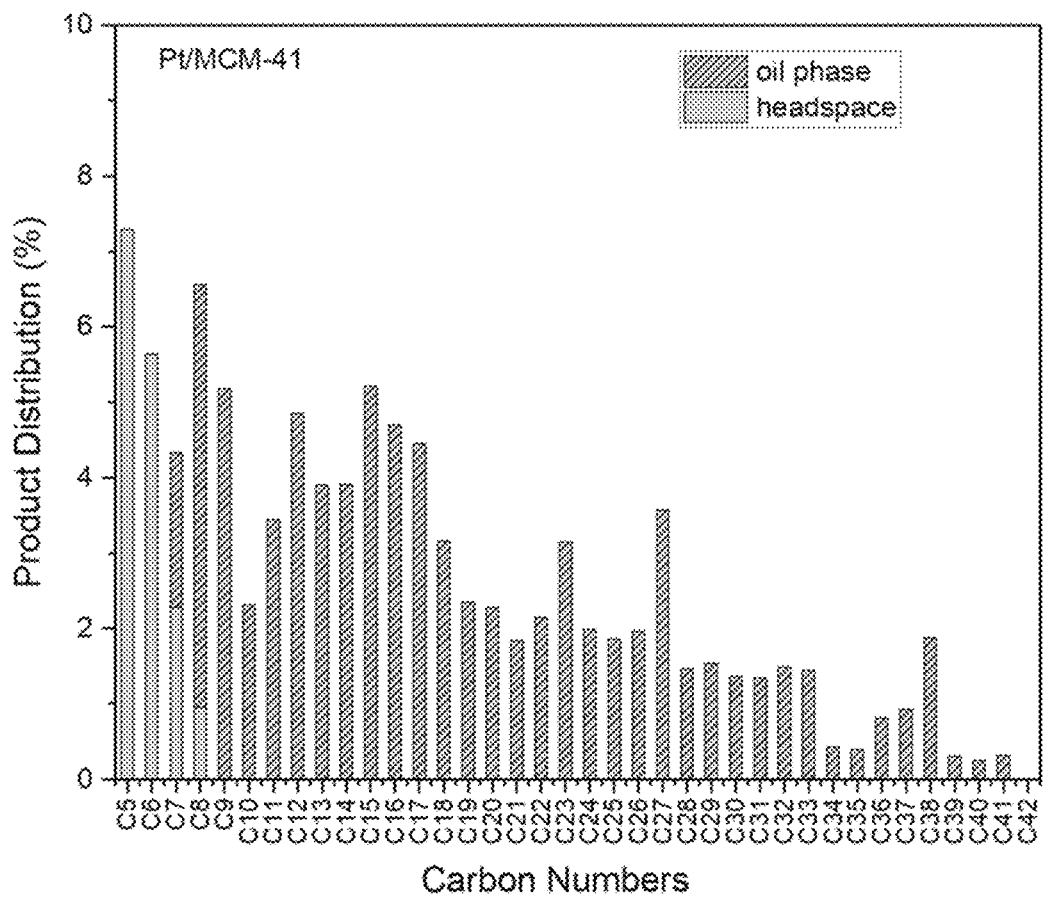
FIG. 70 shows the carbon number distribution for the hydrogenolysis reaction of HDPE (M$_n$=5.9 kDa, Đ=4.5) using Pt/MCM-41 (0.9 Pt wt/silica wt %) as catalyst, conditions: 0.0008 Pt wt/HDPE wt % in the reactor for 24 h at 250° C. under H$_2$ (200 psi).
Figure 71:
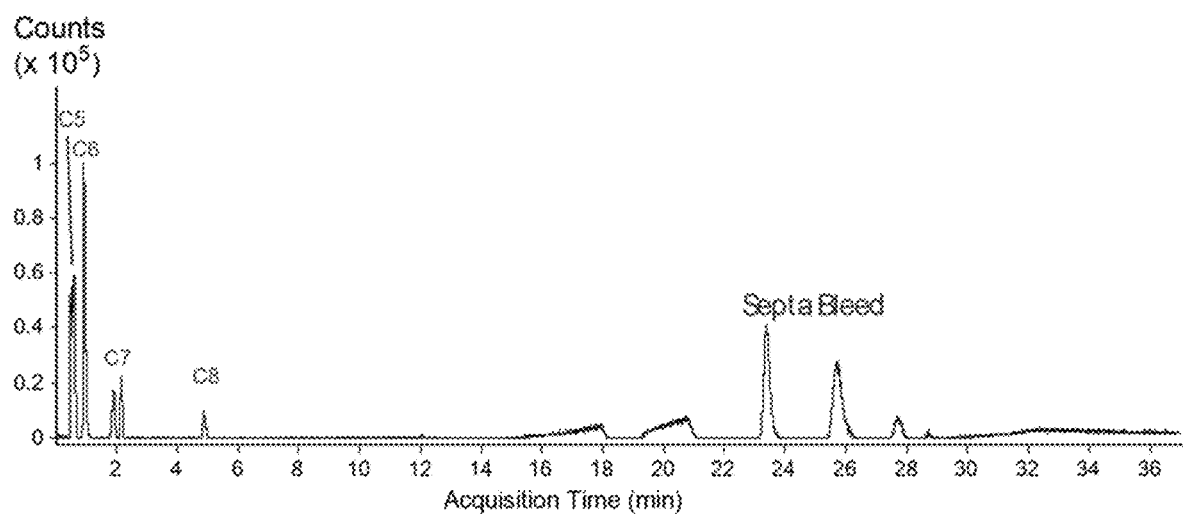
FIG. 71 shows the GC-MS chromatogram of the sampled headspace for the hydrogenolysis reaction of HDPE (M$_n$=5.9 kDa, Đ=4.5) using Pt/SBA-15 (0.8 Pt wt/silica wt %) as catalyst, conditions: 0.0008 Pt wt/HDPE wt % in the reactor for 24 h at 250° C. under H$_2$ (200 psi), yielding volatile species corresponding to 1.2% of the starting HDPE.
Figure 72:
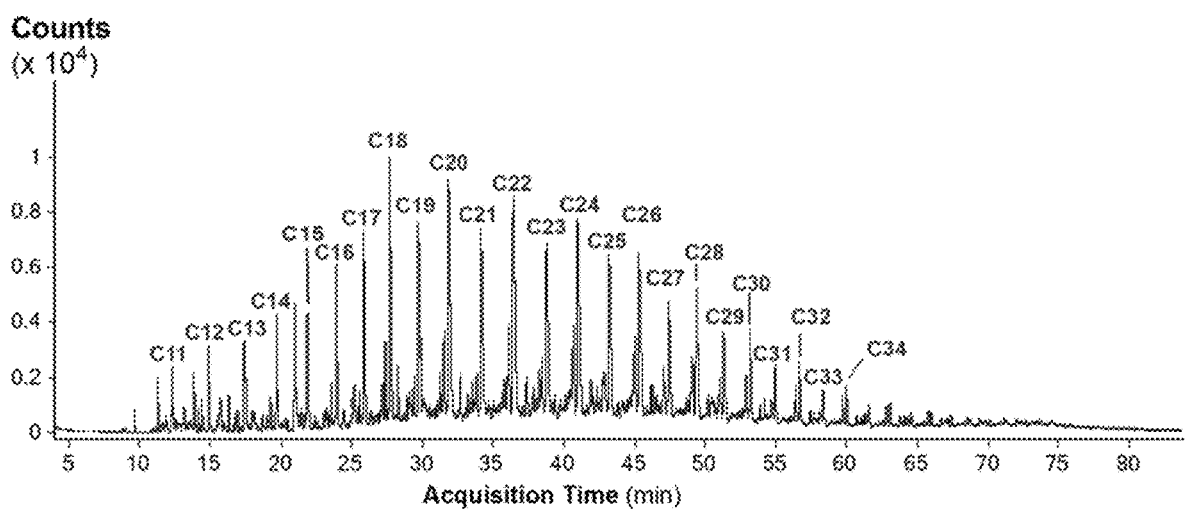
FIG. 72 shows the GC-MS of hydrogenolysis oil products (6.4% yield) from reaction of HDPE (M$_n$=5.9 kDa, Đ=4.5) using Pt/SBA-15 (0.8 Pt wt/silica wt %) as catalyst, conditions: 0.0008 Pt wt/HDPE wt % in the reactor for 24 h at 250° C. under H$_2$ (200 psi), isolated by extraction of the solid reaction mixture with methylene chloride at 80° C.
Figure 73:
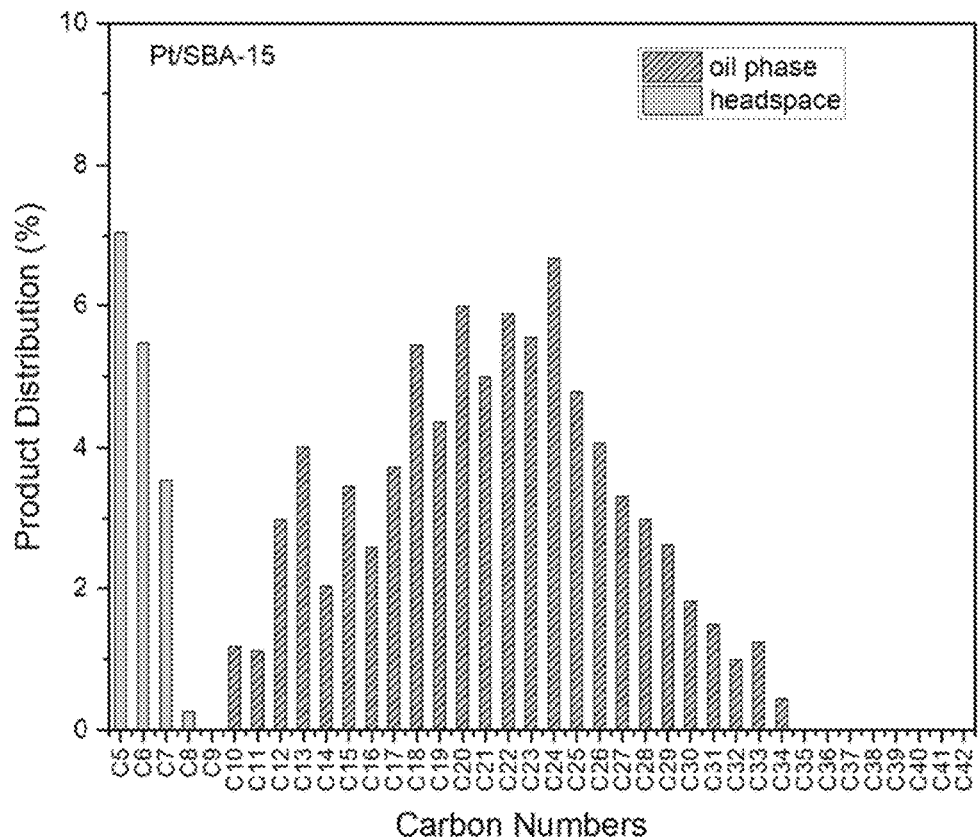
FIG. 73 shows the carbon number distribution for the hydrogenolysis reaction of HDPE (M$_n$=5.9 kDa, Đ=4.5) using Pt/SBA-15 (0.8 Pt wt/silica wt %) as catalyst, conditions: 0.0008 Pt wt/HDPE wt % in the reactor for 24 h at 250° C. under H$_2$ (200 psi).

SimDist GC-FID, as a second method for analytical separation of hydrogenolysis oil products that highlights the broad distribution of hydrogenolysis oil products (15.9% yield) from reaction of HDPE using Pt/SiO$_2$ (Comparisons of carbon number distributions from mSiO$_2$/Pt/SiO$_2$ and Pt/SiO$_2$ are given in FIGS. 55 and 67 for the two sets of experiments.

Figure 58:
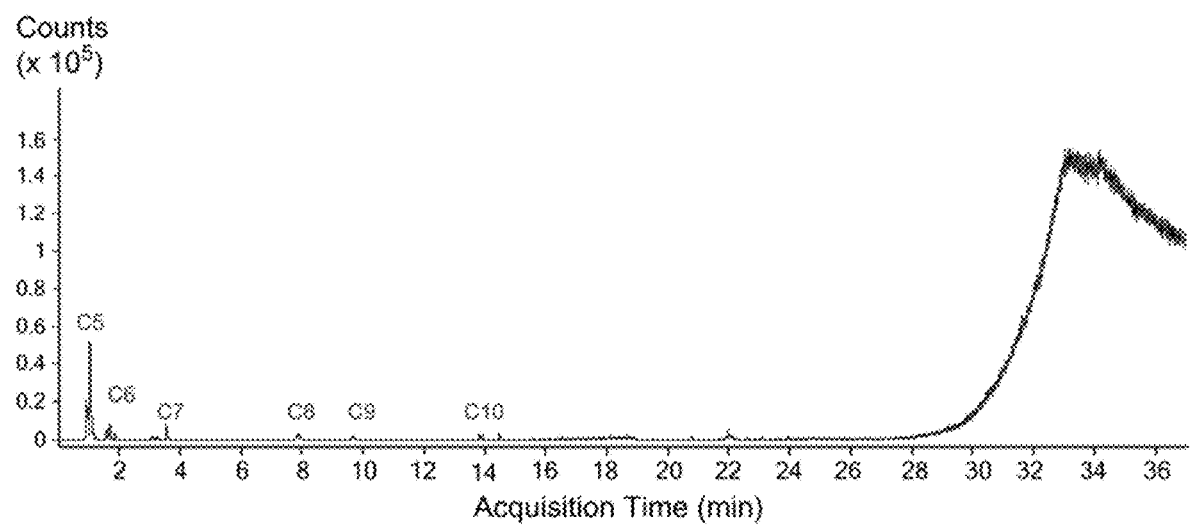
FIG. 58 shows the GC-MS chromatogram of the sampled headspace for the hydrogenolysis reaction of polyethylene (M$_n$=15.4 kDa, Đ=1.1) using mSiO$_2$/Pt/SiO$_2$ (0.04 Pt wt/silica wt %; 2.4 nm diameter mesopores) as catalyst, conditions: 0.0021 Pt wt/polyethylene wt % in the reactor for 24 h at 250° C. under H$_2$ (200 psi), yielding volatile species corresponding to 2.4% of the starting polyethylene.
Figure 59:
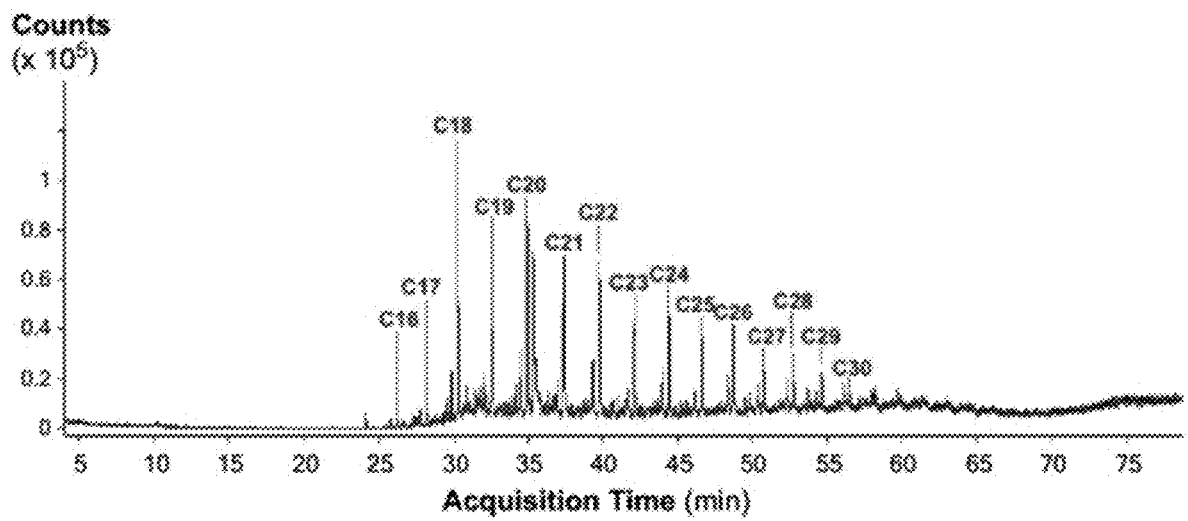
FIG. 59 shows the GC-MS of hydrogenolysis oil products (16.1% yield) from reaction of low dispersity polyethylene (M$_n$=15.4 kDa, Đ=1.1) using mSiO$_2$/Pt/SiO$_2$ (0.04 Pt wt/silica wt %, 2.4 nm diameter mesopores) as catalyst, conditions: 0.0021 Pt wt/polyethylene wt % in the reactor for 24 h at 250° C. under H$_2$ (200 psi), isolated by extraction of the solid reaction mixture with methylene chloride at 80° C.
Figure 60:
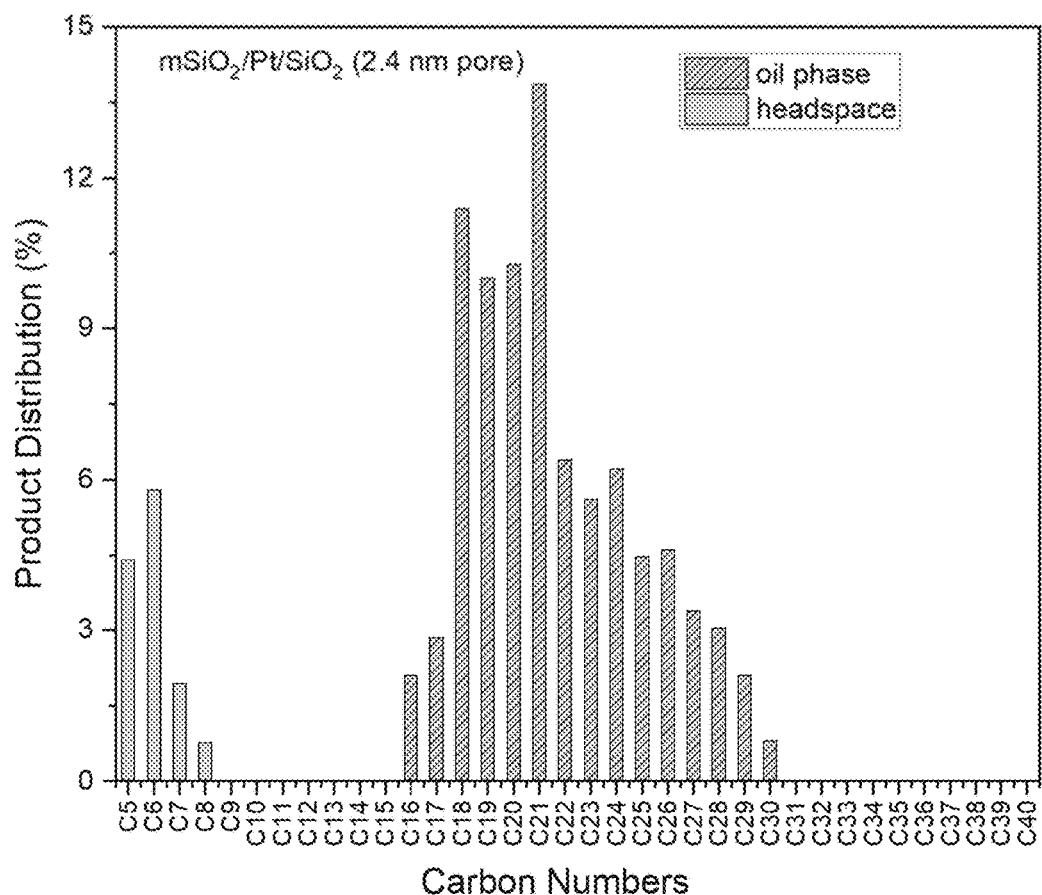
FIG. 60 shows the Carbon number distribution (mass weighted) for the hydrogenolysis reaction of low dispersity polyethylene (15.4 kDa, Đ=1.1) using mSiO$_2$/Pt/SiO$_2$ (0.04 Pt wt/silica wt %, 2.4 nm diameter mesopores) as catalyst, conditions: 0.0021 Pt wt/polyethylene wt % in the reactor 24 h at 250° C. under H$_2$ (200 psi).
Figure 61:
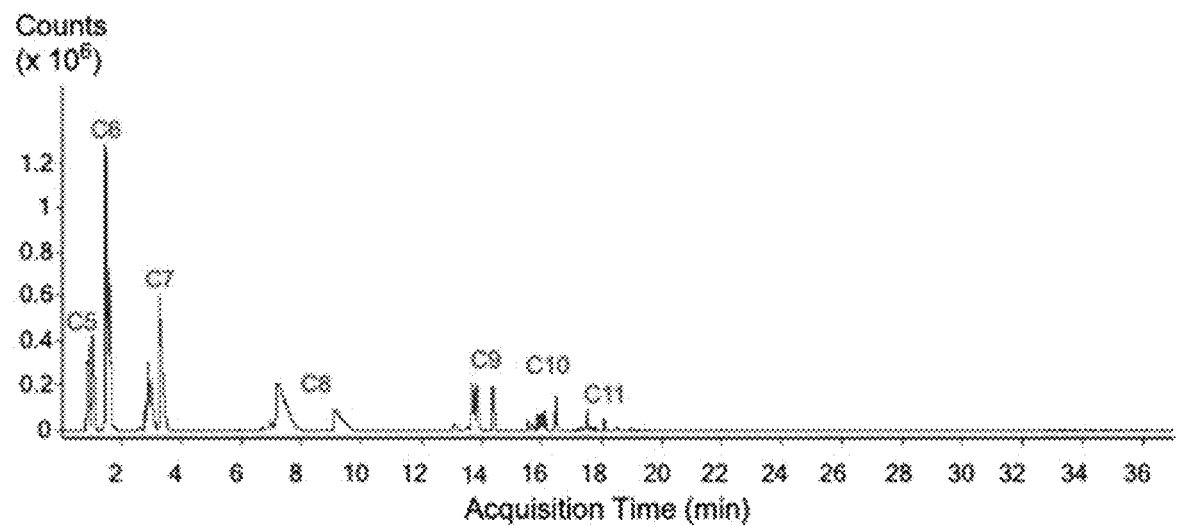
FIG. 61 shows the C-MS trace of the sampled headspace for the hydrogenolysis reaction of HDPE (M$_n$=5.9 kDa, Đ=4.5) using mSiO$_2$/Pt/SiO$_2$ (0.04 Pt wt/silica wt %) as catalyst, conditions: 0.00087 Pt wt/HDPE wt % in the reactor for 24 h at 250° C. under H$_2$ (200 psi), cooled to room temperature and vented, give a yield of volatile species corresponding to 5.2% of the starting mass of HDPE.
Figure 62:
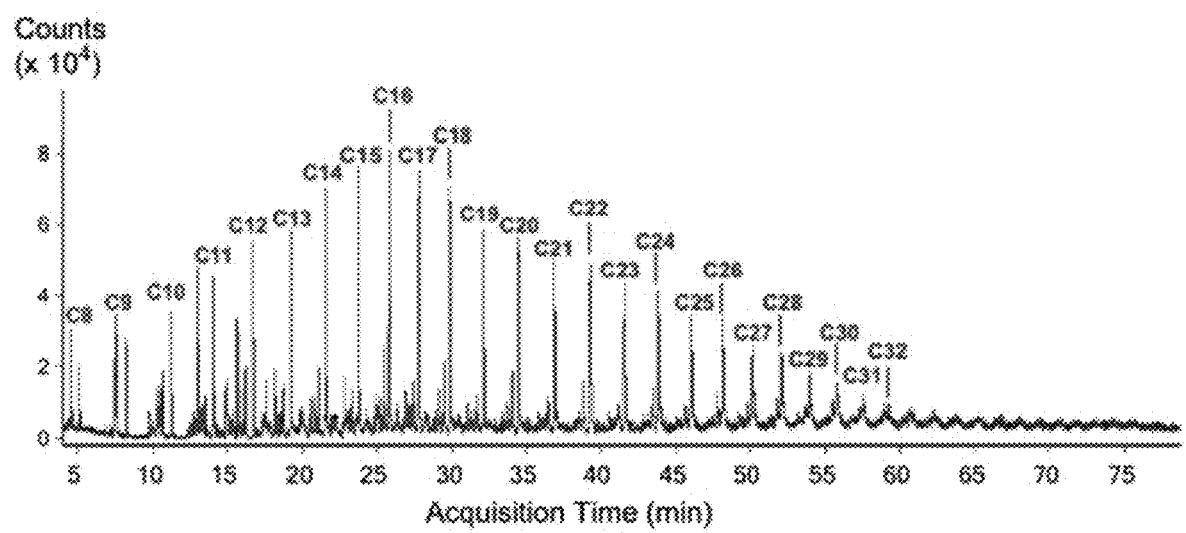
FIG. 62 shows the GC-MS of hydrogenolysis oil products (12.8% yield) from reaction of HDPE (M$_n$=5.9 kDa, Đ=4.5) using mSiO$_2$/Pt/SiO$_2$ (0.04 Pt wt/silica wt %) as catalyst, conditions: 0.00087 Pt wt/HDPE wt % in the reactor for 24 h at 250° C. under H$_2$ (200 psi), cooled and vented at room temperature, product was isolated by extraction of the solid reaction mixture with methylene chloride at 80° C.
Figure 63:
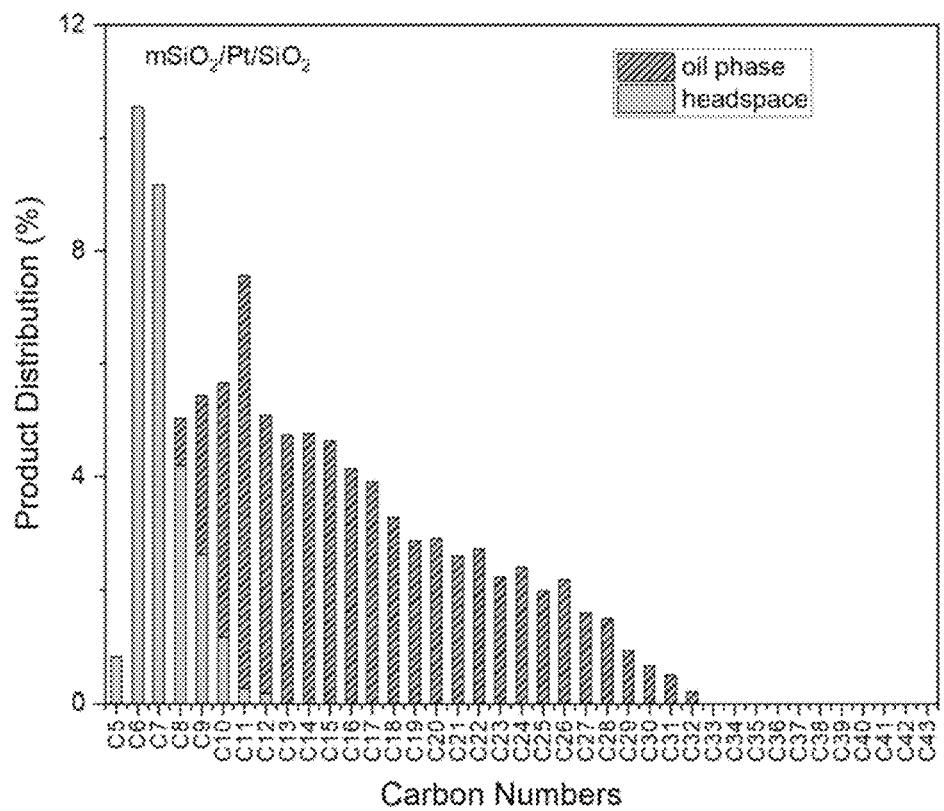
FIG. 63 shows the carbon number distribution (mass weighted) for the hydrogenolysis reaction of HDPE (M$_n$=5.9 kDa, Đ=4.5) using mSiO$_2$/Pt/SiO$_2$ (0.04 Pt wt/silica wt %) as catalyst, conditions: 0.00087 Pt wt/HDPE wt % in the reactor 24 h at 250° C. under H$_2$ (200 psi).

Gas chromatograms of the products and corresponding carbon number distribution from monodisperse polyethylene ($M_n$=15.4 kDa, Đ=1.1) from mSiO$_2$/Pt/SiO$_2$-catalyzed hydrogenolysis are shown in FIGS. 58 to 60.

Figure 64:
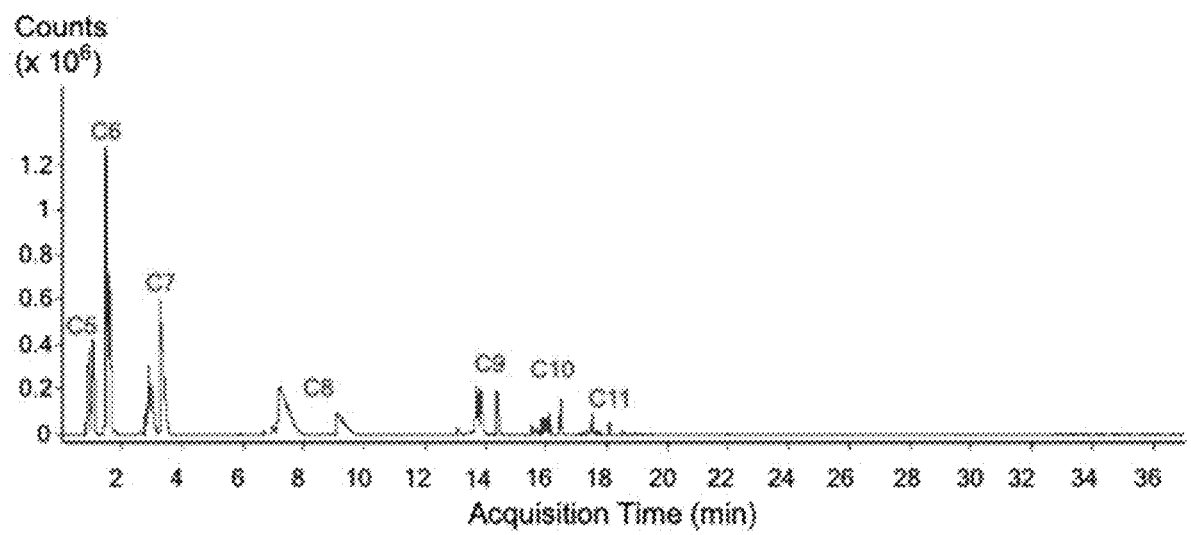
FIG. 64 shows the GC-MS chromatogram of the sampled headspace for the hydrogenolysis reaction of HDPE (M$_n$=5.9 kDa, Đ=4.5) using Pt/SiO$_2$ (0.59 Pt wt/silica wt %) as catalyst, conditions: 0.00087 Pt wt/HDPE wt % in the reactor for 24 h at 250° C. under H$_2$ (200 psi), yielding volatile species corresponding to 9.0% of the starting HDPE.
Figure 65:
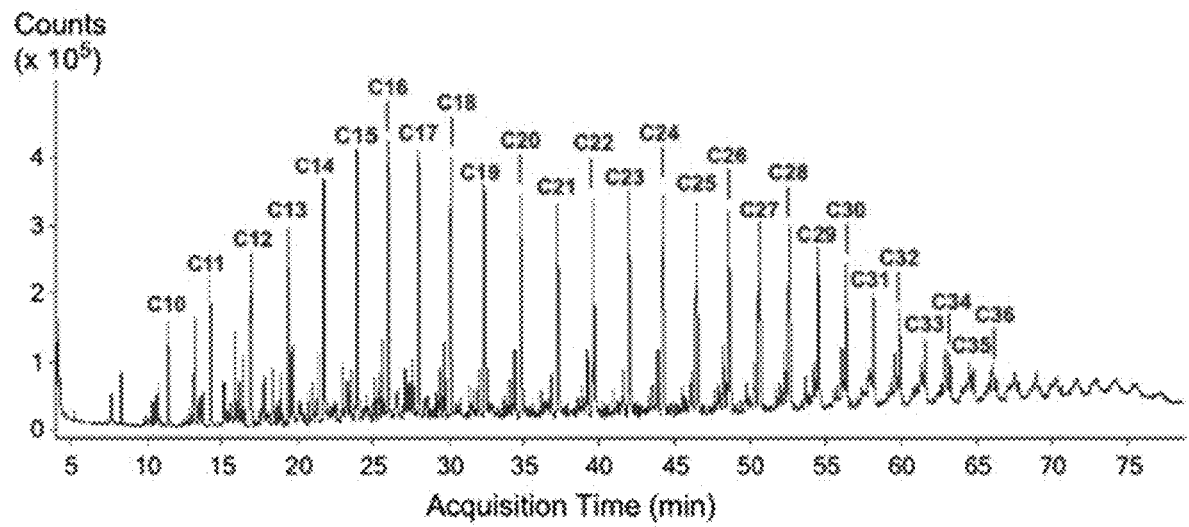
FIG. 65 shows the GC-MS of hydrogenolysis oil products (16.2% yield) from reaction of HDPE (M$_n$=5.9 kDa, Đ=4.5) using Pt/SiO$_2$ (0.59 Pt wt/silica wt %) as catalyst, conditions: 0.00087 Pt wt/HDPE wt % in the reactor for 24 h at 250° C. under H$_2$ (200 psi), isolated by extraction of the solid reaction mixture with methylene chloride at 80° C.
Figure 66:
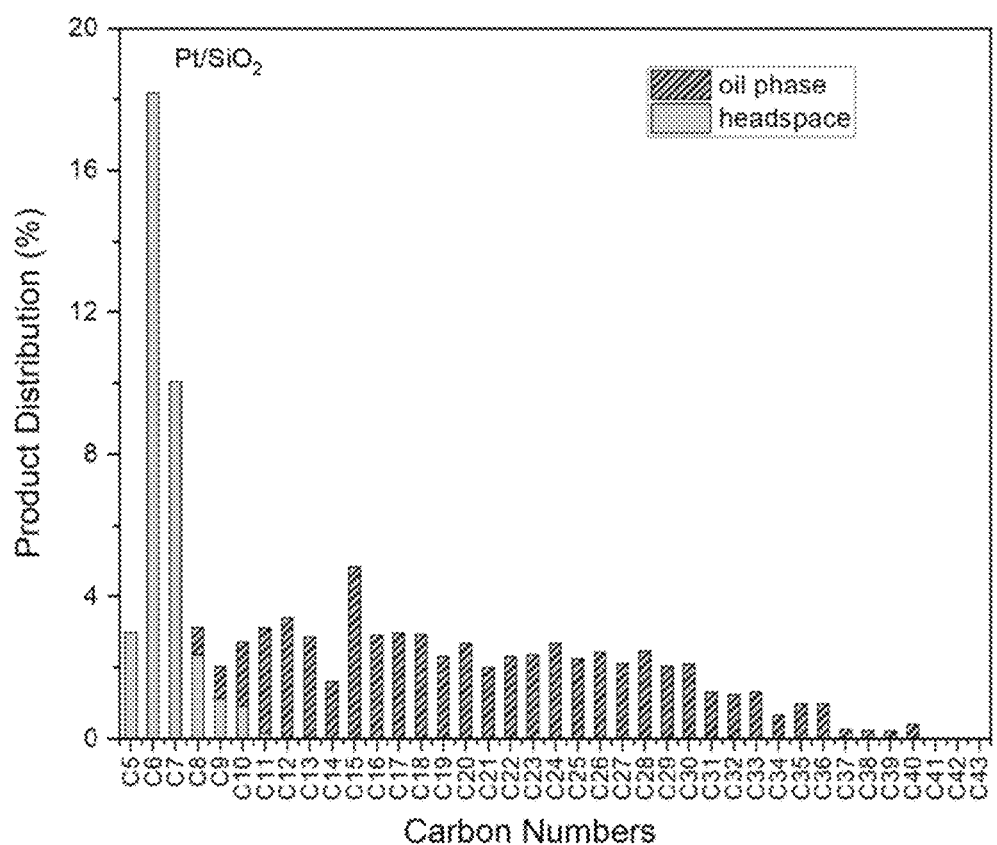
FIG. 66 shows the carbon number distribution for the hydrogenolysis reaction of HDPE (M$_n$=5.9 kDa, Đ=4.5) using Pt/SiO$_2$ (0.59 Pt wt/silica wt %) as catalyst, conditions: 0.00087 Pt wt/HDPE wt % in the reactor for 24 h at 250° C. under H$_2$ (200 psi).

Gas chromatograms of the products and corresponding carbon number distribution for the hydrogenolysis reaction of HDPE ($M_n$=5.9 kDa, Đ=4.5) using Pt/SiO$_2$ (0.59 Pt wt/silica wt %) as catalyst are shown in FIGS. 64-66.

Gas chromatograms of the products and corresponding carbon number distribution from Pt/MCM-41 and Pt/SBA-15 catalyzed hydrogenolysis reactions are shown in FIGS. 68 to 70 and 71 to 73, respectively.

Figure 74:
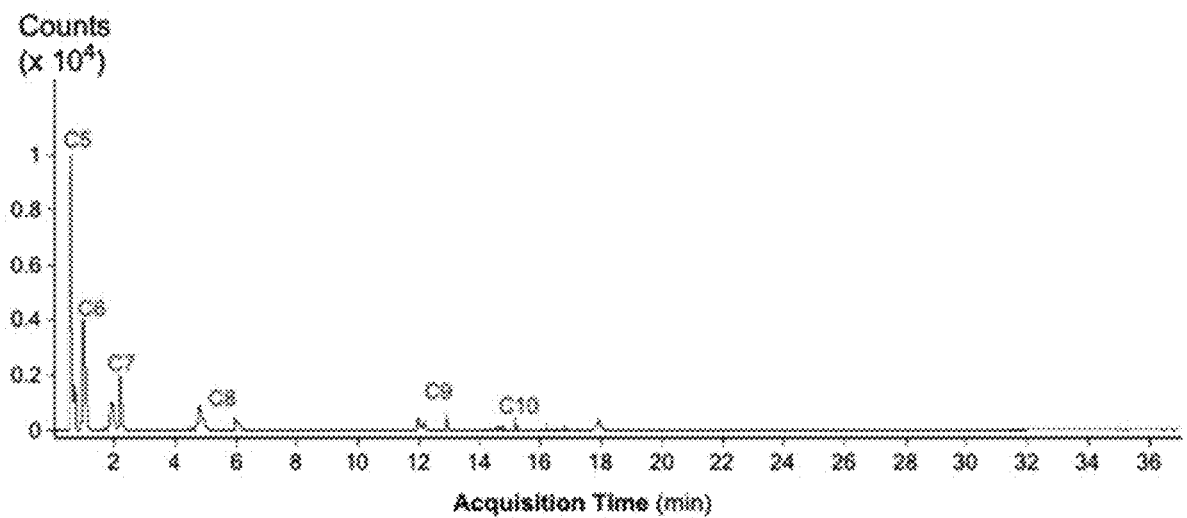
FIG. 74 shows the GC-MS chromatogram of the sampled headspace for the hydrogenolysis reaction of HDPE (M$_n$=5.9 kDa, Đ=4.5) using NiMo/Al$_2$O$_3$ (98.8 mg) as catalyst, conditions: 24 h at 250° C. under H$_2$ (200 psi), yielding volatile species corresponding to 1.9% of the starting HDPE.
Figure 75:
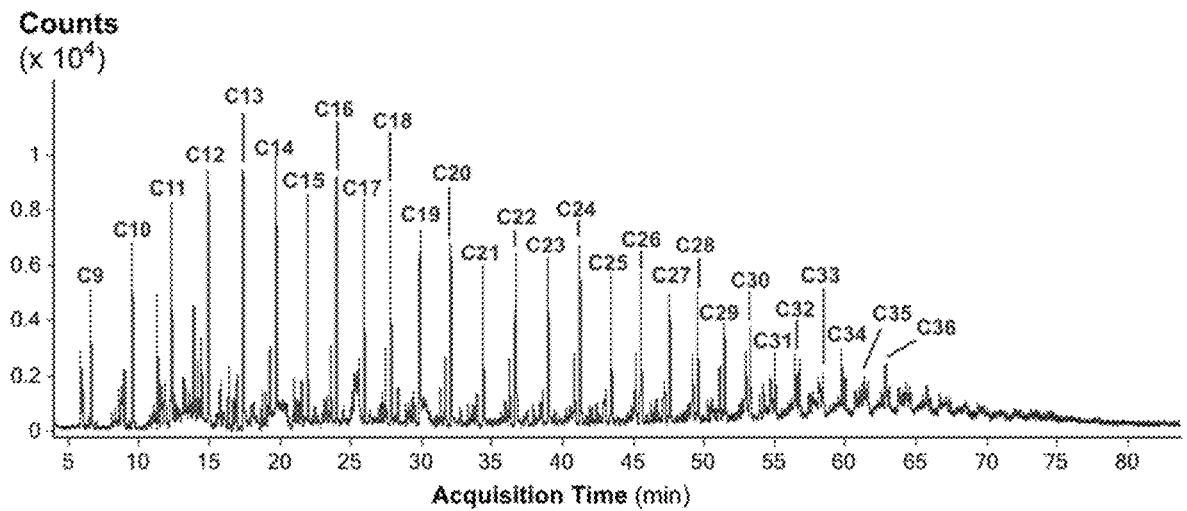
FIG. 75 shows the GC-MS of hydrogenolysis oil products (11.8% yield) from reaction of HDPE (M$_n$=5.9 kDa, Đ=4.5) using NiMo/Al$_2$O$_3$ (98.8 mg) as catalyst, conditions: 24 h at 250° C. under H$_2$ (200 psi), isolated by extraction of the solid reaction mixture with methylene chloride at 80° C.
Figure 76:
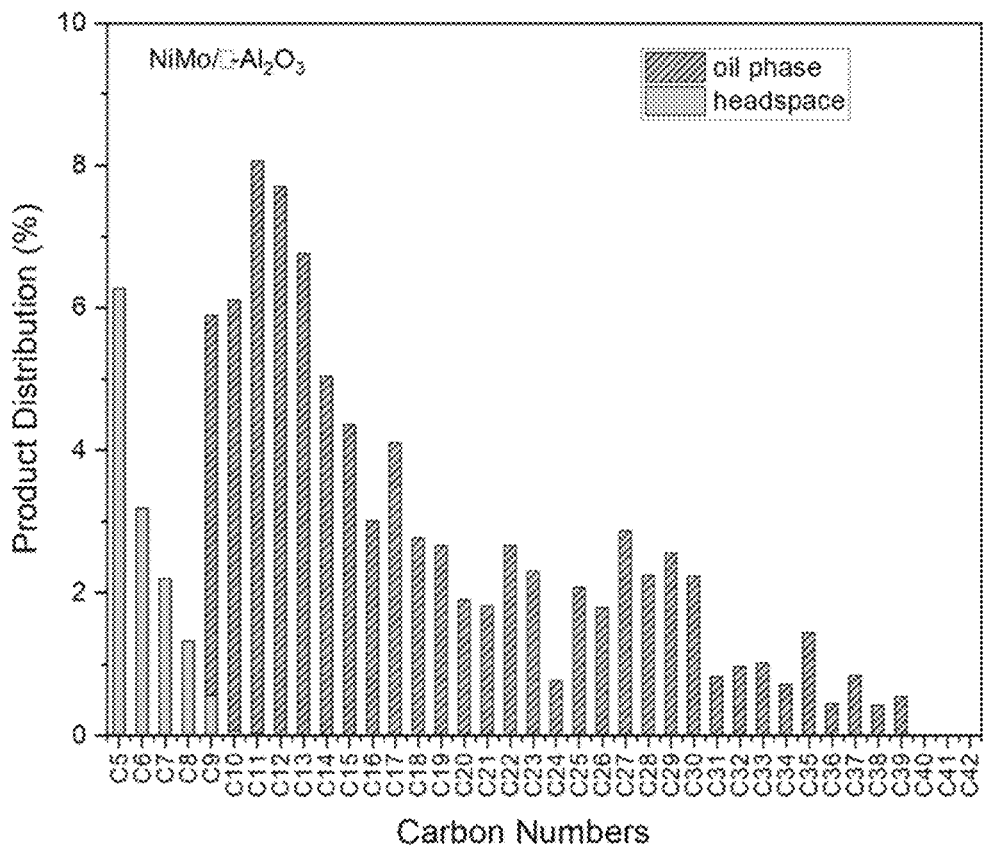
FIG. 76 shows the carbon number distribution for the hydrogenolysis reaction of HDPE (M$_n$=5.9 kDa, Đ=4.5) using NiMo/Al$_2$O$_3$ (98.8 mg) as catalyst, conditions: 24 h at 250° C. under H$_2$ (200 psi).

Gas chromatograms of the products and corresponding carbon number distribution from NiMo/Al$_2$O$_3$ catalyzed hydrogenolysis reactions are shown in FIGS. 74 to 76.

Figure 77:
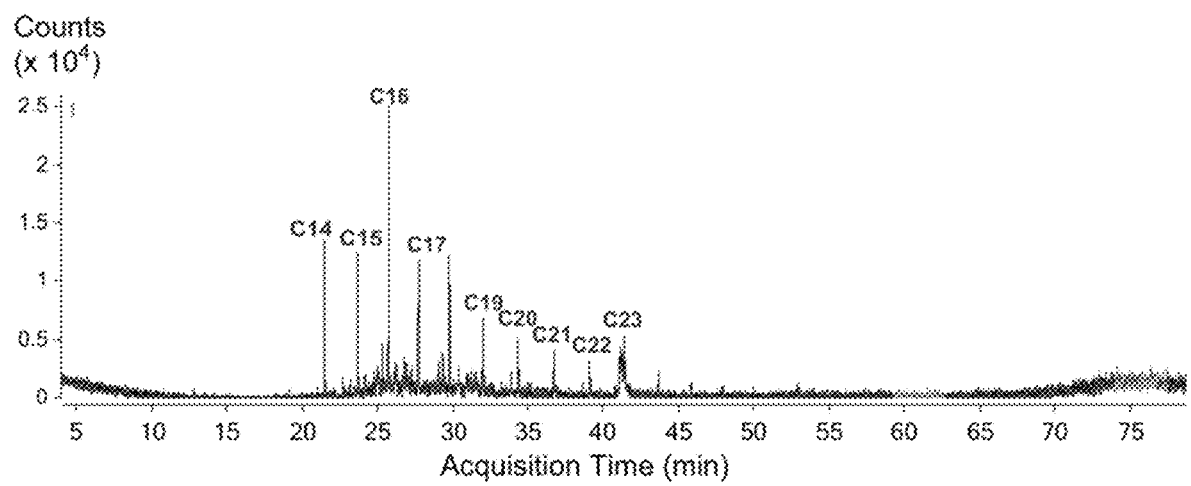
FIG. 77 shows the GC-MS of oil-phase products (2.5% yield) from thermal Pt-free reaction of HDPE using mSiO$_2$/SiO$_2$, conditions: 0.065 g mSiO$_2$/SiO$_2$ in the reactor for 24 h at 250° C. under H$_2$ (200 psi). Product was isolated by extraction of the solid reaction mixture with methylene chloride at 80° C.

Gas chromatograms for a control experiment, without Pt, is given in FIG. 77.

Example 6—Hydrogenolysis at 48 h Reactions at 250° C.

Conversion of HDPE into soluble small molecules by hydrogenolysis with mSiO$_2$/Pt/SiO$_2$ (0.06 Pt wt/silica wt %; 0.0013 Pt wt/HDPE wt %) after 48 h at 250° C. under H$_2$ (200 psi) was 24.1% (as described above in the experimental for 6 h reactions), determined by the sum of mass of extracted, isolated oils and the mass of gaseous species produced (assessed by difference in mass of reaction mixture before and after catalytic reactions). Conversion was only slightly higher (27.5%) after 48 h in hydrogenolysis reactions using the nonporous Pt/SiO$_2$ catalyst (1.7 Pt wt/silica wt %; 0.0013 Pt wt/HDPE wt %) under identical conditions.

Yields of gas phase, oil phase, and residual solid are tabulated in Table 6. Of the low molecular weight products obtained from hydrogenolysis catalyzed by mSiO$_2$/Pt/SiO$_2$, 23.4% were released from the headspace as volatile species while 76.7% were present in the oily condensed phase. An even smaller percentage of the products from Pt/SiO$_2$-catalyzed hydrogenolysis were released from the headspace (10.0%) than from the mesoporous silica-based catalyst, and a corresponding larger percentage of oils (90.0%) were formed. Thus, over the sequence of times measured (6 h, 24 h, 48 h), the mSiO$_2$/Pt/SiO$_2$ catalyst favors a distribution with lower molecular weight hydrocarbon chains compared to Pt/SiO$_2$. The residual polymeric materials that were not extracted into methylene chloride were analyzed by HT-GPC (described above).

TABLE 6

Catalytic data and mass balance of reactions performed at 250° C. for 48 h

| Catalyst[a] | Pt loading (wt %)[b] | HDPE (g)[c] | Conversion to volatiles (g) | Conversion to liquids (g) | Solid residue (g) |
|---|---|---|---|---|---|
| mSiO$_2$/Pt/SiO$_2$[d] | 0.0013 | 3.016 | 0.170 (5.64%) | 0.556 (18.4%) | 2.290 (75.9%) |
| Pt/SiO$_2$[e] | 0.0013 | 3.001 | 0.082 (2.73%) | 0.742 (24.7%) | 2.177 (73.5%) |
| mSiO$_2$/Pt/SiO$_2$[f] | 0.00087 | 3.039 | 0.119 (3.9%) | 0.547 (18.0%) | 2.373 (78.1%) |
| Pt/SiO$_2$[g] | 0.0018 | 3.014 | 0.324 (10.7%) | 0.998 (33.1%) | 1.692 (56.1%) |

[a]The reaction vessel was vented and sampled at room temperature to examine volatile species.
[b]Pt wt/HDPE wt %.
[c]HDPE properties: M$_n$ = 5.9 kDa, Đ = 4.5.
[d]mSiO$_2$/Pt/SiO$_2$ catalyst (0.06 Pt wt/silica wt %).
[e]Pt/SiO$_2$ catalyst (1.7 Pt wt/silica wt %).
[f]mSiO$_2$/Pt/SiO$_2$ catalyst (0.040 Pt wt/silica wt %).
[g]Pt/SiO$_2$ catalyst (0.59 Pt wt/silica wt %).

Figure 78:
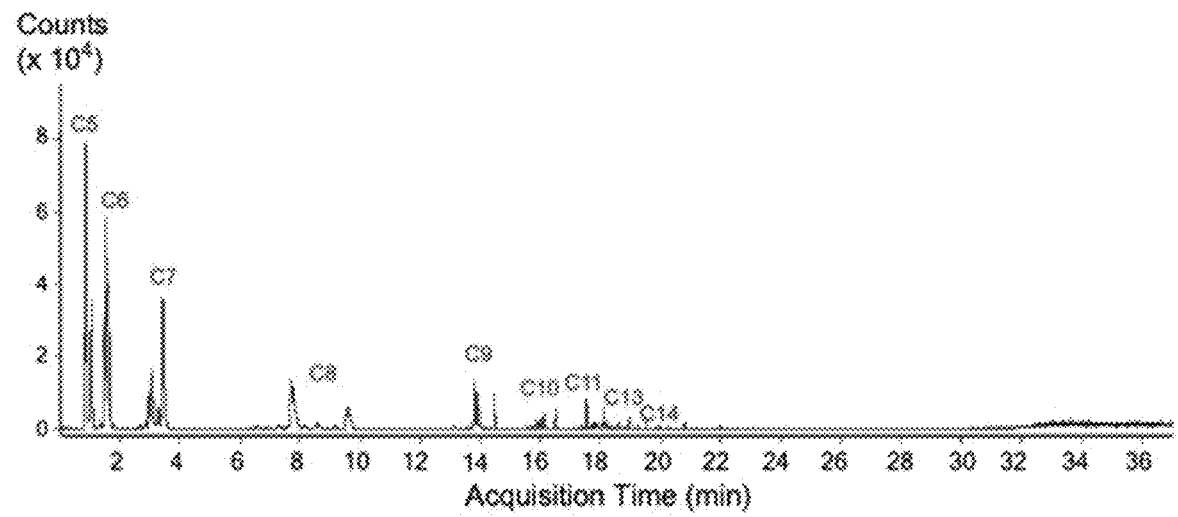
FIG. 78 shows the GC-MS trace of the sampled headspace for the hydrogenolysis reaction of HDPE using mSiO$_2$/Pt/SiO$_2$ (0.040 Pt wt/silica wt %) as catalyst, conditions: 0.00087 Pt wt/HDPE wt % in the reactor for 48 h at 250° C. under H$_2$ (200 psi), cooled to room temperature and vented, giving a yield of volatile species corresponding to 3.9% of the starting mass of HDPE.
Figure 79:
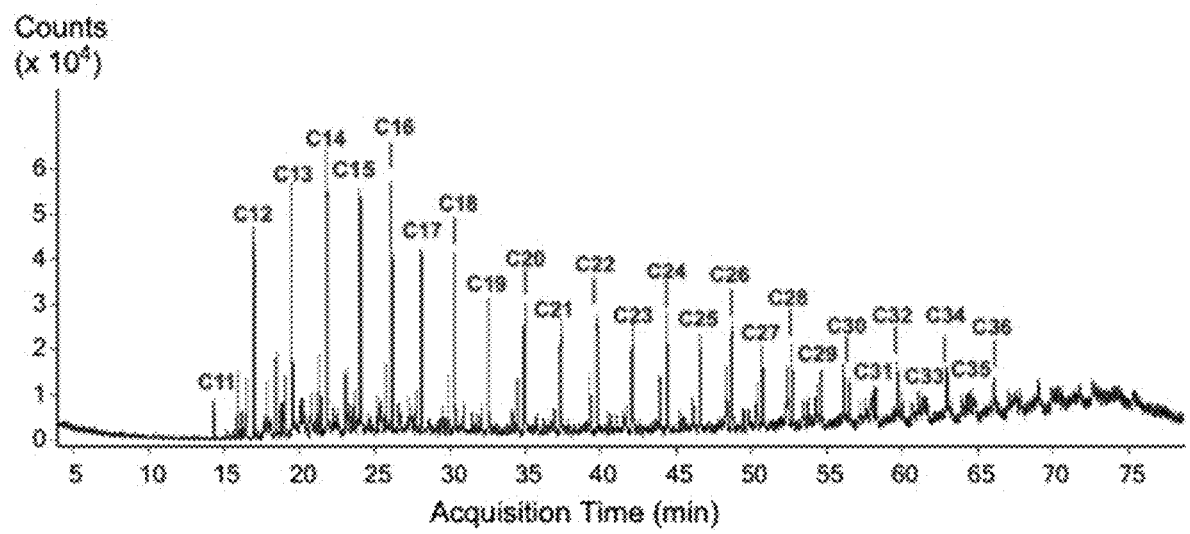
FIG. 79 shows the GC-MS of hydrogenolysis oil products (18.0% yield) from reaction of HDPE using mSiO$_2$/Pt/SiO$_2$ (0.040 Pt wt/silica wt %) as catalyst, conditions: 0.00087 Pt wt/HDPE wt % in the reactor for 48 h at 250° C. under $H_2$ (200 psi), cooled to room temperature and vented. Products were isolated by extraction of the solid reaction mixture with methylene chloride at 80° C.
Figure 80:
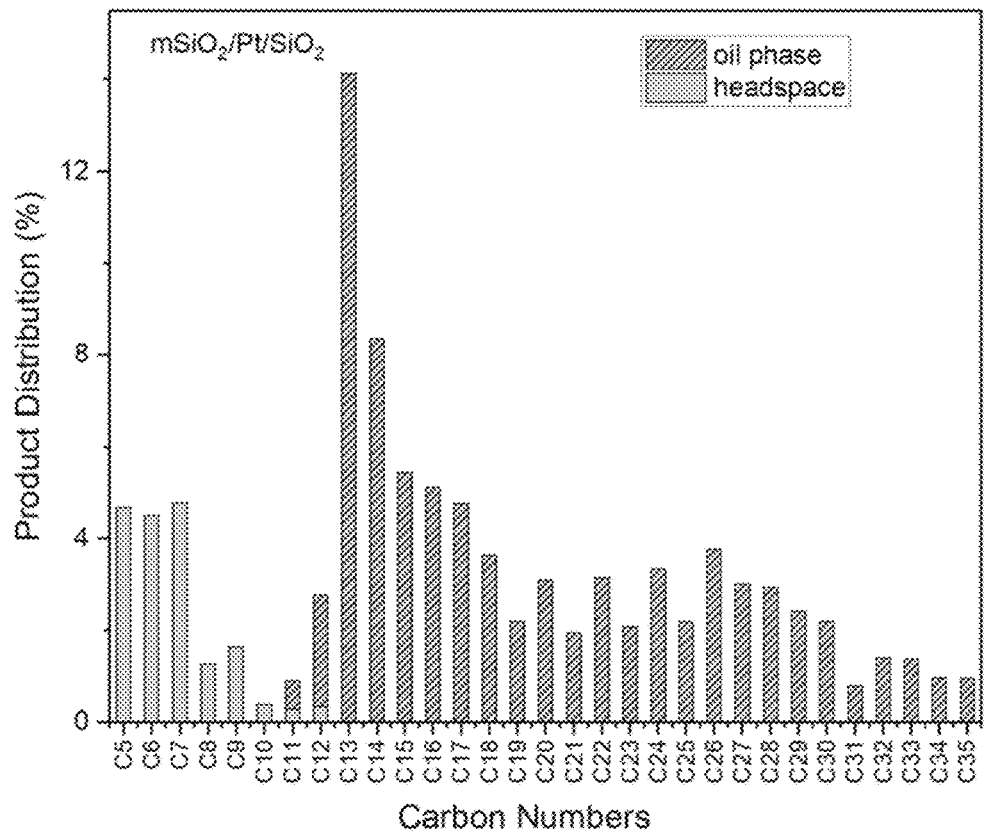
FIG. 80 shows the carbon number distribution for the hydrogenolysis reaction of HDPE ($M_n$=5.9 kDa, Đ=4.5) using $mSiO_2/Pt/SiO_2$ (0.040 Pt wt/silica wt %) as catalyst. 0.00087 Pt wt/HDPE wt % in the reactor for 48 h at 250° C. under $H_2$ (200 psi), cooled to room temperature and vented.
Figure 81:
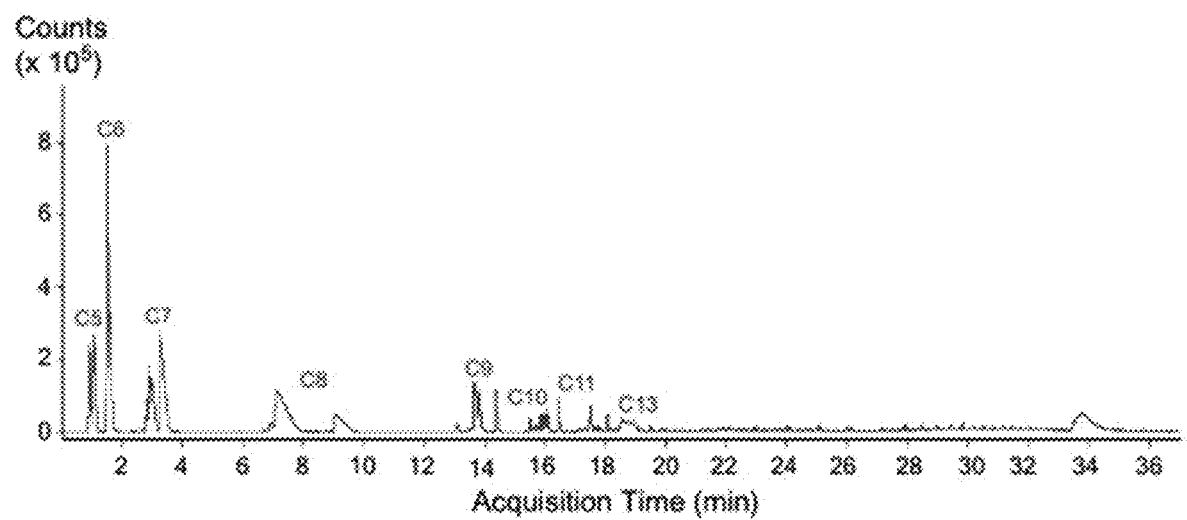
FIG. 81 shows the GC-MS trace of the sampled headspace for the hydrogenolysis reaction of HDPE ($M_n$=5.9 kDa, Đ=4.5) using $Pt/SiO_2$ (0.59 Pt wt/silica wt %) as catalyst, conditions: 0.0018 Pt wt/HDPE wt % in the reactor for 48 h at 250° C. under $H_2$ (200 psi), cooled to room temperature and vented, giving a yield of volatile species corresponding to 10.7% of the starting mass of HDPE.
Figure 82:
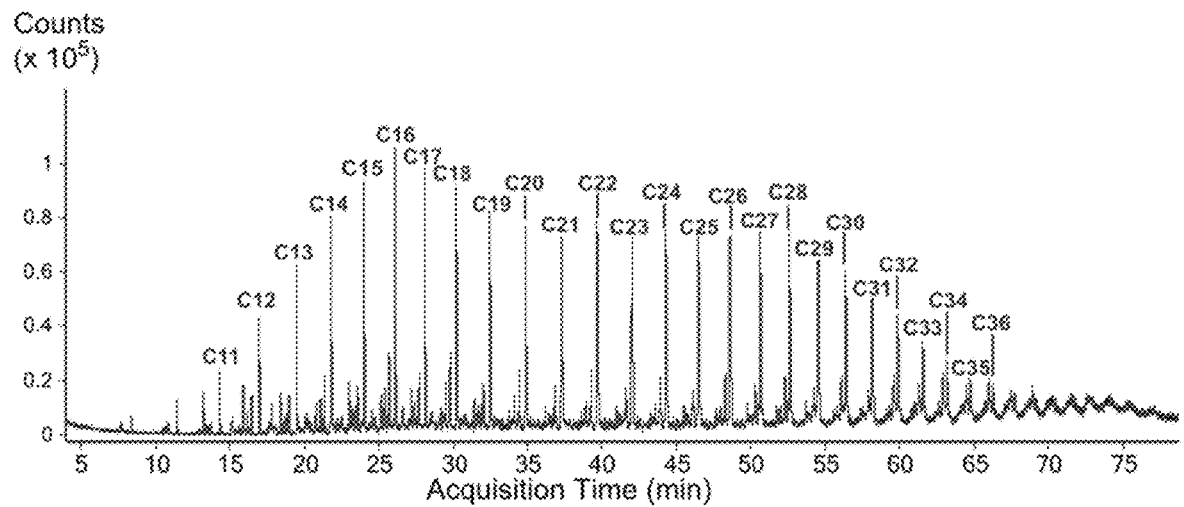
FIG. 82 shows the GC-MS of hydrogenolysis oil products (33.1% yield) from reaction of HDPE ($M_n$=5.9 kDa, Đ=4.5) using $Pt/SiO_2$ (0.59 Pt wt/silica wt %) as catalyst, conditions: 0.0018 Pt wt/HDPE wt % in the reactor for 48 h at 250° C. under $H_2$ (200 psi), isolated by extraction of the solid reaction mixture with methylene chloride at 80° C.
Figure 83:
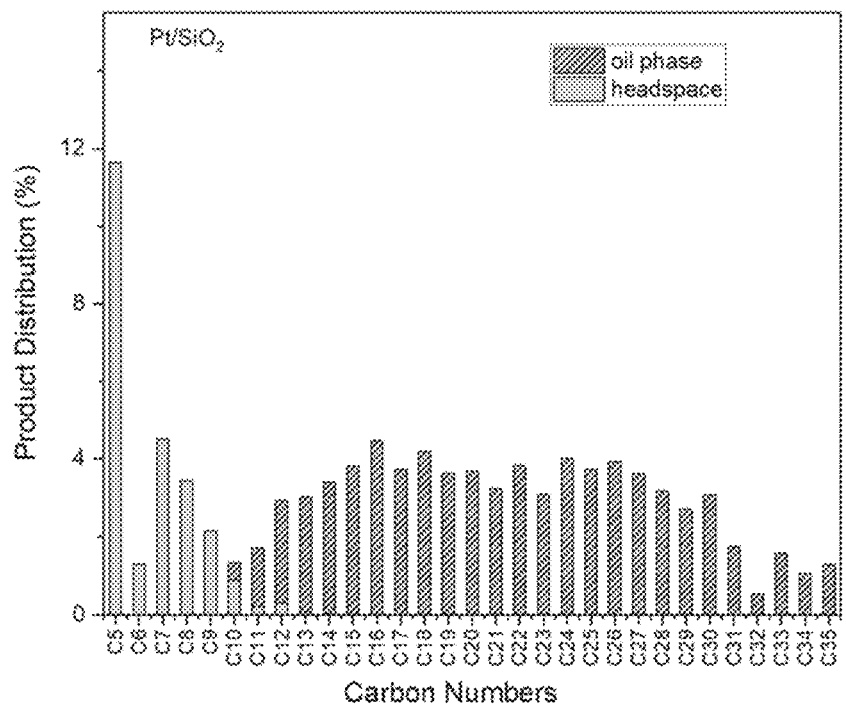
FIG. 83 shows the carbon number distribution for the hydrogenolysis reaction of HDPE ($M_n$=5.9 kDa, Đ=4.5) using $Pt/SiO_2$ (0.59 Pt wt/silica wt %) as catalyst, conditions: 0.0018 Pt wt/HDPE wt % in the reactor for 48 h at 250° C. and $H_2$ (200 psi).
Figure 84:
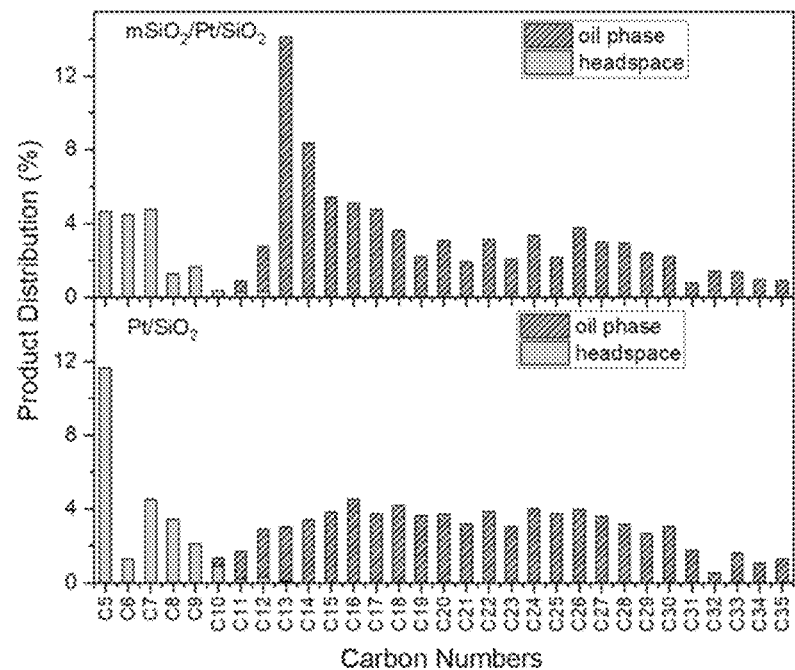
FIG. 84 shows the plot comparing carbon number distributions produced by hydrogenolysis reactions of HDPE using $mSiO_2/Pt/SiO_2$ and $Pt/SiO_2$ after 48 h at 250° C. under $H_2$ (200 psi) obtained from GC-MS analysis of headspace gases and extracted oils, weighted based on their isolated yields.

Gas chromatograms of the products and corresponding carbon number distribution from mSiO$_2$/Pt/SiO$_2$ catalyzed hydrogenolysis reactions are shown in FIGS. 78 to 80, while those of the Pt/SiO$_2$-catalyzed reactions are shown in FIGS. 81 to 83; a comparison of carbon number distribution is given in FIGS. 78-84.

Figure 85:
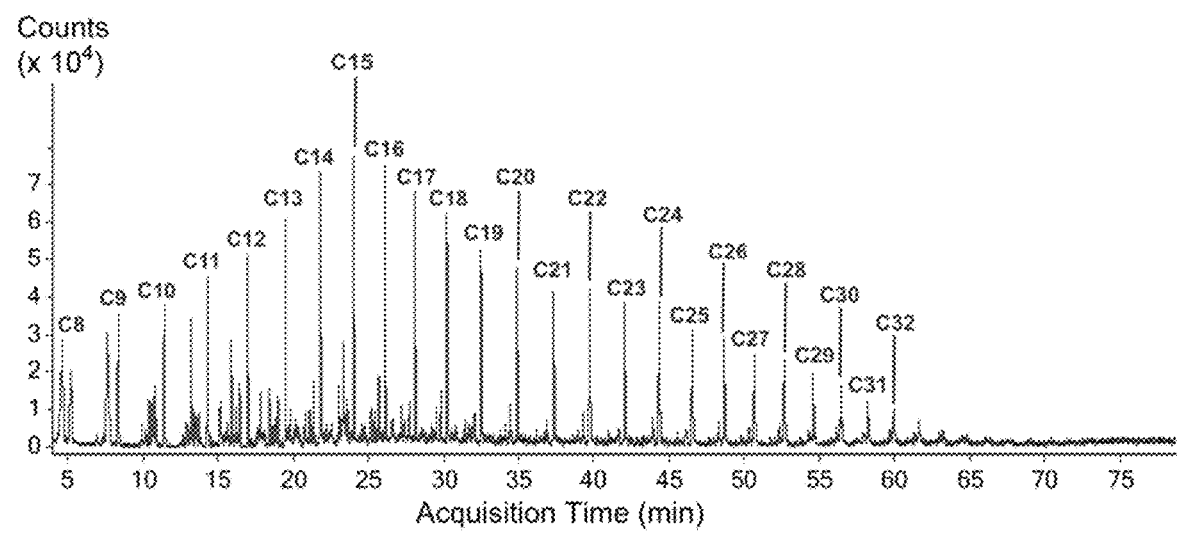
FIG. 85 shows the GC-MS of hydrogenolysis oil products (56.6% yield) from reaction of HDPE ($M_n$=5.9 kDa, Đ=4.5) using $mSiO_2/Pt/SiO_2$ (0.59 Pt wt/silica wt %) as catalyst, conditions: 0.0039 Pt wt/HDPE wt % in the reactor for 136 h at 250° C. under $H_2$ (200 psi), isolated by extraction of the solid reaction mixture with methylene chloride at 80° C.

GC-MS of hydrogenolysis oil products (56.6% yield) from reaction of HDPE (M$_n$=5.9 kDa, Đ=4.5) using mSiO$_2$/Pt/SiO$_2$ (0.59 Pt wt/silica wt %) as catalyst are shown in FIG. 85.

Example 7—Hydrogenolysis with Quantitative Conversion at 250° C.

HDPE was converted into soluble small molecules by hydrogenolysis with mSiO$_2$/Pt/SiO$_2$ (0.06 Pt wt/silica wt %; 0.0013 Pt wt/HDPE wt %) after 136 h at 250° C. under H$_2$ (200 psi) yielding 94% gases and oils (as described above in the experimental for 6 h reactions), determined by the sum of mass of extracted, isolated oils and the mass of gaseous species produced (assessed by difference in mass of reaction mixture before and after catalytic reactions). Yields of gas phase, oil phase, and residual solid are tabulated in Table 7.

TABLE 7

Catalytic data and mass balance of the reaction performed for 136 h and 250° C.

| Catalyst | Pt loading (wt %)[a] | HDPE (g)[b] | Conversion to volatiles (g) | Conversion to liquids (g) | Solid residue (g) |
|---|---|---|---|---|---|
| mSiO$_2$/Pt/SiO$_2$[c] | 0.0039 | 2.015 | 0.754 (37.4%) | 1.14 (56.6%) | 0.12 (6%) |

[a]Pt wt/HDPE wt %.
[b]HDPE properties: M$_n$ = 5.9 kDa, Đ = 4.5.
[c]mSiO$_2$/Pt/SiO$_2$ catalyst (0.06 Pt wt/silica wt %). The reaction vessel was vented and sampled at room temperature to examine volatile species.

Example 8—Hydrogenolysis at 300° C. for 24 h

Conversion of HDPE (M$_n$=5.9 kDa, Đ=4.5) into soluble small molecules by hydrogenolysis with 2.4 nm pore mSiO$_2$/Pt/SiO$_2$ (0.27 Pt wt/silica wt %; 0.004 Pt wt/HDPE wt %) was 97.9% after 24 h at 300° C. under H$_2$ (200 psi at room temperature, 250 psi at 300° C.) as described in above, determined by the sum of mass of extracted, isolated oils and the mass of gaseous species produced (assessed by difference in mass of reaction mixture before and after catalytic reactions). Yields of gas phase, oil phase, and residual solid are tabulated in Table 8.

TABLE 8

Catalytic data and mass balance of the reactions performed at 300° C.

| Catalyst | Pt loading (wt %)[a] | HDPE (g)[b] | Conversion to volatiles (g)[c] | Conversion to liquids (g) | Solid residue (g) |
|---|---|---|---|---|---|
| 1.7 nm mSiO$_2$/Pt/SiO$_2$[d] | 0.004 | 3.034 | 1.043 (34.4%) | 1.532 (50.5%) | 0.459 (15.1%) |
| 2.4 nm mSiO$_2$/Pt/SiO$_2$[e] | 0.004 | 3.073 | 0.744 (24.2%) | 2.264 (73.7%) | 0.065 (2.1%) |

TABLE 8-continued

Catalytic data and mass balance of the reactions performed at 300° C.

| Catalyst | Pt loading (wt %)[a] | HDPE (g)[b] | Conversion to volatiles (g)[c] | Conversion to liquids (g) | Solid residue (g) |
|---|---|---|---|---|---|
| 3.5 nm mSiO$_2$/Pt/SiO$_2$[f] | 0.004 | 3.027 | 0.651 (21.5%) | 2.320 (76.6%) | 0.056 (1.0%) |
| Pt/SiO$_2$[g] | 0.004 | 3.040 | 0.449 (14.8%) | 0.7225 (23.8%) | 1.868 (61.4%) |
| mSiO$_2$/SiO$_2$ | n.a. | 2.992 | 0.019 (0.64%) | 0.231 (7.72%) | 2.752 (91.6%) |

[a]Pt wt/HDPE wt %.
[b]HDPE properties: M$_n$ = 5.9 kDa, Đ = 4.5.
[c]The reaction vessel was vented and sampled at room temperature to examine volatile species.
[d]0.35 Pt wt/silica wt %.
[e]0.27 Pt wt/silica wt %.
[f]0.033 Pt wt/silica wt %.
[g]2.8 Pt wt/silica %.

Figure 86:
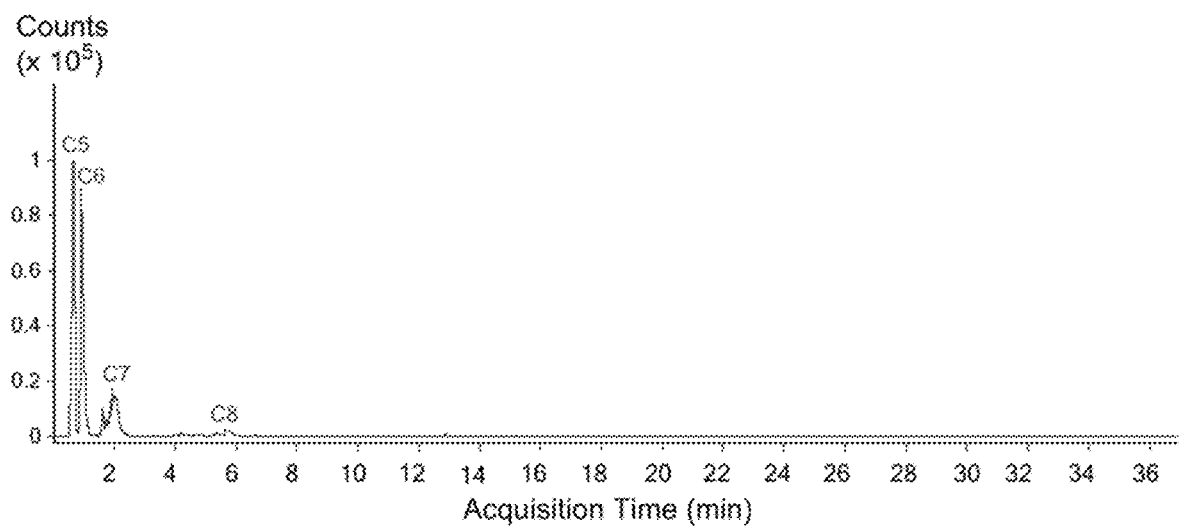
FIG. 86 shows the GC-MS trace of the sampled headspace for the hydrogenolysis reaction of HDPE ($M_n$=5.9 kDa, Đ=4.5) using 1.7 nm diameter pore $mSiO_2/Pt/SiO_2$ (0.35 Pt wt/silica wt %) as catalyst, conditions: 0.004 Pt wt/HDPE wt % in the reactor for 24 h at 300° C. under $H_2$ (200 psi), cooled to room temperature and vented, giving a yield of volatile species corresponding to 33.9% of the starting mass of HDPE.
Figure 87:
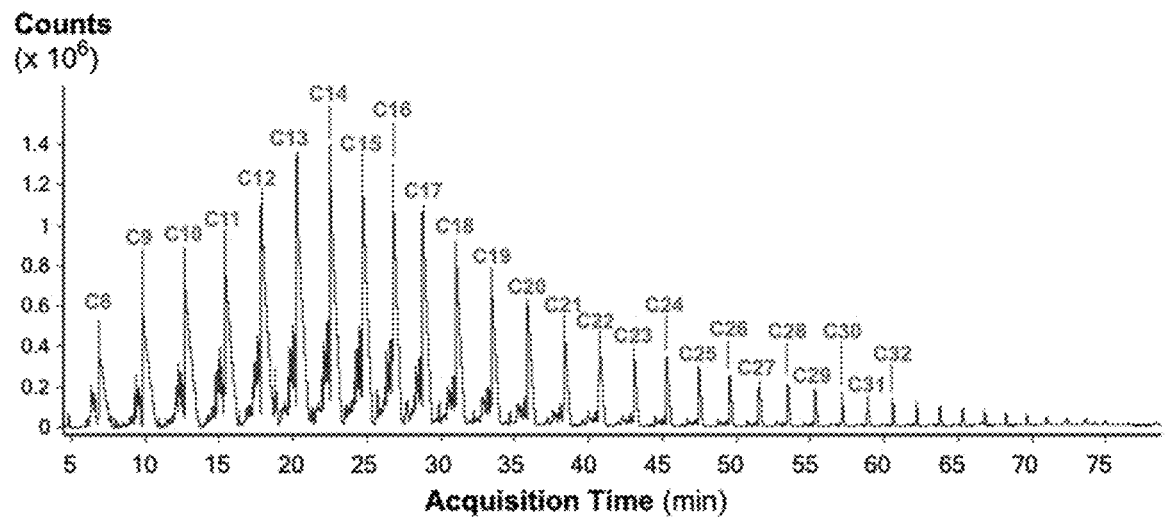
FIG. 87 shows the GC-MS of hydrogenolysis oil products (49.8% yield) from reaction of HDPE ($M_n$=5.9 kDa, Đ=4.5) using 2.4 nm diameter pore $mSiO_2/Pt/SiO_2$ (0.35 Pt wt/silica wt %) as catalyst, conditions: 0.004 Pt wt/HDPE wt % in the reactor for 24 h at 300° C. under $H_2$ (200 psi), isolated by extraction of the solid reaction mixture with methylene chloride at 80° C.
Figure 88:
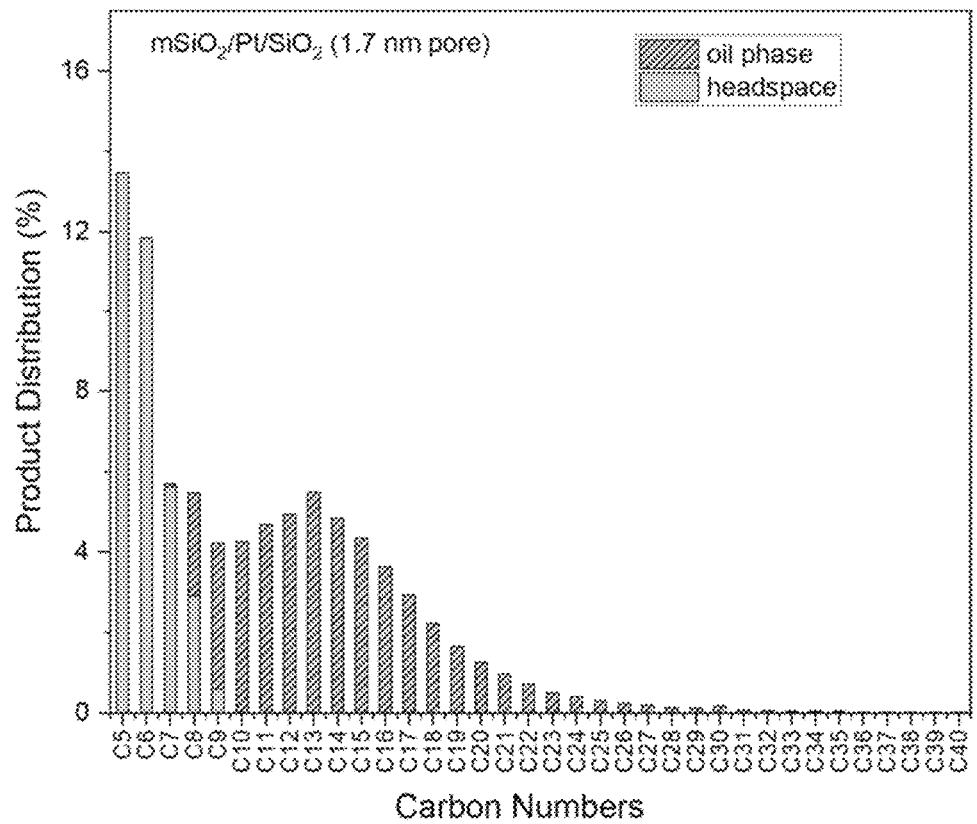
FIG. 88 shows the Carbon number distribution for the hydrogenolysis reaction of HDPE ($M_n$=5.9 kDa, Đ=4.5) using 1.7 nm diameter pore $mSiO_2/Pt/SiO_2$ (0.35 Pt wt/silica wt %) as catalyst, conditions: 0.004 Pt wt/HDPE wt % in the reactor for 24 h at 300° C. under $H_2$ (200 psi).
Figure 89:
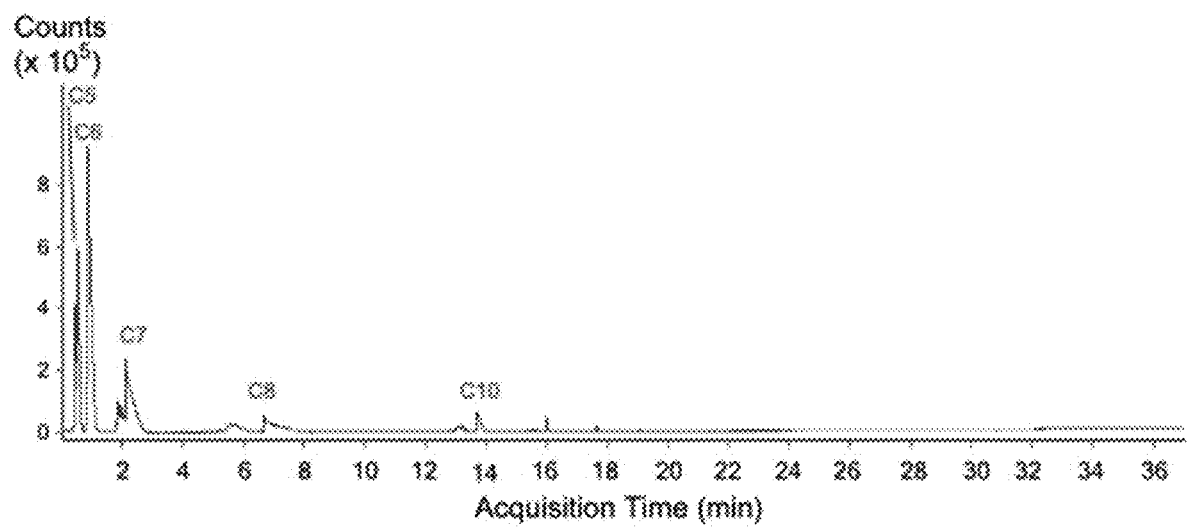
FIG. 89 shows the GC-MS trace of the sampled headspace for the hydrogenolysis reaction of HDPE ($M_n$=5.9 kDa, Đ=4.5) using 2.4 nm diameter pore $mSiO_2/Pt/SiO_2$ (0.027 Pt wt/silica wt %) as catalyst, conditions: 0.004 Pt wt/HDPE wt % in the reactor for 24 h at 300° C. under $H_2$ (200 psi), cooled to room temperature and vented, giving a yield of volatile species corresponding to 24.2% of the starting mass of HDPE.
Figure 90:
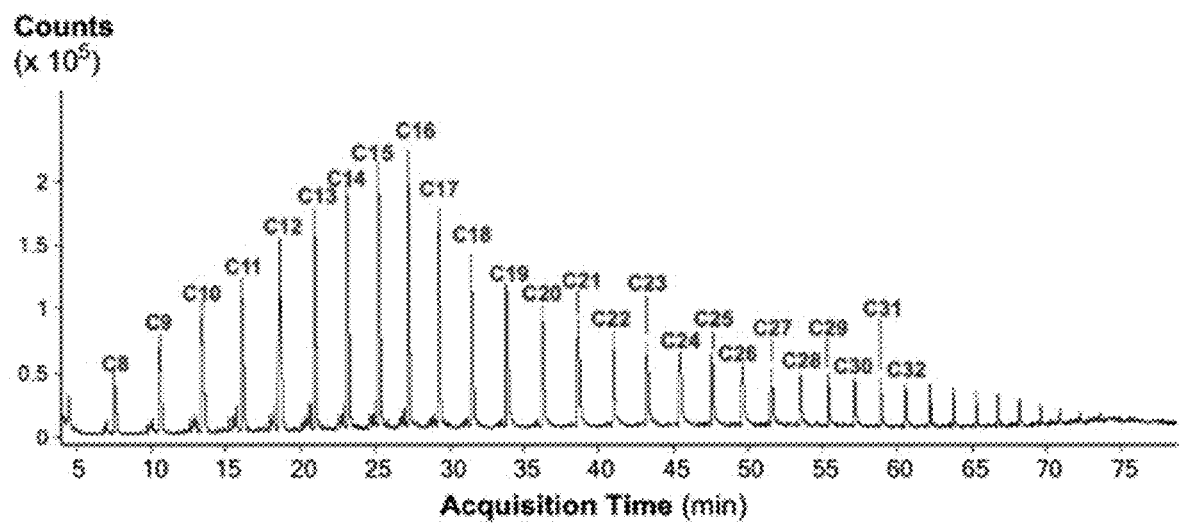
FIG. 90 shows the GC-MS of hydrogenolysis oil products (73.7% yield) from reaction of HDPE ($M_n$=5.9 kDa, Đ=4.5) using 2.4 nm diameter pore $mSiO_2/Pt/SiO_2$ (0.027 Pt wt/silica wt %) as catalyst, conditions: 0.004 Pt wt/HDPE wt % in the reactor for 24 h at 300° C. under $H_2$ (200 psi), isolated by extraction of the solid reaction mixture with methylene chloride at 80° C.
Figure 91:
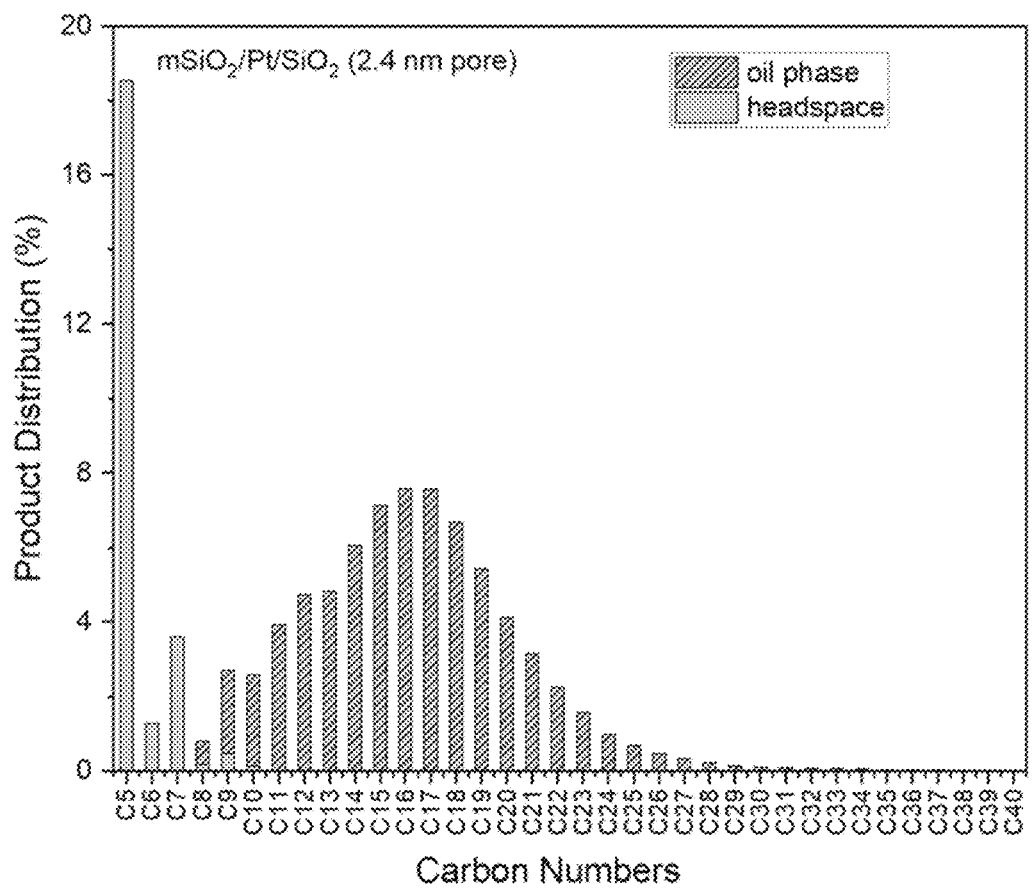
FIG. 91 shows the carbon number distribution for the hydrogenolysis reaction of HDPE ($M_n$=5.9 kDa, Đ=4.5) using 2.4 nm diameter pore $mSiO_2/Pt/SiO_2$ (0.027 Pt wt/silica wt %) as catalyst, conditions: 0.004 Pt wt/HDPE wt % in the reactor for 24 h at 300° C. under $H_2$ (200 psi).
Figure 92:
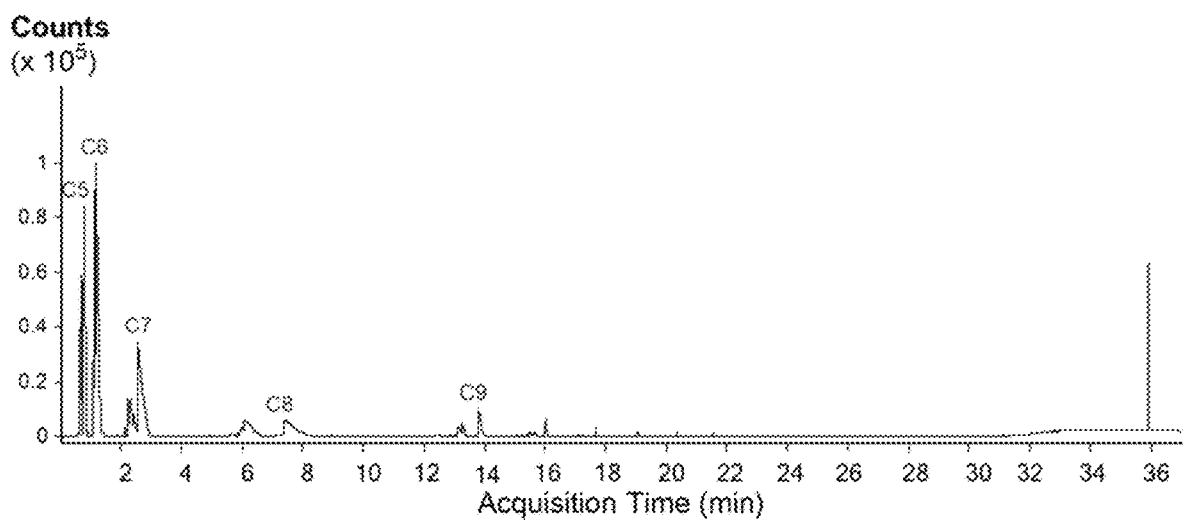
FIG. 92 shows the GC-MS trace of the sampled headspace for the hydrogenolysis reaction of HDPE ($M_n$=5.9 kDa, Đ=4.5) using 3.5 nm diameter pore $mSiO_2/Pt/SiO_2$ (0.033 Pt wt/silica wt %) as catalyst, conditions: 0.004 Pt wt/HDPE wt % in the reactor for 24 h at 300° C. under $H_2$ (200 psi), cooled to room temperature and vented, giving a yield of volatile species corresponding to 21.5% of the starting mass of HDPE.
Figure 93:
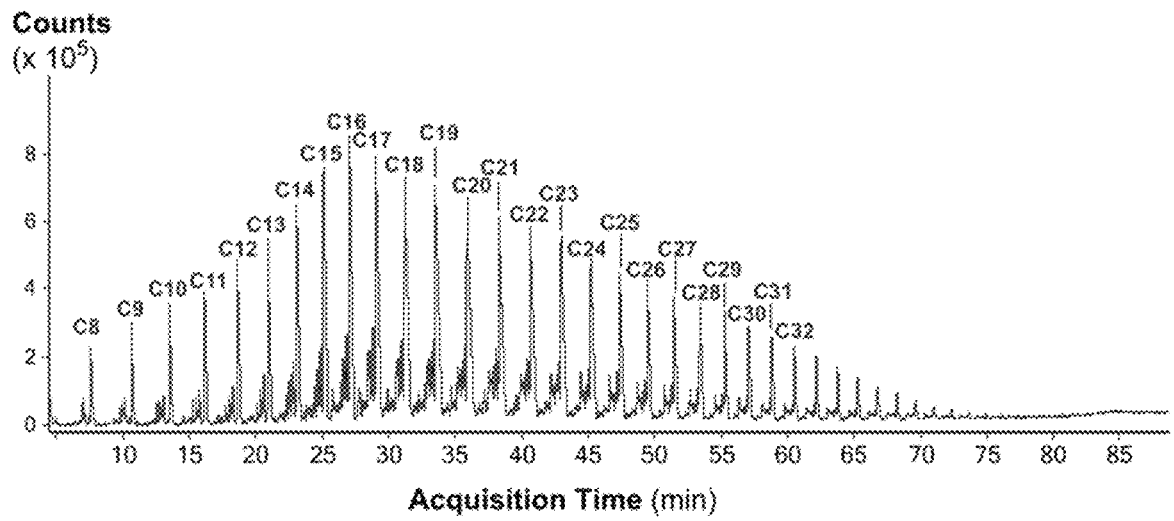
FIG. 93 shows the GC-MS of hydrogenolysis oil products (76.6% yield) from reaction of HDPE ($M_n$=5.9 kDa, Đ=4.5) using 3.5 nm diameter pore $mSiO_2/Pt/SiO_2$ (0.033 Pt wt/silica wt %) as catalyst, conditions: 0.004 Pt wt/HDPE wt % in the reactor for 24 h at 300° C. under $H_2$ (200 psi), isolated by extraction of the solid reaction mixture with methylene chloride at 80° C.
Figure 94:
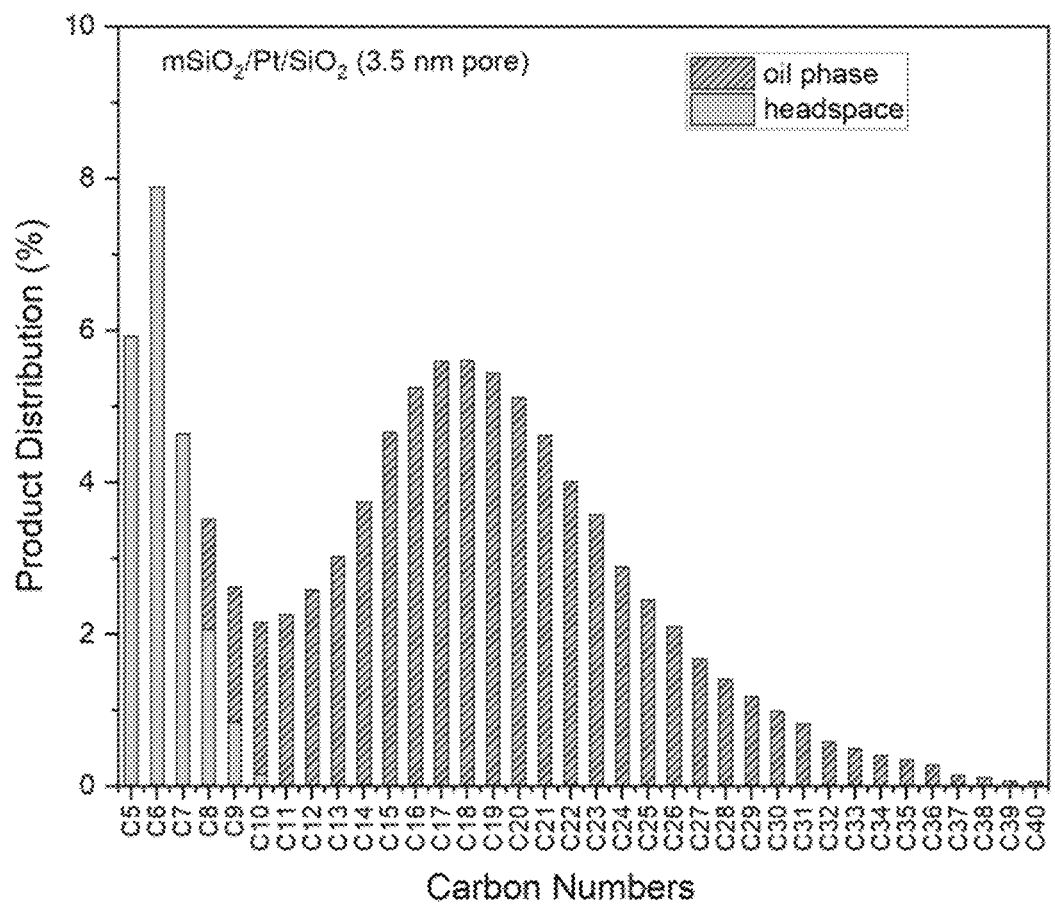
FIG. 94 shows the carbon number distribution for the hydrogenolysis reaction of HDPE ($M_n$=5.9 kDa, Đ=4.5) using 3.5 nm diameter pore $mSiO_2/Pt/SiO_2$ (0.033 Pt wt/silica wt %) as catalyst, conditions: 0.004 Pt wt/HDPE wt % in the reactor for 24 h at 300° C. under $H_2$ (200 psi).
Figure 95:
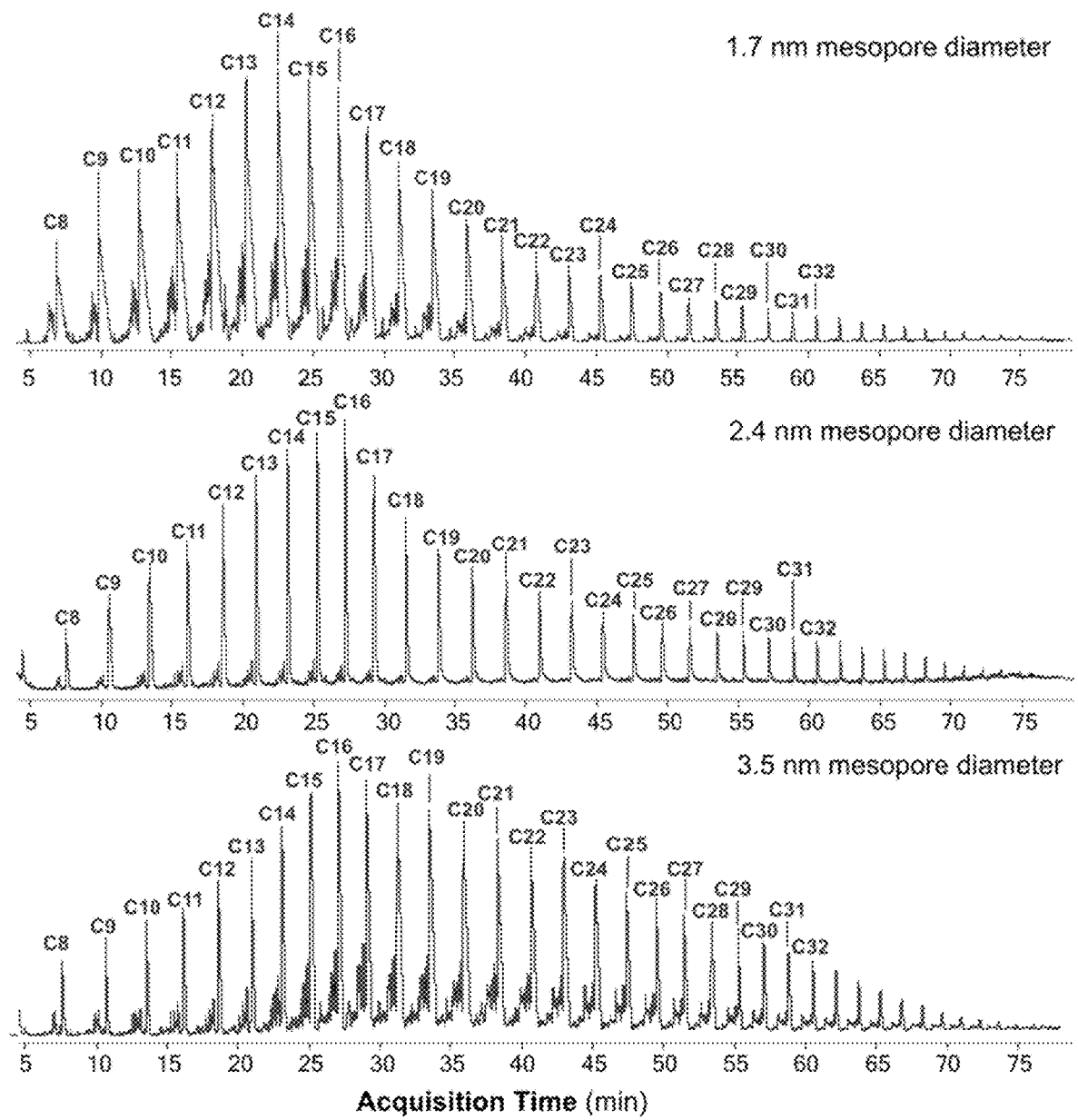
FIG. 95 shows the stacked GC traces comparing oil products from $mSiO_2/Pt/SiO_2$-catalyzed hydrogenolysis of HDPE using 1.7, 2.4, and 3.5 nm diameter mesopores.
Figure 96:
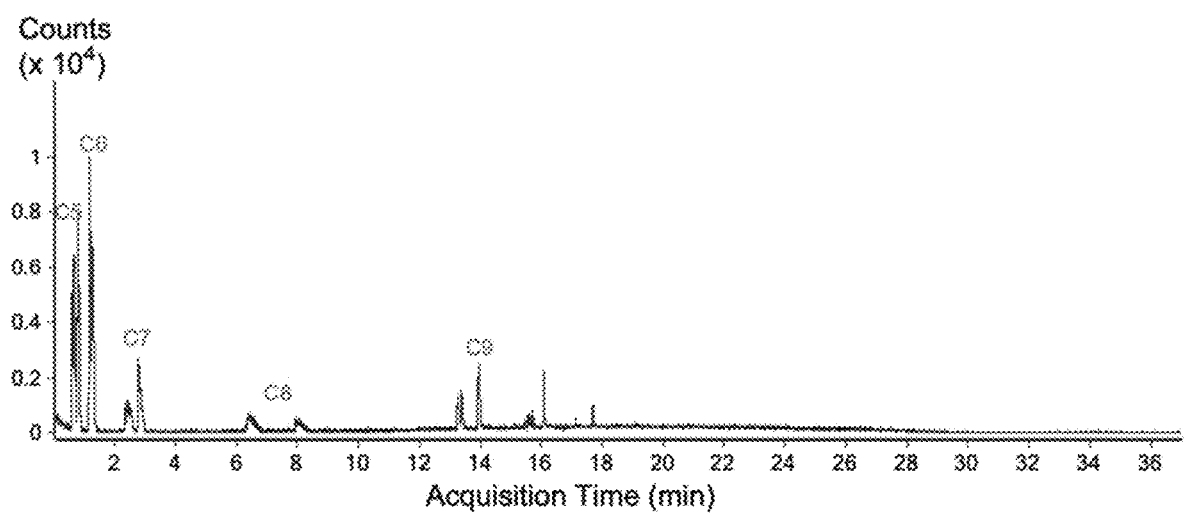
FIG. 96 shows the GC-MS trace of the sampled headspace for the hydrogenolysis reaction of HDPE ($M_n$=5.9 kDa, Đ=4.5) using $Pt/SiO_2$ (2.8 Pt wt/silica wt %) as catalyst, conditions: 0.004 Pt wt/HDPE wt % in the reactor for 24 h at 300° C. under $H_2$ (200 psi), cooled to room temperature and vented, giving a yield of volatile species corresponding to 14.8% of the starting mass of HDPE.
Figure 97:
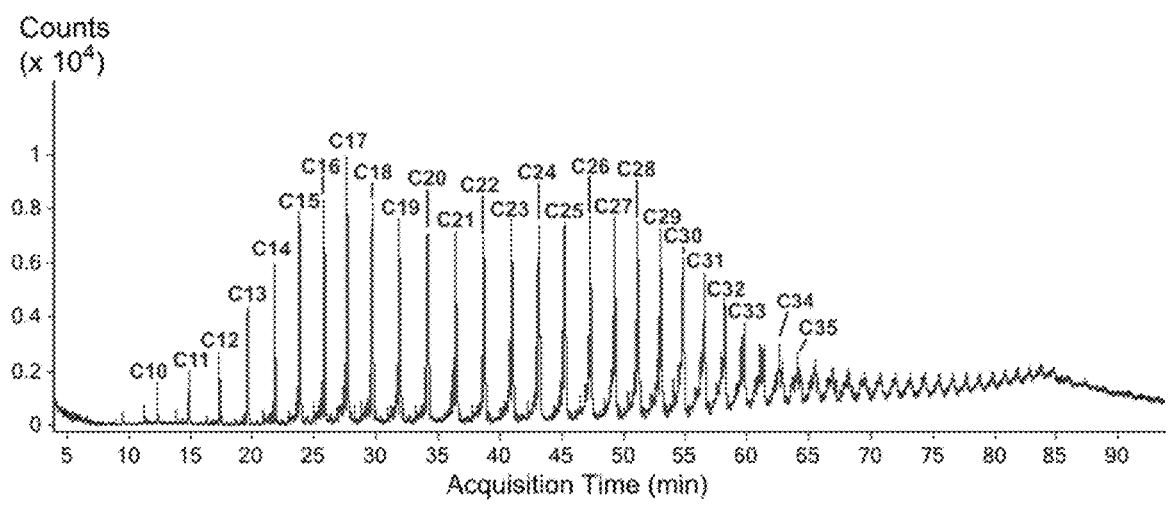
FIG. 97 shows the GC-MS of hydrogenolysis oil products (23.8% yield) from reaction of HDPE ($M_n$=5.9 kDa, Đ=4.5) using $Pt/SiO_2$ (2.8 Pt wt/silica wt %) as catalyst, conditions: 0.004 Pt wt/HDPE wt % in the reactor for 24 h at 300° C. under $H_2$ (200 psi), isolated by extraction of the solid reaction mixture with methylene chloride at 80° C.
Figure 98:
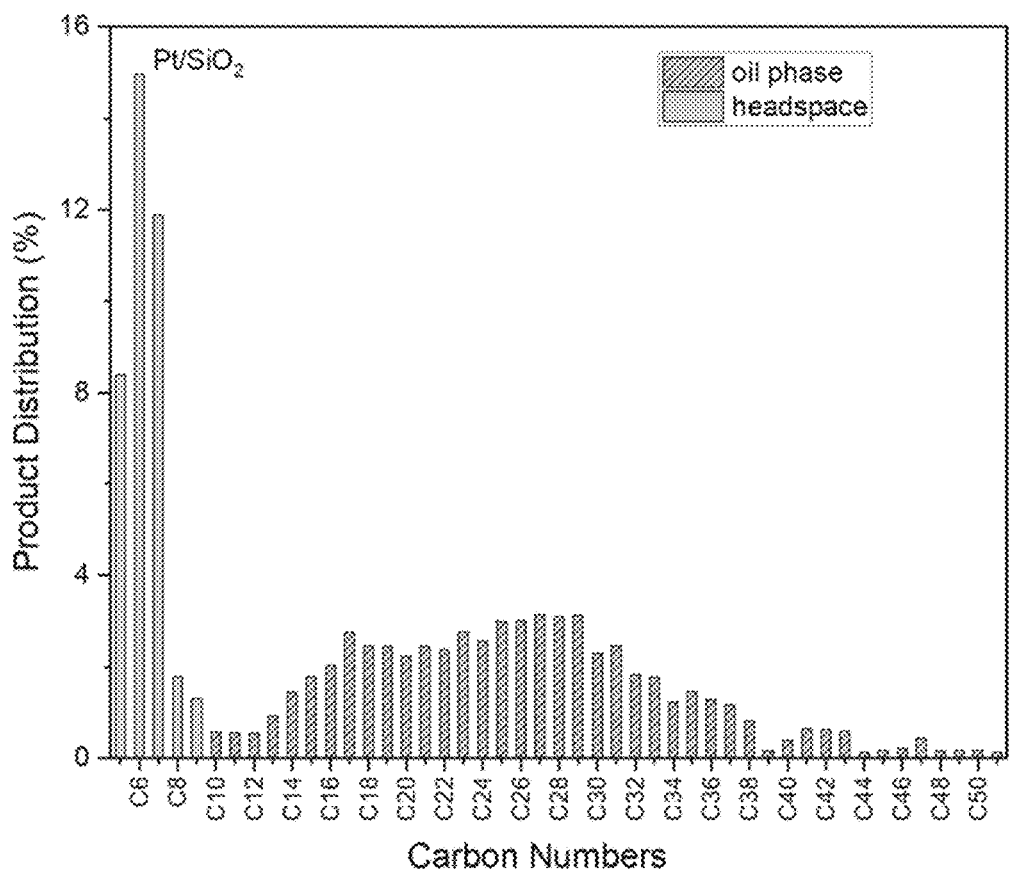
FIG. 98 shows the carbon number distribution for the hydrogenolysis reaction of HDPE ($M_n$=5.9 kDa, Đ=4.5) using $Pt/SiO_2$ (2.8 Pt wt/silica wt %) as catalyst, conditions: 0.004 Pt wt/HDPE wt % in the reactor for 24 h at 300° C. under $H_2$ (200 psi).

Gas chromatograms of the products and corresponding carbon number distribution from 1.7 nm diameter pore mSiO$_2$/Pt/SiO$_2$ catalyzed hydrogenolysis reactions at 300° C. for 24 h are shown in FIGS. 86 to 88, data from 2.4 nm diameter pores are shown in FIGS. 89 to 91, and data from 3.5 nm diameter pores are shown in FIGS. 92 to 94. A stack-plot comparing GC traces of the three catalysts is giving in FIG. 95.

Figure 99:
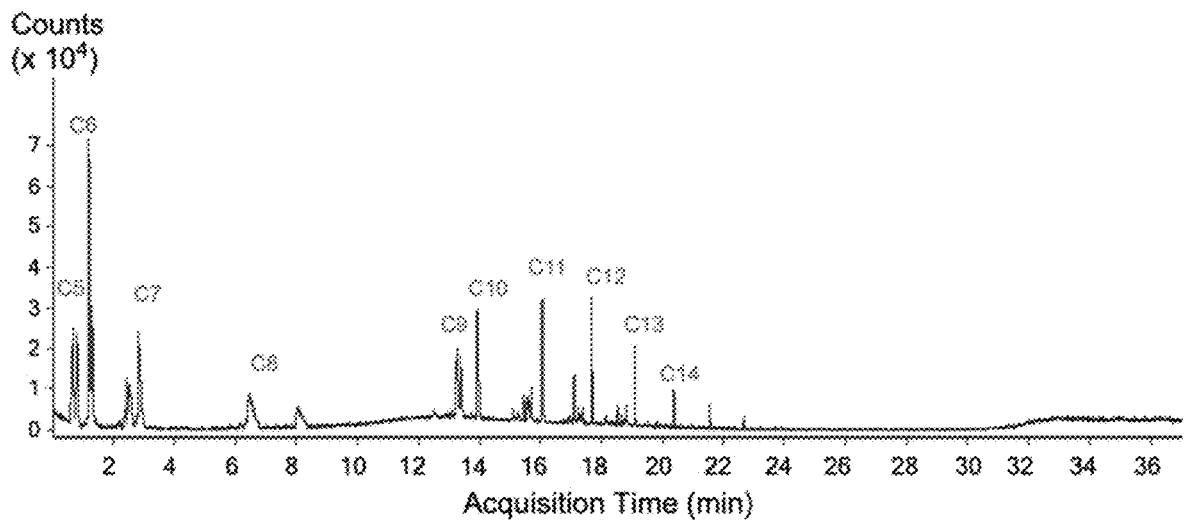
FIG. 99 shows the GC-MS trace of the sampled headspace for the thermal reaction of HDPE ($M_n$=5.9 kDa, Đ=4.5) in the presence of 2.4 nm diameter pore $mSiO_2/SiO_2$ material, conditions: 24 h at 300° C. under $H_2$ (200 psi), cooled to room temperature and vented, giving a yield of volatile species corresponding to 0.64% of the starting mass of HDPE.
Figure 100:
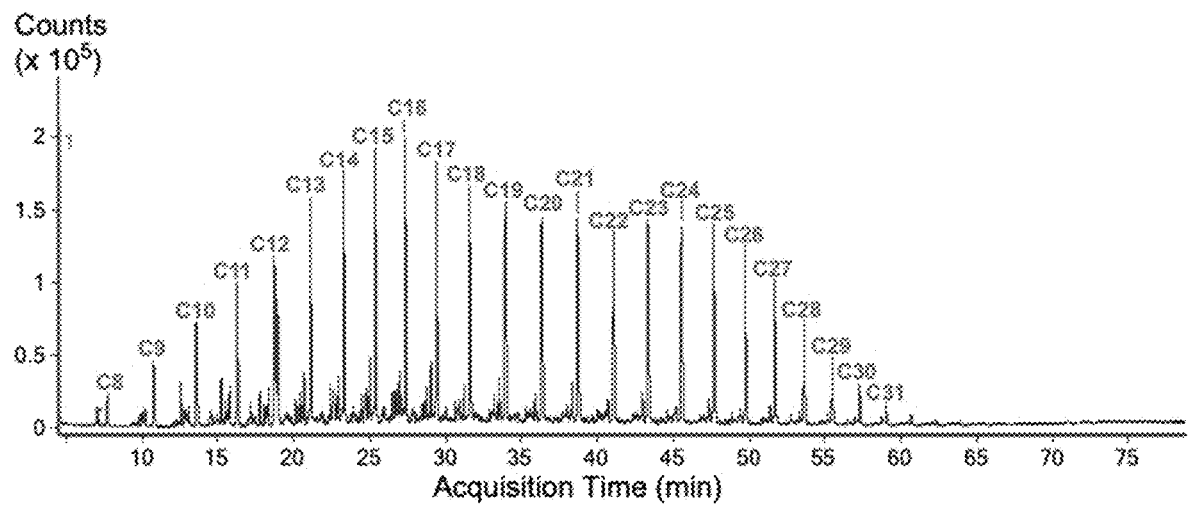
FIG. 100 shows the GC-MS of oil products (7.72% yield) from reaction of HDPE ($M_n$=5.9 kDa, Đ=4.5) in the presence of 2.4 nm diameter pore $mSiO_2/SiO_2$, conditions: 24 h at 300° C. under $H_2$ (200 psi), isolated by extraction of the solid reaction mixture with methylene chloride at 80° C.
Figure 101:
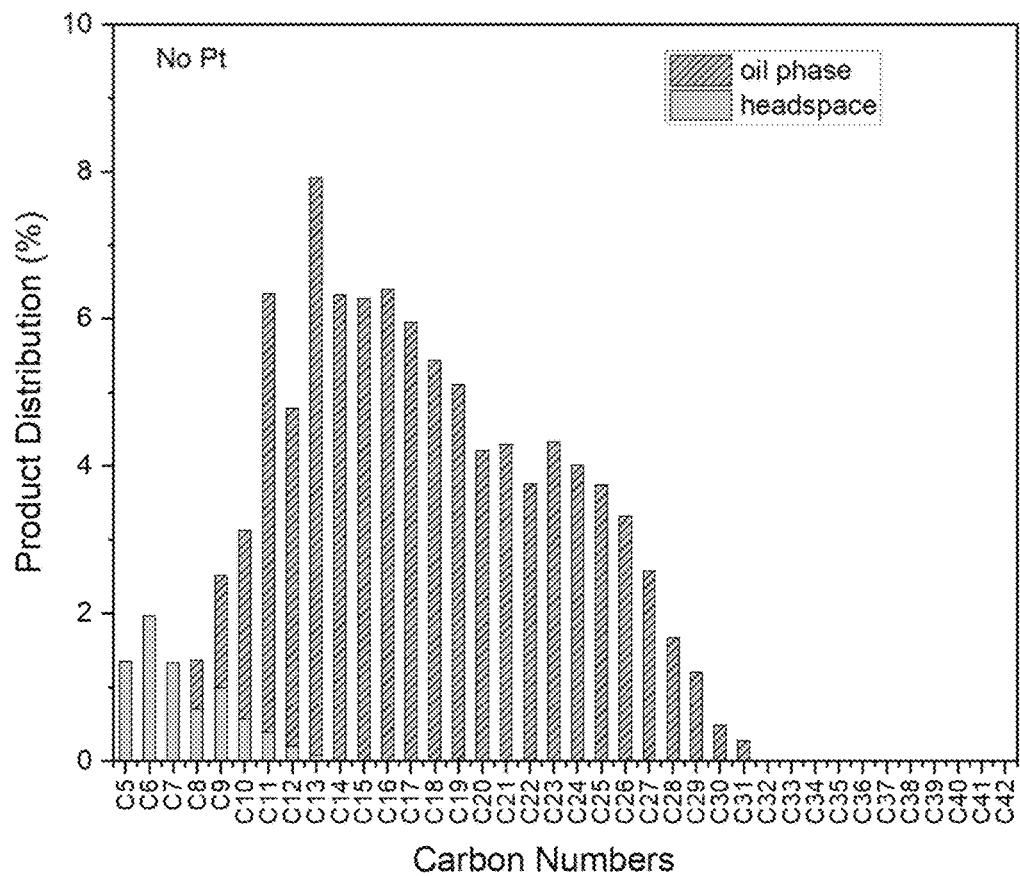
FIG. 101 shows the carbon number distribution for the thermal reaction of HDPE ($M_n$=5.9 kDa, Đ=4.5) in the presence of 2.4 nm diameter pore mSiO$_2$/SiO$_2$ (Pt-free) material, conditions: 24 h at 300° C. under H$_2$ (200 psi).

Gas chromatograms of the products and corresponding carbon number distribution from Pt/SiO$_2$-catalyzed hydrogenolysis reactions at 300° C. for 24 h are shown in FIGS. 95 to 98. Pt-free control reaction data is given in FIGS. 99 to 101.

Example 9—Conversion of 50 g of HDPE at 300° C.

Over conversion of 50 g of HDPE (M$_n$=5.9 kDa, Đ=4.5) into soluble small molecules by hydrogenolysis occurred with 2.4 nm pore mSiO$_2$/Pt/SiO$_2$ (0.27 Pt wt/silica wt %; 0.018 Pt wt/HDPE wt %) over 4 d and 16 h at 300° C. under H$_2$ (200 psi at room temperature, 250 psi at 300° C.). Yields of gas and liquid products are given in Table 9.

TABLE 9

Catalytic data and mass balance of the reaction performed for 112 h and 300° C.

| Catalyst | Pt loading (wt %)[a] | HDPE (g)[b] | Conversion to volatiles (g) | Conversion to liquids (g) | Solid residue (g) |
|---|---|---|---|---|---|
| mSiO$_2$/Pt/SiO$_2$[c] | 0.018 | 50.012 | 33.944 (67.9%) | 16.068 (32.1%) | — |

[a]Pt wt/HDPE wt %.
[b]HDPE properties: M$_n$ = 5.9 kDa, Đ = 4.5.
[c]mSiO$_2$/Pt/SiO$_2$ catalyst (0.27 Pt wt/silica wt %). The reaction vessel was vented and sampled at room temperature to examine volatile species.

Figure 102:
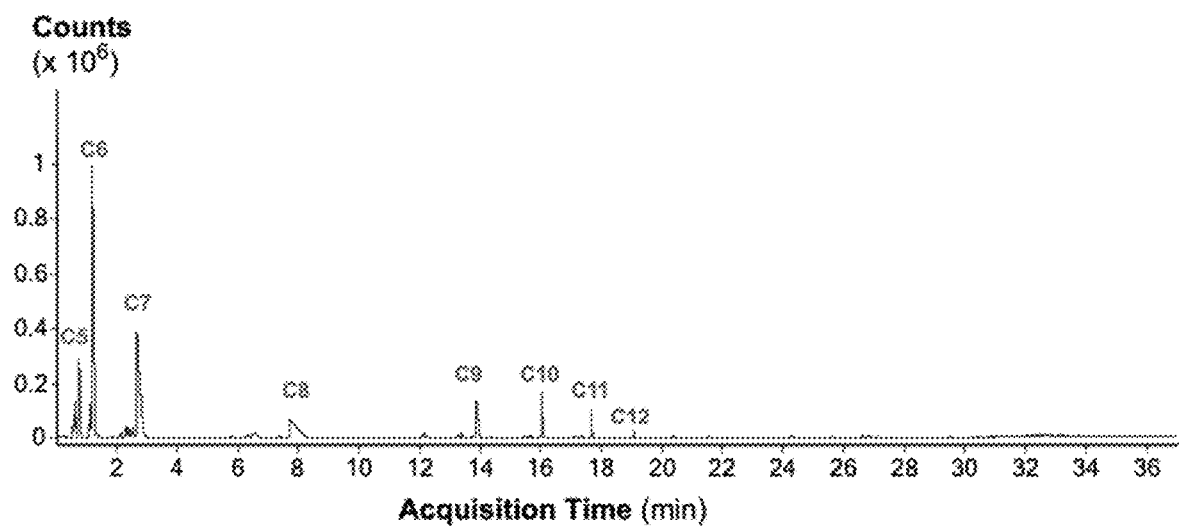
FIG. 102 shows the GC-MS trace of the sampled headspace for the thermal reaction of 50 g of HDPE (M$_n$=5.9 kDa, Đ=4.5) in the presence of 2.4 nm diameter pore mSiO$_2$/Pt/SiO$_2$ (0.27 Pt wt/silica wt %) material, conditions: 112 h at 300° C. under H$_2$ (200 psi), cooled to room temperature and vented, giving a yield of volatile species corresponding to 67.9% of the starting mass of HDPE.
Figure 103:
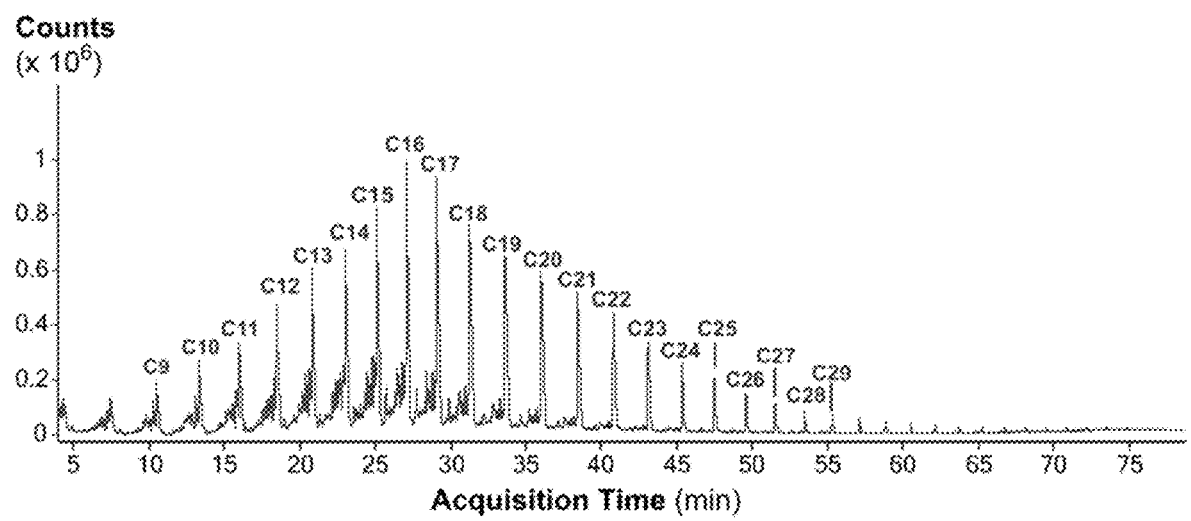
FIG. 103 shows the GC-MS of oil products (32.1% yield) from reaction of 50 g of HDPE (M$_n$=5.9 kDa, Đ=4.5) in the presence of 2.4 nm diameter pore mSiO$_2$/Pt/SiO$_2$ (0.27 Pt wt/silica wt %), conditions: 112 h at 300° C. under H$_2$ (200 psi), isolated by extraction of the solid reaction mixture with methylene chloride at 80° C.

The GC-MS trace of the sampled headspace for the thermal reaction and the GC-MS of oil products of 50 g of HDPE (M$_n$=5.9 kDa, Đ=4.5) in the presence of 2.4 nm diameter pore mSiO$_2$/Pt/SiO$_2$ (0.27 Pt wt/silica wt %) material (reaction time 112 hours) is show in FIGS. 102 and 103 respectively.

Example 10—Post-Consumer HDPE from Grocery-Type Shopping Bags

HDPE from used grocery shopping bags (M$_n$=10.6 kDa, M$_w$=150.1 kDa, Đ=14.1). After use, the bags were cut into small pieces and loaded into the glass liner of the reactor autoclave. The reactor vessel, containing the waste HDPE was heated under vacuum at 40° C. for 12 h. The reactor was cooled and the mSiO$_2$/Pt/SiO$_2$ catalyst was added. The reactor was pressurized with N$_2$ and evacuated 3×, and then it was pressurized with H$_2$, heated to the reaction temperature, and mixed using an overhead mechanical stirrer.

Yields of gas, liquid and solid products are given in Table 10.

TABLE 10

Catalytic data and mass balance of the reactions performed.

| Catalyst[a] | Pt loading (wt %)[b] | HDPE (g) | Conversion to volatiles (g) | Conversion to liquids (g) | Solid residue (g) |
|---|---|---|---|---|---|
| mSiO$_2$/Pt/SiO$_2$[c] | 0.0021 | 1.239 | 0.222 (17.9%) | 0.251 (20.3%) | 0.766 (61.8%) |
| mSiO$_2$/Pt/SiO$_2$[d] | 0.0072 | 1.504 | 0.160 (10.6%) | 0.502 (33.4%) | 0.842 (56.0%) |

[a] 2.4 nm diameter pore mSiO$_2$/Pt/SiO$_2$ catalyst (0.04 Pt wt/silica wt %).
[b] Pt wt/HDPE wt %. The reaction vessel was vented and sampled at room temperature to examine volatile species.
[c] 48 h reaction at 250° C.
[d] 24 h reaction at 300° C.

Figure 104:
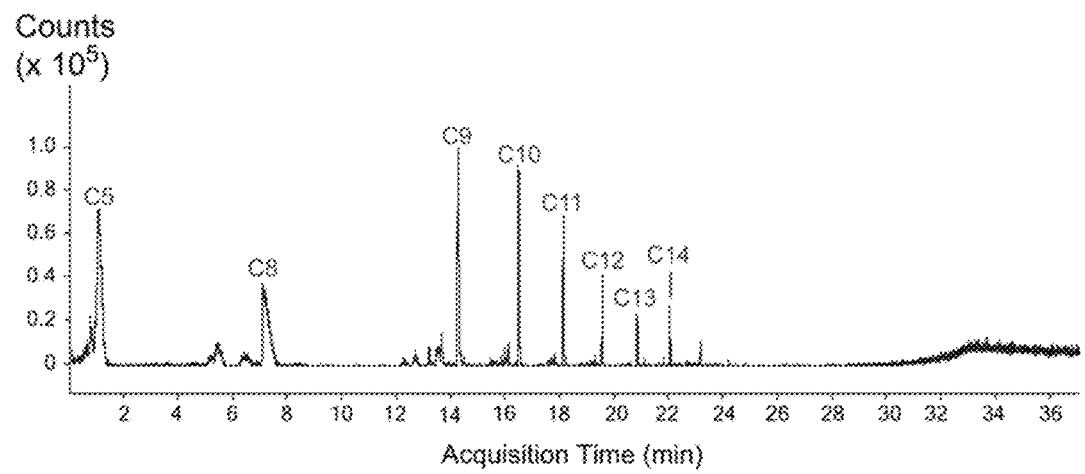
FIG. 104 shows the GC-MS trace of the sampled headspace for the hydrogenolysis reaction of post-consumer HDPE (M$_n$=10.6 kDa, M$_w$=150.1 kDa, Đ=14.1) using 2.4 nm diameter pore mSiO$_2$/Pt/SiO$_2$ (0.04 Pt wt/silica wt %) as catalyst, conditions: 0.0021 Pt wt/HDPE wt % in the reactor for 48 h at 250° C. under H$_2$ (200 psi), cooled to room temperature and vented, giving a yield of volatile species corresponding to 17.9% of the starting mass of HDPE.
Figure 105:
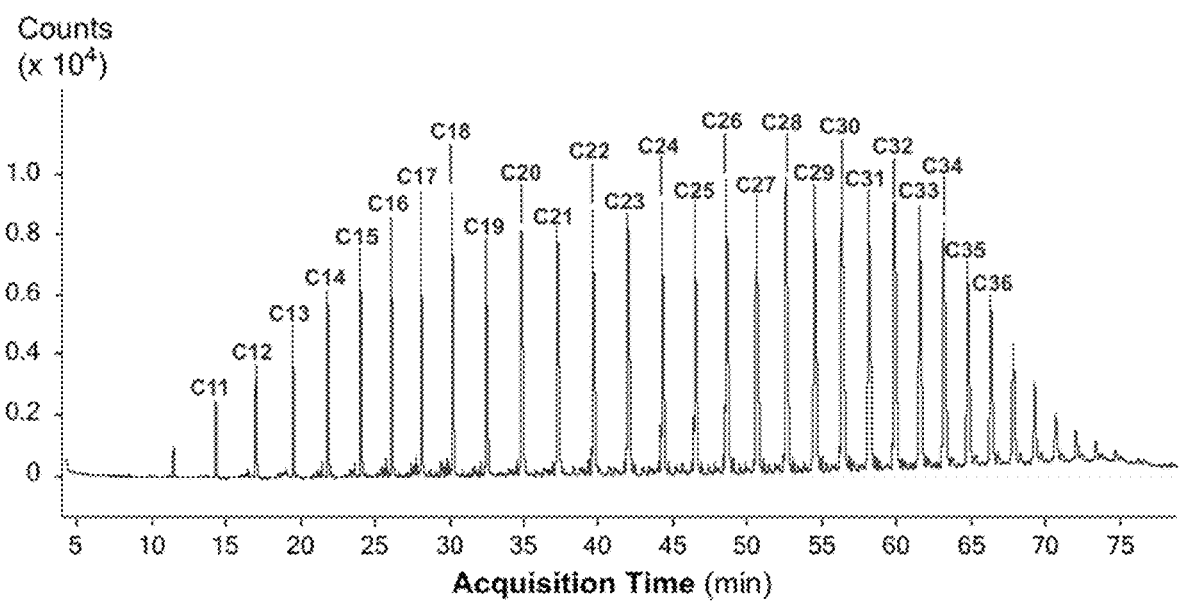
FIG. 105 shows the GC-MS of hydrogenolysis oil products (20.3% yield) from reaction of post-consumer HDPE (M$_n$=10.6 kDa, M$_w$=150.1 kDa, Đ=14.1) using 2.4 nm diameter pore mSiO$_2$/Pt/SiO$_2$ (0.04 Pt wt/silica wt %) as catalyst, conditions: 0.0021 Pt wt/HDPE wt % in the reactor for 48 h at 250° C. under H$_2$ (200 psi), isolated by extraction of the solid reaction mixture with methylene chloride at 80° C.

Gas chromatograms of the products from the catalytic reaction at 250° C. for 48 h are shown in FIGS. 104 and 105.

Figure 106:
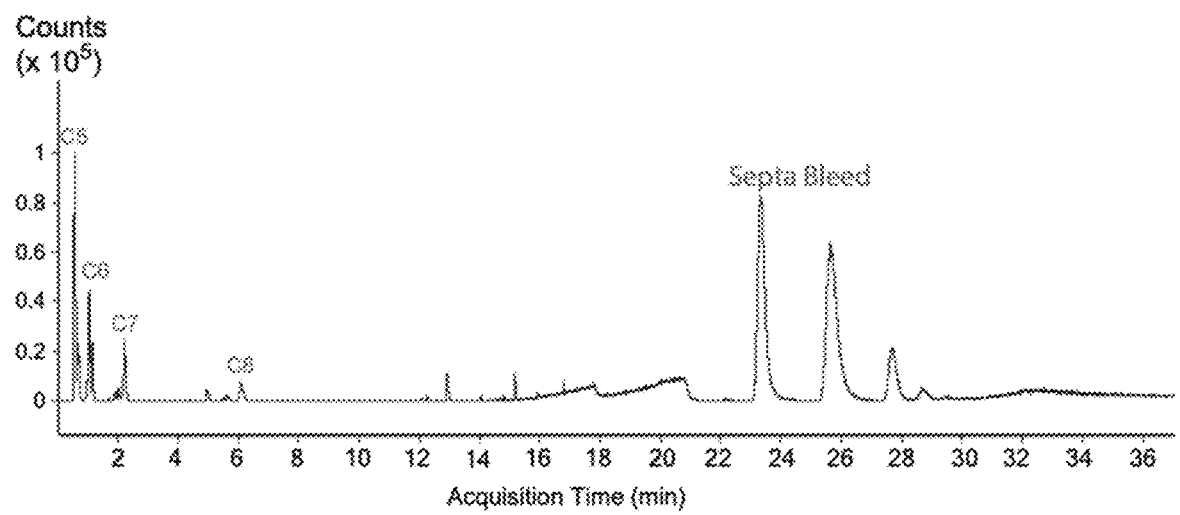
FIG. 106 shows the GC-MS trace of the sampled headspace for the hydrogenolysis reaction of post-consumer HDPE (M$_n$=10.6 kDa, M$_w$=150.1 kDa, Đ=14.1) using 2.4 nm diameter pore mSiO$_2$/Pt/SiO$_2$ (0.04 Pt wt/silica wt %) as catalyst, conditions: 0.0072 Pt wt/HDPE wt % in the reactor for 48 h at 250° C. under H$_2$ (200 psi), cooled to room temperature and vented, giving a yield of volatile species corresponding to 10.6% of the starting mass of HDPE.
Figure 107:
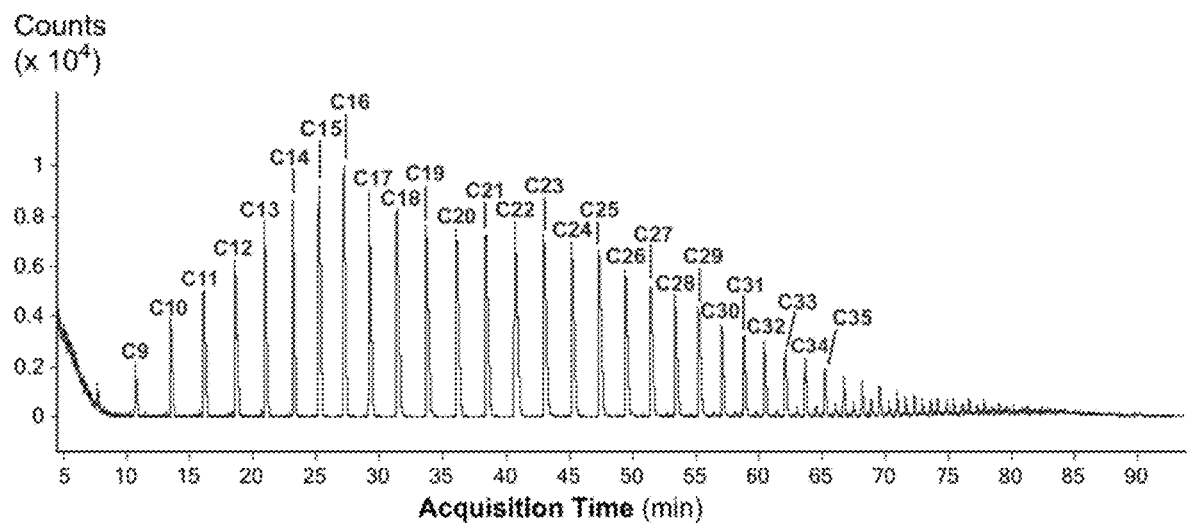
FIG. 107 shows the GC-MS of hydrogenolysis oil products (33.4% yield) from reaction of post-consumer HDPE (M$_n$=10.6 kDa, M$_w$=150.1 kDa, Đ=14.1) using 2.4 nm diameter pore mSiO$_2$/Pt/SiO$_2$ (0.04 Pt wt/silica wt %) as catalyst, conditions: 0.0072 Pt wt/HDPE wt % in the reactor for 24 h at 300° C. under H$_2$ (200 psi), isolated by extraction of the solid reaction mixture with methylene chloride at 80° C.

Gas chromatograms of the products from the catalytic reaction at 300° C. for 24 h are shown in FIGS. 106 and 107.

Example 11—Catalytic Hydrogenolysis of Isotactic Polypropylene

Conversion of iPP into soluble small molecules by hydrogenolysis with 2.4 nm diameter pore mSiO$_2$/Pt/SiO$_2$ (0.0008 Pt wt/silica wt %; 0.04 Pt wt/iPP wt %) after 24 h at 300° C. under H$_2$ (200 psi at room temperature, 250 psi at 300° C.) was 78.9% (as described above in the example for 6 h reactions), determined by the sum of mass of extracted, isolated oils and the mass of gaseous species produced (assessed by difference in mass of reaction mixture before and after catalytic reactions).

Yields of gas phase, oil phase, and residual solid are tabulated in Table 11.

TABLE 11

Catalytic data and mass balance of the iPP hydrogenolysis reaction at 300° C.

| Catalyst | Pt loading (wt %)[a] | HDPE (g) | Conversion to volatiles (g) | Conversion to liquids (g) | Solid residue (g) |
|---|---|---|---|---|---|
| mSiO$_2$/Pt/SiO$_2$[b] | 0.0008 | 3.094 | 0.651 (21.0%) | 2.443 (78.9%) | 0.002 |
| Pt/SiO$_2$ | 0.0008 | 3.054 | 1.443 (47.2%) | 1.611 (52.8%) | — |

[a] Pt wt/HDPE wt %. The reaction vessel was vented and sampled at room temperature to examine volatile species.
[b] mSiO$_2$/Pt/SiO$_2$ catalyst (0.04 Pt wt/silica wt %, 2.4 nm diameter pore).
[c] 2.3 Pt wt/silica wt %.

Figure 108:
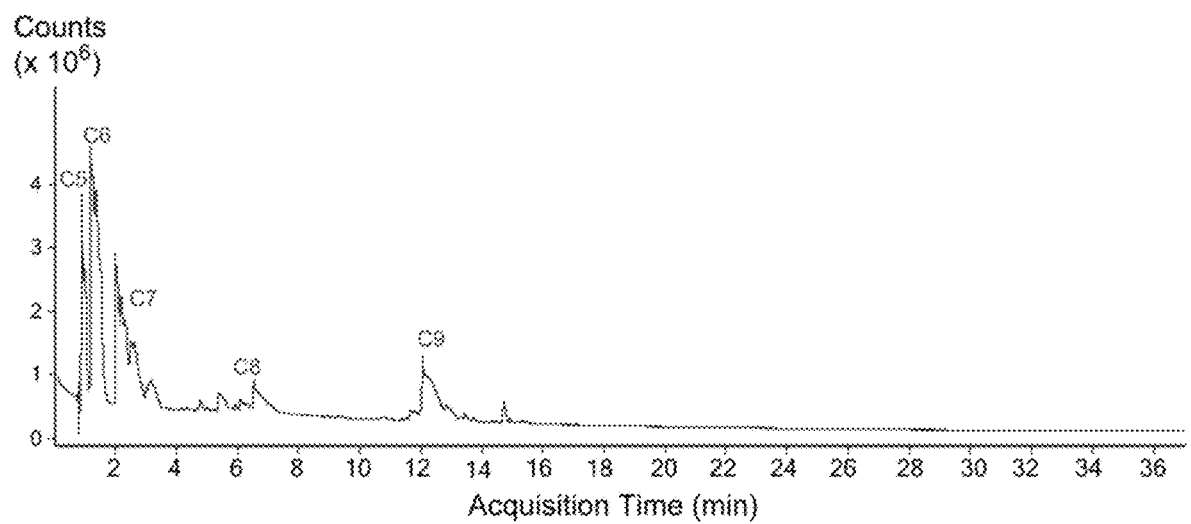
FIG. 108 shows the GC-MS trace of the sampled headspace for the hydrogenolysis reaction of iPP using 2.4 nm diameter pore mSiO$_2$/Pt/SiO$_2$ (0.04 Pt wt/silica wt %) as catalyst, conditions: 0.0008 Pt wt/iPP wt % in the reactor for 24 h at 300° C. under H$_2$ (200 psi), cooled to room temperature and vented, giving a yield of volatile species corresponding to 21.0% of the starting mass of iPP.
Figure 109:
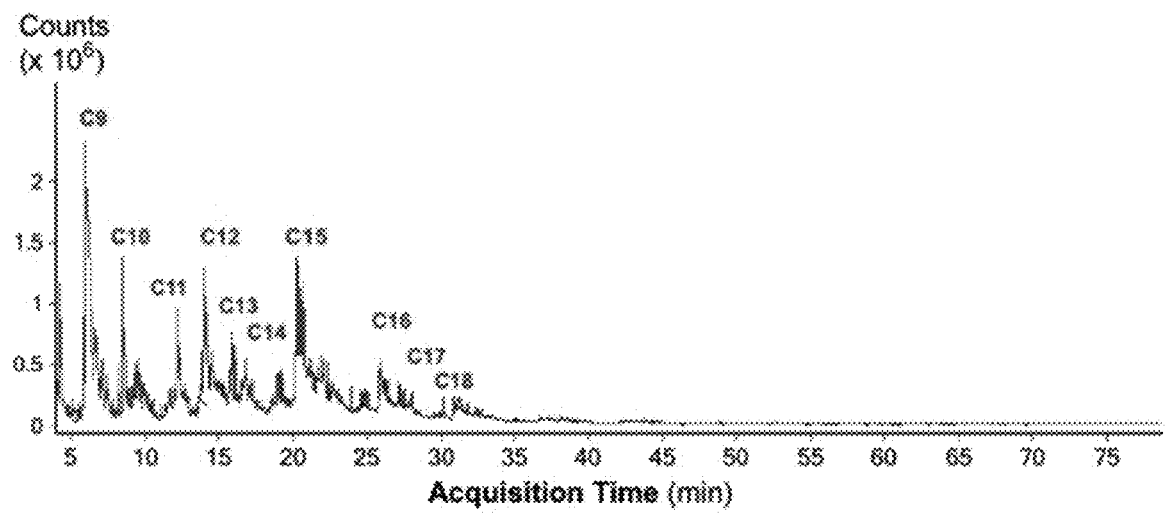
FIG. 109 shows the GC-MS of hydrogenolysis oil products (78.9% yield) from reaction of iPP using 2.4 nm diameter pore mSiO$_2$/Pt/SiO$_2$ (0.04 Pt wt/silica wt %) as catalyst, conditions: 0.0008 Pt wt/iPP wt % in the reactor for 24 h at 300° C. under H$_2$ (200 psi), isolated by extraction of the solid reaction mixture with methylene chloride at 80° C.

The GC-MS trace of the sampled headspace and the GC-MS of oil products for the hydrogenolysis reaction of iPP using 2.4 nm diameter pore mSiO$_2$/Pt/SiO$_2$ (0.04 Pt wt/silica wt %) as catalyst (reaction time 112 hours) is show in FIGS. 108 and 109 respectively.

Figure 110:
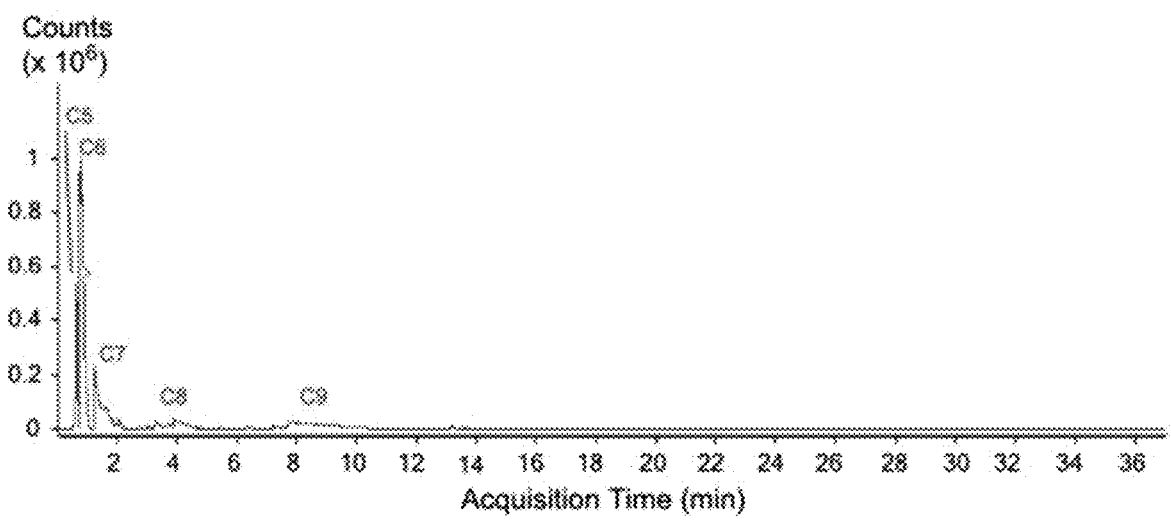
FIG. 110 shows the GC-MS trace of the sampled headspace for the hydrogenolysis reaction of iPP using Pt/SiO$_2$ (2.3 Pt wt/silica wt %) as catalyst, conditions: 0.0008 Pt wt/iPP wt % in the reactor for 24 h at 300° C. under H$_2$ (200 psi), cooled to room temperature and vented, giving a yield of volatile species corresponding to 47.2% of the starting mass of iPP.
Figure 111:
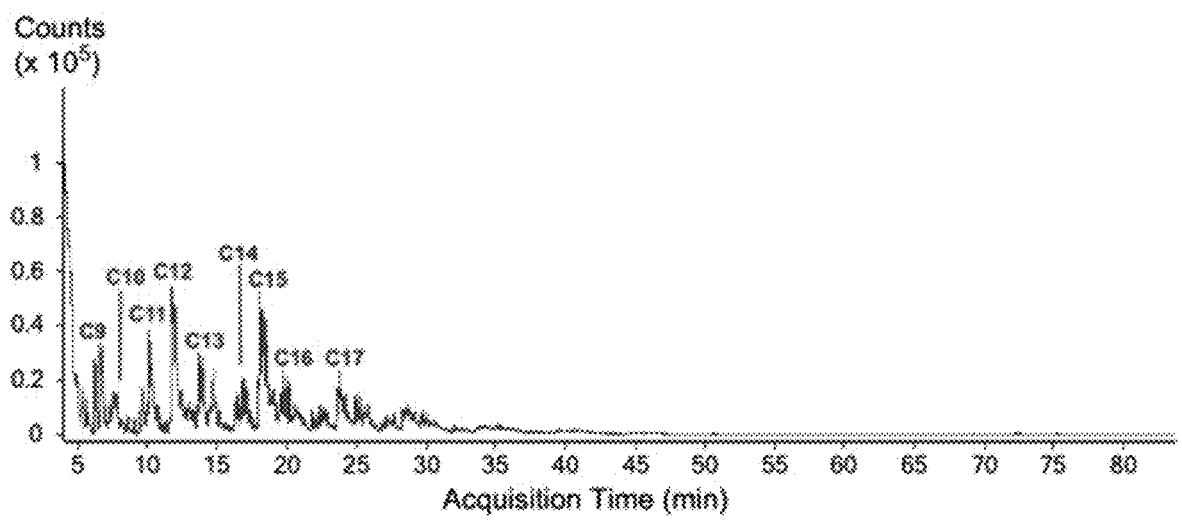
FIG. 111 shows the GC-MS of hydrogenolysis oil products (52.8% yield) from reaction of iPP using Pt/SiO$_2$ (2.3 Pt wt/silica wt %) as catalyst, conditions: 0.0008 Pt wt/iPP wt % in the reactor for 24 h at 300° C. under H$_2$ (200 psi), isolated by extraction of the solid reaction mixture with methylene chloride at 80° C.

The GC-MS trace of the sampled headspace and the GC-MS of oil products for the hydrogenolysis reaction of iPP using 2.4 nm diameter pore mSiO$_2$/Pt/SiO$_2$ (0.04 Pt wt/silica wt %) as catalyst (reaction time 24 hours) is show in FIGS. 110 and 111 respectively.

Example 12—Dynamics of Polyethylene in Silica Materials

The interactions between silica and HDPE are characterized by $^{13}$C solid-state nuclear magnetic resonance (SSNMR) spectroscopy, which inform upon both the conformation and dynamics of polyethylene adsorbed on a support. Briefly, the γ-gauche effect enables the identification of anti (linear, zig-zag, 32 ppm), gauche (bending, 27 ppm), and mobile (~29 ppm) conformers by their $^{13}$C NMR chemical shift. This approach has, for example, been used to detect the ordering of alkyl chains on surfaces, as well as to observe chain diffusion in bulk polyethylene. Also, note that polydimethoxysilane and polyethylene oxide were shown to thread into zeolite or metal-organic frameworks (MOF) pores, respectively. A priori, one might conjecture that these oxygen-containing polymers form stronger interactions with solid materials than polyethylene, especially because the oxygen-free polyvinylidene fluoride did not readily enter the pores of the MOF.

Figures 2A, 2B, 2C:
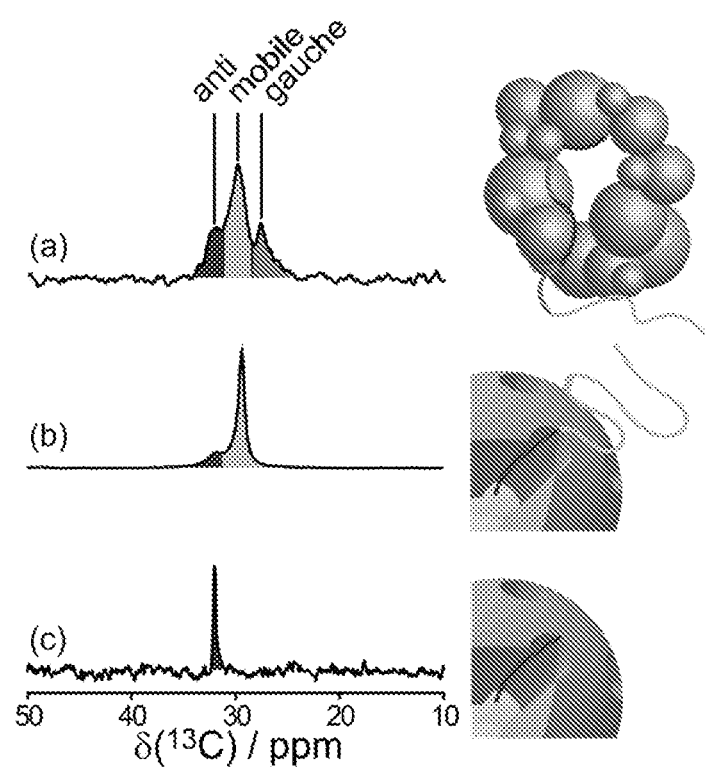
FIGS. 2A-2C show the room temperature $^{13}$C MAS NMR spectra of *PE (M$_n$=130 kDa) adsorbed onto commercial silica gel (FIG. 2A) and mSiO$_2$ (FIG. 2B), an analogous spectrum of natural abundance PE (M$_n$=7 kDa) on mSiO$_2$ (FIG. 2C), spatial assignments are depicted on the right.

Monolayers of $^{13}$C-enriched polyethylene (*PE,) with a number-average molecular mass (M$_n$) of 130 kDa (extended chain length of ~1 μm) were introduced onto Davisil silica gel or mesoporous silica nanoparticles (mSiO$_2$) with an average particle diameter of 450 nm featuring 1.5 nm-wide, ca. 200 nm long pores organized radially from the center of the particle. The $^{13}$C magic-angle-spinning (MAS) SSNMR spectrum obtained for the *PE/Davisil revealed anti, mobile, and gauche conformers similar to that obtained by Inoue, D., et. al., "Structural and Dynamical Studies of $^{13}$C-Labeled Polyethylene Adsorbed on the Surface of Silica Gel by High-Resolution Solid-State $^{13}$C NMR Spectroscopy," *Acta. Polymer.* 46, 420-423 (1995), which is hereby incorporated by reference). Remarkably, the $^{13}$C MAS SSNMR spectrum of *PE/mSiO$_2$ features signals of only anti and mobile conformers (FIGS. 2A-2C). The prominence of the anti-conformer, compared to the gauche, in *PE/mSiO$_2$ would suggest that the mesoporous material is able to induce the formation of long, zig-zag PE domains, consistent with the polymer being threaded into the linear channels of the mSiO$_2$. Prior work suggests that the mobile peak originates from PE chains situated away from the material surface (i.e., located outside of the pore).

Several additional experiments further supported these assignments. First, the integrated intensity of the anti and mobile resonances (1:4), obtained by deconvolution of the spectrum in FIG. 2B, matched the estimated percentage (20%) of ca. 1 m-long polymer chains that could enter roughly 200 nm long pores. Second, cross-polarization (CP) and J-mediated Incredible Natural Abundance DoublE QUAntum Transfer Experiment (INADEQUATE) experiments revealed separate domains composed of anti and mobile methylene units, and the former domain was rigid and extended. Finally, shorter chain HDPE ($M_n$=7 kDa, $^{13}C$ at natural abundance) loaded onto the $mSiO_2$ provided a spectrum that exclusively featured a single sharp resonance with the chemical shift of the anti-conformer (FIG. 2C). Importantly, this result confirmed the suspected spectral distinction of intra- and extra-pore polymer. Additional experiments employing spherical silica particles and a series of surface modifications, confirm that the topology of the material is directing the conformation of the polymer. Taken together, the data lead to the conclusion that HDPE chains thread the mouths of 1.5 nm diameter pores in $mSiO_2$, insert a portion of the chain length that matches the length of the pore, and adopt an extended conformation templated by the linear pore.

Figures 3A, 3B, 3C, 3D:
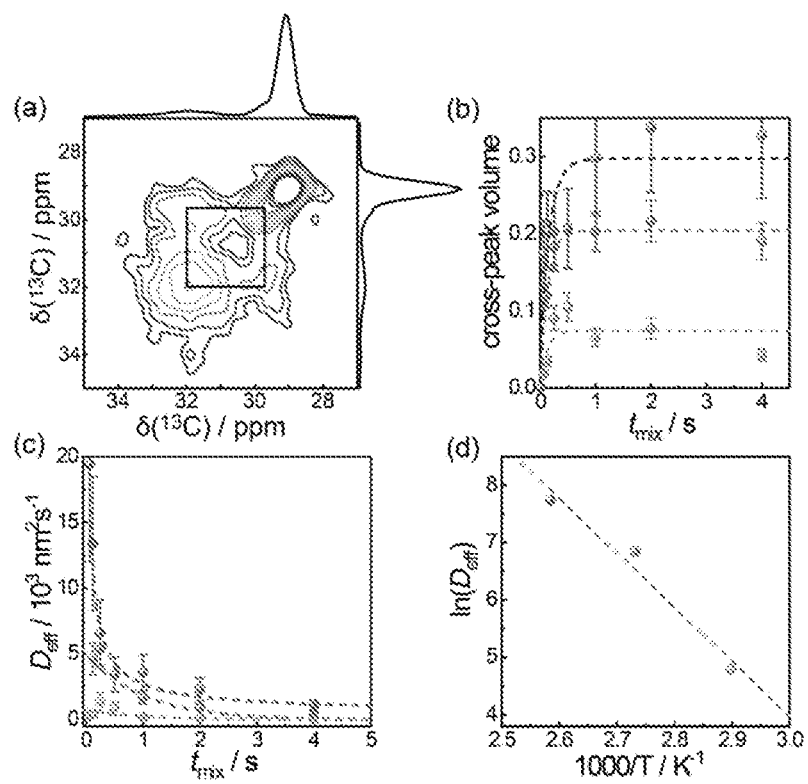
FIGS. 3A-3D show the Representative $^{13}$C EXSY spectrum (93° C., t$_{mix}$=2 s) showing the exchange between the polymer inside the pore and at the pore mouth (black square)(FIG. 3A); Exchange cross-peak build-up curves for temperatures of 72, 93, and 114° C.

These intra- and extra-pore polymer assignments in combination with 2D exchange spectroscopy (EXSY), as demonstrated by Schmidt-Rohr, et. al., "Chain Diffusion between Crystallized and Amorphous Regions in Polyethylene Detected by 2D Exchange $^{13}C$ NMR," Macromol. 24, 5288-5293. (1991), which is hereby incorporated by reference in its entirety, allow detailed interrogation of the dynamic behavior of the species in this system. In EXSY experiments, two time evolution periods are separated by a mixing time ($t_{mix}$) during which the molecules are free to diffuse. Chain diffusion creates off-diagonal cross-peaks in the spectrum wherein a given carbon is found inside the pore for the first evolution period, and outside for the second, for instance. Diffusion cross-peaks were easily identified (top-left and bottom-right corners of the black square) in a representative $^{13}C$ EXSY spectrum (FIG. 3A). Interestingly, the cross-peak corresponded to exchange between the inner-pore region and a small, higher chemical shift shoulder of the mobile resonance, rather than exchange directly between rigid and mobile domains. This higher chemical shift signal was assigned to methylene groups located near the mouth of the pore because the higher shift indicates the species has slightly higher probability of adopting the anti-conformation than in the mobile domain. This environment is analogous to the interfacial region present in between the amorphous and crystalline regions of bulk polyethylene.

Figures 1A, 1B:
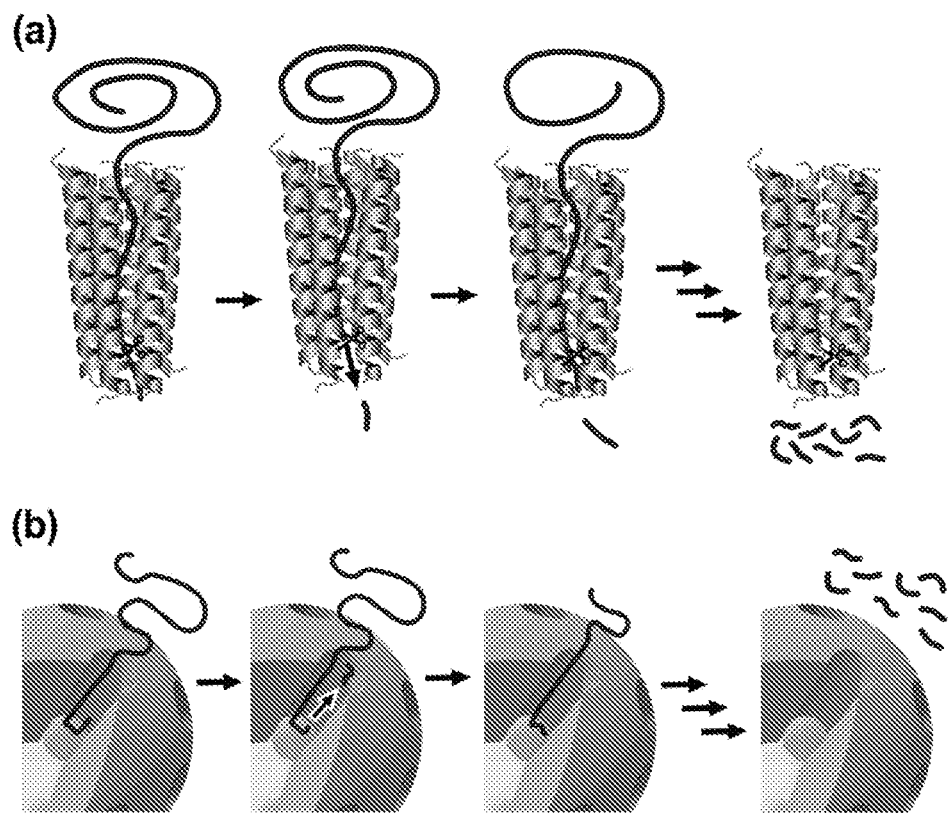
FIGS. 1A-1B show the processive process through which many enzymes deconstruct large macromolecules (FIG. 1A) and an analogous mechanism proposed for the mSiO$_2$/Pt/SiO$_2$ catalyst (FIG. 1B).

The $^{13}C$ EXSY experiment was repeated for $t_{mix}$ values of up to 4 s at temperatures from 72 to 114° C. to estimate the kinetics and thermodynamics of the chain diffusion through the channel. Interestingly, it was observed that the cross-peak intensities did not converge to those expected from pure statistical exchange but that instead a very significant fraction, ca. 70%, of the intra-pore polymer never exits the pore, even at 114° C. (the intensities plotted in FIG. 3B can be read as fractions of intra-pore polymer that can freely leave the pore). As expected, the fraction of the polyethylene that can freely escape the silica channel increases with temperature. Importantly, however, this result demonstrates that the material itself never fully releases the polymer chain. An estimation of equilibrium behavior based on these data suggests that a significant fraction of *PE remains adsorbed in pores at catalytically-relevant temperatures. In addition, experiments performed on eicosane ($C_{20}H_{42}$) show that lower molecular mass fragments do not adsorb strongly onto silica or into 1.5 nm pores. That is, the numerous cumulative dispersion interactions between pore and long hydrocarbon polymer result in strong binding, whereas fewer interactions with small molecules should allow relatively efficient release. Together, this behavior provides the properties required to mimic the processive enzymatic polymer deconstruction process for polymer upcycling depicted in FIG. 1B.

The polymer must also be able to thread through the pore at a reasonable rate for efficient processive catalysis. To probe this translocation rate, a relationship between the cross-peak intensities (I) and the diffusion length ($L=rI=D_{eff}t_{mix}$) was exploited to extract effective intra-pore diffusion coefficients ($D_{eff}$); where r is the pore length (200 nm). The diffusion coefficient depends on the mixing time (FIG. 3C), due to the binding of the polymer, but the initial diffusion coefficient, corresponding to the rate when the polymer is closest to its equilibrium position, is within experimental error with the diffusion coefficient of PE in the melt. Similarly the activation energy for the translation through the pore (80±24 kJ/mol, FIG. 3D) agrees with that measured in bulk PE, These results, therefore, show that while the silica pore is able to bind to PE, this binding is not so strong as to prevent short-range diffusion of the polymer. EXSY experiments performed using the catalytic architecture discussed in the next section show the same behavior.

Example 13—Polyethylene-Surface Interactions

Solid-State NMR

To confirm that the resonance at 32 ppm indeed corresponds to a rigid and more extended polyethylene conformer we have performed $^1H \rightarrow ^{13}C$ cross-polarization (CP)MAS as well as a J-mediated Incredible Natural Abundance DoublE QUAntum Transfer Experiment (INADEQUATE). In consideration of the fact that a threaded polymer should exhibit much lower molecular mobility, and since the CP transfers are mediated by $^1H$-$^{13}C$ dipolar couplings, which in turn are weakened by molecular motions, the mobile part of polymer will be underrepresented in the resulting CPMAS spectrum when compared to the quantitative $^{13}C$ MAS spectrum shown in FIGS. 2A-2C in the main text. Indeed, the relative peak intensities in the spectrum shown in FIG. 112A clearly confirm the high mobility of polyethylene fragments resonating at 29 ppm.

Figures 112A, 112B:
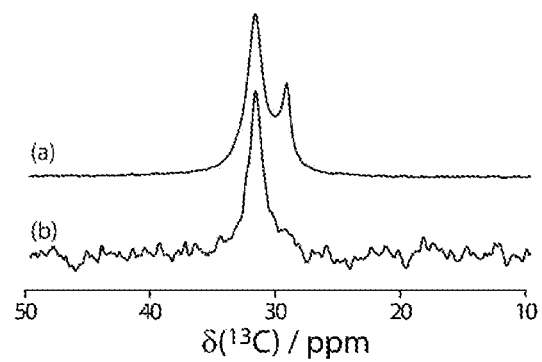
FIGS. 112A-112B show the $^{13}$C CPMAS (FIG. 112A) and CP-refocused-INADEQUATE (FIG. 112B) spectra of $^{13}$C-enriched polyethylene adsorbed on mSiO$_2$.
Figure 113:
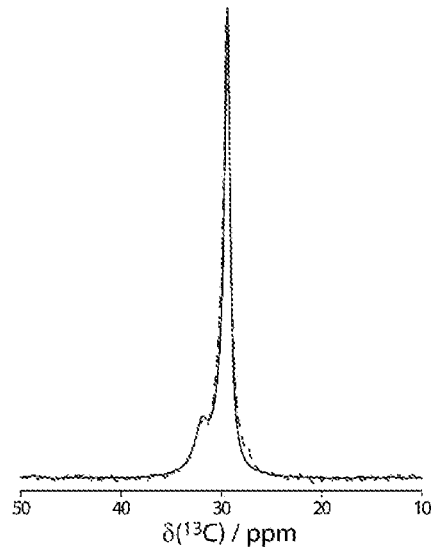
FIG. 113 shows the normalized $^{13}$C Bloch decay MAS spectra of the $^{13}$C-enriched polyethylene that was adsorbed onto the as-synthesized (black) and partly dehydroxylated (dashed) mSiO$_2$ material.

The INADEQUATE experiment returns a non-zero intensity for all $^{13}C$ sites having non-magnetically-equivalent $^{13}C$ neighbors. As such, while a correlation within the all-anti domain is expected (since homonuclear $^{13}C$-$^{13}C$ dipolar coupling prevents magnetic equivalence), a mobile-mobile correlation is not, since this site is homogeneously-broadened and liquid-like, as evidenced by its narrowing at elevated temperatures and inefficient cross-polarization. A correlation between both resonances would result in a non-zero intensity at 29 ppm. In this experiment, only the signal from the anti conformer survived the double quantum filter, demonstrating that indeed the two resonances belong to separate domains and that there are indeed long, all anti, polyethylene segments when the polymer is loaded onto this material (FIGS. 112A-112B).

To substantiate the inventor's theory that the textural properties of the material are what is controlling the polymer's folding two additional control experiments were performed. The first of these was gauged at determining whether the surface chemistry (functional group/OH, densities) could also influence the folding of the polymer. To this aim, the mesoporous silica material was partly dehydroxylated, which was found to linearly-orient the polymer molecules, and repeated the $^{13}C$ MAS NMR experiment, following the polymer loading and washing procedure outlined above. The obtained spectrum was essentially identical to that obtained with the relatively wet surface (see FIG.

113) with the exception that the signal amplitudes were decreased by a factor of 38. This indicates that the polymer-surface interactions must be weaker in the dehydroxylated material, vide infra, and hence more of it was washed away by the solvent, but otherwise the conformation of the polymer at the material surface is unaffected by this change.

Figures 114A, 114B:
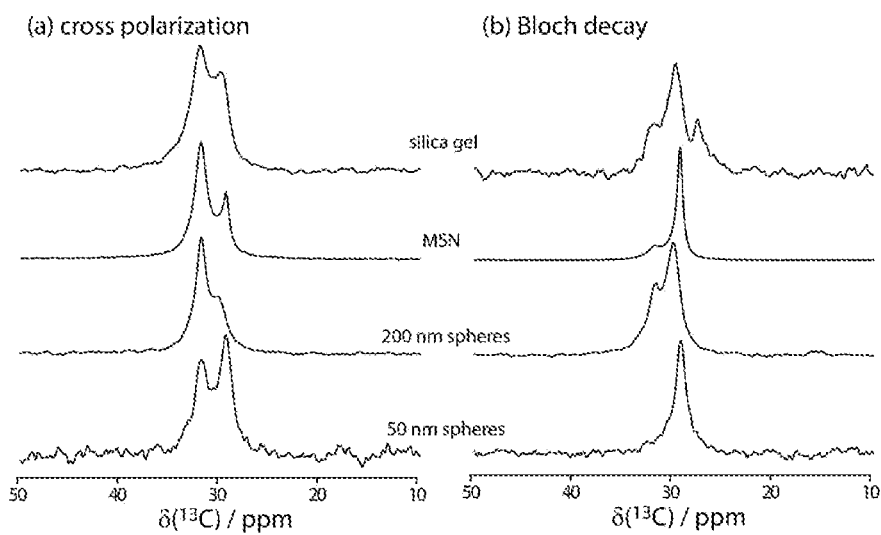
FIGS. 114A-114B show the $^{13}$C CPMAS (FIG. 114A) and Bloch decay MAS (FIG. 114B) NMR spectra of the 130 kg/mol $^{13}$C-enriched polyethylene adsorbed onto different silica materials.

Secondly, the results obtained from the polymer on the $mSiO_2$ were compared with that obtained on a comparable material, albeit without the pores. As such, non-porous silica spheres of a comparable diameter as the $mSiO_2$ (200 nm) as well as spheres of a smaller diameter (50 nm) were prepared. The spectra acquired with the use of CP as well as Bloch decay are shown in FIGS. 114A-114B. The CP spectra emphasize the more rigid parts of the polymer. As can be seen, the $^{13}C$ MAS NMR spectra for the $mSiO_2$ and 200 nm spheres are strikingly different, evidencing that the polymer is entering the pores of the $mSiO_2$. Aside from that, less polymer was loaded onto the silica spheres, as expected, due to their reduced surface areas, and since this polymer was now able to access the longer external surfaces, it was considerably more rigid. In the case of the smaller spheres (50 nm), the diameter was too small to support long cumulative polymer-surface contacts and the polymer loading was drastically reduced. The remaining polymer was then also far more mobile than in the case of the 200 nm spheres.

Figure 115:
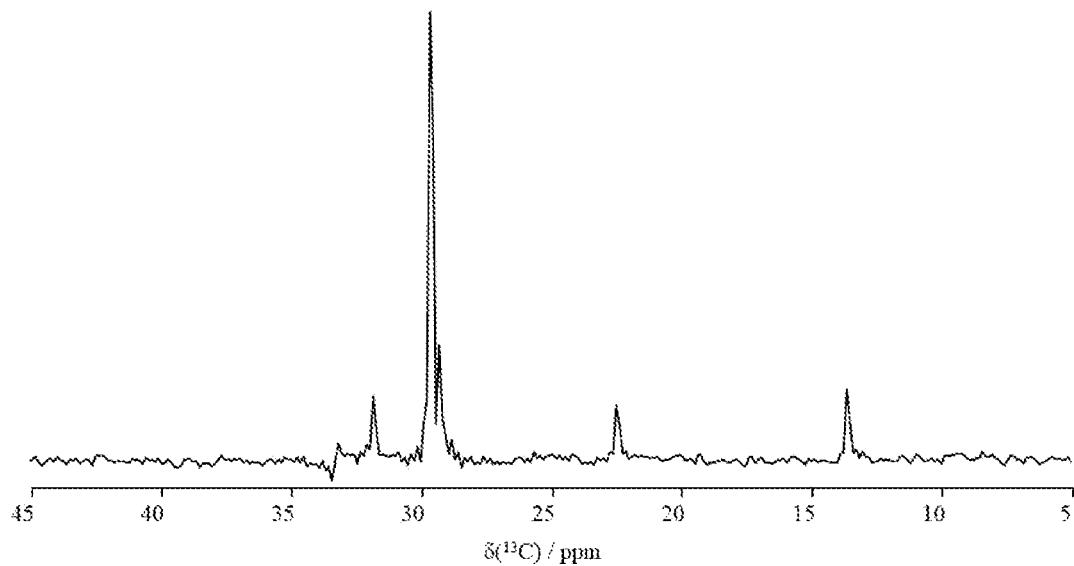
FIG. 115 shows the $^{13}$C Bloch decay MAS NMR spectrum of natural abundance eicosane loaded into the 1.5 nm mSiO$_2$ material at a temperature of 45° C. The three smaller peaks originate from the chain ends and are not detectable in the case of polyethylene.

Thirdly, to determine whether the $mSiO_2$ material would release show chain alkanes following a hydrolysis reaction the conformation of eicosane in the mesoporous silica material was studied. Here eicosane was simply melted into the $mSiO_2$ material in situ in the NMR rotor which contained an excess of the $mSiO_2$. Performing this experiment with polyethylene yields a resonance at 32 ppm, as shown in the main text. With eicosane, however, even at 45° C. (it's melting point is around 37° C.) no rigid signals were observed (see FIG. 115), indicating that the short oligomer is free and does not adsorb strongly to the silica surface.

Figure 116:
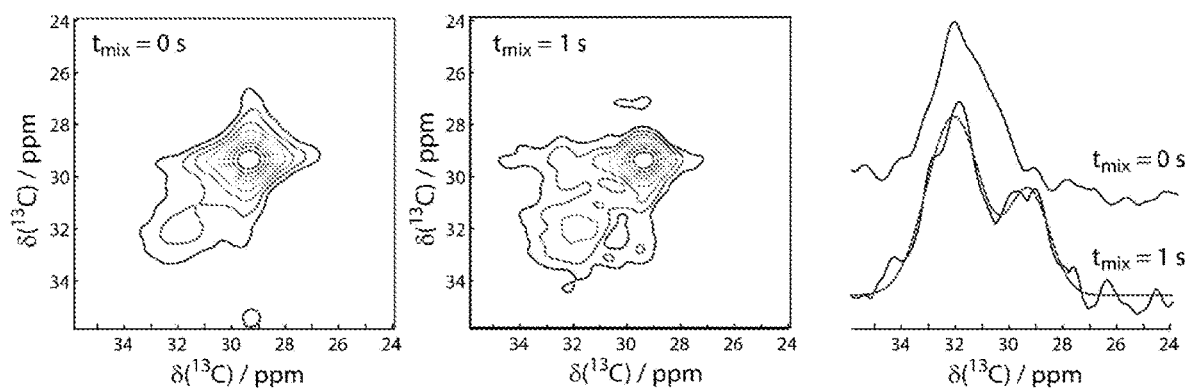
FIG. 116 shows the $^{13}$C 2D EXSY spectra taken for the mSiO$_2$/SiO$_2$ sample with mixing times of 0 and 1 s. F1 slices are shown on the right where the appearance of the exchange peak is evident.

Finally, to confirm the generality of the observations made on the $mSiO_2$ material as well as the principles' transferability to the $mSiO_2/Pt/SiO_2$ material, $^{13}C$-PE was loaded onto a Pt-free core-shell material which was then investigated using $^{13}C$ EXSY at a temperature of 72° C. The exchange spectra are shown in FIG. 116 below for mixing times of 0 and 1 s where no cross-peaks are expected as well as where the cross-peak amplitudes were expected to saturate. Vertical slices taken along the 32 ppm axis are also shown. The cross-peak saturates to a level of 0.3 corresponding to translocations of up to 30 nm, in good agreement with that measured for the $mSiO_2$ material which possessed longer pores. This result demonstrates that the processive behavior observed for $mSiO_2$ is a general feature that is also present in the material used for catalysis.

Analysis of the EXSY Data

Figures 117A, 117B, 117C:
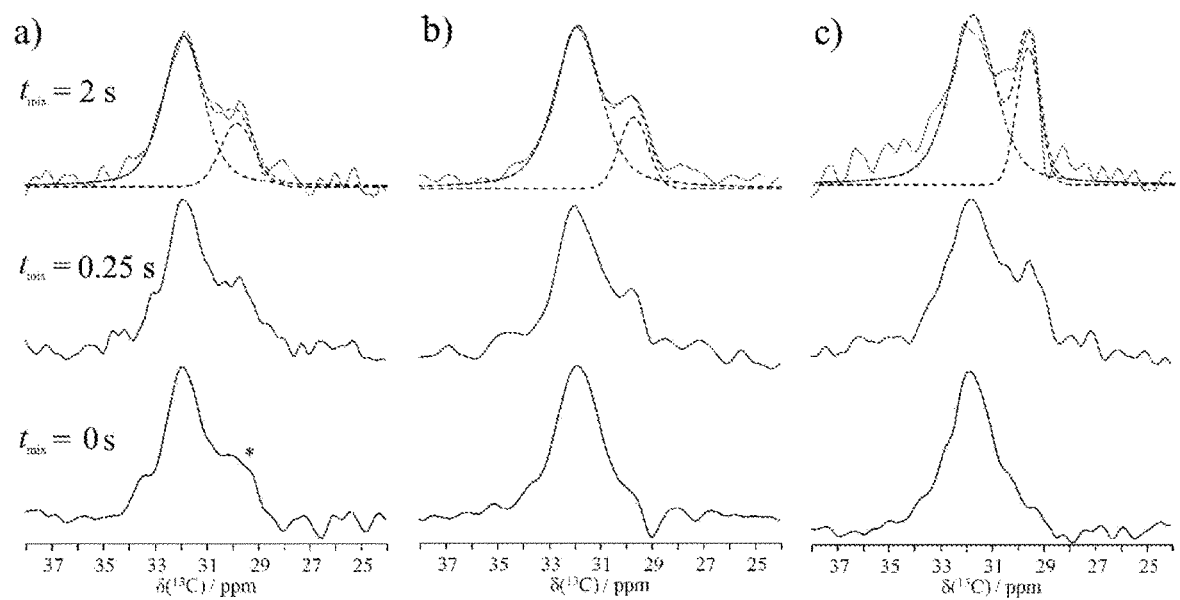
FIGS. 117A-117C show the Summed F1 projections of selected $^{13}$C EXSY NMR spectra of the 130 kg/mol $^{13}$C-enriched polyethylene adsorbed onto mSiO$_2$. From top to bottom, the spectra correspond to mixing times of 2 s, 0.25 s, and 0 s. From left to right, the spectra were collected at different temperatures, with 72° C.

EXSY data were processed using TopSpin 4.0.4. For all spectra, the region of the F2 axis spanning 31 ppm to 34 ppm was summed, and the resulting projection was fit using one or two pseudo-Voigt functions. For spectra collected at a given temperature, the region corresponding to the pore interior was initially fit using the zero mixing time spectrum (which should have no exchange peak). The peak position and breadth were then constrained and used in the fit of spectra with longer mixing times. In addition to the function fitting the pore interior, a second function was used to fit the interfacial region assigned to polymer at the pore mouth. The parameters of this function were allowed to vary freely and were checked for consistency between spectra with different mixing times. The peak position and breadth were found to be consistent within the resolution limit of the F1 axis (approx. 0.2 ppm). For the 72° C. spectra, artifacts arising from the truncation of the mobile peak lead to spurious intensity in the interfacial region. This intensity was accounted for via fitting the 0 s mixing time spectra and subtracting the intensity from spectra with non-zero mixing times. Representative spectra are presented in FIGS. 117A-117C.

Figure 118:
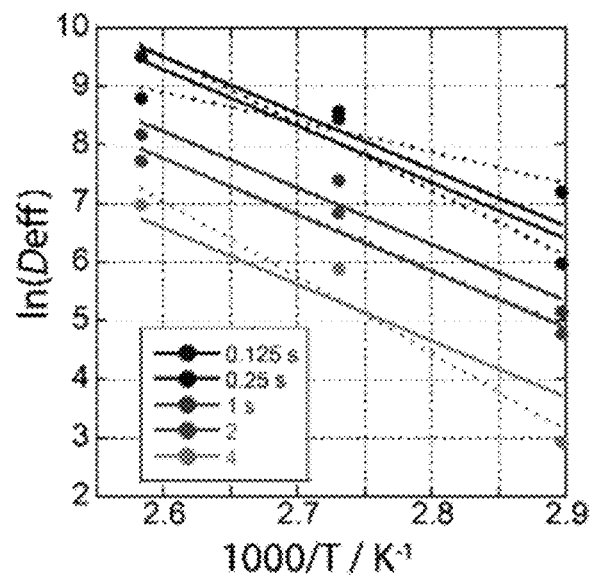
FIG. 118 shows the Arrhenius plot used to determine the activation energy for the intra-pore diffusion at different mixing time (t$_{mix}$=0.125, 0.25, 1, 2, and 4 s). The simultaneous fit of all five mixing times to a single activation energy is depicted with the solid lines, while the dotted lines correspond to the fit from a single mixing time alone.
Figure 119:
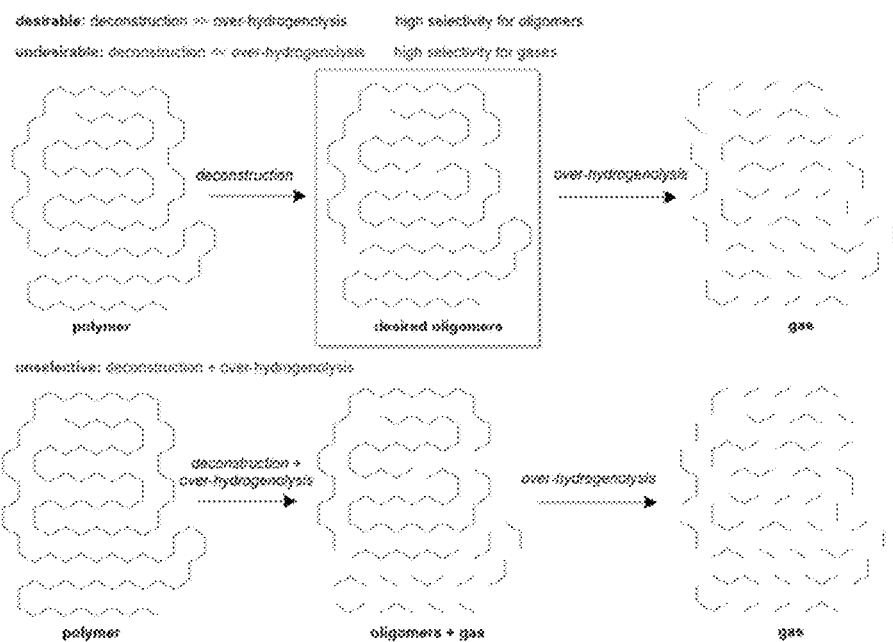
FIG. 119 shows the pathways for catalyst-controlled hydrogenolysis of polyethylene (PE) into wax-like oligomers or gases.
Figures 120A, 120B, 120C, 120D, 120E, 120F:
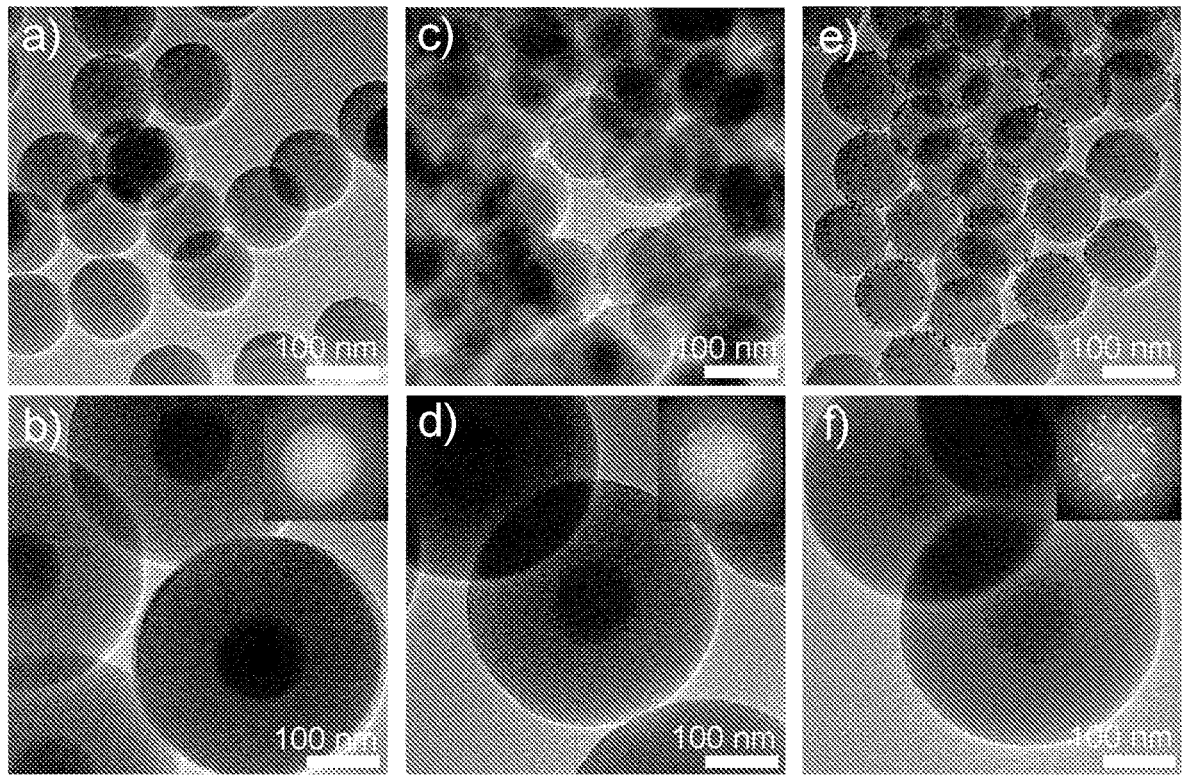

Uncertainties in the parameters of the functions making up the fit, and hence the uncertainties in the ratio of the peaks, were estimated via Monte Carlo modeling. Spectra were fit using DMfit version 20150521. These data were used to calculate Arrhenius activation energies for intra-pore diffusion (FIG. 118).

Example 14—Pt Nanoparticle Size

General Procedure 24 nm Stöber Silica. L-arginine (18.2 mg) and ultrapure water (13.9 mL) were thoroughly mixed. Cyclohexane (0.9 mL) was added gently to form a two-layer system. The solution was heated to 60° C. for 30 min with stirring at ~300 rpm. TEOS (1.10 mL) was added to the mixture, which was then heated at 60° C. for 20 h. After this time, the aqueous layer (bottom) was separated from the organic layer and stored in a refrigerator.

45 nm Stöber Silica. The suspension of 24 nm Stöber silica seed particles (4 mL) was diluted with ultrapure water (14.4 mL). Cyclohexane (2 mL) was then added gently to form a two-layer system. The mixture was heated to 60° C. for 30 min with stirring at ~300 rpm. TEOS (1.408 mL) was then quickly added, in a single portion, to the top layer, and the reaction mixture was heated at 60° C. for 30 h. After this time, the bottom layer was separated from the organic layer and stored in a refrigerator.

120 nm Stöber Silica. 120 nm $SiO_2$ spheres were prepared using the Stöber method. The above aqueous solution of 45 nm Stöber silica seed particles (1 mL) was mixed with ultrapure water (2.6 mL), ethanol (18 mL), and ammonium hydroxide (1.7 mL). The mixture was stirred at 500 rpm for 1 h at room temperature. Three portions of TEOS (1.5 mL total volume) were added in a dropwise fashion to the solution every 30 min (0.5 mL per addition). The reaction was stirred at room temperature for 6 h. The $SiO_2$ spheres were separated, washed with an ethanol/water solution (50/50 v/v; 5×20 mL), and then dried under vacuum at room temperature.

1.7 nm Pt NPs. NaOH (12.5 mL, 0.5 M) in ethylene glycol was added to a solution of $H_2PtCl_6\cdot 6H_2O$ (0.25 g, 0.48 mmol) in 12.5 mL of ethylene glycol. The mixture was heated at 160° C. for 3 h accompanied by $N_2$ bubbling. A 6-mL aliquot of the resulting solution was transferred to a vial. The particles were precipitated by adding HCl (1 mL, 2 M), and dispersed in ethanol containing polyvinylpyrrolidone (PVP-K30, $M_w$=40,000, 12.2 mg). The solvent was evaporated, and the residue was redispersed in water.

2.9 nm Pt NPs. PVP-K30 ($M_w$=40,000; 133 mg) was dissolved in an aqueous solution of $H_2PtCl_6\cdot 6H_2O$ (20 mL, 6 mM) and methanol (180 mL). The mixture was heated at reflux (80° C.) for 3 h. The solvent was evaporated, and the residue was redispersed in water.

5 nm Pt NPs. $K_2PtCl_4$ (41.5 mg), $C_{14}TAB$ (505 mg), and PVP-K30 ($M_w$=40,000; 222 mg) were added to ethylene glycol (20 mL). The vessel was purged with argon to create an inert atmosphere, and the solution was heated at 140° C. for 2 h. Acetone (180 mL) was added to precipitate "as prepared" Pt NPs. The precipitate was further washed with an ethanol/hexanes mixture (¼ v/v; 5×20 mL), and ethanol (20 mL) was added to the material for storage.

$NH_2$—$SiO_2$. In a typical synthesis, 120 nm $SiO_2$ spheres (1 g) were dispersed in isopropanol (175 mL). A solution of APTS (200 µL) in isopropanol (25 mL) was added to this dispersion to functionalize the silica spheres with $NH_2$ groups. The reaction mixture was allowed to age at 80° C., and then the $SiO_2$ spheres were washed with ethanol (3×20 mL) and separated by centrifugation at 8000 rpm. The $NH_2$—$SiO_2$ spheres were dried under vacuum at room temperature and annealed at 100° C. in air for 5 h.

Pt—X/$SiO_2$. Typically, 600 mg $NH_2$—$SiO_2$ spheres were dispersed in ethanol (180 mL). Pt NPs solution was taken out according to the desired loading and diluted to a final volume of 220 mL with ethanol. The 220 mL diluted Pt NPs solution was added to 180 mL $NH_2$—$SiO_2$ suspension dropwise with vigorous magnetic stirring (500 rpm). After addition, the resulting Pt—X/$SiO_2$ suspension was further sonicated for 30 min. After separation, the Pt—X/$SiO_2$ precipitate was washed with ethanol 5 times and stored in ethanol.

$mSiO_2$/Pt—X/$SiO_2$. Pt/$SiO_2$ spheres (25 mg) were dispersed in ethanol (10 mL) by sonication for 30 min at room temperature. A pre-mixed solution of $C_{16}$TAB (165 mg) in $H_2O$ (50 mL) and ethanol (16.3 mL) was added to the above Pt/$SiO_2$ dispersion, and the mixture was sonicated for another 30 min. We then added ammonium hydroxide (550 uL) to the suspension. After 30 min of gentle stirring, a solution of TEOS (720 µL) in ethanol (5 mL) was added in a dropwise manner in portions (4×180 µL) every 30 min to the above suspension. The suspension was stirred for 6 h at room temperature. The $mSiO_2$/Pt—X/$SiO_2$ particles were separated on a centrifuge, washed with ethanol (3×20 mL), and finally dispersed into a mixture of methanol (15 mL) and concentrated hydrochloric acid (1 mL). This mixture was heated at reflux (80° C.) for 24 h to remove the $C_{16}$TAB surfactant. After refluxing, $mSiO_2$/Pt—X/$SiO_2$ catalysts were washed thoroughly with ethanol (6×15 mL) by centrifugation at 8000 rpm.

$N_2$ physisorption data for $mSiO_2$/Pt—X/$SiO_2$ catalysts is shown in table 12.

TABLE 12

| sample | BET surface area (m²/g) | pore volume (cm³/g) | BJH pore size-ad(nm) | TEM sizes (nm) |
|---|---|---|---|---|
| $mSiO_2$/Pt-1.7/$SiO_2$ | 981 | 0.81 | 2.4 | 348 (15) |
| $mSiO_2$/Pt-2.9/$SiO_2$ | 969 | 0.81 | 2.4 | 350 (15) |
| $mSiO_2$/Pt-5.0/$SiO_2$ | 943 | 0.83 | 2.4 | 350 (15) |

The HT-GPC analysis of molecular mass and distributions of PE (Alfa Aesar 041321) is shown in FIG. 190.

Methods and Conditions for Catalytic Reactions

Ethylene hydrogenation. Ethylene hydrogenation experiments were conducted in a gas flow reactor. Typically, catalysts were mixed with quartz sand (200 mg). The reaction gases were composed of He (flowing at 156 mL/min; 99.999%), $C_2H_4$ (2.4 mL/min; 99.9%), and $H_2$ (24 mL/min; 99.995%) at 1 atm. Catalysts were preactivated in the reactor by heating at 200° C. while flowing 10% $O_2$/He for 1 h, He for 0.5 h, and then 10% $H_2$/He for 1 h. A cooling bath was used to maintain catalyst bedding at 20° C. The gas composition was monitored online using an HP 5890 gas chromatography equipped with a capillary column (HP PLOT Q, 30 m×0.32 mm×0.25 µm) with a flame ionization detector (FID). The ethylene hydrogenation activity was assessed using the rate at the initial portion of the reaction. The Pt NPs catalysts undergo deactivations during the hydrogenation reaction at rates that are related to particle size.

Polyethylene hydrogenolysis. Polyethylene hydrogenolysis experiments were performed in Parr autoclaves equipped with an overhead mechanical stirrer. Polyethylene (3.0 g) and the catalyst were loaded into a glass-lined autoclave, which was sealed and purged using alternating vacuum and argon cycles (3×). The reactor was pressurized with $H_2$, mixing was initiated, and the vessel heated at 300° C. for a preset time (6, 8, 12, 15 or 20 h). Then, the reactor was allowed to cool, and the headspace was sampled and analyzed using a GC-FID. Methylene chloride was added to the reactor, which was sealed and heated to 80° C. The resulting suspension was filtered, and ethylene chloride was evaporated from the filtrate to provide the extracted wax product. The remaining solid on the filter was dried, its mass was determined. The yield of gases was calculated by subtracting the initial mass of the polymer by the mass of extracted waxes and solid residue. The extracted wax was analyzed using GC-MS.

Comparisons between catalytic materials. The mass of Pt used in catalytic PE hydrogenolysis experiments is normalized to give equivalent conversion to that of $mSiO_2$/Pt-5.0/$SiO_2$-catalyzed hydrogenation of ethylene under equivalent conditions.

mass(reference) × activity(reference) × wt. % Pt(reference) = mass(catalyst) × activity(catalyst) × wt. % Pt(catalyst)

$$\text{mass(catalyst)} = \frac{\text{mass(reference)} \times \text{activity(reference)} \times \text{wt. \% } Pt(\text{reference})}{\text{activity(catalyst)} \times \text{wt. \% } Pt(\text{catalyst})}$$

reference = $mSiO_2$/Pt – 5.0/$SiO_2$ mass(reference) =

0.036 g $mSiO_2$/Pt – 5.0/$SiO_2$ used in HDPE hydrogenolysis activity(reference) = initial experimental rate of $C_2H_6$ formation using $mSiO_2$/Pt – 5.0/$SiO_2$ =

20.5 mmol $C_2H_6 \cdot g_{Pt}^{-1} s^{-1}$ wt. % Pt(reference) =

$$\frac{\text{mass } Pt}{\text{mass } mSiO_2/Pt-5.0/SiO_2} = 0.28 \text{ wt. \%} \left(\text{determined by } ICP-MS\right)$$

activity(catalyst) = initial experimental rate of $C_2H_6$ formation using $mSiO_2$/Pt–X/$SiO_2$ $$\text{wt. \% } Pt(\text{catalyst}) = \frac{\text{mass } Pt}{\text{mass } mSiO_2/Pt-X/SiO_2} \left(\text{determined by } ICP-MS\right)$$

Gas Chromatography Analysis

Headspace analysis method. Gas Chromatography-Flame Ionization Detector (GC-FID). Gas samples taken from the headspace of the Parr reactor were analyzed by GC-FID using an Agilent Technologies 7890A GC system equipped with a flame ionization detector. A capillary column, Agilent J&W GS-GasPro [0.32 mm×15 m], was used for compound separation. Samples were injected manually using a gas-tight syringe.

Method for analyzing extracted waxes. Gas chromatography-mass spectrometry (GC-MS). An Agilent Technologies 7890 A GC system equipped with an Agilent Technologies 5975 C inert MSD mass spectrometer was used to analyze the nature of the extracted liquid products. A capillary column, Agilent J&W DB-5ht ((5%-phenyl)-methylpolysiloxane, 0.25 mm×30 m×0.1 µm) was used for compound separation. Samples were prepared by dissolving 20 mg of the extracted liquid products in 2 mL of dichloromethane.

Quantification of GC-MS extractable waxes. The composition of the extracted wax fraction, in terms of amounts of each chain length in the samples, is estimated using our previous reported approach, given here for convenience: A GC-MS of the ASTM standard was integrated. A plot of integrated area vs. carbon number (shown in FIG. 21) allows the determination of response of all $C_n$ (since ASTM standard does not include $C_{13}$, $C_{19}$, $C_{21}$, etc.) by interpolation. The regions of $C_6$-$C_{20}$ and $C_{20}$-$C_{40}$ are linear, but with inequivalent slopes. Therefore, these two regions were fit separately.

The relative mass ratio as a function of carbon number $F(C_n)$ was calculated by dividing the area of each peak (or calculated peaks for the appropriate range using the linear fits from FIG. 22) by that of the $C_{12}$ (which was arbitrarily chosen-note that this protocol was also tested with $C_{24}$ and, expectedly, gives an equivalent scaling factor for each peak).

$$\text{relative mass ratio} = F(C_n) = \frac{\text{integrated peak area of } C_n}{\text{integrated peak area of } C_{12}}$$

The relative mass ratio for each $C_n$ allows the estimation of the GC-MS response for hydrocarbon species as a function of the $C_n$. In GC-MS of catalytic mixtures below, the observed integrated intensities for each carbon number are appropriately scaled based on the relative mass ratio $F(C_n)$.

relative intensity for a carbon number =

$$G(C_n) = \frac{\text{observed integrated intensity of catalytic sample}}{F(C_n)}$$

The percentage of each carbon number is determined by dividing that carbon number's relative intensity by the sum of the relative intensities for all carbon species observed.

$$\% C_n = \frac{G(C_n)}{\sum_{6}^{36} G(C_n)} \times 100\%$$

High Temperature Gel Permeation Chromatography

Number-averaged and weight-averaged molecular weights ($M_n$ and $M_w$) and molecular weight distributions ($M_w/M_n$) of the polymers were determined by high-temperature gel permeation chromatography (HT-GPC; Agilent-Polymer Laboratories 220) equipped with RI and viscometer detectors. Monodisperse polyethylene standards (PSS Polymer Standards Service, Inc.) were used for calibration ranging from ~330 Da to ~120 kDa. The column set included 3 Agilent PL-Gel Mixed B columns and 1 PL-Gel Mixed B guard column. 1,2,4-trichlorobenzene (TCB) containing 0.01 wt % 3,5-di-tert-butyl-4-hydroxytoluene (BHT) was chosen as the eluent at a flow rate of 1.0 mL/min at 160° C. The samples were prepared in TCB at a concentration of ~5.0 mg/mL and heated at 150° C. for 24 h prior to injection.

Catalyst Design and Preparation

Mesoporous shell/catalyst/core ($mSiO_2/Pt$—$X/SiO_2$) materials containing Pt NPs with average diameters of 1.7 nm ($mSiO_2/Pt$-1.7/$SiO_2$), 2.9 nm ($mSiO_2/Pt$-2.9/$SiO_2$), and 5 nm ($mSiO_2/Pt$-5.0/$SiO_2$) were synthesized to investigate the effects of Pt particle size on catalytic polyolefin hydrogenolysis in a confined environment specifically and uniformly located at the closed ends of mesopores. All other meso- and nanostructural properties of the $mSiO_2/Pt$—$X/SiO_2$ materials are equivalent across the three catalysts, including the 120 nm size of the $SiO_2$ core, as well as the 2.4 nm diameter and the 120 nm length of the mesopores in the silica shell. The uniform meso- and nanoscale architecture of these catalysts was created through the synthetic approach. Common 120 nm monodisperse solid silica spheres, prepared via a seeded growth process, react with aminopropyl trimethoxysilane to give surface-functionalized $NH_2$—$SiO_2$ spheres. Polyvinylpyrrolidone (PVP)-capped Pt NPs, either 1.7 (±0.3), 2.9 (±0.5), or 5.0 (±1.0) nm in diameter (FIGS. 125A-125C) were immobilized onto the $NH_2$—$SiO_2$ spheres (Pt—$X/SiO_2$, X=1.7, 2.9, or 5.0 nm), then the 120 nm thick, radially-aligned mesoporous silica shell was grown on the Pt—$X/SiO_2$. Transmission electron microscopy (TEM) reveals that, as desired, the silica core sizes and mesoporous shell thickness are equivalent across the three samples, and the Pt NPs are localized at the core-shell interface (FIGS. 120A-120F). Pt NPs are more clearly observed in the sample prepared with 5.0 nm Pt NPs compared to the smaller Pt NPs, which are nonetheless also clearly localized at the core-shell interface in the high-angle annular dark-field scanning transmission electron microscopy (HAADF-STEM) images. The $N_2$ isotherms from Brunauer-Emmett-Teller (BET) analysis, 943-981 $m^2$/g range of surface areas, 0.81-0.83 $cm^3$/g pore volumes, and 2.4 nm pore diameters calculated from the BJH model were all nearly identical for three catalysts (FIGS. 126, 127). That is, the characterization data indicates that the only significant physical difference between $mSiO_2/Pt$-1.7/$SiO_2$, $mSiO_2/Pt$-2.9/$SiO_2$, and $mSiO_2/Pt$-5.0/$SiO_2$ is the size of the platinum NPs. We also note that 1.7 nm Pt NPs are smaller, on average, than the 2.4 nm mesopore diameter, while the average sizes of the Pt NPs in the other two catalytic materials are larger than that of the mesopores.

The active surface area of platinum, which varies between the three $mSiO_2/Pt$—$X/SiO_2$ catalytic materials on a per mass basis, should be kept constant to compare the catalysts' behavior in polyolefin hydrogenolysis reactions. Active Pt in the $mSiO_2/Pt$—$X/SiO_2$ materials was estimated using the structure-insensitive ethylene hydrogenation reaction (Table 13). The $mSiO_2/Pt$-1.7/$SiO_2$ material, as expected, catalyzes ethylene hydrogenation with the highest initial activity (95.2 mmol $C_2H_6 \cdot g_{Pt}^{-1} s^{-1}$), while the activity of $mSiO_2/Pt$-5.0/$SiO_2$ (20.5 mmol $C_2H_6 \cdot g_{Pt}^{-1} s^{-1}$) is the lowest. The higher activity per mass of smaller NP Pt catalyst is attributed to their higher dispersion. The amount of catalyst used for hydrogenolysis reactions was normalized to have the same number of Pt active sites based on the performance of $mSiO_2/Pt$-5.0/$SiO_2$ in ethylene hydrogenation.

TABLE 13

Reaction rate data for ethylene hydrogenation on mSiO$_2$/Pt-X/SiO$_2$ catalysts.

| Catalyst | Loading (Pt wt/silica wt %)[a] | Activity (mmol · g$_{Pt}^{-1}$ s$^{-1}$)[b] | Mass of catalyst used for hydrogenolysis (g)[c] |
|---|---|---|---|
| mSiO$_2$/Pt-1.7/SiO$_2$ | 0.085 | 95.2 | 0.0256 |
| mSiO$_2$/Pt-2.9/SiO$_2$ | 0.40 | 37.0 | 0.0140 |
| mSiO$_2$/Pt-5.0/SiO$_2$ | 0.28 | 20.5 | 0.0360 |

[a]Pt loading for each mSiO$_2$/Pt-X/SiO$_2$ catalyst was measured by inductively coupled plasma (ICP)-MS.
[b]Reaction conditions: C$_2$H$_4$ (10 Torr), H$_2$ (100 Torr), He (650 Torr), total flow 182.4 mL/min, at 293K, activity calculated based on ethane production.
[c]Typical mass of each mSiO$_2$/Pt-X/SiO$_2$ catalysts used for polyethylene hydrogenolysis reaction.

Polyethylene hydrogenolysis experiments examining the effects of Pt NP sizes employ these three mSiO$_2$/Pt—X/SiO$_2$ catalysts. Typical reaction conditions use linear polyethylene (ca. 3 g PE, M$_n$=20 kDa, M$_w$=90 kDa, ρ=0.92 g/mL) and 0.89 MPa of H$_2$ pressure, heated at 300° C. for 6-20 h, in a mechanical impeller-mixed autoclave containing from 0.02-0.1 mg Pt, under solvent-free conditions. At the end of each experiment, the reactors contained a condensed-phase fraction as well as volatile species in the headspace. The volatile species were quantified by comparison of the mass of condensed phase materials before and after the conversion, and the C$_1$-C$_9$ hydrocarbons composition of the volatiles was quantified by gas chromatography-flame ionized detector (GC-FID). Soluble species were extracted from the condensed phase using methylene chloride to give a yield of 'extracted waxes'. The yield is defined as the weight of waxes divided by the total weight of initially added polymer. The quantified composition of the extracted waxes was analyzed by calibrated GC-mass spectrometry (MS), which showed mostly linear C$_8$~C$_{50}$ hydrocarbons. Analysis of the quantities of each fraction and their composition, in terms of molecular weight and distribution, provides key insight for comparing performance of the three mSiO$_2$/Pt—X/SiO$_2$ catalytic materials. The relative activity of the catalysts for carbon-carbon bond cleavage is estimated by comparing conversion of PE into small molecules, per surface active site of Pt under equivalent reaction conditions. The most active catalyst converts the largest amount of insoluble solid polymer. The activity of catalytic materials may also be compared by analyzing the amounts of volatile and extracted species formed per unit time, with volatile species corresponding to more carbon-carbon bond cleavages. For example, formation of 1 g of CH$_4$ corresponds to a ca. 19-fold greater number of C—C bond hydrogenolysis steps than 1 g of C$_{20}$H$_{42}$; in contrast, conversion of a solid polymeric material with M$_n$~20 kDa into a polymer with M$_n$~10 kDa corresponds to only one C—C bond hydrogenolysis step, on average. Thus, such assays of catalytic activity are best considered qualitatively.

These two estimates indicate that catalyst activity follows the trend mSiO$_2$/Pt-1.7/SiO$_2$>mSiO$_2$/Pt-2.9/SiO$_2$>mSiO$_2$/Pt-5.0/SiO$_2$ over the course of the PE deconstructions (Table 14). For example, based on the amount of unextracted CH$_2$Cl$_2$-insoluble materials after reaction, mSiO$_2$/Pt-1.7/SiO$_2$ affords 25% conversion of PE after 6 h at 300° C. under 0.89 MPa, whereas only 15% and 6% consumption of PE are observed using mSiO$_2$/Pt-2.9/SiO$_2$ or mSiO$_2$/Pt-5.0/SiO$_2$, respectively (FIGS. 128A-128B). In addition, mSiO$_2$/Pt-1.7/SiO$_2$ gives the most soluble species (16%) and the most gas-phase species (9%), while mSiO$_2$/Pt-5.0/SiO$_2$ produces the least amount of soluble and volatile species (4 and 2%, respectively). These data indicate that the smallest Pt NP catalyst is most active at short reaction times (at the lowest experimentally accessible conversion under these conditions). This trend continues over the course of the experiments. After 12 h, mSiO$_2$/Pt-1.7/SiO$_2$ catalyzes the hydrogenolysis of 62% of PE, while mSiO$_2$/Pt-5.0/SiO$_2$ gives only 26% conversion.

TABLE 14

Gas, extractable waxes, and insoluble products formed at different reaction time from mSiO$_2$/Pt-X/SiO$_2$-catalyzed hydrogenolysis (X = 1.7, 2.9, and 5.0 nm).[a]

| Catalyst[a] | Product | Reaction Time (h) | | | |
|---|---|---|---|---|---|
| | | 6 | 8 | 12 | 20 |
| mSiO$_2$/Pt-1.7/SiO$_2$ | PE (g) | 3.029 | 3.030 | 3.015 | 3.007 |
| | gas | 0.274 (9.1%) | 0.349 (11.6%) | 0.345 (11.4%) | 1.993 (66.3%) |
| | liquid | 0.476 (15.7%) | 0.880 (29.0%) | 1.523 (50.5%) | 1.014 (33.7%) |
| | solid | 2.279 (75.2%) | 1.801 (59.4%) | 1.147 (38.0%) | n.a. |
| mSiO$_2$/Pt-2.9/SiO$_2$ | PE (g) | 3.004 | 3.001 | 3.002 | 3.018 |
| | gas | 0.255 (8.4%) | 0.250 (8.3%) | 0.360 (12.0%) | 0.451 (14.9%) |
| | liquid | 0.195 (6.4%) | 0.611 (20.4%) | 1.315 (43.8%) | 2.138 (70.8%) |
| | solid | 2.554 (85.2%) | 2.139 (71.3%) | 1.327 (44.2%) | 0.428 (14.2%) |
| mSiO$_2$/Pt-5.0/SiO$_2$ | PE (g) | 3.066 | 3.000 | 3.001 | 3.066 |
| | gas | 0.119 (3.9%) | 0.140 (4.7%) | 0.259 (9.8%) | 0.303 (9.8%) |
| | liquid | 0.058 (1.9%) | 0.255 (8.5%) | 0.525 (17.5%) | 1.892 (61.7%) |
| | solid | 2.889 (94.2%) | 2.604 (86.8%) | 2.216 (73.8%) | 0.807 (26.2%) |

[a]Reaction conditions: 3 g of PE (M$_n$ = 20 kDa, M$_w$ = 90 kDa, ρ = 0.92 g/mL), with 0.0007-0.003 wt. % Pt with respect to PE, 0.89 MPa H$_2$, 300° C.

The yields of extracted waxes also follow the trend mSiO$_2$/Pt-1.7/SiO$_2$>mSiO$_2$/Pt-2.9/SiO$_2$>mSiO$_2$/Pt-5.0/SiO$_2$. After 6 h, for example, the most active catalyst mSiO$_2$/Pt-1.7/SiO$_2$ provides 15.7% extractable waxes, whereas mSiO$_2$/Pt-2.9/SiO$_2$ or mSiO$_2$/Pt-5.0/SiO$_2$ form only 6.4% and 1.9%, respectively. In general, the yields of extractable fractions increase during the batch conversion following this trend, until all the unextractable solids are consumed. At that point, the yield of wax decreases. The yield of extracted material obtained using the catalyst mSiO$_2$/Pt-1.7/SiO$_2$ decreases from 74% after 15 h to 34% after 20 h (FIG. 121).

Although more volatile species are formed both initially (6 h) and at high conversion (20 h) with the mSiO$_2$/Pt-1.7/SiO$_2$ catalyst than using the larger Pt NP catalysts, following a similar trend as described above for extractable waxes, intermediate conversions reveal a powerful, particle-size independent effect on selectivity. Specifically, similar quantities of volatile species are obtained after 12 h with each of the catalytic materials (ca. 10-12%), even with dramatically different conversions of polymer.

The mass fraction of volatile species formed using mSiO$_2$/Pt-1.7/SiO$_2$ is roughly constant from the first 6 h (at 25% conversion of PE) to 15 h (at 86% conversion of PE), indicating that the solid polymeric materials undergo selective hydrogenolysis to the extractable waxes over that portion of the reaction (FIG. 121). In addition, the percentage of mass corresponding to volatile species increases from ca. 4% after 6 h (at 5% conversion of PE) to 10% after 12 h (26% conversion of PE) using the mSiO$_2$/Pt-5.0/SiO$_2$ catalyst. That is, the quantity of volatile species obtained from mSiO$_2$/Pt-1.7/SiO$_2$ after 6 h is comparable to that of mSiO$_2$/Pt-5.0/SiO$_2$ after 12 h, corresponding to equivalent conversions of PE (FIGS. 129 and 131).

After 20 h, quantitative conversion of polyethylene is achieved with mSiO$_2$/Pt-1.7/SiO$_2$. Concurrently, the quantity of volatile species dramatically increases, and the fraction of extractable waxes dramatically decreases. This behavior is attributed to over-hydrogenolysis, which involves further conversion of oligomeric primary products into lower value light hydrocarbons. The over-hydrogenolysis process only becomes dominant once most or all the long-chain PE is consumed. A test of this idea involves the hydrogenolysis reaction using mSiO$_2$/Pt-1.7/SiO$_2$ for 15 h, which a priori was postulated to give high yield of extractable waxes and similar (~10-12%) yields of volatile species at high PE conversion, based on over-hydrolysis at 20 h and the behavior of the other two catalytic materials in Table 14. The result from this experiment matches our expectation, giving 73.6% yield of extractable waxes with only 12.4% of gases. Remarkably, all three Pt-sized catalysts give similar mass fractions of volatile products at conversions of PE ranging from 25-70% (e.g., 10-12% volatiles), suggesting that the over-hydrogenolysis process occurs only at high PE conversion, regardless of the Pt NP size.

mSiO$_2$/Pt—X/SiO$_2$ materials also catalyze the hydrogenolysis of a second, smaller polyethylene sample (M$_n$=5.9 kDa, M$_w$=30 kDa) under identical conditions (ca. 3 g of PE, 300° C., 0.89 MPa H$_2$) (Table 15). A related trend in activity, in which mSiO$_2$/Pt-1.7/SiO$_2$ produces the most liquids and gases (87.3% by mass) after 6 h, while mSiO$_2$/Pt-2.9/SiO$_2$ and mSiO$_2$/Pt-5.0/SiO$_2$ catalyze the hydrogenolysis of ca. 64% of the polyethylene to extractable waxes and gases. The distribution of chain lengths in the extracted waxes is similar for the three mSiO$_2$/Pt—X/SiO$_2$ catalysts. In addition, similar over-hydrogenolysis is observed after 24 h using mSiO$_2$/Pt-1.7/SiO$_2$ as the catalyst, giving 55% of volatile species by mass at that time. This 5.9 kDa M$_n$ polyethylene is more reactive than the longer 20 kDa M$_n$ polyethylene studied above, producing a higher mass percentage of gases and extractable waxes for each catalyst under equivalent conditions. Note that the overall catalytic process involves diffusion and adsorption of chains into the pores, polymer chain adsorption onto Pt, single (or multiple) C—C bond cleavage steps of the chain, and diffusion of the smaller polymer fragments. The relative rates of these steps will affect the overall rate of polymer conversion. Thus, the combined rates of these steps are faster for the shorter polymer (M$_n$=5.9 kDa) than the longer one (M$_n$=20 kDa).

mSiO$_2$/Pt-X/SiO$_2$ materials also catalyze the hydrogenolysis of a second, smaller polyethylene sample (M$_n$=5.9 kDa, M$_w$=30 kDa) under identical conditions (ca. 3 g of PE, 300° C., 0.89 MPa H$_2$) (Table 15). A related trend in activity, in which mSiO$_2$/Pt-1.7/SiO$_2$ produces the most liquids and gases (87.3% by mass) after 6 h, while mSiO$_2$/Pt-2.9/SiO$_2$ and mSiO$_2$/Pt-5.0/SiO$_2$ catalyze the hydrogenolysis of ca. 64% of the polyethylene to extractable waxes and gases. The distribution of chain lengths in the extracted waxes is similar for the three mSiO$_2$/Pt-X/SiO$_2$ catalysts. In addition, similar over-hydrogenolysis is observed after 24 h using mSiO$_2$/Pt-1.7/SiO$_2$ as the catalyst, giving 55% of volatile species by mass at that time. This 5.9 kDa M$_n$ polyethylene is more reactive than the longer 20 kDa M$_n$ polyethylene studied above, producing a higher mass percentage of gases and extractable waxes for each catalyst under equivalent conditions. Note that the overall catalytic process involves diffusion and adsorption of chains into the pores, polymer chain adsorption onto Pt, single (or multiple) C—C bond cleavage steps of the chain, and diffusion of the smaller polymer fragments. The relative rates of these steps will affect the overall rate of polymer conversion. Thus, the combined rates of these steps are faster for the shorter polymer (M$_n$=5.9 kDa) than the longer one (M$_n$=20 kDa).

TABLE 15

Data from mSiO$_2$/Pt-X/SiO$_2$-catalyzed hydrogenolysis of the M$_n$ = 5.9 kDa PE.[a]

| Catalyst | Reactant/Products | Reaction Time (h) 6 | 12 | 20 |
|---|---|---|---|---|
| mSiO$_2$/Pt-1.7/SiO$_2$ | PE (g) | 3.010 | 3.009 | 3.013 |
| | gas | 0.886 (29.4%) | 1.320 (43.8%) | 1.664 (55.3%) |
| | extracted wax | 1.756 (58.3%) | 1.551 (51.5%) | 1.349 (44.7%) |
| | solid | 0.363 (12.3%) | 0.137 (4.5%) | n.a. |
| mSiO$_2$/Pt-2.9/SiO$_2$ | PE (g) | 3.004 | 3.002 | 3.018 |
| | gas | 3.044 | 3.036 | 3.010 |
| | extracted wax | 0.451 (14.8%) | 0.446 (14.7%) | 0.403 (13.3%) |
| | solid | 1.486 (48.8%) | 1.788 (58.8%) | 1.925 (63.9%) |

TABLE 15-continued

Data from mSiO$_2$/Pt-X/SiO$_2$-catalyzed hydrogenolysis of the M$_n$ = 5.9 kDa PE.[a]

| Catalyst | Reactant/Products | Reaction Time (h) | | |
|---|---|---|---|---|
| | | 6 | 12 | 20 |
| mSiO$_2$/Pt-5.0/SiO$_2$ | PE (g) | 3.033 | 3.019 | 3.009 |
| | gas | 0.638 (21.3%) | 0.514 (17.0%) | 0.496 (17.1%) |
| | extracted wax | 1.272 (41.9%) | 1.647 (54.7%) | 1.676 (55.8%) |
| | solid | 1.112 (36.6%) | 0.859 (28.4%) | 0.834 (27.1%) |

[a]Reaction conditions: 3 g of PE (M$_n$ = 5.9 kDa, M$_w$ = 36 kDa, ρ = 0.94 g/mL), with 0.0007-0.003 wt. % Pt with respect to PE, H$_2$ (0.89 MPa), 300° C.

The rates of the individual steps, also, could affect the mean chain length and shape of the distribution of hydrocarbon products in the extractable liquids and waxes. Alternatively, or in addition to a kinetic effect, the average length of the platinum NP that is accessible to the polymer chains could influence the hydrocarbon product distribution via a templating mechanism, as noted in the Introduction. In such a scenario in which the NP templates the product chain length, 1.7 nm and 5.0 nm platinum NPs would give the shortest and longest average chain lengths, respectively. Our previous observation that the diameter of the pores in the mesoporous shell influences the distribution could also come from such kinetic or templating effects.

Given that each of the mSiO$_2$/Pt—X/SiO$_2$ catalysts could provide hydrocarbon species characteristic of the sizes of their NPs, it was surprising that instead, the mean and distribution of product chain length in the extracted wax products are very similar for the three catalysts and over a wide range of conversions. Comparisons show similar compositions of the extractable fractions, determined by calibrated GC-MS, obtained after equivalent reaction times, or at similar conversions of solid polymer or having similar percent yields (by mass) of extracted species. Most of the experiments afford soluble hydrocarbon wax products with a mean chain length of ca. C$_{23}$ and similarly shaped distributions, as seen by visual inspection (FIG. 122) and statistical analysis of the histograms. For example, the mean chain length and distributions of the extracted waxes, obtained using the three Pt NP-sized catalysts, are virtually identical from reactions performed to ca. 75% conversion of PE (60-70% yield of wax). Moreover, the distributions of C$_1$ chains in the extracted waxes are statistically indistinguishable, in terms of the mean product sizes [C$_{23}$] and between the variances in product size [±7 carbons] as determined by one-way analysis of variance (ANOVA).

The distribution of chain lengths in the extracted oil fraction is also independent of conversion throughout the catalytic regime that produces the most extractable oils. For example, mSiO$_2$/Pt-1.7/SiO$_2$ provides C$_{23}$-centered bell-like distributions of chain lengths as the extracted wax yields range from 30% after shorter reactions (8 h) to 73% after longer times (15 h).

At lower conversions obtained with shorter reaction times, the C$_{23}$-centered distribution is distorted by a lower molecular weight fraction, giving a 'shoulder' to the bell-shaped distribution at ~C$_{14}$ (FIG. 123, 8 h data and FIG. 124). These non-Gaussian lower molecular weight species are likely formed as part of the process that initially produces shorter gas-phase species, and the relative abundance of these species decreases as conversion to a C$_{23}$-centered distribution of wax products increases during the catalytic reactions. Similarly, over-hydrogenolysis, at high conversions that afford large amounts of gaseous products, also produces a large molar fraction of the extracted products with shorter chain lengths (C$_9$-C$_{15}$) than observed in the C$_{23}$-centered distributions from shorter reaction times.

The above observations result from the combined effects of the mesoporous shell/active site/core architecture and the high activity of the Pt NP sites. Control reactions, in which platinum-free mesoporous silica shell/solid silica core materials (mSiO$_2$/SiO$_2$) are heated with PE under H$_2$ at 300° C. for 12 h, result in minimal conversion of the solid polymer (3.6%) and even less extractable oil product (1.2%; Table 16).

TABLE 16

Gas, extractable waxes, and insoluble products formed from mSiO$_2$/SiO$_2$-catalyzed hydrogenolysis reaction.[a]

| Catalyst | PE (g) | Reaction time (h) | Volatile products (%) | Extracted products (%) | Solid residue (%) |
|---|---|---|---|---|---|
| mSiO$_2$/SiO$_2$ | 3.043 | 12 | 0.074 g (2.4%) | 0.0.037 g (1.2%) | 2.932 g (96.4%) |

[a]Reaction conditions: 3 g of PE (M$_n$ = 20 kDa, M$_w$ = 90 kDa, ρ = 0.92 g/mL), 0.89 MPa H$_2$, 300° C.

The small amount of extracted liquids contains the signature features of mSiO$_2$/Pt/SiO$_2$ experiments at low conversion, namely a ca. C$_{23}$-centered broad distribution of chain lengths with a shoulder around C$_{14}$ (FIG. 140, 143). The similarity of these distributions suggests that a background reaction, involving interactions of PE and mSiO$_2$ but not Pt sites, occurs at an early stage of all the conversions. A second control experiment shows that the Pt particles supported on the silica core (Pt—X/SiO$_2$) but lacking the mesoporous silica shell are much less effective than the mSiO$_2$/Pt—X/SiO$_2$ catalysts. For example, conversion of PE is only 4.6% after 12 h using Pt-1.7/SiO$_2$, in comparison to 62% obtained under equivalent conditions with mSiO$_2$/Pt-1.7/SiO$_2$. The low conversion was also obtained using Pt-2.9/SiO$_2$ (4.3%); and Pt-5.0/SiO$_2$ (13.5%; Table 17). The higher activity of Pt-5.0/SiO$_2$ compared to Pt-1.7/SiO$_2$ is likely due to less structural changes of the former under catalytic conditions. The extracted wax products from the Pt—X/SiO$_2$ catalytic materials appear as a flat distribution of chain lengths (FIGS. 179, 182, and 185).

TABLE 17

Gas, extracted waxes, and insoluble products formed from Pt-X/SiO$_2$-catalyzed hydrogenolysis reaction.[a]

| Catalyst | PE (g) | Reaction Time (h) | Volatiles products (%) | Extracted products (%) | Solid residue (%) |
|---|---|---|---|---|---|
| Pt-1.7/SiO$_2$ | 3.075 | 12 | 0.056 g (1.8%) | 0.084 g (2.7%) | 2.935 g (95.4%) |
| Pt-2.9/SiO$_2$ | 3.029 | 12 | 0.036 g (1.2%) | 0.094 g (3.1%) | 2.899 g (95.7%) |
| Pt-5.0/SiO$_2$ | 3.008 | 12 | 0.194 g (6.4%) | 0.212 g (7.1%) | 3.007 g (86.4%) |

[a]Reaction conditions: 3 g of PE (M$_n$ = 20 kDa, M$_w$ = 90 kDa, ρ = 0.92 g/mL), with 0.0007-0.003 wt. % Pt with respect to PE 0.89 MPa H$_2$, 300° C.

The quantity of volatile species, time-dependence of the mass-based fractions of products (gases, methylene chloride-extracted waxes, and the residual solid), GC-FID trace of the sampled headspace, the GC-MS of extracted waxes, and the carbon number distribution of extracted waxes for the hydrogenolysis reaction from mSiO$_2$/Pt-1.7/SiO$_2$-catalyzed, mSiO$_2$/Pt-2.9/SiO$_2$-catalyzed, mSiO$_2$/Pt-5.0/SiO$_2$-catalyzed, and mSiO$_2$/SiO$_2$-catalyzed hydrogenolysis at various catalyst loadings and reaction times is shown in FIGS. 130, 132-139, 141, 142, 144-181, 183, and 184.

FIG. 186 shows the bubble wrap plastic waste obtained from backyard as litter, no pre-cleaning was performed prior to reactions.

The GC-FID trace of the sampled headspace, the GC-MS of extracted waxes, and the carbon number distribution of extracted waxes for the hydrogenolysis reaction using mSiO$_2$/Pt-1.7/SiO$_2$ (0.085 Pt wt/silica wt %) as catalyst is shown in FIGS. 187-189.

The inequivalent behavior of mSiO$_2$/Pt—X/SiO$_2$ and Pt—X/SiO$_2$ catalytic architectures are at least partly related to changes in Pt NPs during hydrogenolysis reactions. The TEM image of catalytic Pt-1.7/SiO$_2$ materials, collected post-catalysis at high conversion (62%) after methylene chloride extraction to remove the hydrocarbon products, revealed a significant amount of detached, sintered, and aggregated Pt NPs. In contrast, TEM of mSiO$_2$/Pt-1.7/SiO$_2$ collected on as-synthesized and post-reaction materials indicates that Pt NPs are located at the shell/core interface even after mixing in melted PE, hydrogenolysis treatment, and extraction and separation from organic products with no apparent aggregation (FIGS. 128A-128B). This contrast further highlights the importance of the architecture of mSiO$_2$/Pt—X/SiO$_2$ in which confinement of Pt NPs prevents aggregation, and the mSiO$_2$ overcoat prevents the detaching of particles from the support.

Influence of the mSiO$_2$/Pt—X/SiO$_2$ catalytic architecture on PE hydrogenolysis. The mSiO$_2$/Pt—X/SiO$_2$ architecture is responsible for the very efficiently catalyzed PE conversions, which require very low platinum loading. The three mSiO$_2$/Pt—X/SiO$_2$ catalysts operate effectively at 0.7-3.4× 10$^{-5}$ g Pt/g PE, converting M$_n$=20 kDa into long oligomeric hydrocarbon waxes in over 70% yield after 15-20 h at 300° C. With these catalysts and low Pt loading, PE with M$_n$ of 5.9 kDa is also converted into waxy hydrocarbons in 40-60% yield within 6 h. For comparison, the Pt-1.7/SiO$_2$ catalyst, composed of identical colloidal Pt NPs similarly immobilized on identical Stöber SiO$_2$ core as the mSiO$_2$/Pt/SiO$_2$, gives only 4.6% conversion with 0.7-1.4×10$^{-5}$ g Pt/g PE under comparable conditions. Although the poor performance of Pt/SiO$_2$ is at least partly associated with catalyst degradation, an active site-immobilized and highly selective catalyst with Pt NPs on its external surface, 5c-Pt/SrTiO$_3$, also requires 2.4×10$^{-3}$ g Pt/g PE to reduce M$_n$ from 8.15 kDa to 2.15 kDa (in 97% yield) after 24 h at 300° C. under 1.17 MPa of H$_2$, and produces a desirable M$_n$ of 600 Da after 96 h. A Ru/C catalyst needs 1.3×10$^{-2}$ g Ru/g PE at the low temperature of 200° C. and 2 MPa of H$_2$ to convert PE with M$_n$ of 1.7 kDa into 45% yield of liquid alkane distributions centered at C$_{16}$. Alternatively, 1.5×10$^{-3}$ g Ru/CeO$_2$/g low density polyethylene (LDPE) converts M$_n$ of 1.7 kDa into 90% yield of C$_5$-C$_{45}$ liquids and waxes at 240° C. after 8 h under 6 MPa of H$_2$. The ability of mSiO$_2$/Pt—X/SiO$_2$ materials to be effective at low Pt loading is a consequence of high reactivity for carbon-carbon bond cleavage in polyolefins and long lifetime. The latter feature is further supported by this catalyst remaining equivalently effective and selective after multiple recovery and re-use cycles. We attribute the long lifetime of the catalyst, under these reaction conditions, to effects of both architecture and the synthetic approach. The isolation of individual Pt NPs in the bottom of a mesoporous silica channel limits their dissociation from the silica support during catalytic hydrogenolysis. Because rates of hydrocarbon hydrogenolysis are structure-sensitive, sintering into larger Pt NPs will have an outsized negative effect on deactivation. We also noted above that 1.7 nm Pt NPs are smaller than the 2.4 nm diameter mesoporous channels; however, release of Pt NPs from mSiO$_2$/Pt-1.7/SiO$_2$ was not detected, in contrast to their observed release from the silica surface of Pt—X/SiO$_2$ during catalysis. Likely, the Pt NPs are embedded into the walls of the mesoporous silica shell. Thus, the persistent confinement of these particles at the shell/core interface needed for long catalyst lifetime originates from not only geometric factors. Likely, the growth of the mSiO$_2$ shell also chemically immobilizes Pt NPs in the catalytic material.

The mSiO$_2$/Pt—X/SiO$_2$ architecture also appears to impart high activity for these catalytic conversions. Although precise rate constants of carbon-carbon bond cleavage are not readily measured, due to the thousands of possible individual steps associated with many inequivalent bonds in the distribution of species in the reactor, the relative activities of these catalysts may be assessed qualitatively. One indicator of high activity is the small amount of Pt in the reactor that is capable of converting PE into small molecules in a relatively short amount of time. The long catalyst lifetime noted above contributes to the apparent high activity of this qualitative assessment because the analysis is not performed at low conversion (where catalyst deactivation would be avoided); thus, comparisons of activity with Pt—X/SiO$_2$ have little value. Nonetheless, comparisons of metal loading in catalysts that transform a large fraction of the polyolefins, identified above for hydrogenolysis catalysts, suggest that the Pt centers in mSiO$_2$/Pt—X/SiO$_2$ are especially active. Moreover, the active sites in this material are at the closed end of 120 nm-long mesopores, which require polymers to enter and translocate through the pores to reach the Pt NPs. These steps are not rate-controlling, as evidenced by the shorter reaction times to reach equivalent liquid yields using catalysts with smaller Pt NPs, probably because the pores are constantly filled with polymer chains under these conditions. Interestingly, the shorter reaction times needed for full conversion of smaller ($M_n$=5.9 kDa) PE suggests that chain length influences the overall reaction rate, perhaps as a result of more favorable matching of polymer and pore lengths. The rate of carbon-carbon bond cleavage at a particular catalytic site should be very similar for all $H_2C$—$CH_2$ linkages in hydrocarbon chains, whereas adsorption or translocation in the pores could be affected by the molecular mass of a chain.

The architecture of the $mSiO_2/Pt$—$X/SiO_2$ catalysts is also responsible for high selectivity and high yields of an approximately bell-shaped distribution of the extracted wax products. As the PE deconstruction proceeds over time, the yield of each species in the distribution of the extracted wax products increases. At high conversion (ca. 85%), selectivity for the waxy distribution with $mSiO_2/Pt$-1.7/$SiO_2$ is 85%, calculated as the mass of waxy liquids/total mass of deconstructed products (waxy liquids and gas). The selectivities of both $mSiO_2/Pt$-2.9/$SiO_2$ at 85% conversion or $mSiO_2/Pt$-5.0/$SiO_2$ at 72% conversion are also ca. 85% for the statically indistinguishable waxy product distribution. That is, the three sized Pt NP catalysts provide equivalent chain-length distribution of the products and equivalent selectivity for those distributions. This characteristic selective production of a certain range of hydrocarbon oligomers is noticeably absent from the control catalyst (Pt—$X/SiO_2$) at any stage of conversion. As noted in the Introduction, the average chain length of the products is affected by the characteristics of the mesoporous silica shell in the $mSiO_2/Pt/SiO_2$ catalysts. On the basis of this behavior and extensive solid-state $^{13}C$ NMR studies of conformational and dynamic behavior of absorbed polyethylene, we proposed that the polymer chains could only thread in a specific manner to reach the active Pt site. Thus, the C—C bond cleavage in a polymeric chain is confined to a certain average length, resulting in selective distributions of alkanes. That is, the mesoporous architecture confers selectivity, templating a narrow range of products from hydrogenolysis, rather than the NP sites where the carbon-carbon bond cleavage occurs.

Influence of the Pt NPs on hydrogenolysis. Time-dependence of PE consumption, time-dependence of wax yields indicate faster reactions for smaller Pt NPs in $mSiO_2/Pt$—$X/SiO_2$ compared to larger ones, a signature of a structure-sensitive catalytic reaction. For example, 29% yield of extracted wax is obtained after 8 h using $mSiO_2/Pt$-1.7/$SiO_2$, whereas only 8.5% yield is produced by $mSiO_2/Pt$-5.0/$SiO_2$ after the same amount of time. Similarly, at high conversion, ~75% yield of extracted wax is obtained with $mSiO_2/Pt$-1.7/$SiO_2$ after 15 h, whereas $mSiO_2/Pt$-2.9/$SiO_2$ requires 20 h. The shorter reaction times for conversions of equivalent amounts of PE to comparable distributions of smaller hydrocarbon chains is a qualitative indicator of higher catalytic rates for the smaller NPs, from experiments using equivalent platinum active sites in the reactor.

The rate of PE hydrogenolysis catalyzed by the active sites in smaller Pt NPs is higher than that of sites in larger Pt NPs. In contrast, the similar rates for the small and large Pt NPs as well as Pt surfaces is a hallmark of structure insensitive reactions. Thus, this qualitative assessment reveals that PE hydrogenolysis rates are increased with greater proportions of edge and corner sites compared to facets in the Pt NPs, and we infer that hydrogenolysis catalysis using $mSiO_2/Pt$—$X/SiO_2$ is a structure-sensitive catalytic reaction. Hydrogenolysis of light linear, branched, and cyclic alkanes have been demonstrated to be structure sensitive on metal surfaces, whose activity (and selectivity) varies with the exposed single crystal facet. This structure sensitivity naturally transfers to NP catalysts, because the distribution of surface atoms at the facets changes with the size of the NP. For example, the rate of ethane hydrogenolysis, in terms of turnover frequency (TOF), for 1.7 nm Pt/SBA-15 ($1.2\times10^{-2}$ $s^{-1}$) is double compared to that of 2.9 nm Pt/SBA-15 ($0.6\times10^{-2}$ $s^{-1}$). This trend, involving smaller metal NPs characterized by faster reactions, is observed for these silica-supported Pt NPs operating under gas-solid conditions, while larger NPs on other supports (such as Pt/$Al_2O_3$) have been shown to have higher activity than smaller NPs. Small Pt NPs, prepared by one ALD cycle in the 1c-Pt/$SrTiO_3$ catalyst, have higher activity for PE hydrogenolysis than medium and large Pt NPs, revealing that Pt NP size effect and associated structure sensitivity is also important in condensed phase C—C bond hydrogenolysis.

Structure sensitivity is often also manifested in terms of selectivity. For example, larger Pt NPs catalyze hydrogenolysis of small hydrocarbons in solid-gas reactions to give more branched products than linear ones, favoring cleavage of carbon-carbon bonds of secondary carbons over those involving tertiary carbons. In 1c-Pt/$SrTiO_3$-catalyzed hydrogenolysis of HDPE in the condensed phase, the higher rate of C—C bond cleavage also provides more light hydrocarbon products and gives poor selectivity to high quality liquids than in reactions using the larger Pt NPs in 5c-Pt/$SrTiO_3$. As noted above, remarkably, the selectivity of PE hydrogenolysis catalyzed by small, medium, and larger Pt NPs in $mSiO_2/Pt$—$X/SiO_2$ is independent of the particle size. As an additional comparison, similar amounts of volatiles species (~9%) and extracted waxes (~18%) are obtained at similar conversions for the three catalysts. This result reveals that smaller Pt NPs in $mSiO_2/Pt$-1.7/$SiO_2$ form similar amounts of light hydrocarbon products as in $mSiO_2/Pt$-5.0/$SiO_2$, in contrast to the behavior of Pt/$SrTiO_3$ catalysts.

The synthesis of smaller (1.7 nm), intermediate (2.9 nm), and larger (5.0 nm) Pt NPs in the identical $mSiO_2/Pt$—$X/SiO_2$ architecture provides a family of efficient, highly active, and highly selective catalysts with characteristic features and excellent behavior, across the three Pt NP sizes, in polyethylene hydrogenolysis. The smallest Pt NP is smaller than the 2.4 nm diameter of the mesopore in $mSiO_2/Pt$—$X/SiO_2$, while the largest Pt NP is larger than the pore diameter. The conversions catalyzed by these catalysts proceed in three stages. The first approximately 25% of PE conversion is poorly selective for the $mSiO_2/Pt$—$X/SiO_2$ catalysts, giving approximately 65% (by mass) of products as waxy hydrocarbons. The second stage, involving another 60-75% conversion of the PE, is highly selective for a narrow $C_{23}$-centered distribution of the desired wax-like products. This distribution is templated by the $mSiO_2/Pt$—$X/SiO_2$ architecture, rather than by the size of the Pt NPs. Adsorption of PE chains into mesopores limits conformations to affect the average product chain length. This prominent pore template effect is further demonstrated by the independence of the $C_{23}$-based bell-shaped distribution of the extracted wax products to Pt NP size as well as reaction time or conversion (prior to over-hydrogenolysis). This pore-templated cleavage phenomenon was also observed in $mSiO_2/Pt$-5.0/$SiO_2$-catalyzed hydrogenolysis of PE at 250°

C., which showed features consistent with a processive mechanism. We note that the present conditions (300° C.) result in decreased $M_n$ of the residual PE over the reaction, which is not consistent with highly processive behavior. Thus, the pore-templated carbon-carbon bond cleavage, which is a component of the processive mechanism, also functions in related processes with a low degree of processivity. The present study also indicates that the size of the exposed Pt surface, dictated either by Pt NP size or pore diameter of the mesoporous shell, is unlikely to be responsible for selecting the average chain-length of the product.

Once nearly all of the PE is consumed, undesired over-hydrogenolysis of the wax into volatile species is observed in the third stage. At this stage, the average carbon number decreases from the $C_{23}$-centered distribution as the reaction proceeds. Thus, $mSiO_2/Pt$—$X/SiO_2$ is not only selective for hydrogenolysis of PE to waxes but also remarkably selective for hydrogenolysis of PE in the presence of a large amount of $C_{23}$-centered waxes. The three stages of PE hydrogenolysis occur faster with smaller Pt NPs than with larger ones, corresponding to an increase in catalytic rate without significantly diminishing selectivity.

Upcycling Post-Consumed Bubble Wrap by Pt-Catalyzed Hydrogenolysis

The products formed (gas, extracted waxes, and insoluble products) from $mSiO_2/Pt$-1.7/$SiO_2$-catalyzed hydrogenolysis reaction of post-consumer bubble wrap is shown in Table 18.

TABLE 18

| Catalyst | PE (g) | Time (h) | Volatile products (%) | Extracted wax products (%) | Solid residue (%) |
|---|---|---|---|---|---|
| mSiO₂/Pt-1.7/SiO₂ | 3.002 | 12 | 0.310 g (10.3%) | 0.865 g (28.8%) | 1.827 g (60.9%) |

Conditions: 0.0007 wt/PE wt % heated in the reactor for 12 h at 300° C. under H₂ (at 0.89 MPa).

Although preferred embodiments have been depicted and described in detail herein, it will be apparent to those skilled in the relevant art that various modifications, additions, substitutions, and the like can be made without departing from the spirit of the invention and these are therefore considered to be within the scope of the invention as defined in the claims which follow.

What is claimed:

1. A process for catalytically hydrogenolysizing a polyolefinic polymer, said process comprising:
   providing a polyolefinic polymer and
   subjecting said polyolefinic polymer to a hydrogenolysis reaction in the presence of a catalyst to cleave the polymer into hydrocarbon segments, wherein the catalyst comprises:
      a silica core having an outer surface;
      a mesoporous silica shell having an outer surface and an inner surface with the inner surface being inside the outer surface of said mesoporous silica shell proximate to and surrounding the outer surface of said silica core, wherein the outer surface of the mesoporous silica shell has openings leading to pores within the mesoporous silica shell which extend toward the outer surface of said silica core; and
      catalytic metal nanoparticles positioned within the pores proximate to said core to cleave said polyolefinic polymer entering said mesoporous silica shell through the openings into hydrocarbon segments.

2. The process of claim 1, wherein the silica core further comprises a functional group selected from the group consisting of amines, carboxylic acids, alcohols, thiols, phosphorus, and combinations thereof.

3. The process of claim 2, wherein the functional group is an amine.

4. The process of claim 1, wherein the catalytic metal nanoparticles are positioned on the outer surface of the silica core.

5. The process of claim 1, wherein the catalyst has a mean particle diameter of about 100 nm to about 1000 nm.

6. The process of claim 1, wherein the silica core has a mean particle diameter of about 50 nm to about 500 nm.

7. The process of claim 1, wherein the metal for the catalytic metal nanoparticle is selected from the group consisting of nickel, palladium, platinum, cobalt, rhodium, iridium, iron, ruthenium, osmium, manganese, rhenium, chromium, molybdenum, tungsten, and combinations thereof.

8. The process of claim 7, wherein the metal for the catalytic metal nanoparticle is platinum.

9. The process of claim 1, wherein the catalytic metal nanoparticle comprises about 0.0001 wt % to about 1.0 wt % of the catalyst.

10. The process of claim 1, wherein the catalytic metal nanoparticle has a mean particle diameter of about 1 nm to about 10 nm.

11. The process of claim 1, wherein the mesoporous silica shell has a thickness of about 50 nm to about 500 nm.

12. The process of claim 1, wherein the mesoporous silica shell has a pore diameter of about 1 nm to about 10 nm.

13. The process of claim 1, wherein the pores have a length of about the thickness of the mesoporous silica shell measured between its inner and outer surfaces.

14. The process of claim 1, wherein said polyolefinic polymer is selected from the group consisting of physical mixtures of polymers, polymeric blends, copolymers, block copolymers, graft copolymers, and combinations thereof.

15. The process of claim 1, wherein said polyolefinic polymer is selected from the group consisting of high density polyethylene, isostatic polypropylene, medium density polyethylene, low density polyethylene, linear low density polyethylene, ultra high molecular weight polyethylene, and combinations thereof.

16. The process of claim 15, wherein said polyolefinic polymer is high density polyethylene having a number average molecular weight (Mn) of 5000-100000 Da.

17. The process of claim 1, wherein said polyolefinic polymer has a longitudinal extent between opposed ends and said subjecting said polyolefinic polymer to a hydrogenolysis reaction comprises:
   extending an end of said polyolefinic polymer through the openings and into the pores of said mesoporous silica shell and cleaving said polyolefinic polymer into hydrocarbon segments in the pores using the catalytic metal nanoparticle.

18. The process of claim 1, wherein the pores have dimensions selected to produce a size distribution of the hydrocarbon segments as a result of hydrogenolysis.

19. The process of claim 1, wherein the pores have a diameter selected to permit a length of said polyolefinic polymer to enter the pores which yield a particular segment length as a result of hydrogenolysis.

20. The process of claim 1, wherein said subjecting is carried out at a pressure about 1 psi to about 1000 psi.

21. The process of claim 1, wherein said subjecting is carried out at a temperature of about 150° C. to about 400° C.

* * * * *